US008417588B2

(12) United States Patent
Ringl et al.

(10) Patent No.: US 8,417,588 B2
(45) Date of Patent: Apr. 9, 2013

(54) MANAGING CONSISTENT INTERFACES FOR GOODS TAG, PRODUCTION BILL OF MATERIAL HIERARCHY, AND RELEASE ORDER TEMPLATE BUSINESS OBJECTS ACROSS HETEROGENEOUS SYSTEMS

(75) Inventors: Benjamin Ringl, Leimen (DE); Frank O. Schulz, Schwetzingen (DE); Martin Schmidt, Wiesloch (DE); Martin J. Wilmes, Oftersheim (DE); Michael Hartel, Heidelberg (DE); Michael Seubert, Sinsheim (DE); Sabine Seelenmeyer, Ettlingen (DE); Sergio Alberto Rozenszajn, Rehovot (IL); Stefan Moeller, Dielheim (DE); Thilo Kraehmer, Heidelberg (DE); Thomas Friedrich, Walldorf (DE); Werner Gnan, Angelbachtal (DE)

(73) Assignee: SAP AG, Walldorf (DE)

( * ) Notice: Subject to any disclaimer, the term of this patent is extended or adjusted under 35 U.S.C. 154(b) by 191 days.

(21) Appl. No.: 12/816,170

(22) Filed: Jun. 15, 2010

(65) Prior Publication Data

US 2011/0307353 A1 Dec. 15, 2011

(51) Int. Cl.
*G06Q 30/00* (2012.01)

(52) U.S. Cl. .................... 705/26.81; 705/26.1; 705/27.1

(58) Field of Classification Search ......... 705/26.1–27.2
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

"An XML Model for Use Across Heterogeneous Client-Server Applications," SUvendi Chinnappen-Rimer and Gerhard P. Hancke, IEEE Transactions on Intrumentastion and Measurement, Oct. 2008, vol. 50, No. 10, pp. 2128-2135.*

(Continued)

*Primary Examiner* — Peter Choi
*Assistant Examiner* — Kathleen G Palavecino
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a goods tag, a production bill of material hierarchy, and/or a release order template business object.

6 Claims, 488 Drawing Sheets

U.S. PATENT DOCUMENTS

| | | | |
|---|---|---|---|
| 5,970,475 | A | 10/1999 | Barnes et al. |
| 5,983,284 | A | 11/1999 | Argade |
| 6,047,264 | A | 4/2000 | Fisher et al. |
| 6,058,378 | A | 5/2000 | Clark et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,542,912 | B2 | 4/2003 | Meltzer et al. |
| 6,591,260 | B1 | 7/2003 | Schwartzhoff et al. |
| 6,725,122 | B2 | 4/2004 | Mori et al. |
| 6,738,747 | B1 | 5/2004 | Tanaka et al. |
| 6,745,229 | B1 | 6/2004 | Gobin et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,249,195 | B2 | 7/2007 | Panec et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,426,520 | B2 | 9/2008 | Gorelik et al. |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,536,697 | B2 | 5/2009 | Wiseman et al. |
| 7,574,383 | B1 | 8/2009 | Parasnis et al. |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,689,711 | B2 | 3/2010 | Brouk et al. |
| 7,788,319 | B2 | 8/2010 | Schmidt et al. |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 | 2/2011 | Spence et al. |
| 7,941,236 | B2 | 5/2011 | Spearman |
| 8,082,243 | B2 | 12/2011 | Gorelik et al. |
| 8,150,798 | B2 | 4/2012 | Ma et al. |
| 2001/0042032 | A1 | 11/2001 | Crawshaw et al. |
| 2001/0047372 | A1 | 11/2001 | Gorelik et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0041178 | A1 | 2/2003 | Brouk et al. |
| 2003/0069648 | A1 | 4/2003 | Douglas et al. |
| 2003/0086594 | A1 | 5/2003 | Gross |
| 2003/0120502 | A1 | 6/2003 | Robb et al. |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0195815 | A1 | 10/2003 | Li et al. |
| 2003/0204452 | A1 | 10/2003 | Wheeler |
| 2003/0208389 | A1 | 11/2003 | Kurihara et al. |
| 2003/0212614 | A1 | 11/2003 | Chu et al. |
| 2003/0216978 | A1 | 11/2003 | Sweeney et al. |
| 2003/0220875 | A1 | 11/2003 | Lam et al. |
| 2003/0229522 | A1 | 12/2003 | Thompson et al. |
| 2003/0229550 | A1 | 12/2003 | DiPrima et al. |
| 2003/0233295 | A1 | 12/2003 | Tozawa et al. |
| 2003/0236748 | A1 | 12/2003 | Gressel et al. |
| 2004/0015366 | A1 | 1/2004 | Wiseman et al. |
| 2004/0024662 | A1 | 2/2004 | Gray et al. |
| 2004/0034577 | A1 | 2/2004 | Van Hoose et al. |
| 2004/0039665 | A1 | 2/2004 | Ouchi |
| 2004/0073510 | A1 | 4/2004 | Logan |
| 2004/0083201 | A1 | 4/2004 | Sholl et al. |
| 2004/0083233 | A1 | 4/2004 | Willoughby |
| 2004/0133445 | A1 | 7/2004 | Rajan et al. |
| 2004/0138942 | A1 | 7/2004 | Pearson et al. |
| 2004/0148227 | A1 | 7/2004 | Tabuchi et al. |
| 2004/0172360 | A1 | 9/2004 | Mabrey et al. |
| 2004/0186891 | A1 | 9/2004 | Panec et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038744 | A1 | 2/2005 | Viijoen |
| 2005/0049903 | A1 | 3/2005 | Raja |
| 2005/0055369 | A1 | 3/2005 | Gorelik et al. |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |
| 2005/0197878 | A1 | 9/2005 | Fotteler et al. |
| 2005/0197881 | A1 | 9/2005 | Fotteler et al. |
| 2005/0197882 | A1 | 9/2005 | Fotteler et al. |
| 2005/0197886 | A1 | 9/2005 | Veit |
| 2005/0197887 | A1 | 9/2005 | Zuerl et al. |
| 2005/0197896 | A1 | 9/2005 | Veit et al. |
| 2005/0197897 | A1 | 9/2005 | Veit et al. |
| 2005/0197898 | A1 | 9/2005 | Veit et al. |
| 2005/0197899 | A1 | 9/2005 | Veit et al. |
| 2005/0197900 | A1 | 9/2005 | Veit |
| 2005/0197901 | A1 | 9/2005 | Veit et al. |
| 2005/0197902 | A1 | 9/2005 | Veit |
| 2005/0197928 | A1 | 9/2005 | Fotteler et al. |

| | | | |
|---|---|---|---|
| 2005/0197941 | A1 | 9/2005 | Veit |
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0216421 | A1 | 9/2005 | Barry et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0228821 | A1 | 10/2005 | Gold |
| 2005/0234754 | A1 | 10/2005 | Veit |
| 2005/0246240 | A1 | 11/2005 | Padilla |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026552 | A1 | 2/2006 | Mazzitelli et al. |
| 2006/0026586 | A1 | 2/2006 | Remmel et al. |
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0059005 | A1 | 3/2006 | Horn et al. |
| 2006/0059059 | A1 | 3/2006 | Horn et al. |
| 2006/0059060 | A1 | 3/2006 | Horn et al. |
| 2006/0069598 | A1 | 3/2006 | Schweitzer et al. |
| 2006/0069629 | A1 | 3/2006 | Schweitzer et al. |
| 2006/0069632 | A1 | 3/2006 | Kahn et al. |
| 2006/0074728 | A1 | 4/2006 | Schweitzer et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 | 4/2006 | Seubert et al. |
| 2006/0089885 | A1 | 4/2006 | Finke et al. |
| 2006/0095373 | A1 | 5/2006 | Venkatasubramanian et al. |
| 2006/0184435 | A1 | 8/2006 | Mostowfi |
| 2006/0212376 | A1 | 9/2006 | Snyder et al. |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |
| 2007/0055688 | A1 | 3/2007 | Blattner |
| 2007/0067411 | A1 | 3/2007 | Angelov |
| 2007/0078799 | A1 | 4/2007 | Huber-Buschbeck et al. |
| 2007/0112574 | A1 | 5/2007 | Greene |
| 2007/0124227 | A1 | 5/2007 | Dembo et al. |
| 2007/0129978 | A1 | 6/2007 | Shirasu et al. |
| 2007/0132585 | A1 | 6/2007 | Llorca et al. |
| 2007/0150387 | A1 | 6/2007 | Seubert et al. |
| 2007/0150836 | A1 | 6/2007 | Deggelmann et al. |
| 2007/0156428 | A1 | 7/2007 | Brecht-Tillinger et al. |
| 2007/0156545 | A1 | 7/2007 | Lin |
| 2007/0156552 | A1 | 7/2007 | Manganiello |
| 2007/0156690 | A1 | 7/2007 | Moser et al. |
| 2007/0165622 | A1 | 7/2007 | O'Rourke et al. |
| 2007/0214065 | A1 | 9/2007 | Kahlon et al. |
| 2007/0225949 | A1 | 9/2007 | Sundararajan et al. |
| 2007/0226090 | A1 | 9/2007 | Stratton |
| 2007/0255639 | A1 | 11/2007 | Seifert |
| 2007/0265860 | A1 | 11/2007 | Herrmann et al. |
| 2007/0265862 | A1 | 11/2007 | Freund et al. |
| 2007/0288250 | A1 | 12/2007 | Lemcke et al. |
| 2007/0294159 | A1 | 12/2007 | Cottle |
| 2008/0005012 | A1 | 1/2008 | Deneef |
| 2008/0016242 | A1 | 1/2008 | Panec et al. |
| 2008/0021754 | A1 | 1/2008 | Horn et al. |
| 2008/0040243 | A1 | 2/2008 | Chang et al. |
| 2008/0046104 | A1 | 2/2008 | Van Camp et al. |
| 2008/0046421 | A1 | 2/2008 | Bhatia et al. |
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0120313 | A1 | 5/2008 | O'Brien et al. |
| 2008/0133303 | A1 | 6/2008 | Singh et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0196108 | A1 | 8/2008 | Dent et al. |
| 2008/0215354 | A1 | 9/2008 | Halverson et al. |
| 2008/0243578 | A1 | 10/2008 | Veit |
| 2008/0288317 | A1 | 11/2008 | Kakar |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0094274 | A1 | 4/2009 | Gorelik et al. |
| 2009/0164497 | A1 | 6/2009 | Steinmaier et al. |
| 2009/0192926 | A1 | 7/2009 | Tarapata |
| 2009/0193432 | A1 | 7/2009 | McKegney et al. |
| 2009/0222360 | A1 | 9/2009 | Schmitt et al. |
| 2009/0248429 | A1 | 10/2009 | Doenig et al. |
| 2009/0248430 | A1 | 10/2009 | Hubert et al. |
| 2009/0248431 | A1 | 10/2009 | Schoknecht et al. |
| 2009/0248463 | A1 | 10/2009 | Piochon et al. |
| 2009/0248473 | A1 | 10/2009 | Doenig et al. |
| 2009/0248487 | A1 | 10/2009 | Santoso et al. |
| 2009/0248547 | A1 | 10/2009 | Doenig et al. |
| 2009/0248558 | A1 | 10/2009 | Hollberg et al. |
| 2009/0248586 | A1 | 10/2009 | Kaisermayr et al. |
| 2009/0248698 | A1 | 10/2009 | Rehmann |
| 2009/0249358 | A1 | 10/2009 | Schuette |
| 2009/0249362 | A1 | 10/2009 | Lindemann et al. |
| 2009/0271245 | A1 | 10/2009 | Joshi et al. |
| 2009/0300578 | A1 | 12/2009 | Neil |
| 2009/0326988 | A1 | 12/2009 | Barth et al. |
| 2009/0327009 | A1 | 12/2009 | Schmitt et al. |
| 2009/0327105 | A1 | 12/2009 | Moussa et al. |
| 2009/0327106 | A1 | 12/2009 | Bartelt et al. |
| 2010/0001834 | A1 | 1/2010 | Brunswig et al. |
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0131379 | A1 | 5/2010 | Dorais et al. |
| 2010/0131394 | A1 | 5/2010 | Rutsch et al. |
| 2010/0153297 | A1 | 6/2010 | Haaf et al. |
| 2010/0161425 | A1 | 6/2010 | Sideman |
| 2010/0217645 | A1 | 8/2010 | Jin et al. |
| 2010/0217820 | A1 | 8/2010 | Brouk et al. |
| 2010/0218245 | A1 | 8/2010 | Brouk et al. |
| 2010/0241729 | A1 | 9/2010 | Angelov |
| 2010/0306536 | A1 | 12/2010 | Brouk et al. |
| 2011/0046775 | A1 | 2/2011 | Bailey et al. |
| 2011/0077999 | A1 | 3/2011 | Becker et al. |
| 2011/0078048 | A1 | 3/2011 | Becker et al. |
| 2011/0153767 | A1 | 6/2011 | Coldicott et al. |
| 2011/0276636 | A1 | 11/2011 | Cheng et al. |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | 2008/005102 | 1/2008 |

OTHER PUBLICATIONS

SAP Structured Entity Relationship Model (SAP-SERM) for R/3 System Release 4.0 Introduction and Index; Dec. 1998; 26 pages.

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; <http://www.omg.org/news/meetings/workshops/uml_presentations.htm> retrieved on Mar. 17, 2005.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3. Retrieved on Mar. 17, 2005.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; 1999; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML—Financial Services Markup Language (Jul. 14, 1999) http://xml.coverpages.org/FSML-v1500a.pdf; pp. 1-159 (2 parts).
Webster's Revised Unabridged Dictionary (1913+1828); Def. "merchandise"; <http://machaut.uchicago.edu/?resource=Webster%27s&word=merchandise&use1913=on&u>. Retrieved on Sep. 1, 2009.
Statement in Accordance with the Notice from the European Patent Office dated Oct. 1, 2007 Concerning Business Methods—EPC; Official Journal of the European Patent Office; Munich; Nov. 1, 2007; pp. 592-593.

Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) EPC issued in related European Application No. 05757432.9 on Jan. 26, 2009; 4 pages.
Communication Pursuant to Article 94(3) issued in European Application No. 05757432.9 on Apr. 12, 2011; 5 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,178 on Dec. 7, 2009; 6 pages.
Office Action issued in related U.S. Appl. No. 12/060,178 on May 25, 2010; 19 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.

Office Action issued in related U.S. Appl. No. 12/060,171 on Jul. 1, 2010; 19 pages.
Office Action issued in related U.S. Appl. No. 12/060,171 on Jan. 26, 2011; 17 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
142 Notice of Allowance issued in related U.S. Appl. No. 11/864,866 on Jul. 22, 2011; 6 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Office Action issued in related U.S. Appl. No. 11/864,871 on Apr. 21, 2010; 20 pages.
Office Action issued in related U.S. Appl. No. 11/864,871 on Oct. 1, 2010; 30 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Notice of Allowance issued in related U.S. Appl. No. 11/803,178 on May 17, 2011; 13 pages.
Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Gable, Julie; "Enterprise Application Integration"; Information Management Journal; Mar./Apr. 2002; pp. 48-52.
Himoff et al.; "Magenta Technology: Multi-Agent Systems for Industrial Logistics"; AAMAS'05; Jul. 25-29, 2005; 2005 ACM; pp. 60-66:1-7).
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML—Message Queuing Markup Language"; Proceedings of the 4th IEEE International Workshop on Advanced Issues of E-Commerce and Web-Based Information Systems (WECWIS 2002); 2002; 8 pages.
SAP 2008 Annual Report; 256 pages.
International Search Report and Written Opinion issued in International Application No. PCT/CN2011/001238 on May 3, 2012; 9 pages.
Communication Pursuant to Article 94(3) EPC issued in European Application No. 07835755.5 on Feb. 22, 2012; 7 pages.
Communication Pursuant to Article 94(3) issued in European Application No. 05766672.9 on Jul. 14, 2011; 4 pages.
Notice of Allowance issued in related U.S. Appl. No. 11/864,866 on Mar. 13, 2012; 7 pages.
Notice of Allowance issued in related U.S. Appl. No. 12/060,178 on Sep. 2, 2011; 9 pages.
Notice of Allowance issued in related U.S. Appl. No. 11/145,464 on Feb. 6, 2012; 7 pages.
Notice of Allowance issued in related U.S. Appl. No. 11/364,538 on Jul. 13, 2012; 7 pages.
Notice of Allowance issued in related U.S. Appl. No. 11/731,857 on Dec. 14, 2011; 7 pages.
Notice of Allowance issued in related U.S. Appl. No. 11/803,178 on Jul. 17, 2012; 15 pages.
Notice of Allowance issued in related U.S. Appl. No. 11/864,832 on Jan. 9, 2012;12 pages.
Notice of Allowance issued in related U.S. Appl. No. 11/864,832 on Jul. 30, 2012;12 pages.
Notice of Allowance issued in U.S. Appl. No. 11/155,368 on Jul. 23, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Notice of Allowance issued in U.S. Appl. No. 11/640,422 on Sep. 29, 2011; 7 pages.
Notice of Allowance issued in U.S. Appl. No. 11/640,422 on May 22, 2012; 7 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Sep. 10, 2012; 10 pages.

Notice of Allowance issued in U.S. Appl. No. 11/864,811 on Nov. 14, 2011; 8 pages.
Notice of Allowance issued in U.S. Appl. No. 11/864,811 on Mar. 2, 2012; 8 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Notice of Allowance issued in U.S. Appl. No. 12/060,192 on Mar. 2, 2012; 18 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/815,618 on May 10, 2012; 7 pages.
Office Action issued in related U.S. Appl. No. 11/864,863 on Dec. 22, 2011; 20 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,054 on Dec. 7, 2011; 15 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Office Action issued in related U.S. Appl. No. 12/060,192 on Sep. 6, 2011; 18 pages.
Office Action issued in U.S. Appl. No. 11/864,786 on Mar. 30, 2012; 12 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,802 on Jul. 20, 2012; 16 pages.
Office Action issued in U.S. Appl. No. 12/816,083 on May 9, 2012; 20 pages.
Office Action issued in U.S. Appl. No. 12/816,293 on Apr. 25, 2012; 10 pages.
Office Action issued in U.S. Appl. No. 13/192,543 on Aug. 28, 2012; 14 pages.
Office Action issued in U.S. Appl. No. 13/192,555 on Jul. 20, 2012; 7 pages.
Office Action issued in U.S. Appl. No. 13/349,477 on Jun. 29, 2012; 13 pages.

* cited by examiner

Goods Tag 32000

Unspecified Content Package Tag
32052
Uniform Content Package Tag
32054
Serialised Material Tag
32056
Mixed Content Package Tag
32058
Business Transaction Document Reference
32060
Location
32062
Location Address
32064
Controlled Output Request
32066
Text Collection
32068
{ To FIG. 32-1

| Package | | | Level 1 | Level 2 | Level 3 | Level 4 | Level 5 | Level 6 | Cardinality | Data Type Name |
|---|---|---|---|---|---|---|---|---|---|---|
| Form Mixed Content Package Tag Notification 370000 | | | Form Mixed Content Package Tag Notification 370002 | | | | | | | FormMixedContentPackageTagNotificationMessage 370004 |
| | Message Header 370006 | | | Message Header 370008 | | | | | 1 370010 | BusinessDocumentMessageHeader 370012 |
| | | | | | ID 370014 | | | | 0..1 370016 | BusinessDocumentMessageID 370018 |
| | | | | | UUID 370020 | | | | 0..1 370022 | UUID 370024 |
| | | | | | Reference ID 370026 | | | | 0..1 370028 | BusinessDocumentMessageID 370030 |

FIG. 37-2

| Package | | | Level 1 | Level 2 | Level 3 | Level 4 | Level 5 | Level 6 | Cardinality | Data Type Name |
|---|---|---|---|---|---|---|---|---|---|---|
| | | | | | ReferenceUUID 370032 | | | | 0..1 370034 | UUID 370036 |
| | | | | | CreationDateTime 370038 | | | | 1 370040 | GLOBAL_DateTime 370042 |
| | | | | | TestDataIndicator 370044 | | | | 0..1 370046 | Indicator 370048 |
| | | | | | ReconciliationIndicator 370050 | | | | 0..1 370052 | Indicator 370054 |
| | | | | | SenderBusinessSystemID 370056 | | | | 0..1 370058 | BusinessSystemID 370060 |

FIG. 37-3

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | Recipient BusinessSystemID 370062 | | | | 0..1 370064 | BusinessSystemID 370066 |
| | | Party 370068 | | | | SenderParty 370070 | | | | 0..1 370072 | BusinessDocumentMessageHeaderParty 370074 |
| | | | | | | | InternalID 370076 | | | 0..1 370078 | PartyInternalID 370080 |
| | | | | | | | StandardID 370082 | | | 0..N 370084 | PartyStandardID 370086 |
| | | | | | | | ContactPerson 370088 | | | 0..1 370090 | BusinessDocumentMessageHeaderPartyContactPerson 370092 |
| | | | | | | | | InternalID 370094 | | 0..1 370096 | ContactPersonInternalID 370098 |

FIG. 37-4

| Package | Level 1 | Level 2 | Level 3 | Level 4 | Level 5 | Level 6 | Cardinality | Data Type Name |
|---|---|---|---|---|---|---|---|---|
| | | | | | OrganisationFormattedName 370100 | | 0..N 370102 | LANGUAGEINDEPENDENT_MEDIUM_Name 370104 |
| | | | | | PersonFormattedName 370106 | | 0..N 370108 | LANGUAGEINDEPENDENT_LONG_Name 370110 |
| | | | | | PhoneNumber 370114 | | 0..N 370116 | PhoneNumber 370118 |
| | | | | | FaxNumber 370122 | | 0..N 370124 | PhoneNumber 370126 |
| | | | | | EmailURI 370128 | | 0..N 370130 | EmailURI 370132 |
| | | | Recipient Party 370136 | | | | 0..N 370138 | BusinessDocumentMessageHeaderParty 370140 |

FIG. 37-5

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | InternalID 370142 | | | 0..1 370144 | PartyInternalID 370146 |
| | | | | | | | StandardID 370148 | | | 0..N 370150 | PartyStandardID 370152 |
| | | | | | | | ContactPerson 370154 | | | 0..1 370156 | BusinessDocumentMessageHeaderPartyContactPerson 370158 |
| | | | | | | | | InternalID 370160 | | 0..1 370162 | ContactPersonInternalID 370164 |
| | | | | | | | | OrganisationFormattedName 370166 | | 0..N 370168 | LANGUAGEINDEPENDENT_MEDIUM_Name 370170 |
| | | | | | | | | PersonFormattedName 370172 | | 0..N 370174 | LANGUAGEINDEPENDENT_LONG_Name 370176 |

FIG. 37-6

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | | PhoneNumber 370180 | | 0..N 370182 | PhoneNumber 370184 |
| | | | | | | | | FaxNumber 370188 | | 0..N 370190 | PhoneNumber 370192 |
| | | | | | | | | EmailURI 370194 | | 0..N 370196 | EmailURI 370198 |
| | | Business Scope 370200 | | | | BusinessScope 370202 | | | | 0..N 370204 | BusinessScope 370206 |
| | GoodsTag 370208 | | | | GoodsTag 370210 | | | | | 1 370212 | FormMixedContentPackageTagNotification 370214 |
| | | | | | | ID 370216 | | | | 1 370218 | GoodsTagID 370220 |
| | | | | | | PartySerialID 370222 | | | | 0..1 370224 | SerialID 370226 |

FIG. 37-7

| Package | | | Level 1 | Level 2 | Level 3 | Level 4 | Level 5 | Level 6 | Cardinality | Data Type Name |
|---|---|---|---|---|---|---|---|---|---|---|
| | | | | | ProductionDate 370228 | | | | 0..1 370230 | Date 370232 |
| | | | | | ShippingDate 370234 | | | | 0..1 370236 | Date 370238 |
| | | | | | GoodsReceiptDate 370240 | | | | 0..1 370242 | Date 370244 |
| | | | | | ShippingPackageAttachedIndicator 370246 | | | | 0..1 370248 | Indicator 370250 |
| | | | | | CreationContextDependingDate 370252 | | | | 1 370254 | Date 370256 |

FIG. 37-8

| Package | | | Level 1 | Level 2 | Level 3 | Level 4 | Level 5 | Level 6 | Cardinality | Data Type Name |
|---|---|---|---|---|---|---|---|---|---|---|
| | | | | | GrossWeightMeasure 370258 | | | | 0..1 370260 | Measure 370262 |
| | | | | | GrossWeightMeasureTypeCode 370264 | | | | 0..1 370266 | MeasureTypeCode 370268 |
| | | | | | GrossWeightMeasureTypeName 370270 | | | | 0..1 370272 | LONG_Name 370274 |
| | | | | | GrossWeightMeasureUnitCodeName 370276 | | | | 0..1 370278 | Name 370280 |

FIG. 37-9

| Package | | | Level 1 | Level 2 | Level 3 | Level 4 | Level 5 | Level 6 | Cardinality | Data Type Name |
|---|---|---|---|---|---|---|---|---|---|---|
| | | | | | GrossVolumeMeasure 370282 | | | | 0..1 370284 | Measure 370286 |
| | | | | | GrossVolumeMeasureTypeCode 370288 | | | | 0..1 370290 | MeasureTypeCode 370292 |
| | | | | | GrossVolumeMeasureTypeName 370294 | | | | 0..1 370296 | LONG_Name 370298 |
| | | | | | GrossVolumeMeasureUnitCodeName 370300 | | | | 0..1 370302 | Name 370304 |

FIG. 37-10

| Package | | | Level 1 | Level 2 | Level 3 | Level 4 | Level 5 | Level 6 | Cardinality | Data Type Name |
|---|---|---|---|---|---|---|---|---|---|---|
| | | | | | OutputRequestCreationDateTime 370306 | | | | 1 370308 | LOCAL_DateTime 370310 |
| | | | | | OutputRequestCreationIdentityID 370312 | | | | 1 370314 | IdentityID 370316 |
| | | | | | OutputRequestCreationBusinessPartnerFormattedName 370318 | | | | 0..1 370320 | LANGUAGEINDEPENDENT_LONG_Name 370322 |
| | | | | | ImageFileContentBinaryObject 370324 | | | | 0..1 370326 | BinaryObject 370328 |

FIG. 37-11

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | Transport Tracking 370330 | | | | 0..1 370332 | TransportTracking 370334 |
| | | TextCollection 370336 | | | | TextCollection 370338 | | | | 0..1 370340 | FormMixedContentPackageTagNotificationTextCollection 370342 |
| | | | | | | | TextCollection 370344 | | | 1 370346 | TextCollection 370348 |
| | | | | | | | | @actionCode 370350 | | 0..1 370352 | ActionCode 370354 |
| | | | Text 370356 | | | | | Text 370358 | | 0..N 370360 | TextCollectionText 370362 |
| | | | | | | | | | @actionCode 370364 | 0..1 370366 | ActionCode 370368 |

FIG. 37-12

| Package | Level 1 | Level 2 | Level 3 | Level 4 | Level 5 | Level 6 | Cardinality | Data Type Name |
|---|---|---|---|---|---|---|---|---|
| | | | | | | TypeCode 370370 | 0..1 370372 | TextCollectionTextTypeCode 370374 |
| | | | | | | CreationDateTime 370376 | 0..1 370378 | GLOBAL_DateTime 370380 |
| | | | | | | ContentText 370382 | 1 370384 | Text 370386 |
| LogisticUnit 370388 | | | LogisticUnit 370390 | | | | 0..1 370392 | FormMixedContentPackageTagNotificationLogisticUnit 370394 |
| | | | | LogisticUnitID 370396 | | | 1 370398 | LogisticUnitID 370400 |
| | | | | LogisticUnitDescription 370402 | | | 0..1 370404 | SHORT_Description 370406 |

FIG. 37-13

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | LogisticUnitQuantity 370408 | | | 1 370410 | Quantity 370412 |
| | | | | | | | LogisticUnitQuantityTypeCode 370414 | | | 1 370416 | QuantityTypeCode 370418 |
| | | | | | | | LogisticUnitQuantityTypeName 370420 | | | 1 370422 | SHORT_Name 370424 |
| | | Delivery 370426 | | | | Delivery 370428 | | | | 1 370430 | FormMixedContentPackageTagNotificationDelivery 370432 |
| | | | | | | | ShipToAddress 370434 | | | 0..1 370436 | FormAddress 370438 |

FIG. 37-14

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ShipToAddressPostalCode 370440 | | | 0..1 370442 | PostalCode 370444 |
| | | | | | | | ShipToCountryCode 370446 | | | 0..1 370448 | CountryCode 370450 |
| | | | | | | | ShipToCountryName 370452 | | | 0..1 370454 | MEDIUM_Name 370456 |
| | | | | | | | ShipFromAddress 370458 | | | 0..1 370460 | FormAddress 370462 |
| | | | | | | | ShipFromCountryCode 370464 | | | 0..1 370466 | CountryCode 370468 |

FIG. 37-15

| Package | Level 1 | Level 2 | Level 3 | Level 4 | Level 5 | Level 6 | Cardinality | Data Type Name |
|---|---|---|---|---|---|---|---|---|
| | | | | ShipFromCountryName 370470 | | | 0..1 370472 | MEDIUM_Name 370474 |
| | | | | Incoterms 370476 | | | 0..1 370478 | FormIncoterms 370480 |
| | | | | | ClassificationCode 370482 | | 1 370484 | IncotermsClassificationCode 370486 |
| | | | | | ClassificationName 370488 | | 1 370490 | Name 370492 |
| | | | | | TransferLocationName 370494 | | 0..1 370496 | IncotermsTransferLocationName 370498 |

FIG. 37-16

| Package | Level 1 | Level 2 | Level 3 | Level 4 | Level 5 | Level 6 | Cardinality | Data Type Name |
|---|---|---|---|---|---|---|---|---|
| | | | | BuyerPartyID 370500 | | | 0..1 370502 | PartyID 370504 |
| | | | | BuyerPartyFormattedName 370506 | | | 0..1 370508 | LANGUAGEINDEPENDENT_LONG_Name 370510 |
| | | | | SellerPartyID 370512 | | | 0..1 370514 | PartyID 370516 |
| | | | | SellerPartyFormattedName 370518 | | | 0..1 370520 | LANGUAGEINDEPENDENT_LONG_Name 370522 |
| | | | | RecipientPartyID 370524 | | | 0..1 370526 | PartyID 370528 |

FIG. 37-17

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | RecipientPartyFormattedName 370530 | | | 0..1 370532 | LANGUAGEINDEPENDENT_LONG_Name 370534 |
| | | | | | | | VendorPartyID 370536 | | | 0..1 370538 | PartyID 370540 |
| | | | | | | | VendorPartyFormattedName 370542 | | | 0..1 370544 | LANGUAGEINDEPENDENT_LONG_Name 370546 |
| | | | | | | | FreightForwarderPartyID 370548 | | | 0..1 370550 | PartyID 370552 |

FIG. 37-18

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | FreightForwarderPartyFormattedName 370554 | | | 0..1 370556 | LANGUAGEINDEPENDENT_LONG_Name 370558 |
| | | BusinessTransactionDocumentReferences 370560 | | | | BusinessTransactionDocumentReferences 370562 | | | | 1 370564 | FormMixedContentPackageTagNotificationBusinessTransactionDocumentReferences 370566 |
| | | | | | | | InboundDeliveryID 370568 | | | 0..1 370570 | BusinessTransactionDocumentID 370572 |
| | | | | | | | InboundDeliveryItemID 370574 | | | 0..1 370576 | BusinessTransactionDocumentItemID 370578 |

FIG. 37-19

| Package | Level 1 | Level 2 | Level 3 | Level 4 | Level 5 | Level 6 | Cardinality | Data Type Name |
|---|---|---|---|---|---|---|---|---|
| | | | | ConfirmedInboundDeliveryID 370580 | | | 0..1 370582 | BusinessTransactionDocumentID 370584 |
| | | | | ConfirmedInboundDeliveryItemID 370586 | | | 0..1 370588 | BusinessTransactionDocumentItemID 370590 |
| | | | | OutboundDeliveryID 370592 | | | 0..1 370594 | BusinessTransactionDocumentID 370596 |
| | | | | OutboundDeliveryItemID 370598 | | | 0..1 370600 | BusinessTransactionDocumentItemID 370602 |

FIG. 37-20

| Package | Level 1 | Level 2 | Level 3 | Level 4 | Level 5 | Level 6 | Cardinality | Data Type Name |
|---|---|---|---|---|---|---|---|---|
| | | | | CreationContextDependingDeliveryID 370604 | | | 0..1 370606 | BusinessTransactionDocumentID 370608 |
| | | | | CreationContextDependingDeliveryItemID 370610 | | | 0..1 370612 | BusinessTransactionDocumentItemID 370614 |
| | | | | SalesOrderID 370616 | | | 0..1 370618 | BusinessTransactionDocumentID 370620 |
| | | | | SalesOrderItemID 370622 | | | 0..1 370624 | BusinessTransactionDocumentItemID 370626 |
| | | | | PurchaseOrderID 370628 | | | 0..1 370630 | BusinessTransactionDocumentID 370632 |

FIG. 37-21

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | PurchaseOrderItemID 370634 | | | 0..1 370636 | BusinessTransactionDocumentItemID 370638 |
| | | | | | | | CustomerReturnID 370640 | | | 0..1 370642 | BusinessTransactionDocumentID 370644 |
| | | | | | | | CustomerReturnItemID 370646 | | | 0..1 370648 | BusinessTransactionDocumentItemID 370650 |
| | | | | | | | OriginPurchaseOrderID 370652 | | | 0..1 370654 | BusinessTransactionDocumentID 370656 |
| | | | | | | | OriginPurchaseOrderItemID 370658 | | | 0..1 370660 | BusinessTransactionDocumentItemID 370662 |

FIG. 37-22

| Package | | | | Level 1 | Level 2 | Level 3 | Level 4 | Level 5 | Level 6 | Cardinality | Data Type Name |
|---|---|---|---|---|---|---|---|---|---|---|---|
| | | Site 370664 | | | | Site 370666 | | | | 1 370668 | FormMixedContentPackageTagNotificationSite 370670 |
| | | | | | | | SiteID 370672 | | | 1 370674 | LocationID 370676 |
| | | | | | | | SiteDescription 370678 | | | 1 370680 | SHORT_Description 370682 |
| | | IdentifiedLogisticUnit 370684 | | | | IdentifiedLogisticUnit 370686 | | | | 0..1 370688 | FormMixedContentPackageTagNotificationIdentifiedLogisticUnit 370690 |
| | | | | | | | IdentifiedLogisticUnitInternalID 370692 | | | 0..1 370694 | IdentifiedLogisticUnitInternalID 370696 |

FIG. 37-23

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | GrossVolumeMeasure 370698 | | | 0..1 370700 | FormMeasure 370702 |
| | | | | | | | | Measure 370704 | | 1 370706 | Measure 370708 |
| | | | | | | | | MeasureUnitCodeName 370710 | | 0..1 370712 | Name 370714 |
| | | | | | | | GrossWeightMeasure 370716 | | | 0..1 370718 | FormMeasure 370720 |
| | | | | | | | | Measure 370722 | | 1 370724 | Measure 370726 |
| | | | | | | | | MeasureUnitCodeName 370728 | | 0..1 370730 | Name 370732 |

FIG. 37-24

| Package | Level 1 | Level 2 | Level 3 | Level 4 | Level 5 | Level 6 | Cardinality | Data Type Name |
|---|---|---|---|---|---|---|---|---|
| | | | | NetVolumeMeasure 370734 | | | 0..1 370736 | FormMeasure 370738 |
| | | | | | Measure 370740 | | 1 370742 | Measure 370744 |
| | | | | | MeasureUnitCodeName 370746 | | 0..1 370748 | Name 370750 |
| | | | | NetWeightMeasure 370752 | | | 0..1 370754 | FormMeasure 370756 |
| | | | | | Measure 370758 | | 1 370760 | Measure 370762 |
| | | | | | MeasureUnitCodeName 370764 | | 0..1 370766 | Name 370768 |

FIG. 37-25

| Package | Level 1 | Level 2 | Level 3 | Level 4 | Level 5 | Level 6 | Cardinality | Data Type Name |
|---|---|---|---|---|---|---|---|---|
| | | | | HeightMeasure 370770 | | | 0..1 370772 | FormMeasure 370774 |
| | | | | | Measure 370776 | | 1 370778 | Measure 370780 |
| | | | | | MeasureUnitCodeName 370782 | | 0..1 370784 | Name 370786 |
| | | | | WidthMeasure 370788 | | | 0..1 370790 | FormMeasure 370792 |
| | | | | | Measure 370794 | | 1 370796 | Measure 370798 |
| | | | | | MeasureUnitCodeName 370800 | | 0..1 370802 | Name 370804 |

FIG. 37-26

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | LengthMeasure 370806 | | | 0..1 370808 | FormMeasure 370810 |
| | | | | | | | | Measure 370812 | | 1 370814 | Measure 370816 |
| | | | | | | | | MeasureUnitCodeName 370818 | | 0..1 370820 | Name 370822 |
| | | | | | | | TareWeightMeasure 370824 | | | 0..1 370826 | FormMeasure 370828 |
| | | | | | | | | Measure 370830 | | 1 370832 | Measure 370834 |
| | | | | | | | | MeasureUnitCodeName 370836 | | 0..1 370838 | Name 370840 |

FIG. 38-1

| Package | | | Level 1 | Level 2 | Level 3 | Level 4 | Level 5 | Level 6 | Cardinality | Data Type Name |
|---|---|---|---|---|---|---|---|---|---|---|
| Form Serialised Material Tag Notification 380000 | | | Form Serialised Material Tag Notification 380002 | | | | | | | FormSerialisedMaterialTagNotificationMessage 380004 |
| | Message Header 380006 | | | Message Header 380008 | | | | | 1 380010 | BusinessDocumentMessageHeader 380012 |
| | | | | | ID 380014 | | | | 0..1 380016 | BusinessDocumentMessageID 380018 |
| | | | | | UUID 380020 | | | | 0..1 380022 | UUID 380024 |
| | | | | | ReferenceID 380026 | | | | 0..1 380028 | BusinessDocumentMessageID 380030 |
| | | | | | Reference UUID 380032 | | | | 0..1 380034 | UUID 380036 |

FIG. 38-2

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | CreationDateTime 380038 | | | | 1 380040 | GLOBAL_DateTime 380042 |
| | | | | | | TestDataIndicator 380044 | | | | 0..1 380046 | Indicator 380048 |
| | | | | | | ReconciliationIndicator 380050 | | | | 0..1 380052 | Indicator 380054 |
| | | | | | | SenderBusinessSystemID 380056 | | | | 0..1 380058 | BusinessSystemID 380060 |
| | | | | | | RecipientBusinessSystemID 380062 | | | | 0..1 380064 | BusinessSystemID 380066 |
| | | Party 380068 | | | | SenderParty 380070 | | | | 0..1 380072 | BusinessDocumentMessageHeaderParty 380074 |

FIG. 38-3

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | InternalID 380076 | | | 0..1 380078 | PartyInternalID 380080 |
| | | | | | | | StandardID 380082 | | | 0..N 380084 | PartyStandardID 380086 |
| | | | | | | | ContactPerson 380088 | | | 0..1 380090 | BusinessDocumentMessageHeaderPartyContactPerson 380092 |
| | | | | | | | | InternalID 380094 | | 0..1 380096 | ContactPersonInternalID 380098 |
| | | | | | | | | OrganisationFormattedName 380100 | | 0..N 380102 | LANGUAGEINDEPENDENT_MEDIUM_Name 380104 |
| | | | | | | | | PersonFormattedName 380106 | | 0..N 380108 | LANGUAGEINDEPENDENT_LONG_Name 380110 |

FIG. 38-4

| Package | Level 1 | Level 2 | Level 3 | Level 4 | Level 5 | Level 6 | Cardinality | Data Type Name |
|---|---|---|---|---|---|---|---|---|
| | | | | | PhoneNumber 380114 | | 0..N 380116 | PhoneNumber 380118 |
| | | | | | FaxNumber 380122 | | 0..N 380124 | PhoneNumber 380126 |
| | | | | | EmailURI 380128 | | 0..N 380130 | EmailURI 380132 |
| | | | RecipientParty 380136 | | | | 0..N 380138 | BusinessDocumentMessageHeaderParty 380140 |
| | | | | InternalID 380142 | | | 0..1 380144 | PartyInternalID 380146 |
| | | | | StandardID 380148 | | | 0..N 380150 | PartyStandardID 380152 |
| | | | | ContactPerson 380154 | | | 0..1 380156 | BusinessDocumentMessageHeaderPartyContactPerson 380158 |

FIG. 38-5

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | | InternalID 380160 | | 0..1 380162 | ContactPersonInternalID 380164 |
| | | | | | | | | OrganisationFormattedName 380166 | | 0..N 380168 | LANGUAGEINDEPENDENT_MEDIUM_Name 380170 |
| | | | | | | | | PersonFormattedName 380172 | | 0..N 380174 | LANGUAGEINDEPENDENT_LONG_Name 380176 |
| | | | | | | | | PhoneNumber 380180 | | 0..N 380182 | PhoneNumber 380184 |
| | | | | | | | | FaxNumber 380188 | | 0..N 380190 | PhoneNumber 380192 |
| | | | | | | | | EmailURI 380194 | | 0..N 380196 | EmailURI 380198 |

FIG. 38-6

| Package | | | | Level 1 | Level 2 | Level 3 | Level 4 | Level 5 | Level 6 | Cardinality | Data Type Name |
|---|---|---|---|---|---|---|---|---|---|---|---|
| | | BusinessScope 380200 | | | | BusinessScope 380202 | | | | 0..N 380204 | BusinessScope 380206 |
| | GoodsTag 380208 | | | | GoodsTag 380210 | | | | | 1 380212 | FormSerialisedMaterialTagNotification 380214 |
| | | | | | | ID 380216 | | | | 1 380218 | GoodsTagID 380220 |
| | | | | | | ExternalSerialID 380222 | | | | 0..1 380224 | SerialID 380226 |
| | | | | | | SerialID 380228 | | | | 0..1 380230 | SerialID 380232 |
| | | | | | | Quantity 380234 | | | | 1 380236 | Quantity 380238 |
| | | | | | | QuantityTypeCode 380240 | | | | 1 380242 | QuantityTypeCode 380244 |

FIG. 38-7

| Package | | | Level 1 | Level 2 | Level 3 | Level 4 | Level 5 | Level 6 | Cardinality | Data Type Name |
|---|---|---|---|---|---|---|---|---|---|---|
| | | | | | QuantityTypeName 380246 | | | | 1 380248 | LONG_Name 380250 |
| | | | | | QuantityMeasureUnitCodeName 380252 | | | | 1 380254 | Name 380256 |
| | | | | | ProductionDate 380258 | | | | 0..1 380260 | Date 380262 |
| | | | | | ShippingDate 380264 | | | | 0..1 380266 | Date 380268 |
| | | | | | GoodsReceiptDate 380270 | | | | 0..1 380272 | Date 380274 |

FIG. 38-8

| Package | | | Level 1 | Level 2 | Level 3 | Level 4 | Level 5 | Level 6 | Cardinality | Data Type Name |
|---|---|---|---|---|---|---|---|---|---|---|
| | | | | | ShippingPackageAttachedIndicator 380276 | | | | 0..1 380278 | Indicator 380280 |
| | | | | | CreationContextDependingDate 380282 | | | | 1 380284 | Date 380286 |
| | | | | | GrossWeightMeasure 380288 | | | | 0..1 380290 | Measure 380292 |
| | | | | | GrossWeightMeasureTypeCode 380294 | | | | 0..1 380296 | MeasureTypeCode 380298 |

FIG. 38-9

| Package | | | Level 1 | Level 2 | Level 3 | Level 4 | Level 5 | Level 6 | Cardinality | Data Type Name |
|---|---|---|---|---|---|---|---|---|---|---|
| | | | | | GrossWeightMeasureTypeName 380300 | | | | 0..1 380302 | LONG_Name 380304 |
| | | | | | GrossWeightMeasureUnitCodeName 380306 | | | | 0..1 380308 | Name 380310 |
| | | | | | GrossVolumeMeasure 380312 | | | | 0..1 380314 | Measure 380316 |
| | | | | | GrossVolumeMeasureTypeCode 380318 | | | | 0..1 380320 | MeasureTypeCode 380322 |

FIG. 38-10

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | GrossVolumeMeasureTypeName 380324 | | | | 0..1 380326 | LONG_Name 380328 |
| | | | | | | GrossVolumetMeasureUnitCodeName 380330 | | | | 0..1 380332 | Name 380334 |
| | | | | | | OutputRequestCreationDateTime 380336 | | | | 1 380338 | LOCAL_DateTime 380340 |
| | | | | | | OutputRequestCreationIdentityID 380342 | | | | 1 380344 | IdentityID 380346 |

FIG. 38-11

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | OutputRequestCreationBusinessPartnerFormattedName 380348 | | | | 0..1 380350 | LANGUAGEINDEPENDENT_LONG_Name 380352 |
| | | | | | | ImageFileContentBinaryObject 380354 | | | | 0..1 380356 | BinaryObject 380358 |
| | | | | | | TransportTracking 380360 | | | | 0..1 380362 | TransportTracking 380364 |
| | | TextCollection 380366 | | | | TextCollection 380368 | | | | 0..1 380370 | FormSerialisedMaterialTagNotificationTextCollection 380372 |
| | | | | | | | TextCollection 380374 | | | 1 380376 | TextCollection 380378 |

FIG. 38-12

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | | | | | | | | @actionCode 380380 | | 0..1 380382 | ActionCode 380384 |
| | | | | Text 380386 | | | | | Text 380388 | | 0..N 380390 | TextCollectionText 380392 |
| | | | | | | | | | | @actionCode 380394 | 0..1 380396 | ActionCode 380398 |
| | | | | | | | | | | TypeCode 380400 | 0..1 380402 | TextCollectionTextTypeCode 380404 |
| | | | | | | | | | | CreationDateTime 380406 | 0..1 380408 | GLOBAL_DateTime 380410 |
| | | | | | | | | | | ContentText 380412 | 1 380414 | Text 380416 |
| | | Product 380418 | | | | | Product 380420 | | | | 0..1 380422 | FormSerialisedMaterialTagNotificationProduct 380424 |

FIG. 38-13

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ProductID 380426 | | | 1 380428 | ProductID 380430 |
| | | | | | | | ProductDescription 380432 | | | 0..1 380434 | SHORT_Description 380436 |
| | | | | | | | GlobalTradeItemNumberID 380438 | | | 0..1 380440 | ProductStandardID 380442 |
| | | | | | | | GlobalTradeItemNumberQuantityTypeCode 380444 | | | 0..1 380446 | QuantityTypeCode 380448 |
| | | | | | | | GlobalTradeItemNumberQuantityTypeName 380450 | | | 0..1 380452 | SHORT_Name 380454 |

FIG. 38-14

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ProductSellerID 380456 | | | 0..1 380458 | ProductPartyID 380460 |
| | | | | | | | ProductBuyerID 380462 | | | 0..1 380464 | ProductPartyID 380466 |
| | | ProductRequirementSpecification 380468 | | | | ProductRequirementSpecification 380470 | | | | 0..1 380472 | FormSerialisedMaterialTagNotificationProductRequirementSpecification 380474 |
| | | | | | | | ProductRequirementSpecificationID 380476 | | | 1 380478 | RequirementSpecificationID 380480 |
| | | | | | | | ProductRequirementSpecificationVersionID 380482 | | | 1 380484 | VersionID 380486 |

FIG. 38-15

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ProductRequirementSpecificationDescription 380488 | | | 0..1 380490 | MEDIUM_Description 380492 |
| | | IdentifiedStock 380494 | | | | IdentifiedStock 380496 | | | | 0..1 380498 | FormSerialisedMaterialTagNotificationIdentifiedStock 380500 |
| | | | | | | | IdentifiedStockID 380502 | | | 1 380504 | IdentifiedStockID 380506 |
| | | | | | | | IdentifiedStockPartyID 380508 | | | 0..1 380510 | IdentifiedStockPartyID 380512 |
| | | | | | | | IdentifiedStockDescription 380514 | | | 0..1 380516 | MEDIUM_Description 380518 |

FIG. 38-16

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | Expiration DateTime 380520 | | | 0..1 380522 | LOCAL_DateTime 380524 |
| | | Logistics Area 380526 | | | | LogisticsArea 380528 | | | | 0..1 380530 | FormSerialisedMaterialTagNotificationLogisticsArea 380532 |
| | | | | | | | LogisticsAreaID 380534 | | | 1 380536 | LogisticsAreaID 380538 |
| | | | | | | | LogisticsAreaDescription 380540 | | | 0..1 380542 | SHORT_Description 380544 |
| | | Delivery 380546 | | | | Delivery 380548 | | | | 1 380550 | FormSerialisedMaterialTagNotificationDelivery 380552 |
| | | | | | | | ShipToAddress 380554 | | | 0..1 380556 | FormAddress 380558 |

FIG. 38-17

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ShipToAddressPostalCode 380560 | | | 0..1 380562 | PostalCode 380564 |
| | | | | | | | ShipToCountryCode 380566 | | | 0..1 380568 | CountryCode 380570 |
| | | | | | | | ShipToCountryName 380572 | | | 0..1 380574 | MEDIUM_Name 380576 |
| | | | | | | | ShipFromAddress 380578 | | | 0..1 380580 | FormAddress 380582 |
| | | | | | | | ShipFromCountryCode 380584 | | | 0..1 380586 | CountryCode 380588 |

FIG. 38-18

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ShipFromCountryName 380590 | | | 0..1 380592 | MEDIUM_Name 380594 |
| | | | | | | | Incoterms 380596 | | | 0..1 380598 | FormIncoterms 380600 |
| | | | | | | | | ClassificationCode 380602 | | 1 380604 | IncotermsClassificationCode 380606 |
| | | | | | | | | ClassificationName 380608 | | 1 380610 | Name 380612 |
| | | | | | | | | TransferLocationName 380614 | | 0..1 380616 | IncotermsTransferLocationName 380618 |
| | | | | | | | BuyerPartyID 380620 | | | 0..1 380622 | PartyID 380624 |

FIG. 38-19

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | BuyerPartyFormattedName 380626 | | | 0..1 380628 | LANGUAGEINDEPENDENT_LONG_Name 380630 |
| | | | | | | | SellerPartyID 380632 | | | 0..1 380634 | PartyID 380636 |
| | | | | | | | SellerPartyFormattedName 380638 | | | 0..1 380640 | LANGUAGEINDEPENDENT_LONG_Name 380642 |
| | | | | | | | RecipientPartyID 380644 | | | 0..1 380646 | PartyID 380648 |
| | | | | | | | RecipientPartyFormattedName 380650 | | | 0..1 380652 | LANGUAGEINDEPENDENT_LONG_Name 380654 |

FIG. 38-20

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | VendorPartyID 380656 | | | 0..1 380658 | PartyID 380660 |
| | | | | | | | VendorPartyFormattedName 380662 | | | 0..1 380664 | LANGUAGEINDEPENDENT_LONG_Name 380666 |
| | | | | | | | FreightForwarderPartyID 380668 | | | 0..1 380670 | PartyID 380672 |
| | | | | | | | FreightForwarderPartyFormattedName 380674 | | | 0..1 380676 | LANGUAGEINDEPENDENT_LONG_Name 380678 |
| | | BusinessTransactionDocumentReferences 380680 | | | | BusinessTransactionDocumentReferences 380682 | | | | 1 380684 | FormSerialisedMaterialTagNotificationBusinessTransactionDocumentReferences 380686 |

FIG. 38-21

| Package | Level 1 | Level 2 | Level 3 | Level 4 | Level 5 | Level 6 | Cardinality | Data Type Name |
|---|---|---|---|---|---|---|---|---|
| | | | | ProductionLotID 380688 | | | 0..1 380690 | BusinessTransactionDocumentID 380692 |
| | | | | SiteLogisticsLotID 380694 | | | 0..1 380696 | BusinessTransactionDocumentID 380698 |
| | | | | InboundDeliveryID 380700 | | | 0..1 380702 | BusinessTransactionDocumentID 380704 |
| | | | | InboundDeliveryItemID 380706 | | | 0..1 380708 | BusinessTransactionDocumentItemID 380710 |
| | | | | OutboundDeliveryID 380712 | | | 0..1 380714 | BusinessTransactionDocumentID 380716 |
| | | | | OutboundDeliveryItemID 380718 | | | 0..1 380720 | BusinessTransactionDocumentItemID 380722 |

FIG. 38-22

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ConfirmedInboundDeliveryID<br>380724 | | | 0..1<br>380726 | BusinessTransactionDocumentID<br>380728 |
| | | | | | | | ConfirmedInboundDeliveryItemID<br>380730 | | | 0..1<br>380732 | BusinessTransactionDocumentItemID<br>380734 |
| | | | | | | | CreationContextDependingDeliveryID<br>380736 | | | 0..1<br>380738 | BusinessTransactionDocumentID<br>380740 |
| | | | | | | | CreationContextDependingDeliveryItemID<br>380742 | | | 0..1<br>380744 | BusinessTransactionDocumentItemID<br>380746 |

FIG. 38-23

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | SalesOrderID 380748 | | | 0..1 380750 | BusinessTransactionDocumentID 380752 |
| | | | | | | | SalesOrderItemID 380754 | | | 0..1 380756 | BusinessTransactionDocumentItemID 380758 |
| | | | | | | | PurchaseOrderID 380760 | | | 0..1 380762 | BusinessTransactionDocumentID 380764 |
| | | | | | | | PurchaseOrderItemID 380766 | | | 0..1 380768 | BusinessTransactionDocumentItemID 380770 |
| | | | | | | | CustomerReturnID 380772 | | | 0..1 380774 | BusinessTransactionDocumentID 380776 |
| | | | | | | | CustomerReturnItemID 380778 | | | 0..1 380780 | BusinessTransactionDocumentItemID 380782 |

FIG. 38-24

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | OriginPurchaseOrderID 380784 | | | 0..1 380786 | BusinessTransactionDocumentID 380788 |
| | | | | | | | OriginPurchaseOrderItemID 380790 | | | 0..1 380792 | BusinessTransactionDocumentItemID 380794 |
| | | Site 380796 | | | | Site 380798 | | | | 1 380800 | FormSerialisedMaterialTagNotificationSite 380802 |
| | | | | | | | SiteID 380804 | | | 1 380806 | LocationID 380808 |
| | | | | | | | SiteDescription 380810 | | | 0..1 380812 | SHORT_Description 380814 |

FIG. 39-1

| Package | | | Level 1 | Level 2 | Level 3 | Level 4 | Level 5 | Level 6 | Cardinality | Data Type Name |
|---|---|---|---|---|---|---|---|---|---|---|
| Form Uniform Content Package Tag Notification 390000 | | | Form Uniform Content Package Tag Notification 390002 | | | | | | | FormUniformContentPackageTagNotificationMessage 390004 |
| | Message Header 390006 | | | Message Header 390008 | | | | | 1 390010 | BusinessDocumentMessageHeader 390012 |
| | | | | | ID 390014 | | | | 0..1 390016 | BusinessDocumentMessageID 390018 |
| | | | | | UUID 390020 | | | | 0..1 390022 | UUID 390024 |
| | | | | | ReferenceID 390026 | | | | 0..1 390028 | BusinessDocumentMessageID 390030 |

FIG. 39-2

| Package | | | Level 1 | Level 2 | Level 3 | Level 4 | Level 5 | Level 6 | Cardinality | Data Type Name |
|---|---|---|---|---|---|---|---|---|---|---|
| | | | | | ReferenceUUID 390032 | | | | 0..1 390034 | UUID 390036 |
| | | | | | CreationDateTime 390038 | | | | 1 390040 | GLOBAL_DateTime 390042 |
| | | | | | TestDataIndicator 390044 | | | | 0..1 390046 | Indicator 390048 |
| | | | | | ReconciliationIndicator 390050 | | | | 0..1 390052 | Indicator 390054 |
| | | | | | SenderBusinessSystemID 390056 | | | | 0..1 390058 | BusinessSystemID 390060 |

FIG. 39-3

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | Recipient Business SystemID 390062 | | | | 0..1 390064 | BusinessSystemID 390066 |
| | | Party 390068 | | | | SenderParty 390070 | | | | 0..1 390072 | BusinessDocumentMessageHeaderParty 390074 |
| | | | | | | | InternalID 390076 | | | 0..1 390078 | PartyInternalID 390080 |
| | | | | | | | StandardID 390082 | | | 0..N 390084 | PartyStandardID 390086 |
| | | | | | | | ContactPerson 390088 | | | 0..1 390090 | BusinessDocumentMessageHeaderPartyContactPerson 390092 |
| | | | | | | | | InternalID 390094 | | 0..1 390096 | ContactPersonInternalID 390098 |

FIG. 39-4

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | | OrganisationFormattedName 390100 | | 0..N 390102 | LANGUAGEINDEPENDENT_MEDIUM_Name 390104 |
| | | | | | | | | PersonFormattedName 390106 | | 0..N 390108 | LANGUAGEINDEPENDENT_LONG_Name 390110 |
| | | | | | | | | PhoneNumber 390114 | | 0..N 390116 | PhoneNumber 390118 |
| | | | | | | | | FaxNumber 390122 | | 0..N 390124 | PhoneNumber 390126 |
| | | | | | | | | EmailURI 390128 | | 0..N 390130 | EmailURI 390132 |
| | | | | | | RecipientParty 390136 | | | | 0..N 390138 | BusinessDocumentMessageHeaderParty 390140 |

FIG. 39-5

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | InternalID 390142 | | | 0..1 390144 | PartyInternalID 390146 |
| | | | | | | | StandardID 390148 | | | 0..N 390150 | PartyStandardID 390152 |
| | | | | | | | ContactPerson 390154 | | | 0..1 390156 | BusinessDocumentMessageHeaderPartyContactPerson 390158 |
| | | | | | | | | InternalID 390160 | | 0..1 390162 | ContactPersonInternalID 390164 |
| | | | | | | | | OrganisationFormattedName 390166 | | 0..N 390168 | LANGUAGEINDEPENDENT_MEDIUM_Name 390170 |
| | | | | | | | | PersonFormattedName 390172 | | 0..N 390174 | LANGUAGEINDEPENDENT_LONG_Name 390176 |

FIG. 39-6

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | | PhoneNumber 390180 | | 0..N 390182 | PhoneNumber 390184 |
| | | | | | | | | FaxNumber 390188 | | 0..N 390190 | PhoneNumber 390192 |
| | | | | | | | | EmailURI 390194 | | 0..N 390196 | EmailURI 390198 |
| | | BusinessScope 390200 | | | | BusinessScope 390202 | | | | 0..N 390204 | BusinessScope 390206 |
| | GoodsTag 390208 | | | | GoodsTag 390210 | | | | | 1 390212 | FormUniformContentPackageTagNotification 390214 |
| | | | | | | ID 390216 | | | | 1 390218 | GoodsTagID 390220 |
| | | | | | | ExternalSerialID 390222 | | | | 0..1 390224 | SerialID 390226 |

FIG. 39-7

| Package | Level 1 | Level 2 | Level 3 | Level 4 | Level 5 | Level 6 | Cardinality | Data Type Name |
|---|---|---|---|---|---|---|---|---|
| | | | Quantity 390228 | | | | 1 390230 | Quantity 390232 |
| | | | QuantityTypeCode 390234 | | | | 1 390236 | QuantityTypeCode 390238 |
| | | | QuantityTypeName 390240 | | | | 1 390242 | LONG_Name 390244 |
| | | | Quantity Measure UnitCode Name 390246 | | | | 1 390248 | Name 390250 |
| | | | ProductionDate 390252 | | | | 0..1 390254 | Date 390256 |
| | | | Shipping Date 390258 | | | | 0..1 390260 | Date 390262 |

FIG. 39-8

| Package | | | Level 1 | Level 2 | Level 3 | Level 4 | Level 5 | Level 6 | Cardinality | Data Type Name |
|---|---|---|---|---|---|---|---|---|---|---|
| | | | | | GoodsReceiptDate 390264 | | | | 0..1 390266 | Date 390268 |
| | | | | | ShippingPackageAttachedIndicator 390270 | | | | 0..1 390272 | Indicator 390274 |
| | | | | | CreationContextDependingDate 390276 | | | | 1 390278 | Date 390280 |
| | | | | | GrossWeightMeasure 390282 | | | | 0..1 390284 | Measure 390286 |

FIG. 39-9

| Package | | | Level 1 | Level 2 | Level 3 | Level 4 | Level 5 | Level 6 | Cardinality | Data Type Name |
|---|---|---|---|---|---|---|---|---|---|---|
| | | | | | GrossWeightMeasureTypeCode 390288 | | | | 0..1 390290 | MeasureTypeCode 390292 |
| | | | | | GrossWeightMeasureTypeName 390294 | | | | 0..1 390296 | LONG_Name 390298 |
| | | | | | GrossWeightMeasureUnitCodeName 390300 | | | | 0..1 390302 | Name 390304 |
| | | | | | GrossVolumeMeasure 390306 | | | | 0..1 390308 | Measure 390310 |

FIG. 39-10

| Package | Level 1 | Level 2 | Level 3 | Level 4 | Level 5 | Level 6 | Cardinality | Data Type Name |
|---|---|---|---|---|---|---|---|---|
| | | | GrossVolumeMeasureTypeCode 390312 | | | | 0..1 390314 | MeasureTypeCode 390316 |
| | | | GrossVolumeMeasureTypeName 390318 | | | | 0..1 390320 | LONG_Name 390322 |
| | | | GrossVolumeMeasureUnitCodeName 390324 | | | | 0..1 390326 | Name 390328 |
| | | | OutputRequestCreationDateTime 390330 | | | | 1 390332 | LOCAL_DateTime 390334 |

FIG. 39-11

| Package | | | Level 1 | Level 2 | Level 3 | Level 4 | Level 5 | Level 6 | Cardinality | Data Type Name |
|---|---|---|---|---|---|---|---|---|---|---|
| | | | | | OutputRequestCreationIdentityID 390336 | | | | 1 390338 | IdentityID 390340 |
| | | | | | OutputRequestCreationBusinessPartnerFormattedName 390342 | | | | 0..1 390344 | LANGUAGEINDEPENDENT_LONG_Name 390346 |
| | | | | | ImageFileContentBinaryObject 390348 | | | | 0..1 390350 | BinaryObject 390352 |
| | | | | | TransportTracking 390354 | | | | 0..1 390356 | TransportTracking 390358 |

FIG. 39-12

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | TextCollection 390360 | | | | | TextCollection 390362 | | | | 0..1 390364 | FormUniformContentPackageTagNotificationTextCollection 390366 |
| | | | | | | | | TextCollection 390368 | | | 1 390370 | TextCollection 390372 |
| | | | | | | | | | @actionCode 390374 | | 0..1 390376 | ActionCode 390378 |
| | | | | Text 390380 | | | | | Text 390382 | | 0..N 390384 | TextCollectionText 390386 |
| | | | | | | | | | | @actionCode 390388 | 0..1 390390 | ActionCode 390392 |
| | | | | | | | | | | TypeCode 390394 | 0..1 390396 | TextCollectionTextTypeCode 390398 |

FIG. 39-13

| Package | Level 1 | Level 2 | Level 3 | Level 4 | Level 5 | Level 6 | Cardinality | Data Type Name |
|---|---|---|---|---|---|---|---|---|
| | | | | | | CreationDateTime 390400 | 0..1 390402 | GLOBAL_DateTime 390404 |
| | | | | | | ContentText 390406 | 1 390408 | Text 390410 |
| Product 390412 | | | Product 390414 | | | | 0..1 390416 | FormUniformContentPackageTagNotificationProduct 390418 |
| | | | | ProductID 390420 | | | 1 390422 | ProductID 390424 |
| | | | | ProductDescription 390426 | | | 0..1 390428 | SHORT_Description 390430 |
| | | | | GlobalTradeItemNumberID 390432 | | | 0..1 390434 | ProductStandardID 390436 |

FIG. 39-14

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | GlobalTradeItemNumberQuantityTypeCode 390438 | | | 0..1 390440 | QuantityTypeCode 390442 |
| | | | | | | | GlobalTradeItemNumberQuantityTypeName 390444 | | | 0..1 390446 | SHORT_Name 390448 |
| | | | | | | | ProductSellerID 390450 | | | 0..1 390452 | ProductPartyID 390454 |
| | | | | | | | ProductBuyerID 390456 | | | 0..1 390458 | ProductPartyID 390460 |

FIG. 39-15

| Package | | | | Level 1 | Level 2 | Level 3 | Level 4 | Level 5 | Level 6 | Cardinality | Data Type Name |
|---|---|---|---|---|---|---|---|---|---|---|---|
| | | ProductRequirementSpecification 390462 | | | | ProductRequirementSpecification 390464 | | | | 0..1 390466 | FormUniformContentPackageTagNotificationProductRequirementSpecification 390468 |
| | | | | | | | ProductRequirementSpecificationID 390470 | | | 1 390472 | RequirementSpecificationID 390474 |
| | | | | | | | ProductRequirementSpecificationVersionID 390476 | | | 1 390478 | VersionID 390480 |
| | | | | | | | ProductRequirementSpecificationDescription 390482 | | | 0..1 390484 | MEDIUM_Description 390486 |

FIG. 39-16

| Package | | | | Level 1 | Level 2 | Level 3 | Level 4 | Level 5 | Level 6 | Cardinality | Data Type Name |
|---|---|---|---|---|---|---|---|---|---|---|---|
| | | Identified Stock 390488 | | | | Identified Stock 390490 | | | | 0..1 390492 | FormUniformContentPackageTagNotificationIdentifiedStock 390494 |
| | | | | | | | IdentifiedStockID 390496 | | | 1 390498 | IdentifiedStockID 390500 |
| | | | | | | | IdentifiedStockPartyID 390502 | | | 0..1 390504 | IdentifiedStockPartyID 390506 |
| | | | | | | | IdentifiedStockDescription 390508 | | | 0..1 390510 | MEDIUM_Description 390512 |
| | | | | | | | ExpirationDateTime 390514 | | | 0..1 390516 | LOCAL_DateTime 390518 |

FIG. 39-17

| Package | | | | Level 1 | Level 2 | Level 3 | Level 4 | Level 5 | Level 6 | Cardinality | Data Type Name |
|---|---|---|---|---|---|---|---|---|---|---|---|
| | | Logistics Area 390520 | | | | Logistics Area 390522 | | | | 0..1 390524 | FormUniformContentPackageTagNotificationLogisticsArea 390526 |
| | | | | | | | LogisticsAreaID 390528 | | | 1 390530 | LogisticsAreaID 390532 |
| | | | | | | | LogisticsAreaDescription 390534 | | | 0..1 390536 | SHORT_Description 390538 |
| | | Delivery 390540 | | | | Delivery 390542 | | | | 1 390544 | FormUniformContentPackageTagNotificationDelivery 390546 |
| | | | | | | | ShipToAddress 390548 | | | 0..1 390550 | FormAddress 390552 |

FIG. 39-18

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ShipToAddressPostalCode 390554 | | | 0..1 390556 | PostalCode 390558 |
| | | | | | | | ShipToCountryCode 390560 | | | 0..1 390562 | CountryCode 390564 |
| | | | | | | | ShipToCountryName 390566 | | | 0..1 390568 | MEDIUM_Name 390570 |
| | | | | | | | ShipFromAddress 390572 | | | 0..1 390574 | FormAddress 390576 |
| | | | | | | | ShipFromCountryCode 390578 | | | 0..1 390580 | CountryCode 390582 |

FIG. 39-19

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ShipFromCountryName 390584 | | | 0..1 390586 | MEDIUM_Name 390588 |
| | | | | | | | Incoterms 390590 | | | 0..1 390592 | FormIncoterms 390594 |
| | | | | | | | | ClassificationCode 390596 | | 1 390598 | IncotermsClassificationCode 390600 |
| | | | | | | | | ClassificationName 390602 | | 1 390604 | Name 390606 |
| | | | | | | | | TransferLocationName 390608 | | 0..1 390610 | IncotermsTransferLocationName 390612 |
| | | | | | | | BuyerPartyID 390614 | | | 0..1 390616 | PartyID 390618 |

FIG. 39-20

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | BuyerParty Formatted Name 390620 | | | 0..1 390622 | LANGUAGEINDEPENDENT _LONG_Name 390624 |
| | | | | | | | SellerPartyID 390626 | | | 0..1 390628 | PartyID 390630 |
| | | | | | | | SellerParty Formatted Name 390632 | | | 0..1 390634 | LANGUAGEINDEPENDENT _LONG_Name 390636 |
| | | | | | | | RecipientPartyID 390638 | | | 0..1 390640 | PartyID 390642 |
| | | | | | | | RecipientPartyFormattedName 390644 | | | 0..1 390646 | LANGUAGEINDEPENDENT _LONG_Name 390648 |

FIG. 39-21

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | VendorPartyID 390650 | | | 0..1 390652 | PartyID 390654 |
| | | | | | | | VendorPartyFormattedName 390656 | | | 0..1 390658 | LANGUAGEINDEPENDENT_LONG_Name 390660 |
| | | | | | | | FreightForwarderPartyID 390662 | | | 0..1 390664 | PartyID 390666 |
| | | | | | | | FreightForwarderPartyFormattedName 390668 | | | 0..1 390670 | LANGUAGEINDEPENDENT_LONG_Name 390672 |

FIG. 39-22

| Package | | | | Level 1 | Level 2 | Level 3 | Level 4 | Level 5 | Level 6 | Cardinality | Data Type Name |
|---|---|---|---|---|---|---|---|---|---|---|---|
| | | BusinessTransactionDocumentReferences 390674 | | | | BusinessTransactionDocumentReferences 390676 | | | | 1 390678 | FormUniformContentPackageTagNotificationBusinessTransactionDocumentReferences 390680 |
| | | | | | | | ProductionLotID 390682 | | | 0..1 390684 | BusinessTransactionDocumentID 390686 |
| | | | | | | | SiteLogisticsLotID 390688 | | | 0..1 390690 | BusinessTransactionDocumentID 390692 |
| | | | | | | | InboundDeliveryID 390694 | | | 0..1 390696 | BusinessTransactionDocumentID 390698 |
| | | | | | | | InboundDeliveryItemID 390700 | | | 0..1 390702 | BusinessTransactionDocumentItemID 390704 |

FIG. 39-23

| Package | Level 1 | Level 2 | Level 3 | Level 4 | Level 5 | Level 6 | Cardinality | Data Type Name |
|---|---|---|---|---|---|---|---|---|
| | | | | ConfirmedInboundDeliveryID 390706 | | | 0..1 390708 | BusinessTransactionDocumentID 390710 |
| | | | | ConfirmedInboundDeliveryItemID 390712 | | | 0..1 390714 | BusinessTransactionDocumentItemID 390716 |
| | | | | OutboundDeliveryID 390718 | | | 0..1 390720 | BusinessTransactionDocumentID 390722 |
| | | | | OutboundDeliveryItemID 390724 | | | 0..1 390726 | BusinessTransactionDocumentItemID 390728 |
| | | | | CreationContextDependingDeliveryID 390730 | | | 0..1 390732 | BusinessTransactionDocumentID 390734 |

FIG. 39-24

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | CreationContextDependingDeliveryItemID 390736 | | | 0..1 390738 | BusinessTransactionDocumentItemID 390740 |
| | | | | | | | SalesOrderID 390742 | | | 0..1 390744 | BusinessTransactionDocumentID 390746 |
| | | | | | | | SalesOrderItemID 390748 | | | 0..1 390750 | BusinessTransactionDocumentItemID 390752 |
| | | | | | | | PurchaseOrderID 390754 | | | 0..1 390756 | BusinessTransactionDocumentID 390758 |
| | | | | | | | PurchaseOrderItemID 390760 | | | 0..1 390762 | BusinessTransactionDocumentItemID 390764 |

FIG. 39-25

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | CustomerReturnID 390766 | | | 0..1 390768 | BusinessTransactionDocumentID 390770 |
| | | | | | | | CustomerReturnItemID 390772 | | | 0..1 390774 | BusinessTransactionDocumentItemID 390776 |
| | | | | | | | OriginPurchaseOrderID 390778 | | | 0..1 390780 | BusinessTransactionDocumentID 390782 |
| | | | | | | | OriginPurchaseOrderItemID 390784 | | | 0..1 390786 | BusinessTransactionDocumentItemID 390788 |
| | | Site 390790 | | | | Site 390792 | | | | 1 390794 | FormUniformContentPackageTagNotificationSite 390796 |
| | | | | | | | SiteID 390798 | | | 1 390800 | LocationID 390802 |

FIG. 39-26

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | SiteDescription 390804 | | | 0..1 390806 | SHORT_Description 390808 |
| | | LogisticUnit 390810 | | | | LogisticUnit 390812 | | | | 0..1 390814 | FormUniformContentPackageTagNotificationLogisticUnit 390816 |
| | | | | | | | LogisticUnitID 390818 | | | 1 390820 | LogisticUnitID 390822 |
| | | | | | | | LogisticUnitDescription 390824 | | | 0..1 390826 | SHORT_Description 390828 |
| | | | | | | | LogisticUnitQuantity 390830 | | | 1 390832 | Quantity 390834 |

FIG. 39-27

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | LogisticUnitQuantityTypeCode 390836 | | | 1 390838 | QuantityTypeCode 390840 |
| | | | | | | | LogisticUnitQuantityTypeName 390842 | | | 1 390844 | SHORT_Name 390846 |

FIG. 40-1

| Package | | | Level 1 | Level 2 | Level 3 | Level 4 | Level 5 | Level 6 | Cardinality | Data Type Name |
|---|---|---|---|---|---|---|---|---|---|---|
| Form Unspecified Content Package Tag Notification 400000 | | | Form Unspecified Content Package Tag Notification 400002 | | | | | | | FormUnspecifiedContentPackageTagNotificationMessage 400004 |
| | Message Header 400006 | | | Message Header 400008 | | | | | 1 400010 | BusinessDocumentMessageHeader 400012 |
| | | | | | ID 400014 | | | | 0..1 400016 | BusinessDocumentMessageID 400018 |
| | | | | | UUID 400020 | | | | 0..1 400022 | UUID 400024 |
| | | | | | ReferenceID 400026 | | | | 0..1 400028 | BusinessDocumentMessageID 400030 |
| | | | | | ReferenceUUID 400032 | | | | 0..1 400034 | UUID 400036 |

FIG. 40-2

| Package | Level 1 | Level 2 | Level 3 | Level 4 | Level 5 | Level 6 | Cardinality | Data Type Name |
|---|---|---|---|---|---|---|---|---|
| | | | CreationDateTime 400038 | | | | 1 400040 | GLOBAL_DateTime 400042 |
| | | | TestDataIndicator 400044 | | | | 0..1 400046 | Indicator 400048 |
| | | | ReconciliationIndicator 400050 | | | | 0..1 400052 | Indicator 400054 |
| | | | SenderBusinessSystemID 400056 | | | | 0..1 400058 | BusinessSystemID 400060 |
| | | | Recipient Business SystemID 400062 | | | | 0..1 400064 | BusinessSystemID 400066 |

FIG. 40-3

| Package | | | | Level 1 | Level 2 | Level 3 | Level 4 | Level 5 | Level 6 | Cardinality | Data Type Name |
|---|---|---|---|---|---|---|---|---|---|---|---|
| | | Party 400068 | | | | SenderParty 400070 | | | | 0..1 400072 | BusinessDocumentMessageHeaderParty 400074 |
| | | | | | | | InternalID 400076 | | | 0..1 400078 | PartyInternalID 400080 |
| | | | | | | | StandardID 400082 | | | 0..N 400084 | PartyStandardID 400086 |
| | | | | | | | ContactPerson 400088 | | | 0..1 400090 | BusinessDocumentMessageHeaderPartyContactPerson 400092 |
| | | | | | | | | InternalID 400094 | | 0..1 400096 | ContactPersonInternalID 400098 |
| | | | | | | | | OrganisationFormattedName 400100 | | 0..N 400102 | LANGUAGEINDEPENDENT_MEDIUM_Name 400104 |

FIG. 40-4

| Package | Level 1 | Level 2 | Level 3 | Level 4 | Level 5 | Level 6 | Cardinality | Data Type Name |
|---|---|---|---|---|---|---|---|---|
| | | | | | PersonFormattedName 400106 | | 0..N 400108 | LANGUAGEINDEPENDENT_LONG_Name 400110 |
| | | | | | PhoneNumber 400114 | | 0..N 400116 | PhoneNumber 400118 |
| | | | | | FaxNumber 400122 | | 0..N 400124 | PhoneNumber 400126 |
| | | | | | EmailURI 400128 | | 0..N 400130 | EmailURI 400132 |
| | | | RecipientParty 400136 | | | | 0..N 400138 | BusinessDocumentMessageHeaderParty 400140 |
| | | | | InternalID 400142 | | | 0..1 400144 | PartyInternalID 400146 |
| | | | | StandardID 400148 | | | 0..N 400150 | PartyStandardID 400152 |

FIG. 40-5

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ContactPerson 400154 | | | 0..1 400156 | BusinessDocumentMessageHeaderPartyContactPerson 400158 |
| | | | | | | | | InternalID 400160 | | 0..1 400162 | ContactPersonInternalID 400164 |
| | | | | | | | | OrganisationFormattedName 400166 | | 0..N 400168 | LANGUAGEINDEPENDENT_MEDIUM_Name 400170 |
| | | | | | | | | PersonFormattedName 400172 | | 0..N 400174 | LANGUAGEINDEPENDENT_LONG_Name 400176 |
| | | | | | | | | PhoneNumber 400180 | | 0..N 400182 | PhoneNumber 400184 |
| | | | | | | | | FaxNumber 400188 | | 0..N 400190 | PhoneNumber 400192 |

FIG. 40-6

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | | EmailURI 400194 | | 0..N 400196 | EmailURI 400198 |
| | | Business Scope 400200 | | | | Business Scope 400202 | | | | 0..N 400204 | BusinessScope 400206 |
| | GoodsTa g 400208 | | | | GoodsTa g 400210 | | | | | 1 400212 | FormUnspecifiedContent PackageTagNotification 400214 |
| | | | | | | ID 400216 | | | | 1 400218 | GoodsTagID 400220 |
| | | | | | | ExternalS erialID 400222 | | | | 0..1 400224 | SerialID 400226 |
| | | | | | | Productio nDate 400228 | | | | 0..1 400230 | Date 400232 |
| | | | | | | Shipping Date 400234 | | | | 0..1 400236 | Date 400238 |

FIG. 40-7

| Package | | | Level 1 | Level 2 | Level 3 | Level 4 | Level 5 | Level 6 | Cardinality | Data Type Name |
|---|---|---|---|---|---|---|---|---|---|---|
| | | | | | GoodsReceiptDate 400240 | | | | 0..1 400242 | Date 400244 |
| | | | | | ShippingPackageAttachedIndicator 400246 | | | | 0..1 400248 | Indicator 400250 |
| | | | | | CreationContextDependingDate 400252 | | | | 1 400254 | Date 400256 |
| | | | | | GrossWeightMeasure 400258 | | | | 0..1 400260 | Measure 400262 |

FIG. 40-8

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | GrossWeightMeasureTypeCode 400264 | | | | 0..1 400266 | MeasureTypeCode 400268 |
| | | | | | | GrossWeightMeasureTypeName 400270 | | | | 0..1 400272 | LONG_Name 400274 |
| | | | | | | GrossWeightMeasureUnitCodeName 400276 | | | | 0..1 400278 | Name 400280 |
| | | | | | | GrossVolumeMeasure 400282 | | | | 0..1 400284 | Measure 400286 |

FIG. 40-9

| Package | | | Level 1 | Level 2 | Level 3 | Level 4 | Level 5 | Level 6 | Cardinality | Data Type Name |
|---|---|---|---|---|---|---|---|---|---|---|
| | | | | | GrossVolumeMeasureTypeCode 400288 | | | | 0..1 400290 | MeasureTypeCode 400292 |
| | | | | | GrossVolumeMeasureTypeName 400294 | | | | 0..1 400296 | LONG_Name 400298 |
| | | | | | GrossVolumeMeasureUnitCodeName 400300 | | | | 0..1 400302 | Name 400304 |
| | | | | | OutputRequestCreationDateTime 400306 | | | | 1 400308 | LOCAL_DateTime 400310 |

FIG. 40-10

| Package | | | Level 1 | Level 2 | Level 3 | Level 4 | Level 5 | Level 6 | Cardinality | Data Type Name |
|---|---|---|---|---|---|---|---|---|---|---|
| | | | | | OutputRequestCreationIdentityID 400312 | | | | 1 400314 | IdentityID 400316 |
| | | | | | OutputRequestCreationBusinessPartnerFormattedName 400318 | | | | 0..1 400320 | LANGUAGEINDEPENDENT_LONG_Name 400322 |
| | | | | | ImageFileContentBinaryObject 400324 | | | | 0..1 400326 | BinaryObject 400328 |
| | | | | | TransportTracking 400330 | | | | 0..1 400332 | TransportTracking 400334 |

FIG. 40-11

| Package | | | | | Level 1 | Level 2 | Level 3 | Level 4 | Level 5 | Level 6 | Cardinality | Data Type Name |
|---|---|---|---|---|---|---|---|---|---|---|---|---|
| | | TextCollection 400336 | | | | | TextCollection 400338 | | | | 0..1 400340 | FormUnspecifiedContentPackageTagNotificationTextCollection 400342 |
| | | | | | | | | TextCollection 400344 | | | 1 400346 | TextCollection 400348 |
| | | | | | | | | | @actionCode 400350 | | 0..1 400352 | ActionCode 400354 |
| | | | | Text 400356 | | | | | Text 400358 | | 0..N 400360 | TextCollectionText 400362 |
| | | | | | | | | | | @actionCode 400364 | 0..1 400366 | ActionCode 400368 |
| | | | | | | | | | | TypeCode 400370 | 0..1 400372 | TextCollectionTextTypeCode 400374 |

FIG. 40-12

| Package | Level 1 | Level 2 | Level 3 | Level 4 | Level 5 | Level 6 | Cardinality | Data Type Name |
|---|---|---|---|---|---|---|---|---|
| | | | | | | CreationDateTime 400376 | 0..1 400378 | GLOBAL_DateTime 400380 |
| | | | | | | ContentText 400382 | 1 400384 | Text 400386 |
| LogisticUnit 400388 | | | LogisticUnit 400390 | | | | 0..1 400392 | FormUnspecifiedContentPackageTagNotificationLogisticUnit 400394 |
| | | | | LogisticUnitID 400396 | | | 1 400398 | LogisticUnitID 400400 |
| | | | | LogisticUnitDescription 400402 | | | 0..1 400404 | SHORT_Description 400406 |
| | | | | LogisticUnitQuantity 400408 | | | 1 400410 | Quantity 400412 |

FIG. 40-13

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | LogisticUnitQuantityTypeCode 400414 | | | 1 400416 | QuantityTypeCode 400418 |
| | | | | | | | LogisticUnitQuantityTypeName 400420 | | | 1 400422 | SHORT_Name 400424 |
| | | Delivery 400426 | | | | Delivery 400428 | | | | 1 400430 | FormUnspecifiedContentPackageTagNotificationDelivery 400432 |
| | | | | | | | ShipToAddress 400434 | | | 0..1 400436 | FormAddress 400438 |
| | | | | | | | ShipToAddressPostalCode 400440 | | | 0..1 400442 | PostalCode 400444 |

FIG. 40-14

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | ShipToCountryCode 400446 | | | 0..1 400448 | CountryCode 400450 |
| | | | | | | | ShipToCountryName 400452 | | | 0..1 400454 | MEDIUM_Name 400456 |
| | | | | | | | ShipFromAddress 400458 | | | 0..1 400460 | FormAddress 400462 |
| | | | | | | | ShipFromCountryCode 400464 | | | 0..1 400466 | CountryCode 400468 |
| | | | | | | | ShipFromCountryName 400470 | | | 0..1 400472 | MEDIUM_Name 400474 |
| | | | | | | | Incoterms 400476 | | | 0..1 400478 | FormIncoterms 400480 |

FIG. 40-15

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | | ClassificationCode 400482 | | 1 400484 | IncotermsClassificationCode 400486 |
| | | | | | | | | ClassificationName 400488 | | 1 400490 | Name 400492 |
| | | | | | | | | TransferLocationName 400494 | | 0..1 400496 | IncotermsTransferLocationName 400498 |
| | | | | | | | BuyerPartyID 400500 | | | 0..1 400502 | PartyID 400504 |
| | | | | | | | BuyerPartyFormattedName 400506 | | | 0..1 400508 | LANGUAGEINDEPENDENT_LONG_Name 400510 |
| | | | | | | | SellerPartyID 400512 | | | 0..1 400514 | PartyID 400516 |

FIG. 40-16

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | SellerParty Formatted Name 400518 | | | 0..1 400520 | LANGUAGEINDEPENDENT_LONG_Name 400522 |
| | | | | | | | RecipientPartyID 400524 | | | 0..1 400526 | PartyID 400528 |
| | | | | | | | RecipientPartyFormattedName 400530 | | | 0..1 400532 | LANGUAGEINDEPENDENT_LONG_Name 400534 |
| | | | | | | | VendorPartyID 400536 | | | 0..1 400538 | PartyID 400540 |
| | | | | | | | VendorPartyFormatted Name 400542 | | | 0..1 400544 | LANGUAGEINDEPENDENT_LONG_Name 400546 |

FIG. 40-17

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | FreightForwarderPartyID 400548 | | | 0..1 400550 | PartyID 400552 |
| | | | | | | | FreightForwarderPartyFormattedName 400554 | | | 0..1 400556 | LANGUAGEINDEPENDENT_LONG_Name 400558 |
| | | BusinessTransactionDocumentReferences 400560 | | | | BusinessTransactionDocumentReferences 400562 | | | | 1 400564 | FormUnspecifiedContentPackageTagNotificationBusinessTransactionDocumentReferences 400566 |
| | | | | | | | InboundDeliveryID 400568 | | | 0..1 400570 | BusinessTransactionDocumentID 400572 |

FIG. 40-18

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | InboundDeliveryItemID 400574 | | | 0..1 400576 | BusinessTransactionDocumentItemID 400578 |
| | | | | | | | ConfirmedInboundDeliveryID 400580 | | | 0..1 400582 | BusinessTransactionDocumentID 400584 |
| | | | | | | | ConfirmedInboundDeliveryItemID 400586 | | | 0..1 400588 | BusinessTransactionDocumentItemID 400590 |
| | | | | | | | OutboundDeliveryID 400592 | | | 0..1 400594 | BusinessTransactionDocumentID 400596 |
| | | | | | | | OutboundDeliveryItemID 400598 | | | 0..1 400600 | BusinessTransactionDocumentItemID 400602 |

FIG. 40-19

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | CreationContextDependingDeliveryID 400604 | | | 0..1 400606 | BusinessTransactionDocumentID 400608 |
| | | | | | | | CreationContextDependingDeliveryItemID 400610 | | | 0..1 400612 | BusinessTransactionDocumentItemID 400614 |
| | | | | | | | SalesOrderID 400616 | | | 0..1 400618 | BusinessTransactionDocumentID 400620 |
| | | | | | | | SalesOrderItemID 400622 | | | 0..1 400624 | BusinessTransactionDocumentItemID 400626 |
| | | | | | | | PurchaseOrderID 400628 | | | 0..1 400630 | BusinessTransactionDocumentID 400632 |

FIG. 40-20

| Package | | | | Level 1 | Level 2 | Level 3 | Level 4 | Level 5 | Level 6 | Cardinality | Data Type Name |
|---|---|---|---|---|---|---|---|---|---|---|---|
| | | | | | | | PurchaseOrderItemID 400634 | | | 0..1 400636 | BusinessTransactionDocumentItemID 400638 |
| | | | | | | | CustomerReturnID 400640 | | | 0..1 400642 | BusinessTransactionDocumentID 400644 |
| | | | | | | | CustomerReturnItemID 400646 | | | 0..1 400648 | BusinessTransactionDocumentItemID 400650 |
| | | | | | | | OriginPurchaseOrderID 400652 | | | 0..1 400654 | BusinessTransactionDocumentID 400656 |
| | | | | | | | OriginPurchaseOrderItemID 400658 | | | 0..1 400660 | BusinessTransactionDocumentItemID 400662 |

FIG. 40-21

| Package | | | | Level 1 | Level 2 | Level 3 | Level 4 | Level 5 | Level 6 | Cardinality | Data Type Name |
|---|---|---|---|---|---|---|---|---|---|---|---|
| | | Site 400664 | | | | Site 400666 | | | | 1 400668 | FormUnspecifiedContentPackageTagNotificationSite 400670 |
| | | | | | | | SiteID 400672 | | | 1 400674 | LocationID 400676 |
| | | | | | | | SiteDescription 400678 | | | 1 400680 | SHORT_Description 400682 |

| Package | | | Level 1 | Level 2 | Level 3 | Level 4 | Level 5 | Cardinality | Data Type Name |
|---|---|---|---|---|---|---|---|---|---|
| Form Production Bill of Material Hierarchy<br><br>430000 | | | Form Production Bill of Material Hierarchy<br><br>430002 | | | | | | FormProductionBillOfMaterialHierarchyMessage<br><br>430004 |
| | ProductionBillOfMaterial Hierarchy<br><br>430006 | | | ProductionBillOfMaterial Hierarchy<br><br>430008 | | | | 1<br><br>430010 | FormProductionBillOfMaterialHierarchy<br><br>430012 |
| | | | | | ProductionBillOfMaterialID<br><br>430014 | | | 1<br><br>430016 | BillOfMaterialID<br><br>430018 |
| | | | | | ProductionBillOfMaterialDescription<br><br>430020 | | | 0..1<br><br>430022 | MEDIUM_Description<br><br>430024 |
| | | | | | ProductionBillOfMaterialVariantID<br><br>430026 | | | 1<br><br>430028 | BillOfMaterialVariantID<br><br>430030 |

FIG. 43-2

| Package | | | Level 1 | Level 2 | Level 3 | Level 4 | Level 5 | Cardinality | Data Type Name |
|---|---|---|---|---|---|---|---|---|---|
| | | | | | ProductionBillOfMaterialVariantDescription 430032 | | | 0..1 430034 | MEDIUM_Description 430036 |
| | | | | | MaterialID 430038 | | | 1 430040 | ProductID 430042 |
| | | | | | MaterialDescription 430044 | | | 0..1 430046 | SHORT_Description 430048 |
| | | | | | ExplosionDate 430050 | | | 1 430052 | Date 430054 |
| | | | | | MaximumtHierarchyLevelOrdinalNumberValue 430056 | | | 0..1 430058 | OrdinalNumberValue 430060 |
| | | | | | Quantity 430062 | | | 1 430064 | FormQuantity 430066 |
| | | | | | | Quantity 430068 | | 1 430070 | Quantity 430072 |

FIG. 43-3

| Package | | | Level 1 | Level 2 | Level 3 | Level 4 | Level 5 | Cardinality | Data Type Name |
|---|---|---|---|---|---|---|---|---|---|
| | | | | | | QuantityMeasureUnitCodeName 430074 | | 1 430076 | Name 430078 |
| | | | | | | QuantityTypeCode 430080 | | 1 430082 | QuantityTypeCode 430084 |
| | | | | | | QuantityTypeCodeName 430086 | | 0..1 430088 | Name 430090 |
| | | Item 430092 | | | Item 430094 | | | 1..N 430096 | FormProductionBillOfMaterialHierarchyItem 430098 |
| | | | | | | HierarchyLevelOrdinalNumberValue 430100 | | 1 430102 | OrdinalNumberValue 430104 |
| | | | | | | OrdinalNumberValue 430106 | | 1 430108 | OrdinalNumberValue 430110 |
| | | | | | | ParentItemOrdinalNumberValue 430112 | | 0..1 430114 | OrdinalNumberValue 430116 |

FIG. 43-4

| Package | | | Level 1 | Level 2 | Level 3 | Level 4 | Level 5 | Cardinality | Data Type Name |
|---|---|---|---|---|---|---|---|---|---|
| | | | | | | MaterialID 430118 | | 1 430120 | ProductID 430122 |
| | | | | | | MaterialDescription 430124 | | 0..1 430126 | SHORT_Description 430128 |
| | | | | | | ProductionBillOfMaterialID 430130 | | 0..1 430132 | BillOfMaterialID 430134 |
| | | | | | | ProductionBillOfMaterialDescription 430136 | | 0..1 430138 | MEDIUM_Description 430140 |
| | | | | | | ProductionBillOfMaterialVariantID 430142 | | 0..1 430144 | BillOfMaterialVariantID 430146 |
| | | | | | | ProductionBillOfMaterialVariantDescription 430148 | | 0..1 430150 | MEDIUM_Description 430152 |

FIG. 43-5

| Package | | | Level 1 | Level 2 | Level 3 | Level 4 | Level 5 | Cardinality | Data Type Name |
|---|---|---|---|---|---|---|---|---|---|
| | | | | | | ProductionBillOfMaterialItemGroupID 430154 | | 0..1 430156 | BillOfMaterialItemGroupID 430158 |
| | | | | | | ProductionBillOfMaterialItemGroupItemID 430160 | | 0..1 430162 | BillOfMaterialItemGroupItemID 430164 |
| | | | | | | ProductionBillOfMaterialItemGroupItemChangeStateEngineeringChangeOrderID 430166 | | 0..1 430168 | EngineeringChangeOrderID 430170 |
| | | | | | | Quantity 430172 | | 1 430174 | FormQuantity 430176 |
| | | | | | | | Quantity 430178 | 1 430180 | Quantity 430182 |
| | | | | | | | QuantityMeasureUnitCodeName 430184 | 1 430186 | Name 430188 |

FIG. 43-6

| Package | | | Level 1 | Level 2 | Level 3 | Level 4 | Level 5 | Cardinality | Data Type Name |
|---|---|---|---|---|---|---|---|---|---|
| | | | | | | | QuantityTypeCode 430190 | 1 430192 | QuantityTypeCode 430194 |
| | | | | | | | QuantityTypeCodeName 430196 | 0..1 430198 | Name 430200 |
| | | | | | | ValidityDatePeriod 430202 | | 0..1 430204 | CLOSED_DatePeriod 430206 |
| | | | | | | ProductionBillOfMaterialItemGroupItemChangeStateQuantityFixedIndicator 430208 | | 1 430210 | Indicator 430212 |

| Package | | Level 1 | Level 2 | Level 3 | Level 4 | Level 5 | Level 6 | Level 7 | Level 8 | Cardinality | Data Type Name |
|---|---|---|---|---|---|---|---|---|---|---|---|
| FormProcurementReleaseOrderRequest 470000 | | FormProcurementReleaseOrderRequest 470002 | | | | | | | | | FormProcurementReleaseOrderRequestMessage 470004 |
| | MessageHeader 470006 | | MessageHeader 470008 | | | | | | | 1 470010 | BusinessDocumentMessageHeader 470012 |
| | | | | ID 470014 | | | | | | 0..1 470016 | BusinessDocumentMessageID 470018 |
| | | | | UUID 470020 | | | | | | 0..1 470022 | UUID 470024 |

FIG. 47-2

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | ReferenceID 470026 | | | | | | 0..1 470028 | BusinessDocumentMessageID 470030 |
| | | | ReferenceUUID 470032 | | | | | | 0..1 470034 | UUID 470036 |
| | | | CreationDateTime 470038 | | | | | | 1 470040 | GLOBAL_DateTime 470042 |
| | | | TestDataIndicator 470044 | | | | | | 0..1 470046 | Indicator 470048 |
| | | | ReconciliationIndicator 470050 | | | | | | 0..1 470052 | Indicator 470054 |

FIG. 47-3

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | SenderBusinessSystemID 470056 | | | | | | 0..1 470058 | BusinessSystemID 470060 |
| | | | RecipientBusinessSystemID 470062 | | | | | | 0..1 470064 | BusinessSystemID 470066 |
| Party 470068 | | | SenderParty 470070 | | | | | | 0..1 470072 | BusinessDocumentMessageHeaderParty 470074 |
| | | | | InternalID 470076 | | | | | 0..1 470078 | PartyInternalID 470080 |
| | | | | StandardID 470082 | | | | | 0..N 470084 | PartyStandardID 470086 |

FIG. 47-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ContactPerson 470088 | | | | | 0..1 470090 | BusinessDocumentMessageHeaderPartyContactPerson 470092 |
| | | | | | InternalID 470094 | | | | 0..1 470096 | ContactPersonInternalID 470098 |
| | | | | | OrganisationFormattedName 470100 | | | | 0..N 470102 | LANGUAGEINDEPENDENT_MEDIUM_Name 470104 |
| | | | | | PersonFormattedName 470106 | | | | 0..N 470108 | LANGUAGEINDEPENDENT_LONG_Name 470110 |
| | | | | | PhoneNumber 470114 | | | | 0..N 470116 | PhoneNumber 470118 |

FIG. 47-5

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FaxNumber 470122 | | | | 0..N 470124 | PhoneNumber 470126 |
| | | | | | EmailURI 470128 | | | | 0..N 470130 | EmailURI 470132 |
| | | | RecipientParty 470136 | | | | | | 0..N 470138 | BusinessDocumentMessageHeaderParty 470140 |
| | | | | InternalID 470142 | | | | | 0..1 470144 | PartyInternalID 470146 |
| | | | | StandardID 470148 | | | | | 0..N 470150 | PartyStandardID 470152 |

FIG. 47-6

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ContactPerson 470154 | | | | | 0..1 470156 | BusinessDocumentMessageHeaderPartyContactPerson 470158 |
| | | | | | InternalID 470160 | | | | 0..1 470162 | ContactPersonInternalID 470164 |
| | | | | | OrganisationFormattedName 470166 | | | | 0..N 470168 | LANGUAGEINDEPENDENT_MEDIUM_Name 470170 |
| | | | | | PersonFormattedName 470172 | | | | 0..N 470174 | LANGUAGEINDEPENDENT_LONG_Name 470176 |
| | | | | | PhoneNumber 470180 | | | | 0..N 470182 | PhoneNumber 470184 |

FIG. 47-7

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | FaxNumber 470188 | | | | 0..N 470190 | PhoneNumber 470192 |
| | | | | | | | | EmailURI 470194 | | | | 0..N 470196 | EmailURI 470198 |
| | | Business Scope | | | | Business Scope 470202 | | | | | | 0..N 470204 | BusinessScope 470206 |
| | ProcurementReleaseOrder 470208 | | | | ProcurementReleaseOrder 470210 | | | | | | | 1 470212 | FormProcurementReleaseOrderRequest 470214 |
| | | | | | | @actionCode 470216 | | | | | | 1 470218 | ActionCode 470220 |

FIG. 47-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | @reconciliationPeriodCounterValue 470222 | | | | | | 0..1 470224 | CounterValue 470226 |
| | | | WatermarkName 470228 | | | | | | 1 470230 | LANGUAGEINDEPENDENT_MEDIUM_Name 470232 |
| | | | ID 470234 | | | | | | 1 470236 | BusinessTransactionDocumentID 470238 |
| | | | CreationDateTime 470240 | | | | | | 1 470242 | LOCALNORMALISED_DateTime 470244 |

FIG. 47-9

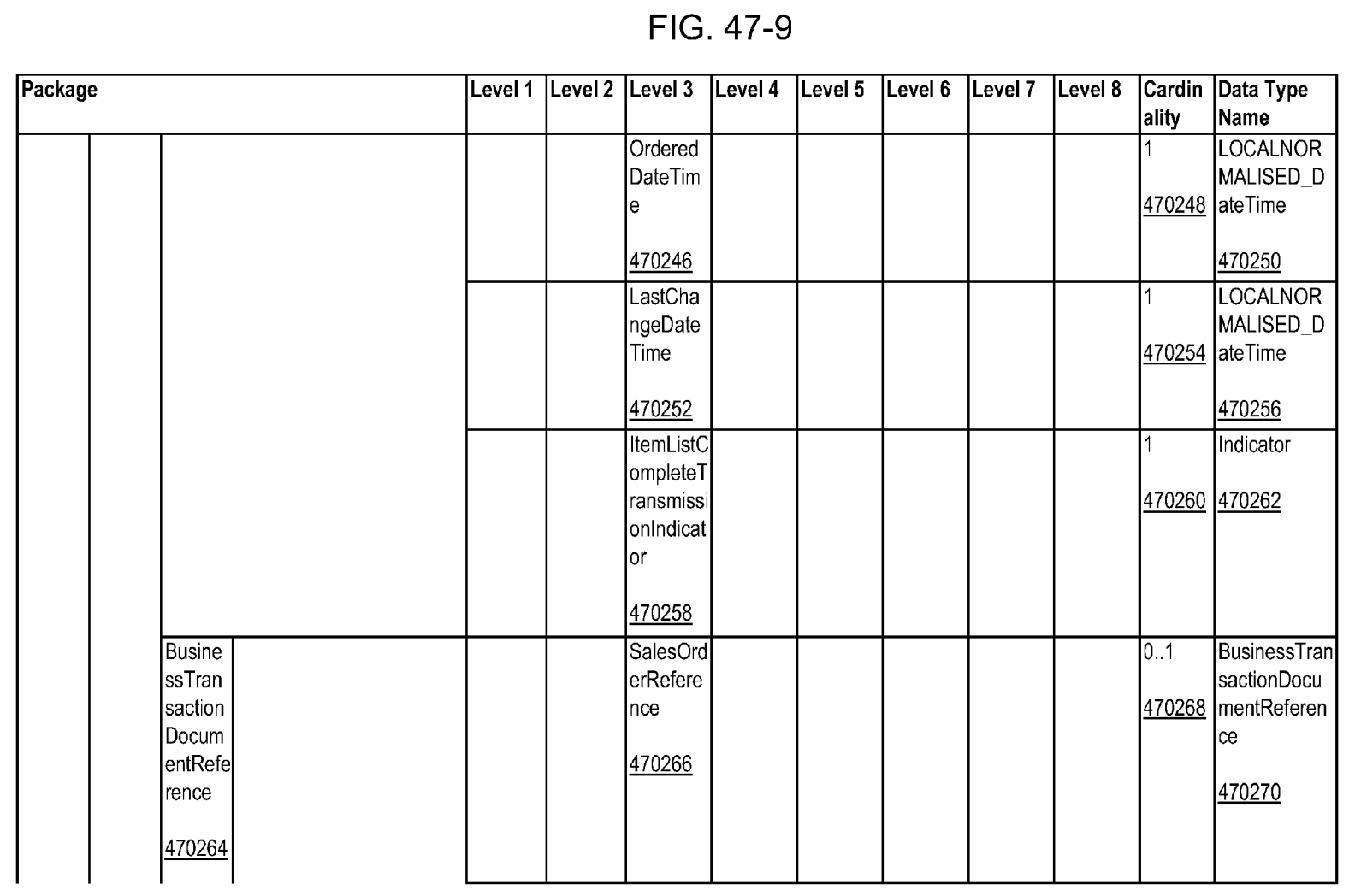

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | OrderedDateTime 470246 | | | | | | 1 470248 | LOCALNORMALISED_DateTime 470250 |
| | | | | | | LastChangeDateTime 470252 | | | | | | 1 470254 | LOCALNORMALISED_DateTime 470256 |
| | | | | | | ItemListCompleteTransmissionIndicator 470258 | | | | | | 1 470260 | Indicator 470262 |
| | | BusinessTransactionDocumentReference 470264 | | | | SalesOrderReference 470266 | | | | | | 0..1 470268 | BusinessTransactionDocumentReference 470270 |

FIG. 47-10

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | OriginPurchaseOrderReference 470274 | | | | | | 0..1 470276 | BusinessTransactionDocumentReference 470278 |
| | | Party 470280 | | | | BuyerParty 470282 | | | | | | 0..1 470284 | FormBusinessTransactionDocumentParty 470286 |
| | | | | | | | InternalID 470288 | | | | | 0..1 470290 | PartyInternalID 470292 |
| | | | | | | | StandardID 470294 | | | | | 0..N 470296 | PartyStandardID 470298 |
| | | | | | | | BuyerID 470300 | | | | | 0..1 470302 | PartyPartyID 470304 |
| | | | | | | | SellerID 470306 | | | | | 0..1 470308 | PartyPartyID 470310 |

FIG. 47-11

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ProductRecipientID 470312 | | | | | 0..1 470314 | PartyPartyID 470316 |
| | | | | VendorID 470318 | | | | | 0..1 470320 | PartyPartyID 470322 |
| | | | | BillToID 470324 | | | | | 0..1 470326 | PartyPartyID 470328 |
| | | | | BillFromID 470330 | | | | | 0..1 470332 | PartyPartyID 470334 |
| | | | | BidderID 470336 | | | | | 0..1 470338 | PartyPartyID 470340 |
| | | | | PaymentTransactionInitiatorID 470342 | | | | | 0..1 470344 | PartyPartyID 470346 |

FIG. 47-12

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PaymentTransactionDestinatedID 470348 | | | | | 0..1 470350 | PartyPartyID 470352 |
| | | | | TaxID 470354 | | | | | 0..1 470356 | PartyTaxID 470358 |
| | | | | TypeCode 470360 | | | | | 0..1 470362 | BusinessObjectTypeCode 470364 |
| | | | | FormattedName 470366 | | | | | 0..1 470368 | LANGUAGEINDEPENDENT_LONG_Name 470370 |
| | | | | FormAddress 470372 | | | | | 0..1 470374 | FormAddress 470376 |

FIG. 47-13

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ContactPerson 470380 | | | | | 0..1 470382 | FormContactPerson 470384 |
| | | | | | InternalID 470386 | | | | 0..1 470388 | ContactPersonInternalID 470390 |
| | | | | | BuyerID 470392 | | | | 0..1 470394 | ContactPersonPartyID 470396 |
| | | | | | SellerID 470398 | | | | 0..1 470400 | ContactPersonPartyID 470402 |
| | | | | | ProductRecipientID 470404 | | | | 0..1 470406 | ContactPersonPartyID 470408 |
| | | | | | VendorID 470410 | | | | 0..1 470412 | ContactPersonPartyID 470414 |

FIG. 47-14

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BillToID 470416 | | | | 0..1 470418 | ContactPersonPartyID 470420 |
| | | | | | BillFromID 470422 | | | | 0..1 470424 | ContactPersonPartyID 470426 |
| | | | | | BidderID 470428 | | | | 0..1 470430 | ContactPersonPartyID 470432 |
| | | | | | FormAddress 470434 | | | | 0..1 470436 | FormAddress 470438 |
| | | | | | FormattedName 470440 | | | | 0..1 470442 | LANGUAGEINDEPENDENT_LONG_Name 470444 |

FIG. 47-15

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | SellerParty 470448 | | | | | | 1 470450 | FormBusinessTransactionDocumentParty 470452 |
| | | | | InternalID 470454 | | | | | 0..1 470456 | PartyInternalID 470458 |
| | | | | StandardID 470460 | | | | | 0..N 470462 | PartyStandardID 470464 |
| | | | | BuyerID 470466 | | | | | 0..1 470468 | PartyPartyID 470470 |
| | | | | SellerID 470472 | | | | | 0..1 470474 | PartyPartyID 470476 |
| | | | | ProductRecipientID 470478 | | | | | 0..1 470480 | PartyPartyID 470482 |

FIG. 47-16

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | VendorID 470484 | | | | | 0..1 470486 | PartyPartyID 470488 |
| | | | | BillToID 470490 | | | | | 0..1 470492 | PartyPartyID 470494 |
| | | | | BillFromID 470496 | | | | | 0..1 470498 | PartyPartyID 470500 |
| | | | | BidderID 470502 | | | | | 0..1 470504 | PartyPartyID 470506 |
| | | | | PaymentTransactionInitiatorID 470508 | | | | | 0..1 470510 | PartyPartyID 470512 |
| | | | | PaymentTransactionDestinatedID 470514 | | | | | 0..1 470516 | PartyPartyID 470518 |

FIG. 47-17

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | TaxID 470520 | | | | | 0..1 470522 | PartyTaxID 470524 |
| | | | | TypeCode 470526 | | | | | 0..1 470528 | BusinessObjectTypeCode 470530 |
| | | | | FormattedName 470532 | | | | | 0..1 470534 | LANGUAGEINDEPENDENT_LONG_Name 470536 |
| | | | | FormAddress 470538 | | | | | 0..1 470540 | FormAddress 470542 |
| | | | | ContactPerson 470546 | | | | | 0..1 470548 | FormContactPerson 470550 |
| | | | | | InternalID 470552 | | | | 0..1 470554 | ContactPersonInternalID 470556 |

FIG. 47-18

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BuyerID 470558 | | | | 0..1 470560 | ContactPersonPartyID 470562 |
| | | | | | SellerID 470564 | | | | 0..1 470566 | ContactPersonPartyID 470568 |
| | | | | | ProductRecipientID 470570 | | | | 0..1 470572 | ContactPersonPartyID 470574 |
| | | | | | VendorID 470576 | | | | 0..1 470578 | ContactPersonPartyID 470580 |
| | | | | | BillToID 470582 | | | | 0..1 470584 | ContactPersonPartyID 470586 |
| | | | | | BillFromID 470588 | | | | 0..1 470590 | ContactPersonPartyID 470592 |

FIG. 47-19

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BidderID 470594 | | | | 0..1 470596 | ContactPersonPartyID 470598 |
| | | | | | FormAddress 470600 | | | | 0..1 470602 | FormAddress 470604 |
| | | | | | FormattedName 470606 | | | | 0..1 470608 | LANGUAGEINDEPENDENT_LONG_Name 470610 |
| | | | LogisticsRequestResponsibleParty 470614 | | | | | | 0..1 470616 | FormBusinessTransactionDocumentParty 470618 |
| | | | | InternalID 470620 | | | | | 0..1 470622 | PartyInternalID 470624 |

FIG. 47-20

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | StandardID 470626 | | | | | 0..N 470628 | PartyStandardID 470630 |
| | | | | BuyerID 470632 | | | | | 0..1 470634 | PartyPartyID 470636 |
| | | | | SellerID 470638 | | | | | 0..1 470640 | PartyPartyID 470642 |
| | | | | ProductRecipientID 470644 | | | | | 0..1 470646 | PartyPartyID 470648 |
| | | | | VendorID 470650 | | | | | 0..1 470652 | PartyPartyID 470654 |
| | | | | BillToID 470656 | | | | | 0..1 470658 | PartyPartyID 470660 |
| | | | | BillFromID 470662 | | | | | 0..1 470664 | PartyPartyID 470666 |

FIG. 47-21

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | BidderID 470668 | | | | | 0..1 470670 | PartyPartyID 470672 |
| | | | | PaymentTransactionInitiatorID 470674 | | | | | 0..1 470676 | PartyPartyID 470678 |
| | | | | PaymentTransactionDestinatedID 470680 | | | | | 0..1 470682 | PartyPartyID 470684 |
| | | | | TaxID 470686 | | | | | 0..1 470688 | PartyTaxID 470690 |
| | | | | TypeCode 470692 | | | | | 0..1 470694 | BusinessObjectTypeCode 470696 |

FIG. 47-22

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | FormattedName 470698 | | | | | 0..1 470700 | LANGUAGEINDEPENDENT_LONG_Name 470702 |
| | | | | FormAddress 470704 | | | | | 0..1 470706 | FormAddress 470708 |
| | | | | ContactPerson 470712 | | | | | 0..1 470714 | FormContactPerson 470716 |
| | | | | | InternalID 470718 | | | | 0..1 470720 | ContactPersonInternalID 470722 |
| | | | | | BuyerID 470724 | | | | 0..1 470726 | ContactPersonPartyID 470728 |
| | | | | | SellerID 470730 | | | | 0..1 470732 | ContactPersonPartyID 470734 |

FIG. 47-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | ProductRecipientID 470736 | | | | 0..1 470738 | ContactPersonPartyID 470740 |
| | | | | | VendorID 470742 | | | | 0..1 470744 | ContactPersonPartyID 470746 |
| | | | | | BillToID 470748 | | | | 0..1 470750 | ContactPersonPartyID 470752 |
| | | | | | BillFromID 470754 | | | | 0..1 470756 | ContactPersonPartyID 470758 |
| | | | | | BidderID 470760 | | | | 0..1 470762 | ContactPersonPartyID 470764 |
| | | | | | FormAddress 470766 | | | | 0..1 470768 | FormAddress 470770 |

FIG. 47-24

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FormattedName 470772 | | | | 0..1 470774 | LANGUAGEINDEPENDENT_LONG_Name 470776 |
| | | | FreightForwarderParty 470780 | | | | | | 0..1 470782 | FormBusinessTransactionDocumentParty 470784 |
| | | | | InternalID 470786 | | | | | 0..1 470788 | PartyInternalID 470790 |
| | | | | StandardID 470792 | | | | | 0..N 470794 | PartyStandardID 470796 |
| | | | | BuyerID 470798 | | | | | 0..1 470800 | PartyPartyID 470802 |
| | | | | SellerID 470804 | | | | | 0..1 470806 | PartyPartyID 470808 |

FIG. 47-25

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ProductRecipientID 470810 | | | | | 0..1 470812 | PartyPartyID 470814 |
| | | | | VendorID 470816 | | | | | 0..1 470818 | PartyPartyID 470820 |
| | | | | BillToID 470822 | | | | | 0..1 470824 | PartyPartyID 470826 |
| | | | | BillFromID 470828 | | | | | 0..1 470830 | PartyPartyID 470832 |
| | | | | BidderID 470834 | | | | | 0..1 470836 | PartyPartyID 470838 |
| | | | | PaymentTransactionInitiatorID 470840 | | | | | 0..1 470842 | PartyPartyID 470844 |

FIG. 47-26

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PaymentTransactionDestinatedID 470846 | | | | | 0..1 470848 | PartyPartyID 470850 |
| | | | | TaxID 470852 | | | | | 0..1 470854 | PartyTaxID 470856 |
| | | | | TypeCode 470858 | | | | | 0..1 470860 | BusinessObjectTypeCode 470862 |
| | | | | FormattedName 470864 | | | | | 0..1 470866 | LANGUAGEINDEPENDENT_LONG_Name 470868 |
| | | | | FormAddress 470870 | | | | | 0..1 470872 | FormAddress 470874 |

FIG. 47-27

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | ContactPerson 470878 | | | | | 0..1 470880 | FormContactPerson 470882 |
| | | | | | InternalID 470884 | | | | 0..1 470886 | ContactPersonInternalID 470888 |
| | | | | | BuyerID 470890 | | | | 0..1 470892 | ContactPersonPartyID 470894 |
| | | | | | SellerID 470896 | | | | 0..1 470898 | ContactPersonPartyID 470900 |
| | | | | | ProductRecipientID 470902 | | | | 0..1 470904 | ContactPersonPartyID 470906 |
| | | | | | VendorID 470908 | | | | 0..1 470910 | ContactPersonPartyID 470912 |

FIG. 47-28

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | BillToID 470914 | | | | 0..1 470916 | ContactPersonPartyID 470918 |
| | | | | | | | | BillFromID 470920 | | | | 0..1 470922 | ContactPersonPartyID 470924 |
| | | | | | | | | BidderID 470926 | | | | 0..1 470928 | ContactPersonPartyID 470930 |
| | | | | | | | | FormAddress 470932 | | | | 0..1 470934 | FormAddress 470936 |
| | | | | | | | | FormattedName 470938 | | | | 0..1 470940 | LANGUAGEINDEPENDENT_LONG_Name 470942 |
| | | AttachmentFolder 470944 | | | | AttachmentFolder 470946 | | | | | | 0..1 470948 | AttachmentFolder 470950 |

FIG. 47-29

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | @actionCode 470952 | | | | | 0..1 470954 | |
| Document 470956 | | | | Document 470958 | | | | | 0..N 470960 | Document 470962 |
| | | | | | @actionCode 470964 | | | | 0..1 470966 | ActionCode 470968 |
| | | | | | PathName 470970 | | | | 1 470972 | LANGUAGEINDEPENDENT_Name 470974 |
| | | | | | Name 470976 | | | | 1 470978 | LANGUAGEINDEPENDENT_Name 470980 |
| | | | | | VersionID 470982 | | | | 0..1 470984 | VersionID 470986 |

FIG. 47-30

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | SystemAdministrativeData 470988 | | | | 1 470990 | SystemAdministrativeData 470992 |
| | | | | | LinkInternalIndicator 470994 | | | | 0..1 470996 | Indicator 470998 |
| | | | | | VisibleIndicator 471000 | | | | 1 471002 | Indicator 471004 |
| | | | | | VersioningEnabledIndicator 471006 | | | | 1 471008 | Indicator 471010 |
| | | | | | CategoryCode 471012 | | | | 1 471014 | DocumentCategoryCode 471016 |

FIG. 47-31

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | TypeCode 471018 | | | | 0..1 471020 | DocumentTypeCode 471022 |
| | | | | | MIMECode 471024 | | | | 0..1 471026 | MIMECode 471028 |
| | | | | | AlternativeName 471030 | | | | 0..1 471032 | LANGUAGEINDEPENDENT_Name 471034 |
| | | | | | InternalLinkPathName 471036 | | | | 0..1 471038 | LANGUAGEINDEPENDENT_Name 471040 |
| | | | | | Description 471042 | | | | 0..1 471044 | Description 471046 |
| | | | | | ExternalLinkWebURI 471048 | | | | 0..1 471050 | WebURI 471052 |

FIG. 47-32

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FileContentURI 471054 | | | | 0..1 471056 | URI 471058 |
| | | | | | FileSizeMeasure 471060 | | | | 0..1 471062 | Measure 471064 |
| | | | | | FileContentBinaryObject 471066 | | | | 0..1 471068 | BinaryObject 471070 |
| | | | | | Attachment 471072 | | | | 0..1 471074 | Attachment 471076 |
| | | | | | Property 471080 | | | | 0..N 471082 | DocumentProperty 471084 |
| | | | | | | @actionCode 471086 | | | 0..1 471088 | ActionCode 471090 |

FIG. 47-33

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Name 471092 | | | 1 471094 | LANGUAGEINDEPENDENT_Name 471096 |
| | | | | | | DataTypeFormatCode 471098 | | | 1 471100 | PropertyDataTypeFormatCode 471102 |
| | | | | | | VisibleIndicator 471104 | | | 1 471106 | Indicator 471108 |
| | | | | | | ChangeAllowedIndicator 471110 | | | 1 471112 | Indicator 471114 |
| | | | | | | MultipleValueIndicator 471116 | | | 1 471118 | Indicator 471120 |

FIG. 47-34

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | NamespaceURI 471122 | | | 0..1 471124 | NamespaceURI 471126 |
| | | | | | | Description 471128 | | | 0..1 471130 | Description 471132 |
| | | | | | | Value 471136 | | | 0..N 471138 | DocumentPropertyValue 471140 |
| | | | | | | | Text 471142 | | 0..1 471144 | LANGUAGEINDEPENDENT_Text 471146 |
| | | | | | | | Indicator 471148 | | 0..1 471150 | Indicator 471152 |
| | | | | | | | DateTime 471154 | | 0..1 471156 | DateTime 471158 |

FIG. 47-35

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | IntegerValue 471160 | | 0..1 471162 | IntegerValue 471164 |
| | | TextCollection 471166 | | | | | TextCollection 471168 | | | | | | 0..1 471170 | FormTextCollection 471172 |
| | | | | | | | | Text 471174 | | | | | 0..N 471176 | FormTextCollectionText 471178 |
| | | | | | | | | | TypeCode 471180 | | | | 0..1 471182 | TextCollectionTextTypeCode 471184 |
| | | | | | | | | | TypeName 471186 | | | | 0..1 471188 | LANGUAGEINDEPENDENT_MEDIUM_Name 471190 |

FIG. 47-36

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | SystemAdministrativeData 471192 | | | | 0..1 471194 | FormSystemAdministrativeData 471196 |
| | | | | | | CreationDateTime 471198 | | | 1 471200 | LOCAL_DateTime 471202 |
| | | | | | | CreationIdentityUUID 471204 | | | 0..1 471206 | UUID 471208 |
| | | | | | | CreationUserAccountID 471210 | | | 0..1 471212 | UserAccountID 471214 |

FIG. 47-37

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CreationBusinessPartnerFormattedName 471216 | | | 0..1 471218 | LANGUAGEINDEPENDENT_LONG_Name 471220 |
| | | | | | | LastChangeDateTime 471222 | | | 0..1 471224 | LOCAL_DateTime 471226 |
| | | | | | | LastChangeIdentityUUID 471228 | | | 0..1 471230 | UUID 471232 |
| | | | | | | LastChangeUserAccountID 471234 | | | 0..1 471236 | UserAccountID 471238 |

FIG. 47-38

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | | | LastChangeBusinessPartnerFormattedName 471240 | | | 0..1 471242 | LANGUAGEINDEPENDENT_LONG_Name 471244 |
| | | | | | | | | CreationDateTime 471246 | | | | 0..1 471248 | LOCAL_DateTime 471250 |
| | | | | | | | | ContentText 471252 | | | | 1 471254 | Text 471256 |
| | | Item 471258 | | | | Item 471260 | | | | | | 0..N 471262 | FormProcurementReleaseOrderRequestItem 471264 |
| | | | | | | | @actionCode 471266 | | | | | 0..1 471268 | ActionCode 471270 |

FIG. 47-39

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | ID 471272 | | | | | 0..1 471274 | BusinessTransactionDocumentItemID 471276 |
| | | | | | | | | TypeCode 471278 | | | | | 0..1 471280 | BusinessTransactionDocumentItemTypeCode 471282 |
| | | | | | | | | CancellationDocumentIndicator 471284 | | | | | 0..1 471286 | Indicator 471288 |
| | | | BusinessTransactionDocumentReference 471290 | | | | | PurchasingContractReference 471292 | | | | | 1 471294 | BusinessTransactionDocumentReference 471296 |

FIG. 47-40

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | SalesOrderReference 471300 | | | | | 1 471302 | BusinessTransactionDocumentReference 471304 |
| | | | | | | | | OriginPurchaseOrderReference 471308 | | | | | 1 471310 | BusinessTransactionDocumentReference 471312 |
| | | | Party 471314 | | | | | ProductRecipientParty 471316 | | | | | 0..1 471318 | FormBusinessTransactionDocumentParty 471320 |
| | | | | | | | | | InternalID 471322 | | | | 0..1 471324 | PartyInternalID 471326 |
| | | | | | | | | | StandardID 471328 | | | | 0..N 471330 | PartyStandardID 471332 |

FIG. 47-41

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BuyerID 471334 | | | | 0..1 471336 | PartyPartyID 471338 |
| | | | | | SellerID 471340 | | | | 0..1 471342 | PartyPartyID 471344 |
| | | | | | ProductRecipientID 471346 | | | | 0..1 471348 | PartyPartyID 471350 |
| | | | | | VendorID 471352 | | | | 0..1 471354 | PartyPartyID 471356 |
| | | | | | BillToID 471358 | | | | 0..1 471360 | PartyPartyID 471362 |
| | | | | | BillFromID 471364 | | | | 0..1 471366 | PartyPartyID 471368 |
| | | | | | BidderID 471370 | | | | 0..1 471372 | PartyPartyID 471374 |

FIG. 47-42

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | PaymentTransactionInitiatorID 471376 | | | | 0..1 471378 | PartyPartyID 471380 |
| | | | | | PaymentTransactionDestinatedID 471382 | | | | 0..1 471384 | PartyPartyID 471386 |
| | | | | | TaxID 471388 | | | | 0..1 471390 | PartyTaxID 471392 |
| | | | | | TypeCode 471394 | | | | 0..1 471396 | BusinessObjectTypeCode 471398 |
| | | | | | FormattedName 471400 | | | | 0..1 471402 | LANGUAGEINDEPENDENT_LONG_Name 471404 |

FIG. 47-43

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | FormAddress 471406 | | | | 0..1 471408 | FormAddress 471410 |
| | | | | | ContactPerson 471414 | | | | 0..1 471416 | FormContactPerson 471418 |
| | | | | | | InternalID 471420 | | | 0..1 471422 | ContactPersonInternalID 471424 |
| | | | | | | BuyerID 471426 | | | 0..1 471428 | ContactPersonPartyID 471430 |
| | | | | | | SellerID 471432 | | | 0..1 471434 | ContactPersonPartyID 471436 |
| | | | | | | ProductRecipientID 471438 | | | 0..1 471440 | ContactPersonPartyID 471442 |

FIG. 47-44

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | VendorID 471444 | | | 0..1 471446 | ContactPersonPartyID 471448 |
| | | | | | | BillToID 471450 | | | 0..1 471452 | ContactPersonPartyID 471454 |
| | | | | | | BillFromID 471456 | | | 0..1 471458 | ContactPersonPartyID 471460 |
| | | | | | | BidderID 471462 | | | 0..1 471464 | ContactPersonPartyID 471466 |
| | | | | | | FormAddress 471468 | | | 0..1 471470 | FormAddress 471472 |
| | | | | | | FormattedName 471474 | | | 0..1 471476 | LANGUAGEINDEPENDENT_LONG_Name 471478 |

FIG. 47-45

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| Location 471480 | | | | ShipToLocation 471482 | | | | | 0..1 471484 | FormBusinessTransactionDocumentShipToLocation 471486 |
| | | | | | InternalID 471488 | | | | 0..1 471490 | LocationInternalID 471492 |
| | | | | | StandardID 471494 | | | | 0..N 471496 | LocationStandardID 471498 |
| | | | | | BuyerID 471500 | | | | 0..1 471502 | LocationPartyID 471504 |
| | | | | | SellerID 471506 | | | | 0..1 471508 | LocationPartyID 471510 |

FIG. 47-46

| Package | | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|---|
| | | | | | | | | | | | ProductRecipientID 471512 | | | | 0..1 471514 | LocationPartyID 471516 |
| | | | | | | | | | | | VendorID 471518 | | | | 0..1 471520 | LocationPartyID 471522 |
| | | | | | | | | | | | Note 471524 | | | | 0..1 471526 | Note 471528 |
| | | | | | Address 471530 | | | | | | Address 471532 | | | | 0..1 471534 | FormAddress 471536 |
| | | | | | UnloadingLocation 471538 | | | | | | UnloadingLocation 471540 | | | | 0..1 471542 | FormBusinessTransactionDocumentLocation 471544 |
| | | | | | | | | | | | | InternalID 471546 | | | 0..1 471548 | LocationInternalID 471550 |

FIG. 47-47

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StandardID 471552 | | | 0..N 471554 | LocationStandardID 471556 |
| | | | | | | BuyerID 471558 | | | 0..1 471560 | LocationPartyID 471562 |
| | | | | | | SellerID 471564 | | | 0..1 471566 | LocationPartyID 471568 |
| | | | | | | ProductRecipientID 471570 | | | 0..1 471572 | LocationPartyID 471574 |
| | | | | | | VendorID 471576 | | | 0..1 471578 | LocationPartyID 471580 |
| | | | | | | BillToID 471582 | | | 0..1 471584 | LocationPartyID 471586 |

FIG. 47-48

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | BillFromID 471588 | | | 0..1 471590 | LocationPartyID 471592 |
| | | | | | | | | | | | BidderID 471594 | | | 0..1 471596 | LocationPartyID 471598 |
| | | | | | | | | | | | Note 471600 | | | 0..1 471602 | Note 471604 |
| | | | | | | | | | | | FormAddress 471606 | | | 0..1 471608 | FormAddress 471610 |
| | | | ProductInformation 471612 | | | | | | Product 471614 | | | | | 1 471616 | FormBusinessTransactionDocumentProduct 471618 |
| | | | | | | | | | | InternalID 471620 | | | | 0..1 471622 | ProductInternalID 471624 |

FIG. 47-49

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | StandardID 471626 | | | | 0..N 471628 | ProductStandardID 471630 |
| | | | | | BuyerID 471632 | | | | 0..1 471634 | ProductPartyID 471636 |
| | | | | | SellerID 471638 | | | | 0..1 471640 | ProductPartyID 471642 |
| | | | | | ProductRecipientID 471644 | | | | 0..1 471646 | ProductPartyID 471648 |
| | | | | | VendorID 471650 | | | | 0..1 471652 | ProductPartyID 471654 |
| | | | | | ManufacturerID 471656 | | | | 0..1 471658 | ProductPartyID 471660 |

FIG. 47-50

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | BillToID 471662 | | | | 0..1 471664 | ProductPartyID 471666 |
| | | | | | BillFromID 471668 | | | | 0..1 471670 | ProductPartyID 471672 |
| | | | | | BidderID 471674 | | | | 0..1 471676 | ProductPartyID 471678 |
| | | | | | TypeCode 471680 | | | | 0..1 471682 | ProductTypeCode 471684 |
| | | | | | TypeName 471686 | | | | 0..1 471688 | Name 471690 |
| | | | | | Note 471692 | | | | 0..1 471694 | Note 471696 |

FIG. 47-51

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | ProductRequirementSpecification 471698 | | | | | 0..1 471700 | FormBusinessTransactionDocumentProductRequirementSpecification 471702 |
| | | | | | | | | | InternalID 471704 | | | | 0..1 471706 | RequirementSpecificationID 471708 |
| | | | | | | | | | VersionInternalID 471710 | | | | 0..1 471712 | VersionID 471714 |
| | | | | | | | | | Description 471716 | | | | 0..1 471718 | MEDIUM_Description 471720 |
| | | | TextCollection 471722 | | | | | TextCollection 471724 | | | | | 0..1 471726 | FormTextCollection 471728 |

FIG. 47-52

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Text 471730 | | | | 0..N 471732 | FormTextCollectionText 471734 |
| | | | | | | TypeCode 471736 | | | 0..1 471738 | TextCollectionTextTypeCode 471740 |
| | | | | | | TypeName 471742 | | | 0..1 471744 | LANGUAGEINDEPENDENT_MEDIUM_Name 471746 |
| | | | | | | SystemAdministrativeData 471748 | | | 0..1 471750 | FormSystemAdministrativeData 471752 |
| | | | | | | | CreationDateTime 471754 | | 1 471756 | LOCAL_DateTime 471758 |

FIG. 47-53

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CreationIdentityUUID 471760 | | 0..1 471762 | UUID 471764 |
| | | | | | | | CreationUserAccountID 471766 | | 0..1 471768 | UserAccountID 471770 |
| | | | | | | | CreationBusinessPartnerFormattedName 471772 | | 0..1 471774 | LANGUAGEINDEPENDENT_LONG_Name 471776 |
| | | | | | | | LastChangeDateTime 471778 | | 0..1 471780 | LOCAL_DateTime 471782 |

FIG. 47-54

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | LastChangeIdentityUUID 471784 | | 0..1 471786 | UUID 471788 |
| | | | | | | | LastChangeUserAccountID 471790 | | 0..1 471792 | UserAccountID 471794 |
| | | | | | | | LastChangeBusinessPartnerFormattedName 471796 | | 0..1 471798 | LANGUAGEINDEPENDENT_LONG_Name 471800 |
| | | | | | | CreationDateTime 471802 | | | 0..1 471804 | LOCAL_DateTime 471806 |

FIG. 47-55

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | ContentText 471808 | | | 1 471810 | Text 471812 |
| | | | AttachmentFolder 471814 | | | | | | AttachmentFolder 471816 | | | | | 0..1 471818 | AttachmentFolder 471820 |
| | | | | | | | | | | @actionCode 471822 | | | | 0..1 471824 | |
| | | | | Document 471826 | | | | | | Document 471828 | | | | 0..N 471830 | Document 471832 |
| | | | | | | | | | | | @actionCode 471834 | | | 0..1 471836 | ActionCode 471838 |
| | | | | | | | | | | | PathName 471840 | | | 1 471842 | LANGUAGEINDEPENDENT_Name 471844 |

FIG. 47-56

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Name 471846 | | | 1 471848 | LANGUAGEINDEPENDENT_Name 471850 |
| | | | | | | VersionID 471852 | | | 0..1 471854 | VersionID 471856 |
| | | | | | | SystemAdministrativeData 471858 | | | 1 471860 | SystemAdministrativeData 471862 |
| | | | | | | LinkInternalIndicator 471864 | | | 0..1 471866 | Indicator 471868 |
| | | | | | | VisibleIndicator 471870 | | | 1 471872 | Indicator 471874 |

FIG. 47-57

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | VersioningEnabledIndicator 471876 | | | 1 471878 | Indicator 471880 |
| | | | | | | CategoryCode 471882 | | | 1 471884 | DocumentCategoryCode 471886 |
| | | | | | | TypeCode 471888 | | | 0..1 471890 | DocumentTypeCode 471892 |
| | | | | | | MIMECode 471894 | | | 0..1 471896 | MIMECode 471898 |
| | | | | | | AlternativeName 471900 | | | 0..1 471902 | LANGUAGEINDEPENDENT_Name 471904 |

FIG. 47-58

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | InternalLinkPathName 471906 | | | 0..1 471908 | LANGUAGEINDEPENDENT_Name 471910 |
| | | | | | | Description 471912 | | | 0..1 471914 | Description 471916 |
| | | | | | | ExternalLinkWebURI 471918 | | | 0..1 471920 | WebURI 471922 |
| | | | | | | FileContentURI 471924 | | | 0..1 471926 | URI 471928 |
| | | | | | | FileSizeMeasure 471930 | | | 0..1 471932 | Measure 471934 |

FIG. 47-59

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | FileContentBinaryObject 471936 | | | 0..1 471938 | BinaryObject 471940 |
| | | | | | | Attachment 471942 | | | 0..1 471944 | Attachment 471946 |
| | | | | | | Property 471950 | | | 0..N 471952 | DocumentProperty 471954 |
| | | | | | | | @actionCode 471956 | | 0..1 471958 | ActionCode 471960 |
| | | | | | | | Name 471962 | | 1 471964 | LANGUAGEINDEPENDENT_Name 471966 |
| | | | | | | | DataTypeFormatCode 471968 | | 1 471970 | PropertyDataTypeFormatCode 471972 |

FIG. 47-60

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | VisibleIndicator 471974 | | 1 471976 | Indicator 471978 |
| | | | | | | | ChangeAllowedIndicator 471980 | | 1 471982 | Indicator 471984 |
| | | | | | | | MultipleValueIndicator 471986 | | 1 471988 | Indicator 471990 |
| | | | | | | | NamespaceURI 471992 | | 0..1 471994 | NamespaceURI 471996 |
| | | | | | | | Description 471998 | | 0..1 472000 | Description 472002 |

FIG. 47-61

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | Value 472006 | | 0..N 472008 | DocumentPropertyValue 472010 |
| | | | | | | | | | | | | | Text 472012 | 0..1 472014 | LANGUAGEINDEPENDENT_Text 472016 |
| | | | | | | | | | | | | | Indicator 472018 | 0..1 472020 | Indicator 472022 |
| | | | | | | | | | | | | | DateTime 472024 | 0..1 472026 | DateTime 472028 |
| | | | | | | | | | | | | | IntegerValue 472030 | 0..1 472032 | IntegerValue 472034 |

FIG. 47-62

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | Request 472036 | | | | | Request 472038 | | | | | 1 472040 | FormProcurementReleaseOrderRequestItemRequest 472042 |
| | | | | | | | | | ID 472044 | | | | 1 472046 | ReleaseOrderItemRequestID 472048 |
| | | | | | | | | | CreationDateTime 472050 | | | | 0..1 472052 | LOCALNORMALISED_DateTime 472054 |
| | | | | | | | | | PreviousItemRequestID 472056 | | | | 0..1 472058 | ReleaseOrderItemRequestID 472060 |

FIG. 47-63

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | Schedule Line 472062 | | | | | | Schedule Line 472064 | | | | 0..N 472066 | FormProcurementReleaseOrderRequestItemRequestScheduleLine 472068 |
| | | | | | | | | | | | ID 472070 | | | 0..N 472072 | ReleaseOrderItemRequestScheduleLineID 472074 |
| | | | | | | | | | | | RequestedArrivalDateTimePeriod 472076 | | | 0..1 472078 | UPPEROPEN_LOCALNORMALISED_DateTimePeriod 472080 |
| | | | | | | | | | | | RequestedQuantity 472084 | | | 1 472086 | FormQuantity 472088 |

FIG. 47-64

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | | Quantity 472090 | | 1 472092 | Quantity 472094 |
| | | | | | | | | | | | | QuantityMeasureUnitCodeName 472096 | | 1 472098 | Name 472100 |
| | | | | | | | | | | | | QuantityTypeCode 472102 | | 1 472104 | QuantityTypeCode 472106 |
| | | | | | | | | | | | | QuantityTypeCodeName 472108 | | 0..1 472110 | Name 472112 |

FIG. 48-1

| Package | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|
| ProcurementReleaseOrderRequest 480000 | | | ProcurementReleaseOrderRequest 480002 | | | | | | | | | | ProcurementReleaseOrderRequestMessage 480004 |
| | MessageHeader 480006 | | | MessageHeader 480008 | | | | | | | | 1 480010 | BusinessDocumentMessageHeader 480012 |
| | | | | | ID 480014 | | | | | | | 0..1 480016 | BusinessDocumentMessageID 480018 |
| | | | | | UUID 480020 | | | | | | | 0..1 480022 | UUID 480024 |

FIG. 48-2

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ReferenceID 480026 | | | | | | | 0..1 480028 | BusinessDocumentMessageID 480030 |
| | | | ReferenceUUID 480032 | | | | | | | 0..1 480034 | UUID 480036 |
| | | | CreationDateTime 480038 | | | | | | | 1 480040 | GLOBAL_DateTime 480042 |
| | | | TestDataIndicator 480044 | | | | | | | 0..1 480046 | Indicator 480048 |

FIG. 48-3

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | ReconciliationIndicator 480050 | | | | | | | 0..1 480052 | Indicator 480054 |
| | | | | | | SenderBusinessSystemID 480056 | | | | | | | 0..1 480058 | BusinessSystemID 480060 |
| | | | | | | RecipientBusinessSystemID 480062 | | | | | | | 0..1 480064 | BusinessSystemID 480066 |
| | | Party 480068 | | | | SenderParty 480070 | | | | | | | 0..1 480072 | BusinessDocumentMessageHeaderParty 480074 |

FIG. 48-4

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | InternalID 480076 | | | | | | 0..1 480078 | PartyInternalID 480080 |
| | | | | StandardID 480082 | | | | | | 0..N 480084 | PartyStandardID 480086 |
| | | | | ContactPerson 480088 | | | | | | 0..1 480090 | BusinessDocumentMessageHeaderPartyContactPerson 480092 |
| | | | | | InternalID 480094 | | | | | 0..1 480096 | ContactPersonInternalID 480098 |

FIG. 48-5

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormattedName 480100 | | | | | 0..N 480102 | LANGUAGEINDEPENDENT_MEDIUM_Name 480104 |
| | | | | | PersonFormattedName 480106 | | | | | 0..N 480108 | LANGUAGEINDEPENDENT_LONG_Name 480110 |
| | | | | | PhoneNumber 480112 | | | | | 0..N 480114 | PhoneNumber 480116 |
| | | | | | FaxNumber 480118 | | | | | 0..N 480120 | PhoneNumber 480122 |

FIG. 48-6

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | EmailURI 480124 | | | | | 0..N 480126 | EmailURI 480128 |
| | | | RecipientParty 480132 | | | | | | | 0..N 480134 | BusinessDocumentMessageHeaderParty 480136 |
| | | | | InternalID 480138 | | | | | | 0..1 480140 | PartyInternalID 480142 |
| | | | | StandardID 480144 | | | | | | 0..N 480146 | PartyStandardID 480148 |

FIG. 48-7

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Contact Person 480150 | | | | | | 0..1 480152 | BusinessDocumentMessageHeaderPartyContactPerson 480154 |
| | | | | | InternalID 480156 | | | | | 0..1 480158 | ContactPersonInternalID 480160 |
| | | | | | OrganisationFormattedName 480162 | | | | | 0..N 480164 | LANGUAGEINDEPENDENT_MEDIUM_Name 480166 |

FIG. 48-8

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PersonFormattedName 480168 | | | | | 0..N 480170 | LANGUAGEINDEPENDENT_LONG_Name 480172 |
| | | | | | PhoneNumber 480174 | | | | | 0..N 480176 | PhoneNumber 480178 |
| | | | | | FaxNumber 480180 | | | | | 0..N 480182 | PhoneNumber 480184 |
| | | | | | EmailURI 480186 | | | | | 0..N 480188 | EmailURI 480190 |

FIG. 48-9

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Business Scope 480192 | | | | BusinessScope 480194 | | | | | | | 0..N 480196 | BusinessScope 480198 |
| | ProcurementReleaseOrder 480200 | | | | ProcurementReleaseOrder 480202 | | | | | | | | 1 480204 | ProcurementReleaseOrderRequest 480206 |
| | | | | | | @actionCode 480208 | | | | | | | 1 480210 | ActionCode 480212 |
| | | | | | | @reconciliationPeriodCounterValue 480214 | | | | | | | 0..1 480216 | CounterValue 480218 |

FIG. 48-10

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ID 480220 | | | | | | | 1 480222 | BusinessTransactionDocumentID 480224 |
| | | | CreationDateTime 480226 | | | | | | | 1 480228 | LOCALNORMALISED_DateTime 480230 |
| | | | OrderedDateTime 480232 | | | | | | | 1 480234 | LOCALNORMALISED_DateTime 480236 |

FIG. 48-11

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | | | | | ItemListCompleteTransmissionIndicator 480238 | | | | | | | 1 480240 | Indicator 480242 |
| | | BusinessTransactionDocumentReference 480244 | | | | SalesOrderReference 480246 | | | | | | | 0..1 480248 | BusinessTransactionDocumentReference 480250 |
| | | | | | | OriginPurchaseOrderReference 480254 | | | | | | | 0..1 480256 | BusinessTransactionDocumentReference 480258 |

FIG. 48-12

| Package | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|
| | | Party 480260 | | | | BuyerParty 480262 | | | | | | | 0..1 480264 | BusinessTransactionDocumentParty 480266 |
| | | | | | | | InternalID 480268 | | | | | | 0..1 480270 | PartyInternalID 480272 |
| | | | | | | | StandardID 480274 | | | | | | 0..N 480276 | PartyStandardID 480278 |
| | | | | | | | BuyerID 480280 | | | | | | 0..1 480282 | PartyPartyID 480284 |
| | | | | | | | SellerID 480286 | | | | | | 1 480288 | PartyPartyID 480290 |

FIG. 48-13

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ProductRecipientID 480292 | | | | | | 0..1 480294 | PartyPartyID 480296 |
| | | | | VendorID 480298 | | | | | | 0..1 480300 | PartyPartyID 480302 |
| | | | | BillToID 480304 | | | | | | 0..1 480306 | PartyPartyID 480308 |
| | | | | BillFromID 480310 | | | | | | 0..1 480312 | PartyPartyID 480314 |
| | | | | BidderID 480316 | | | | | | 0..1 480318 | PartyPartyID 480320 |

FIG. 48-14

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | PaymentTransactionInitiatorID 480322 | | | | | | 0..1 480324 | PartyPartyID 480326 |
| | | | | PaymentTransactionDestinatedID 480328 | | | | | | 0..1 480330 | PartyPartyID 480332 |
| | | | | TaxID 480334 | | | | | | 0..1 480336 | PartyTaxID 480338 |
| | | | | ClearingHouseID 480340 | | | | | | 0..1 480342 | PartyPartyID 480344 |

FIG. 48-15

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | TypeCode 480346 | | | | | | 0..1 480348 | BusinessObjectTypeCode 480350 |
| | | | | | | | | DeterminationMethodCode 480352 | | | | | | 0..1 480354 | PartyDeterminationMethodCode 480356 |
| | | | | | | | | AddressReference 480358 | | | | | | 0..1 480360 | PartyAddressReference 480362 |
| | | | Address 480364 | | | | | Address 480366 | | | | | | 0..1 480368 | Address 480370 |

FIG. 48-16

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormOfAddress 480372 | | | | | 0..1 480374 | FormOfAddress 480376 |
| | | | | | OrganisationFormattedName 480378 | | | | | 0..N 480380 | LANGUAGEINDEPENDENT_MEDIUM_Name 480382 |
| | | | | | PersonName 480384 | | | | | 0..1 480386 | PersonName 480388 |
| | | | | | FunctionalTitleName 480390 | | | | | 0..1 480392 | LANGUAGEINDEPENDENT_MEDIUM_Name 480394 |

FIG. 48-17

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DepartmentName 480396 | | | | | 0..1 480398 | LANGUAGEINDEPENDENT_MEDIUM_Name 480400 |
| | | | | | Office 480404 | | | | | 0..1 480406 | Office 480408 |
| | | | | | Physical Address 480412 | | | | | 0..1 480414 | Physical Address 480416 |
| | | | | | | Country Code 480418 | | | | 0..1 480420 | CountryCode 480422 |
| | | | | | | Country Name 480424 | | | | 0..1 480426 | MEDIUM_Name 480428 |

FIG. 48-18

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RegionCode 480430 | | | | 0..1 480432 | RegionCode 480434 |
| | | | | | | RegionName 480436 | | | | 0..1 480438 | LANGUAGEINDEPENDENT_MEDIUM_Name 480440 |
| | | | | | | StreetPostalCode 480442 | | | | 0..1 480444 | PostalCode 480446 |
| | | | | | | POBoxPostalCode 480448 | | | | 0..1 480450 | PostalCode 480452 |

FIG. 48-19

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CompanyPostalCode 480454 | | | | 0..1 480456 | PostalCode 480458 |
| | | | | | | CityName 480460 | | | | 0..1 480462 | LANGUAGEINDEPENDENT_MEDIUM_Name 480464 |
| | | | | | | AdditionalCityName 480466 | | | | 0..1 480468 | LANGUAGEINDEPENDENT_MEDIUM_Name 480470 |

FIG. 48-20

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DistrictName 480472 | | | | 0..1 480474 | LANGUAGEINDEPENDENT_MEDIUM_Name 480476 |
| | | | | | | POBoxID 480478 | | | | 0..1 480480 | POBoxID 480482 |
| | | | | | | POBoxIndicator 480484 | | | | 0..1 480486 | Indicator 480488 |
| | | | | | | POBoxCountryCode 480490 | | | | 0..1 480492 | CountryCode 480494 |

FIG. 48-21

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBoxCountryName 480496 | | | | 0..1 480498 | MEDIUM_Name 480500 |
| | | | | | | POBoxRegionCode 480502 | | | | 0..1 480504 | RegionCode 480506 |
| | | | | | | POBoxRegionName 480508 | | | | 0..1 480510 | LANGUAGEINDEPENDENT_MEDIUM_Name 480512 |
| | | | | | | POBoxCityName 480514 | | | | 0..1 480516 | LANGUAGEINDEPENDENT_MEDIUM_Name 480518 |

FIG. 48-22

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetName 480520 | | | | 0..1 480522 | StreetName 480524 |
| | | | | | | StreetPrefixName 480526 | | | | 0..N 480528 | LANGUAGEINDEPENDENT_MEDIUM_Name 480530 |
| | | | | | | StreetSuffixName 480532 | | | | 0..N 480534 | LANGUAGEINDEPENDENT_MEDIUM_Name 480536 |
| | | | | | | HouseID 480538 | | | | 0..1 480540 | HouseID 480542 |

FIG. 48-23

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalHouseID 480544 | | | | 0..1 480546 | HouseID 480548 |
| | | | | | | BuildingID 480550 | | | | 0..1 480552 | BuildingID 480554 |
| | | | | | | FloorID 480556 | | | | 0..1 480558 | FloorID 480560 |
| | | | | | | RoomID 480562 | | | | 0..1 480564 | RoomID 480566 |
| | | | | | | CareOfName 480568 | | | | 0..1 480570 | LANGUAGEINDEPENDENT_MEDIUM_Name 480572 |

FIG. 48-24

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Description 480574 | | | | 0..N 480576 | Description 480578 |
| | | | | | TaxJurisdictionCode 480580 | | | | | 0..1 480582 | TaxJurisdictionCode 480584 |
| | | | | | TimeZoneDifferenceValue 480586 | | | | | 0..1 480588 | TimeZoneDifferenceValue 480590 |
| | | | | | GeoCoordinates 480592 | | | | | 0..1 480594 | GeoCoordinates 480596 |
| | | | | | Communication 480600 | | | | | 0..1 480602 | Communication 480604 |

FIG. 48-25

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 480606 | | | | 0..1 480608 | LanguageCode 480610 |
| | | | | | | CorrespondenceLanguageName 480612 | | | | 0..1 480614 | MEDIUM_Name 480616 |
| | | | | | | Telephone 480618 | | | | 0..N 480620 | Telephone 480622 |
| | | | | | | | Number 480624 | | | 1 480626 | PhoneNumber 480628 |

FIG. 48-26

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | SMSEnabledIndicator 480630 | | | 0..1 480632 | Indicator 480634 |
| | | | | | | | NumberDefaultIndicator 480636 | | | 1 480638 | Indicator 480640 |
| | | | | | | | NumberDescription 480642 | | | 0..N 480644 | Description 480646 |
| | | | | | | | NumberUsageDenialIndicator 480648 | | | 1 480650 | Indicator 480652 |

FIG. 48-27

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | MobilePhone 480654 | | | | 0..N 480656 | Telephone 480658 |
| | | | | | | | Number 480660 | | | 1 480662 | PhoneNumber 480664 |
| | | | | | | | SMSEnabledIndicator 480666 | | | 0..1 480668 | Indicator 480670 |
| | | | | | | | NumberDefaultIndicator 480672 | | | 1 480674 | Indicator 480676 |
| | | | | | | | NumberDescription 480678 | | | 0..N 480680 | Description 480682 |

FIG. 48-28

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 480684 | | | 1 480686 | Indicator 480688 |
| | | | | | | Facsimile 480690 | | | | 0..N 480692 | Facsimile 480694 |
| | | | | | | | Number 480696 | | | 1 480698 | PhoneNumber 480700 |
| | | | | | | | NumberDefaultIndicator 480702 | | | 1 480704 | Indicator 480706 |
| | | | | | | | NumberDescription 480708 | | | 0..N 480710 | Description 480712 |

FIG. 48-29

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 480714 | | | 1 480716 | Indicator 480718 |
| | | | | | | Email 480720 | | | | 0..N 480722 | Email 480724 |
| | | | | | | | URI 480726 | | | 1 480728 | EmailURI 480730 |
| | | | | | | | URIDefaultIndicator 480732 | | | 1 480734 | Indicator 480736 |
| | | | | | | | URIDescription 480738 | | | 0..N 480740 | Description 480742 |

FIG. 48-30

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | | | | URIUsageDenialIndicator 480744 | | | 1 480746 | Indicator 480748 |
| | | | | | | | | | | Web 480750 | | | | 0..N 480752 | Web 480754 |
| | | | | | | | | | | | URI 480756 | | | 1 480758 | WebURI 480760 |
| | | | | | | | | | | | URIDefaultIndicator 480762 | | | 1 480764 | Indicator 480766 |
| | | | | | | | | | | | URIDescription 480768 | | | 0..N 480770 | Description 480772 |

FIG. 48-31

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| ContactPerson 480774 | | | | ContactPerson 480776 | | | | | | 0..N 480778 | ContactPerson 480780 |
| | | | | | InternalID 480782 | | | | | 0..1 480784 | ContactPersonInternalID 480786 |
| | | | | | BuyerID 480788 | | | | | 0..1 480790 | ContactPersonPartyID 480792 |
| | | | | | SellerID 480794 | | | | | 0..1 480796 | ContactPersonPartyID 480798 |
| | | | | | ProductRecipientID 480800 | | | | | 0..1 480802 | ContactPersonPartyID 480804 |

FIG. 48-32

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | VendorID 480806 | | | | | 0..1 480808 | ContactPersonPartyID 480810 |
| | | | | | BillToID 480812 | | | | | 0..1 480814 | ContactPersonPartyID 480816 |
| | | | | | BillFromID 480818 | | | | | 0..1 480820 | ContactPersonPartyID 480822 |
| | | | | | BidderID 480824 | | | | | 0..1 480826 | ContactPersonPartyID 480828 |
| | | | | | AddressReference 480830 | | | | | 0..1 480832 | PartyAddressReference 480834 |

FIG. 48-33

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| Address 480836 | | | | | Address 480838 | | | | | 0..1 480840 | Address 480842 |
| | | | | | | OrganisationFormOfAddress 480844 | | | | 0..1 480846 | FormOfAddress 480848 |
| | | | | | | OrganisationFormattedName 480850 | | | | 0..N 480852 | LANGUAGEINDEPENDENT_MEDIUM_Name 480854 |
| | | | | | | PersonName 480856 | | | | 0..1 480858 | PersonName 480860 |

FIG. 48-34

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FunctionalTitleName 480862 | | | | 0..1 480864 | LANGUAGEINDEPENDENT_MEDIUM_Name 480866 |
| | | | | | | DepartmentName 480868 | | | | 0..1 480870 | LANGUAGEINDEPENDENT_MEDIUM_Name 480872 |
| | | | | | | Office 480876 | | | | 0..1 480878 | Office 480880 |
| | | | | | | PhysicalAddress 480884 | | | | 0..1 480886 | PhysicalAddress 480888 |

FIG. 48-35

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | | CountryCode 480890 | | | 0..1 480892 | CountryCode 480894 |
| | | | | | | | | | | | | CountryName 480896 | | | 0..1 480898 | MEDIUM_Name 480900 |
| | | | | | | | | | | | | RegionCode 480902 | | | 0..1 480904 | RegionCode 480906 |
| | | | | | | | | | | | | RegionName 480908 | | | 0..1 480910 | LANGUAGEINDEPENDENT_MEDIUM_Name 480912 |
| | | | | | | | | | | | | StreetPostalCode 480914 | | | 0..1 480916 | PostalCode 480918 |

FIG. 48-36

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxPostalCode 480920 | | | 0..1 480922 | PostalCode 480924 |
| | | | | | | | CompanyPostalCode 480926 | | | 0..1 480928 | PostalCode 480930 |
| | | | | | | | CityName 480932 | | | 0..1 480934 | LANGUAGEINDEPENDENT_MEDIUM_Name 480936 |
| | | | | | | | AdditionalCityName 480938 | | | 0..1 480940 | LANGUAGEINDEPENDENT_MEDIUM_Name 480942 |

FIG. 48-37

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DistrictName 480944 | | | 0..1 480946 | LANGUAGEINDEPENDENT_MEDIUM_Name 480948 |
| | | | | | | | POBoxID 480950 | | | 0..1 480952 | POBoxID 480954 |
| | | | | | | | POBoxIndicator 480956 | | | 0..1 480958 | Indicator 480960 |
| | | | | | | | POBoxCountryCode 480962 | | | 0..1 480964 | CountryCode 480966 |

FIG. 48-38

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxCountryName 480968 | | | 0..1 480970 | MEDIUM_Name 480972 |
| | | | | | | | POBoxRegionCode 480974 | | | 0..1 480976 | RegionCode 480978 |
| | | | | | | | POBoxRegionName 480980 | | | 0..1 480982 | LANGUAGEINDEPENDENT_MEDIUM_Name 480984 |
| | | | | | | | POBoxCityName 480986 | | | 0..1 480988 | LANGUAGEINDEPENDENT_MEDIUM_Name 480990 |

FIG. 48-39

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 480992 | | | 0..1 480994 | StreetName 480996 |
| | | | | | | | StreetPrefixName 480998 | | | 0..N 481000 | LANGUAGEINDEPENDENT_MEDIUM_Name 481002 |
| | | | | | | | StreetSuffixName 481004 | | | 0..N 481006 | LANGUAGEINDEPENDENT_MEDIUM_Name 481008 |
| | | | | | | | HouseID 481010 | | | 0..1 481012 | HouseID 481014 |

FIG. 48-40

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 481016 | | | 0..1 481018 | HouseID 481020 |
| | | | | | | | BuildingID 481022 | | | 0..1 481024 | BuildingID 481026 |
| | | | | | | | FloorID 481028 | | | 0..1 481030 | FloorID 481032 |
| | | | | | | | RoomID 481034 | | | 0..1 481036 | RoomID 481038 |
| | | | | | | | CareOfName 481040 | | | 0..1 481042 | LANGUAGEINDEPENDENT_MEDIUM_Name 481044 |

FIG. 48-41

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Description 481046 | | | 0..N 481048 | Description 481050 |
| | | | | | | TaxJurisdictionCode 481052 | | | | 0..1 481054 | TaxJurisdictionCode 481056 |
| | | | | | | TimeZoneDifferenceValue 481058 | | | | 0..1 481060 | TimeZoneDifferenceValue 481062 |
| | | | | | | GeoCoordinates 481064 | | | | 0..1 481066 | GeoCoordinates 481068 |
| | | | | | | Communication 481072 | | | | 0..1 481074 | Communication 481076 |

FIG. 48-42

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 481078 | | | 0..1 481080 | LanguageCode 481082 |
| | | | | | | | CorrespondenceLanguageName 481084 | | | 0..1 481086 | MEDIUM_Name 481088 |
| | | | | | | | Telephone 481090 | | | 0..N 481092 | Telephone 481094 |
| | | | | | | | | Number 481096 | | 1 481098 | PhoneNumber 481100 |

FIG. 48-43

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | SMSEnabledIndicator 481102 | | 0..1 481104 | Indicator 481106 |
| | | | | | | | | NumberDefaultIndicator 481108 | | 1 481110 | Indicator 481112 |
| | | | | | | | | NumberDescription 481114 | | 0..N 481116 | Description 481118 |
| | | | | | | | | NumberUsageDenialIndicator 481120 | | 1 481122 | Indicator 481124 |

FIG. 48-44

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | MobilePhone 481126 | | | 0..N 481128 | Telephone 481130 |
| | | | | | | | | Number 481132 | | 1 481134 | PhoneNumber 481136 |
| | | | | | | | | SMSEnabledIndicator 481138 | | 0..1 481140 | Indicator 481142 |
| | | | | | | | | NumberDefaultIndicator 481144 | | 1 481146 | Indicator 481148 |
| | | | | | | | | NumberDescription 481150 | | 0..N 481152 | Description 481154 |

FIG. 48-45

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | | | NumberUsageDenialIndicator 481156 | | 1 481158 | Indicator 481160 |
| | | | | | | | | | | | | Facsimile 481162 | | | 0..N 481164 | Facsimile 481166 |
| | | | | | | | | | | | | | Number 481168 | | 1 481170 | PhoneNumber 481172 |
| | | | | | | | | | | | | | NumberDefaultIndicator 481174 | | 1 481176 | Indicator 481178 |
| | | | | | | | | | | | | | NumberDescription 481180 | | 0..N 481182 | Description 481184 |

FIG. 48-46

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 481186 | | 1 481188 | Indicator 481190 |
| | | | | | | | Email 481192 | | | 0..N 481194 | Email 481196 |
| | | | | | | | | URI 481198 | | 1 481200 | EmailURI 481202 |
| | | | | | | | | URIDefaultIndicator 481204 | | 1 481206 | Indicator 481208 |
| | | | | | | | | URIDescription 481210 | | 0..N 481212 | Description 481214 |

FIG. 48-47

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIUsageDenialIndicator 481216 | | 1 481218 | Indicator 481220 |
| | | | | | | | Web 481222 | | | 0..N 481224 | Web 481226 |
| | | | | | | | | URI 481228 | | 1 481230 | WebURI 481232 |
| | | | | | | | | URIDefaultIndicator 481234 | | 1 481236 | Indicator 481238 |
| | | | | | | | | URIDescription 481240 | | 0..N 481242 | Description 481244 |

FIG. 48-48

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | SellerParty 481248 | | | | | | | 1 481250 | BusinessTransactionDocumentParty 481252 |
| | | | | InternalID 481254 | | | | | | 0..1 481256 | PartyInternalID 481258 |
| | | | | StandardID 481260 | | | | | | 0..N 481262 | PartyStandardID 481264 |
| | | | | BuyerID 481266 | | | | | | 0..1 481268 | PartyPartyID 481270 |
| | | | | SellerID 481272 | | | | | | 1 481274 | PartyPartyID 481276 |

FIG. 48-49

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ProductRecipientID 481278 | | | | | | 0..1 481280 | PartyPartyID 481282 |
| | | | | VendorID 481284 | | | | | | 0..1 481286 | PartyPartyID 481288 |
| | | | | BillToID 481290 | | | | | | 0..1 481292 | PartyPartyID 481294 |
| | | | | BillFromID 481296 | | | | | | 0..1 481298 | PartyPartyID 481300 |
| | | | | BidderID 481302 | | | | | | 0..1 481304 | PartyPartyID 481306 |

FIG. 48-50

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | PaymentTransactionInitiatorID 481308 | | | | | | 0..1 481310 | PartyPartyID 481312 |
| | | | | PaymentTransactionDestinatedID 481314 | | | | | | 0..1 481316 | PartyPartyID 481318 |
| | | | | TaxID 481320 | | | | | | 0..1 481322 | PartyTaxID 481324 |
| | | | | ClearingHouseID 481326 | | | | | | 0..1 481328 | PartyPartyID 481330 |

FIG. 48-51

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | TypeCode 481332 | | | | | | 0..1 481334 | BusinessObjectTypeCode 481336 |
| | | | | | | | | DeterminationMethodCode 481338 | | | | | | 0..1 481340 | PartyDeterminationMethodCode 481342 |
| | | | | | | | | AddressReference 481344 | | | | | | 0..1 481346 | PartyAddressReference 481348 |
| | | | Address 481350 | | | | | Address 481352 | | | | | | 0..1 481354 | Address 481356 |

FIG. 48-52

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormOfAddress 481358 | | | | | 0..1 481360 | FormOfAddress 481362 |
| | | | | | OrganisationFormattedName 481364 | | | | | 0..N 481366 | LANGUAGEINDEPENDENT_MEDIUM_Name 481368 |
| | | | | | PersonName 481370 | | | | | 0..1 481372 | PersonName 481374 |
| | | | | | FunctionalTitleName 481376 | | | | | 0..1 481378 | LANGUAGEINDEPENDENT_MEDIUM_Name 481380 |

FIG. 48-53

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DepartmentName 481382 | | | | | 0..1 481384 | LANGUAGEINDEPENDENT_MEDIUM_Name 481386 |
| | | | | | Office 481390 | | | | | 0..1 481392 | Office 481394 |
| | | | | | Physical Address 481398 | | | | | 0..1 481400 | Physical Address 481402 |
| | | | | | | Country Code 481404 | | | | 0..1 481406 | CountryCode 481408 |
| | | | | | | Country Name 481410 | | | | 0..1 481412 | MEDIUM_Name 481414 |

FIG. 48-54

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RegionCode 481416 | | | | 0..1 481418 | RegionCode 481420 |
| | | | | | | RegionName 481422 | | | | 0..1 481424 | LANGUAGEINDEPENDENT_MEDIUM_Name 481426 |
| | | | | | | StreetPostalCode 481428 | | | | 0..1 481430 | PostalCode 481432 |
| | | | | | | POBoxPostalCode 481434 | | | | 0..1 481436 | PostalCode 481438 |

FIG. 48-55

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CompanyPostalCode 481440 | | | | 0..1 481442 | PostalCode 481444 |
| | | | | | | CityName 481446 | | | | 0..1 481448 | LANGUAGEINDEPENDENT_MEDIUM_Name 481450 |
| | | | | | | AdditionalCityName 481452 | | | | 0..1 481454 | LANGUAGEINDEPENDENT_MEDIUM_Name 481456 |

FIG. 48-56

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DistrictName 481458 | | | | 0..1 481460 | LANGUAGEINDEPENDENT_MEDIUM_Name 481462 |
| | | | | | | POBoxID 481464 | | | | 0..1 481466 | POBoxID 481468 |
| | | | | | | POBoxIndicator 481470 | | | | 0..1 481472 | Indicator 481474 |
| | | | | | | POBoxCountryCode 481476 | | | | 0..1 481478 | CountryCode 481480 |

FIG. 48-57

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBoxCountryName 481482 | | | | 0..1 481484 | MEDIUM_Name 481486 |
| | | | | | | POBoxRegionCode 481488 | | | | 0..1 481490 | RegionCode 481492 |
| | | | | | | POBoxRegionName 481494 | | | | 0..1 481496 | LANGUAGEINDEPENDENT_MEDIUM_Name 481498 |
| | | | | | | POBoxCityName 481500 | | | | 0..1 481502 | LANGUAGEINDEPENDENT_MEDIUM_Name 481504 |

FIG. 48-58

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetName 481506 | | | | 0..1 481508 | StreetName 481510 |
| | | | | | | StreetPrefixName 481512 | | | | 0..N 481514 | LANGUAGEINDEPENDENT_MEDIUM_Name 481516 |
| | | | | | | StreetSuffixName 481518 | | | | 0..N 481520 | LANGUAGEINDEPENDENT_MEDIUM_Name 481522 |
| | | | | | | HouseID 481524 | | | | 0..1 481526 | HouseID 481528 |

FIG. 48-59

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalHouseID 481530 | | | | 0..1 481532 | HouseID 481534 |
| | | | | | | BuildingID 481536 | | | | 0..1 481538 | BuildingID 481540 |
| | | | | | | FloorID 481542 | | | | 0..1 481544 | FloorID 481546 |
| | | | | | | RoomID 481548 | | | | 0..1 481550 | RoomID 481552 |
| | | | | | | CareOfName 481554 | | | | 0..1 481556 | LANGUAGEINDEPENDENT_MEDIUM_Name 481558 |

FIG. 48-60

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Description 481560 | | | | 0..N 481562 | Description 481564 |
| | | | | | TaxJurisdictionCode 481566 | | | | | 0..1 481568 | TaxJurisdictionCode 481570 |
| | | | | | TimeZoneDifferenceValue 481572 | | | | | 0..1 481574 | TimeZoneDifferenceValue 481576 |
| | | | | | GeoCoordinates 481578 | | | | | 0..1 481580 | GeoCoordinates 481582 |
| | | | | | Communication 481586 | | | | | 0..1 481588 | Communication 481590 |

FIG. 48-61

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 481592 | | | | 0..1 481594 | LanguageCode 481596 |
| | | | | | | CorrespondenceLanguageName 481598 | | | | 0..1 481600 | MEDIUM_Name 481602 |
| | | | | | | Telephone 481604 | | | | 0..N 481606 | Telephone 481608 |
| | | | | | | | Number 481610 | | | 1 481612 | PhoneNumber 481614 |

FIG. 48-62

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | SMSEnabledIndicator 481616 | | | 0..1 481618 | Indicator 481620 |
| | | | | | | | NumberDefaultIndicator 481622 | | | 1 481624 | Indicator 481626 |
| | | | | | | | NumberDescription 481628 | | | 0..N 481630 | Description 481632 |
| | | | | | | | NumberUsageDenialIndicator 481634 | | | 1 481636 | Indicator 481638 |

FIG. 48-63

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | MobilePhone 481640 | | | | 0..N 481642 | Telephone 481644 |
| | | | | | | | Number 481646 | | | 1 481648 | PhoneNumber 481650 |
| | | | | | | | SMSEnabledIndicator 481652 | | | 0..1 481654 | Indicator 481656 |
| | | | | | | | NumberDefaultIndicator 481658 | | | 1 481660 | Indicator 481662 |
| | | | | | | | NumberDescription 481664 | | | 0..N 481666 | Description 481668 |

FIG. 48-64

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 481670 | | | 1 481672 | Indicator 481674 |
| | | | | | | Facsimile 481676 | | | | 0..N 481678 | Facsimile 481680 |
| | | | | | | | Number 481682 | | | 1 481684 | PhoneNumber 481686 |
| | | | | | | | NumberDefaultIndicator 481688 | | | 1 481690 | Indicator 481692 |
| | | | | | | | NumberDescription 481694 | | | 0..N 481696 | Description 481698 |

FIG. 48-65

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 481700 | | | 1 481702 | Indicator 481704 |
| | | | | | | Email 481706 | | | | 0..N 481708 | Email 481710 |
| | | | | | | | URI 481712 | | | 1 481714 | EmailURI 481716 |
| | | | | | | | URIDefaultIndicator 481718 | | | 1 481720 | Indicator 481722 |
| | | | | | | | URIDescription 481724 | | | 0..N 481726 | Description 481728 |

FIG. 48-66

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | URIUsageDenialIndicator 481730 | | | 1 481732 | Indicator 481734 |
| | | | | | | Web 481736 | | | | 0..N 481738 | Web 481740 |
| | | | | | | | URI 481742 | | | 1 481744 | WebURI 481746 |
| | | | | | | | URIDefaultIndicator 481748 | | | 1 481750 | Indicator 481752 |
| | | | | | | | URIDescription 481754 | | | 0..N 481756 | Description 481758 |

FIG. 48-67

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Contact Person 481760 | | | | | Contact Person 481762 | | | | | | 0..N 481764 | ContactPerson 481766 |
| | | | | | | | | | InternalID 481768 | | | | | 0..1 481770 | ContactPersonInternalID 481772 |
| | | | | | | | | | BuyerID 481774 | | | | | 0..1 481776 | ContactPersonPartyID 481778 |
| | | | | | | | | | SellerID 481780 | | | | | 0..1 481782 | ContactPersonPartyID 481784 |
| | | | | | | | | | ProductRecipientID 481786 | | | | | 0..1 481788 | ContactPersonPartyID 481790 |

FIG. 48-68

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | VendorID 481792 | | | | | 0..1 481794 | ContactPersonPartyID 481796 |
| | | | | | BillToID 481798 | | | | | 0..1 481800 | ContactPersonPartyID 481802 |
| | | | | | BillFromID 481804 | | | | | 0..1 481806 | ContactPersonPartyID 481808 |
| | | | | | BidderID 481810 | | | | | 0..1 481812 | ContactPersonPartyID 481814 |
| | | | | | AddressReference 481816 | | | | | 0..1 481818 | PartyAddressReference 481820 |

FIG. 48-69

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | Address 481822 | | | | | | Address 481824 | | | | | 0..1 481826 | Address 481828 |
| | | | | | | | | | | | OrganisationFormOfAddress 481830 | | | | 0..1 481832 | FormOfAddress 481834 |
| | | | | | | | | | | | OrganisationFormattedName 481836 | | | | 0..N 481838 | LANGUAGEINDEPENDENT_MEDIUM_Name 481840 |
| | | | | | | | | | | | PersonName 481842 | | | | 0..1 481844 | PersonName 481846 |

FIG. 48-70

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FunctionalTitleName 481848 | | | | 0..1 481850 | LANGUAGEINDEPENDENT_MEDIUM_Name 481852 |
| | | | | | | DepartmentName 481854 | | | | 0..1 481856 | LANGUAGEINDEPENDENT_MEDIUM_Name 481858 |
| | | | | | | Office 481862 | | | | 0..1 481864 | Office 481866 |
| | | | | | | PhysicalAddress 481870 | | | | 0..1 481872 | PhysicalAddress 481874 |

FIG. 48-71

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CountryCode 481876 | | | 0..1 481878 | CountryCode 481880 |
| | | | | | | | CountryName 481882 | | | 0..1 481884 | MEDIUM_Name 481886 |
| | | | | | | | RegionCode 481888 | | | 0..1 481890 | RegionCode 481892 |
| | | | | | | | RegionName 481894 | | | 0..1 481896 | LANGUAGEINDEPENDENT_MEDIUM_Name 481898 |
| | | | | | | | StreetPostalCode 481900 | | | 0..1 481902 | PostalCode 481904 |

FIG. 48-72

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxPostalCode 481906 | | | 0..1 481908 | PostalCode 481910 |
| | | | | | | | CompanyPostalCode 481912 | | | 0..1 481914 | PostalCode 481916 |
| | | | | | | | CityName 481918 | | | 0..1 481920 | LANGUAGEINDEPENDENT_MEDIUM_Name 481922 |
| | | | | | | | AdditionalCityName 481924 | | | 0..1 481926 | LANGUAGEINDEPENDENT_MEDIUM_Name 481928 |

FIG. 48-73

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DistrictName 481930 | | | 0..1 481932 | LANGUAGEINDEPENDENT_MEDIUM_Name 481934 |
| | | | | | | | POBoxID 481936 | | | 0..1 481938 | POBoxID 481940 |
| | | | | | | | POBoxIndicator 481942 | | | 0..1 481944 | Indicator 481946 |
| | | | | | | | POBoxCountryCode 481948 | | | 0..1 481950 | CountryCode 481952 |

FIG. 48-74

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxCountryName 481954 | | | 0..1 481956 | MEDIUM_Name 481958 |
| | | | | | | | POBoxRegionCode 481960 | | | 0..1 481962 | RegionCode 481964 |
| | | | | | | | POBoxRegionName 481966 | | | 0..1 481968 | LANGUAGEINDEPENDENT_MEDIUM_Name 481970 |
| | | | | | | | POBoxCityName 481972 | | | 0..1 481974 | LANGUAGEINDEPENDENT_MEDIUM_Name 481976 |

FIG. 48-75

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 481978 | | | 0..1 481980 | StreetName 481982 |
| | | | | | | | StreetPrefixName 481984 | | | 0..N 481986 | LANGUAGEINDEPENDENT_MEDIUM_Name 481988 |
| | | | | | | | StreetSuffixName 481990 | | | 0..N 481992 | LANGUAGEINDEPENDENT_MEDIUM_Name 481994 |
| | | | | | | | HouseID 481996 | | | 0..1 481998 | HouseID 482000 |

FIG. 48-76

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 482002 | | | 0..1 482004 | HouseID 482006 |
| | | | | | | | BuildingID 482008 | | | 0..1 482010 | BuildingID 482012 |
| | | | | | | | FloorID 482014 | | | 0..1 482016 | FloorID 482018 |
| | | | | | | | RoomID 482020 | | | 0..1 482022 | RoomID 482024 |
| | | | | | | | CareOfName 482026 | | | 0..1 482028 | LANGUAGEINDEPENDENT_MEDIUM_Name 482030 |

FIG. 48-77

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Description 482032 | | | 0..N 482034 | Description 482036 |
| | | | | | | TaxJurisdictionCode 482038 | | | | 0..1 482040 | TaxJurisdictionCode 482042 |
| | | | | | | TimeZoneDifferenceValue 482044 | | | | 0..1 482046 | TimeZoneDifferenceValue 482048 |
| | | | | | | GeoCoordinates 482050 | | | | 0..1 482052 | GeoCoordinates 482054 |
| | | | | | | Communication 482058 | | | | 0..1 482060 | Communication 482062 |

FIG. 48-78

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 482064 | | | 0..1 482066 | LanguageCode 482068 |
| | | | | | | | CorrespondenceLanguageName 482070 | | | 0..1 482072 | MEDIUM_Name 482074 |
| | | | | | | | Telephone 482076 | | | 0..N 482078 | Telephone 482080 |
| | | | | | | | | Number 482082 | | 1 482084 | PhoneNumber 482086 |

FIG. 48-79

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | SMSEnabledIndicator 482088 | | 0..1 482090 | Indicator 482092 |
| | | | | | | | | NumberDefaultIndicator 482094 | | 1 482096 | Indicator 482098 |
| | | | | | | | | NumberDescription 482100 | | 0..N 482102 | Description 482104 |
| | | | | | | | | NumberUsageDenialIndicator 482106 | | 1 482108 | Indicator 482110 |

FIG. 48-80

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | MobilePhone 482112 | | | 0..N 482114 | Telephone 482116 |
| | | | | | | | | Number 482118 | | 1 482120 | PhoneNumber 482122 |
| | | | | | | | | SMSEnabledIndicator 482124 | | 0..1 482126 | Indicator 482128 |
| | | | | | | | | NumberDefaultIndicator 482130 | | 1 482132 | Indicator 482134 |
| | | | | | | | | NumberDescription 482136 | | 0..N 482138 | Description 482140 |

FIG. 48-81

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 482142 | | 1 482144 | Indicator 482146 |
| | | | | | | | Facsimile 482148 | | | 0..N 482150 | Facsimile 482152 |
| | | | | | | | | Number 482154 | | 1 482156 | PhoneNumber 482158 |
| | | | | | | | | NumberDefaultIndicator 482160 | | 1 482162 | Indicator 482164 |
| | | | | | | | | NumberDescription 482166 | | 0..N 482168 | Description 482170 |

FIG. 48-82

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 482172 | | 1 482174 | Indicator 482176 |
| | | | | | | | Email 482178 | | | 0..N 482180 | Email 482182 |
| | | | | | | | | URI 482184 | | 1 482186 | EmailURI 482188 |
| | | | | | | | | URIDefaultIndicator 482190 | | 1 482192 | Indicator 482194 |
| | | | | | | | | URIDescription 482196 | | 0..N 482198 | Description 482200 |

FIG. 48-83

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIUsageDenialIndicator 482202 | | 1 482204 | Indicator 482206 |
| | | | | | | | Web 482208 | | | 0..N 482210 | Web 482212 |
| | | | | | | | | URI 482214 | | 1 482216 | WebURI 482218 |
| | | | | | | | | URIDefaultIndicator 482220 | | 1 482222 | Indicator 482224 |
| | | | | | | | | URIDescription 482226 | | 0..N 482228 | Description 482230 |

FIG. 48-84

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | LogisticsRequestResponsibleParty 482234 | | | | | | | 0..1 482236 | BusinessTransactionDocumentParty 482238 |
| | | | | InternalID 482240 | | | | | | 0..1 482242 | PartyInternalID 482244 |
| | | | | StandardID 482246 | | | | | | 0..N 482248 | PartyStandardID 482250 |
| | | | | BuyerID 482252 | | | | | | 0..1 482254 | PartyPartyID 482256 |
| | | | | SellerID 482258 | | | | | | 1 482260 | PartyPartyID 482262 |

FIG. 48-85

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ProductRecipientID 482264 | | | | | | 0..1 482266 | PartyPartyID 482268 |
| | | | | VendorID 482270 | | | | | | 0..1 482272 | PartyPartyID 482274 |
| | | | | BillToID 482276 | | | | | | 0..1 482278 | PartyPartyID 482280 |
| | | | | BillFromID 482282 | | | | | | 0..1 482284 | PartyPartyID 482286 |
| | | | | BidderID 482288 | | | | | | 0..1 482290 | PartyPartyID 482292 |

FIG. 48-86

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | PaymentTransactionInitiatorID 482294 | | | | | | 0..1 482296 | PartyPartyID 482298 |
| | | | | PaymentTransactionDestinatedID 482300 | | | | | | 0..1 482302 | PartyPartyID 482304 |
| | | | | TaxID 482306 | | | | | | 0..1 482308 | PartyTaxID 482310 |
| | | | | ClearingHouseID 482312 | | | | | | 0..1 482314 | PartyPartyID 482316 |

FIG. 48-87

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | TypeCode 482318 | | | | | | 0..1 482320 | BusinessObjectTypeCode 482322 |
| | | | | | | | | DeterminationMethodCode 482324 | | | | | | 0..1 482326 | PartyDeterminationMethodCode 482328 |
| | | | | | | | | AddressReference 482330 | | | | | | 0..1 482332 | PartyAddressReference 482334 |
| | | | Address 482336 | | | | | Address 482338 | | | | | | 0..1 482340 | Address 482342 |

FIG. 48-88

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormOfAddress 482344 | | | | | 0..1 482346 | FormOfAddress 482348 |
| | | | | | OrganisationFormattedName 482350 | | | | | 0..N 482352 | LANGUAGEINDEPENDENT_MEDIUM_Name 482354 |
| | | | | | PersonName 482356 | | | | | 0..1 482358 | PersonName 482360 |
| | | | | | FunctionalTitleName 482362 | | | | | 0..1 482364 | LANGUAGEINDEPENDENT_MEDIUM_Name 482366 |

FIG. 48-89

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DepartmentName 482368 | | | | | 0..1 482370 | LANGUAGEINDEPENDENT_MEDIUM_Name 482372 |
| | | | | | Office 482376 | | | | | 0..1 482378 | Office 482380 |
| | | | | | Physical Address 482384 | | | | | 0..1 482386 | Physical Address 482388 |
| | | | | | | Country Code 482390 | | | | 0..1 482392 | CountryCode 482394 |
| | | | | | | Country Name 482396 | | | | 0..1 482398 | MEDIUM_Name 482400 |

FIG. 48-90

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RegionCode 482402 | | | | 0..1 482404 | RegionCode 482406 |
| | | | | | | RegionName 482408 | | | | 0..1 482410 | LANGUAGEINDEPENDENT_MEDIUM_Name 482412 |
| | | | | | | StreetPostalCode 482414 | | | | 0..1 482416 | PostalCode 482418 |
| | | | | | | POBoxPostalCode 482420 | | | | 0..1 482422 | PostalCode 482424 |

FIG. 48-91

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CompanyPostalCode 482426 | | | | 0..1 482428 | PostalCode 482430 |
| | | | | | | CityName 482432 | | | | 0..1 482434 | LANGUAGEINDEPENDENT_MEDIUM_Name 482436 |
| | | | | | | AdditionalCityName 482438 | | | | 0..1 482440 | LANGUAGEINDEPENDENT_MEDIUM_Name 482442 |

FIG. 48-92

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DistrictName 482444 | | | | 0..1 482446 | LANGUAGEINDEPENDENT_MEDIUM_Name 482448 |
| | | | | | | POBoxID 482450 | | | | 0..1 482452 | POBoxID 482454 |
| | | | | | | POBoxIndicator 482456 | | | | 0..1 482458 | Indicator 482460 |
| | | | | | | POBoxCountryCode 482462 | | | | 0..1 482464 | CountryCode 482466 |

FIG. 48-93

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBoxCountryName 482468 | | | | 0..1 482470 | MEDIUM_Name 482472 |
| | | | | | | POBoxRegionCode 482474 | | | | 0..1 482476 | RegionCode 482478 |
| | | | | | | POBoxRegionName 482480 | | | | 0..1 482482 | LANGUAGEINDEPENDENT_MEDIUM_Name 482484 |
| | | | | | | POBoxCityName 482486 | | | | 0..1 482488 | LANGUAGEINDEPENDENT_MEDIUM_Name 482490 |

FIG. 48-94

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetName 482492 | | | | 0..1 482494 | StreetName 482496 |
| | | | | | | StreetPrefixName 482498 | | | | 0..N 482500 | LANGUAGEINDEPENDENT_MEDIUM_Name 482502 |
| | | | | | | StreetSuffixName 482504 | | | | 0..N 482506 | LANGUAGEINDEPENDENT_MEDIUM_Name 482508 |
| | | | | | | HouseID 482510 | | | | 0..1 482512 | HouseID 482514 |

FIG. 48-95

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalHouseID 482516 | | | | 0..1 482518 | HouseID 482520 |
| | | | | | | BuildingID 482522 | | | | 0..1 482524 | BuildingID 482526 |
| | | | | | | FloorID 482528 | | | | 0..1 482530 | FloorID 482532 |
| | | | | | | RoomID 482534 | | | | 0..1 482536 | RoomID 482538 |
| | | | | | | CareOf Name 482540 | | | | 0..1 482542 | LANGUAGEINDEPENDENT_MEDIUM_Name 482544 |

FIG. 48-96

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Description 482546 | | | | 0..N 482548 | Description 482550 |
| | | | | | TaxJurisdictionCode 482552 | | | | | 0..1 482554 | TaxJurisdictionCode 482556 |
| | | | | | TimeZoneDifferenceValue 482558 | | | | | 0..1 482560 | TimeZoneDifferenceValue 482562 |
| | | | | | GeoCoordinates 482564 | | | | | 0..1 482566 | GeoCoordinates 482568 |
| | | | | | Communication 482572 | | | | | 0..1 482574 | Communication 482576 |

FIG. 48-97

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 482578 | | | | 0..1 482580 | LanguageCode 482582 |
| | | | | | | CorrespondenceLanguageName 482584 | | | | 0..1 482586 | MEDIUM_Name 482588 |
| | | | | | | Telephone 482590 | | | | 0..N 482592 | Telephone 482594 |
| | | | | | | | Number 482596 | | | 1 482598 | PhoneNumber 482600 |

FIG. 48-98

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | SMSEnabledIndicator 482602 | | | 0..1 482604 | Indicator 482606 |
| | | | | | | | NumberDefaultIndicator 482608 | | | 1 482610 | Indicator 482612 |
| | | | | | | | NumberDescription 482614 | | | 0..N 482616 | Description 482618 |
| | | | | | | | NumberUsageDenialIndicator 482620 | | | 1 482622 | Indicator 482624 |

FIG. 48-99

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | MobilePhone 482626 | | | | 0..N 482628 | Telephone 482630 |
| | | | | | | | Number 482632 | | | 1 482634 | PhoneNumber 482636 |
| | | | | | | | SMSEnabledIndicator 482638 | | | 0..1 482640 | Indicator 482642 |
| | | | | | | | NumberDefaultIndicator 482644 | | | 1 482646 | Indicator 482648 |
| | | | | | | | NumberDescription 482650 | | | 0..N 482652 | Description 482654 |

FIG. 48-100

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 482656 | | | 1 482658 | Indicator 482660 |
| | | | | | | Facsimile 482662 | | | | 0..N 482664 | Facsimile 482666 |
| | | | | | | | Number 482668 | | | 1 482670 | PhoneNumber 482672 |
| | | | | | | | NumberDefaultIndicator 482674 | | | 1 482676 | Indicator 482678 |
| | | | | | | | NumberDescription 482680 | | | 0..N 482682 | Description 482684 |

FIG. 48-101

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 482686 | | | 1 482688 | Indicator 482690 |
| | | | | | | Email 482692 | | | | 0..N 482694 | Email 482696 |
| | | | | | | | URI 482698 | | | 1 482700 | EmailURI 482702 |
| | | | | | | | URIDefaultIndicator 482704 | | | 1 482706 | Indicator 482708 |
| | | | | | | | URIDescription 482710 | | | 0..N 482712 | Description 482714 |

FIG. 48-102

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | URIUsageDenialIndicator 482716 | | | 1 482718 | Indicator 482720 |
| | | | | | | Web 482722 | | | | 0..N 482724 | Web 482726 |
| | | | | | | | URI 482728 | | | 1 482730 | WebURI 482732 |
| | | | | | | | URIDefaultIndicator 482734 | | | 1 482736 | Indicator 482738 |
| | | | | | | | URIDescription 482740 | | | 0..N 482742 | Description 482744 |

FIG. 48-103

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| ContactPerson 482746 | | | | ContactPerson 482748 | | | | | | 0..N 482750 | ContactPerson 482752 |
| | | | | | InternalID 482754 | | | | | 0..1 482756 | ContactPersonInternalID 482758 |
| | | | | | BuyerID 482760 | | | | | 0..1 482762 | ContactPersonPartyID 482764 |
| | | | | | SellerID 482766 | | | | | 0..1 482768 | ContactPersonPartyID 482770 |
| | | | | | ProductRecipientID 482772 | | | | | 0..1 482774 | ContactPersonPartyID 482776 |

FIG. 48-104

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | VendorID 482778 | | | | | 0..1 482780 | ContactPersonPartyID 482782 |
| | | | | | BillToID 482784 | | | | | 0..1 482786 | ContactPersonPartyID 482788 |
| | | | | | BillFromID 482790 | | | | | 0..1 482792 | ContactPersonPartyID 482794 |
| | | | | | BidderID 482796 | | | | | 0..1 482798 | ContactPersonPartyID 482800 |
| | | | | | AddressReference 482802 | | | | | 0..1 482804 | PartyAddressReference 482806 |

FIG. 48-105

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | Address 482808 | | | | | | Address 482810 | | | | | 0..1 482812 | Address 482814 |
| | | | | | | | | | | | OrganisationFormOfAddress 482816 | | | | 0..1 482818 | FormOfAddress 482820 |
| | | | | | | | | | | | OrganisationFormattedName 482822 | | | | 0..N 482824 | LANGUAGEINDEPENDENT_MEDIUM_Name 482826 |
| | | | | | | | | | | | PersonName 482828 | | | | 0..1 482830 | PersonName 482832 |

FIG. 48-106

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FunctionalTitleName 482834 | | | | 0..1 482836 | LANGUAGEINDEPENDENT_MEDIUM_Name 482838 |
| | | | | | | DepartmentName 482840 | | | | 0..1 482842 | LANGUAGEINDEPENDENT_MEDIUM_Name 482844 |
| | | | | | | Office 482848 | | | | 0..1 482850 | Office 482852 |
| | | | | | | PhysicalAddress 482856 | | | | 0..1 482858 | PhysicalAddress 482860 |

FIG. 48-107

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CountryCode 482862 | | | 0..1 482864 | CountryCode 482866 |
| | | | | | | | CountryName 482868 | | | 0..1 482870 | MEDIUM_Name 482872 |
| | | | | | | | RegionCode 482874 | | | 0..1 482876 | RegionCode 482878 |
| | | | | | | | RegionName 482880 | | | 0..1 482882 | LANGUAGEINDEPENDENT_MEDIUM_Name 482884 |
| | | | | | | | StreetPostalCode 482886 | | | 0..1 482888 | PostalCode 482890 |

FIG. 48-108

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxPostalCode 482892 | | | 0..1 482894 | PostalCode 482896 |
| | | | | | | | CompanyPostalCode 482898 | | | 0..1 482900 | PostalCode 482902 |
| | | | | | | | CityName 482904 | | | 0..1 482906 | LANGUAGEINDEPENDENT_MEDIUM_Name 482908 |
| | | | | | | | AdditionalCityName 482910 | | | 0..1 482912 | LANGUAGEINDEPENDENT_MEDIUM_Name 482914 |

FIG. 48-109

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DistrictName 482916 | | | 0..1 482918 | LANGUAGEINDEPENDENT_MEDIUM_Name 482920 |
| | | | | | | | POBoxID 482922 | | | 0..1 482924 | POBoxID 482926 |
| | | | | | | | POBoxIndicator 482928 | | | 0..1 482930 | Indicator 482932 |
| | | | | | | | POBoxCountryCode 482934 | | | 0..1 482936 | CountryCode 482938 |

FIG. 48-110

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxCountryName 482940 | | | 0..1 482942 | MEDIUM_Name 482944 |
| | | | | | | | POBoxRegionCode 482946 | | | 0..1 482948 | RegionCode 482950 |
| | | | | | | | POBoxRegionName 482952 | | | 0..1 482954 | LANGUAGEINDEPENDENT_MEDIUM_Name 482956 |
| | | | | | | | POBoxCityName 482958 | | | 0..1 482960 | LANGUAGEINDEPENDENT_MEDIUM_Name 482962 |

FIG. 48-111

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 482964 | | | 0..1 482966 | StreetName 482968 |
| | | | | | | | StreetPrefixName 482970 | | | 0..N 482972 | LANGUAGEINDEPENDENT_MEDIUM_Name 482974 |
| | | | | | | | StreetSuffixName 482976 | | | 0..N 482978 | LANGUAGEINDEPENDENT_MEDIUM_Name 482980 |
| | | | | | | | HouseID 482982 | | | 0..1 482984 | HouseID 482986 |

FIG. 48-112

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 482988 | | | 0..1 482990 | HouseID 482992 |
| | | | | | | | BuildingID 482994 | | | 0..1 482996 | BuildingID 482998 |
| | | | | | | | FloorID 483000 | | | 0..1 483002 | FloorID 483004 |
| | | | | | | | RoomID 483006 | | | 0..1 483008 | RoomID 483010 |
| | | | | | | | CareOfName 483012 | | | 0..1 483014 | LANGUAGEINDEPENDENT_MEDIUM_Name 483016 |

FIG. 48-113

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Description 483018 | | | 0..N 483020 | Description 483022 |
| | | | | | | TaxJurisdictionCode 483024 | | | | 0..1 483026 | TaxJurisdictionCode 483028 |
| | | | | | | TimeZoneDifferenceValue 483030 | | | | 0..1 483032 | TimeZoneDifferenceValue 483034 |
| | | | | | | GeoCoordinates 483036 | | | | 0..1 483038 | GeoCoordinates 483040 |
| | | | | | | Communication 483044 | | | | 0..1 483046 | Communication 483048 |

FIG. 48-114

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 483050 | | | 0..1 483052 | LanguageCode 483054 |
| | | | | | | | CorrespondenceLanguageName 483056 | | | 0..1 483058 | MEDIUM_Name 483060 |
| | | | | | | | Telephone 483062 | | | 0..N 483064 | Telephone 483066 |
| | | | | | | | | Number 483068 | | 1 483070 | PhoneNumber 483072 |

FIG. 48-115

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | SMSEnabledIndicator 483074 | | 0..1 483076 | Indicator 483078 |
| | | | | | | | | NumberDefaultIndicator 483080 | | 1 483082 | Indicator 483084 |
| | | | | | | | | NumberDescription 483086 | | 0..N 483088 | Description 483090 |
| | | | | | | | | NumberUsageDenialIndicator 483092 | | 1 483094 | Indicator 483096 |

FIG. 48-116

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | MobilePhone 483098 | | | 0..N 483100 | Telephone 483102 |
| | | | | | | | | Number 483104 | | 1 483106 | PhoneNumber 483108 |
| | | | | | | | | SMSEnabledIndicator 483110 | | 0..1 483112 | Indicator 483114 |
| | | | | | | | | NumberDefaultIndicator 483116 | | 1 483118 | Indicator 483120 |
| | | | | | | | | NumberDescription 483122 | | 0..N 483124 | Description 483126 |

FIG. 48-117

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 483128 | | 1 483130 | Indicator 483132 |
| | | | | | | | Facsimile 483134 | | | 0..N 483136 | Facsimile 483138 |
| | | | | | | | | Number 483140 | | 1 483142 | PhoneNumber 483144 |
| | | | | | | | | NumberDefaultIndicator 483146 | | 1 483148 | Indicator 483150 |
| | | | | | | | | NumberDescription 483152 | | 0..N 483154 | Description 483156 |

FIG. 48-118

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 483158 | | 1 483160 | Indicator 483162 |
| | | | | | | | Email 483164 | | | 0..N 483166 | Email 483168 |
| | | | | | | | | URI 483170 | | 1 483172 | EmailURI 483174 |
| | | | | | | | | URIDefaultIndicator 483176 | | 1 483178 | Indicator 483180 |
| | | | | | | | | URIDescription 483182 | | 0..N 483184 | Description 483186 |

FIG. 48-119

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIUsageDenialIndicator 483188 | | 1 483190 | Indicator 483192 |
| | | | | | | | Web 483194 | | | 0..N 483196 | Web 483198 |
| | | | | | | | | URI 483200 | | 1 483202 | WebURI 483204 |
| | | | | | | | | URIDefaultIndicator 483206 | | 1 483208 | Indicator 483210 |
| | | | | | | | | URIDescription 483212 | | 0..N 483214 | Description 483216 |

FIG. 48-120

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | FreightForwarderParty 483220 | | | | | | | 0..1 483222 | BusinessTransactionDocumentParty 483224 |
| | | | | InternalID 483226 | | | | | | 0..1 483228 | PartyInternalID 483230 |
| | | | | StandardID 483232 | | | | | | 0..N 483234 | PartyStandardID 483236 |
| | | | | BuyerID 483238 | | | | | | 0..1 483240 | PartyPartyID 483242 |
| | | | | SellerID 483244 | | | | | | 1 483246 | PartyPartyID 483248 |

FIG. 48-121

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ProductRecipientID 483250 | | | | | | 0..1 483252 | PartyPartyID 483254 |
| | | | | VendorID 483256 | | | | | | 0..1 483258 | PartyPartyID 483260 |
| | | | | BillToID 483262 | | | | | | 0..1 483264 | PartyPartyID 483266 |
| | | | | BillFromID 483268 | | | | | | 0..1 483270 | PartyPartyID 483272 |
| | | | | BidderID 483274 | | | | | | 0..1 483276 | PartyPartyID 483278 |

FIG. 48-122

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | PaymentTransactionInitiatorID 483280 | | | | | | 0..1 483282 | PartyPartyID 483284 |
| | | | | PaymentTransactionDestinatedID 483286 | | | | | | 0..1 483288 | PartyPartyID 483290 |
| | | | | TaxID 483292 | | | | | | 0..1 483294 | PartyTaxID 483296 |
| | | | | ClearingHouseID 483298 | | | | | | 0..1 483300 | PartyPartyID 483302 |

FIG. 48-123

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | | | | | | TypeCode 483304 | | | | | | 0..1 483306 | BusinessObjectTypeCode 483308 |
| | | | | | | | | DeterminationMethodCode 483310 | | | | | | 0..1 483312 | PartyDeterminationMethodCode 483314 |
| | | | | | | | | AddressReference 483316 | | | | | | 0..1 483318 | PartyAddressReference 483320 |
| | | | Address 483322 | | | | | Address 483324 | | | | | | 0..1 483326 | Address 483328 |

FIG. 48-124

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OrganisationFormOfAddress 483330 | | | | | 0..1 483332 | FormOfAddress 483334 |
| | | | | | OrganisationFormattedName 483336 | | | | | 0..N 483338 | LANGUAGEINDEPENDENT_MEDIUM_Name 483340 |
| | | | | | PersonName 483342 | | | | | 0..1 483344 | PersonName 483346 |
| | | | | | FunctionalTitleName 483348 | | | | | 0..1 483350 | LANGUAGEINDEPENDENT_MEDIUM_Name 483352 |

FIG. 48-125

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DepartmentName 483354 | | | | | 0..1 483356 | LANGUAGEINDEPENDENT_MEDIUM_Name 483358 |
| | | | | | Office 483362 | | | | | 0..1 483364 | Office 483366 |
| | | | | | Physical Address 483370 | | | | | 0..1 483372 | Physical Address 483374 |
| | | | | | | Country Code 483376 | | | | 0..1 483378 | CountryCode 483380 |
| | | | | | | Country Name 483382 | | | | 0..1 483384 | MEDIUM_Name 483386 |

FIG. 48-126

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RegionCode 483388 | | | | 0..1 483390 | RegionCode 483392 |
| | | | | | | RegionName 483394 | | | | 0..1 483396 | LANGUAGEINDEPENDENT_MEDIUM_Name 483398 |
| | | | | | | StreetPostalCode 483400 | | | | 0..1 483402 | PostalCode 483404 |
| | | | | | | POBoxPostalCode 483406 | | | | 0..1 483408 | PostalCode 483410 |

FIG. 48-127

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CompanyPostalCode 483412 | | | | 0..1 483414 | PostalCode 483416 |
| | | | | | | CityName 483418 | | | | 0..1 483420 | LANGUAGEINDEPENDENT_MEDIUM_Name 483422 |
| | | | | | | AdditionalCityName 483424 | | | | 0..1 483426 | LANGUAGEINDEPENDENT_MEDIUM_Name 483428 |

FIG. 48-128

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DistrictName 483430 | | | | 0..1 483432 | LANGUAGEINDEPENDENT_MEDIUM_Name 483434 |
| | | | | | | POBoxID 483436 | | | | 0..1 483438 | POBoxID 483440 |
| | | | | | | POBoxIndicator 483442 | | | | 0..1 483444 | Indicator 483446 |
| | | | | | | POBoxCountryCode 483448 | | | | 0..1 483450 | CountryCode 483452 |

FIG. 48-129

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | POBoxCountryName 483454 | | | | 0..1 483456 | MEDIUM_Name 483458 |
| | | | | | | POBoxRegionCode 483460 | | | | 0..1 483462 | RegionCode 483464 |
| | | | | | | POBoxRegionName 483466 | | | | 0..1 483468 | LANGUAGEINDEPENDENT_MEDIUM_Name 483470 |
| | | | | | | POBoxCityName 483472 | | | | 0..1 483474 | LANGUAGEINDEPENDENT_MEDIUM_Name 483476 |

FIG. 48-130

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | StreetName 483478 | | | | 0..1 483480 | StreetName 483482 |
| | | | | | | StreetPrefixName 483484 | | | | 0..N 483486 | LANGUAGEINDEPENDENT_MEDIUM_Name 483488 |
| | | | | | | StreetSuffixName 483490 | | | | 0..N 483492 | LANGUAGEINDEPENDENT_MEDIUM_Name 483494 |
| | | | | | | HouseID 483496 | | | | 0..1 483498 | HouseID 483500 |

FIG. 48-131

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AdditionalHouseID 483502 | | | | 0..1 483504 | HouseID 483506 |
| | | | | | | BuildingID 483508 | | | | 0..1 483510 | BuildingID 483512 |
| | | | | | | FloorID 483514 | | | | 0..1 483516 | FloorID 483518 |
| | | | | | | RoomID 483520 | | | | 0..1 483522 | RoomID 483524 |
| | | | | | | CareOfName 483526 | | | | 0..1 483528 | LANGUAGEINDEPENDENT_MEDIUM_Name 483530 |

FIG. 48-132

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Description 483532 | | | | 0..N 483534 | Description 483536 |
| | | | | | TaxJurisdictionCode 483538 | | | | | 0..1 483540 | TaxJurisdictionCode 483542 |
| | | | | | TimeZoneDifferenceValue 483544 | | | | | 0..1 483546 | TimeZoneDifferenceValue 483548 |
| | | | | | GeoCoordinates 483550 | | | | | 0..1 483552 | GeoCoordinates 483554 |
| | | | | | Communication 483558 | | | | | 0..1 483560 | Communication 483562 |

FIG. 48-133

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CorrespondenceLanguageCode 483564 | | | | 0..1 483566 | LanguageCode 483568 |
| | | | | | | CorrespondenceLanguageName 483570 | | | | 0..1 483572 | MEDIUM_Name 483574 |
| | | | | | | Telephone 483576 | | | | 0..N 483578 | Telephone 483580 |
| | | | | | | | Number 483582 | | | 1 483584 | PhoneNumber 483586 |

FIG. 48-134

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | SMSEnabledIndicator 483588 | | | 0..1 483590 | Indicator 483592 |
| | | | | | | | NumberDefaultIndicator 483594 | | | 1 483596 | Indicator 483598 |
| | | | | | | | NumberDescription 483600 | | | 0..N 483602 | Description 483604 |
| | | | | | | | NumberUsageDenialIndicator 483606 | | | 1 483608 | Indicator 483610 |

FIG. 48-135

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | MobilePhone 483612 | | | | 0..N 483614 | Telephone 483616 |
| | | | | | | | Number 483618 | | | 1 483620 | PhoneNumber 483622 |
| | | | | | | | SMSEnabledIndicator 483624 | | | 0..1 483626 | Indicator 483628 |
| | | | | | | | NumberDefaultIndicator 483630 | | | 1 483632 | Indicator 483634 |
| | | | | | | | NumberDescription 483636 | | | 0..N 483638 | Description 483640 |

FIG. 48-136

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 483642 | | | 1 483644 | Indicator 483646 |
| | | | | | | Facsimile 483648 | | | | 0..N 483650 | Facsimile 483652 |
| | | | | | | | Number 483654 | | | 1 483656 | PhoneNumber 483658 |
| | | | | | | | NumberDefaultIndicator 483660 | | | 1 483662 | Indicator 483664 |
| | | | | | | | NumberDescription 483666 | | | 0..N 483668 | Description 483670 |

FIG. 48-137

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NumberUsageDenialIndicator 483672 | | | 1 483674 | Indicator 483676 |
| | | | | | | Email 483678 | | | | 0..N 483680 | Email 483682 |
| | | | | | | | URI 483684 | | | 1 483686 | EmailURI 483688 |
| | | | | | | | URIDefaultIndicator 483690 | | | 1 483692 | Indicator 483694 |
| | | | | | | | URIDescription 483696 | | | 0..N 483698 | Description 483700 |

FIG. 48-138

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | URIUsageDenialIndicator 483702 | | | 1 483704 | Indicator 483706 |
| | | | | | | Web 483708 | | | | 0..N 483710 | Web 483712 |
| | | | | | | | URI 483714 | | | 1 483716 | WebURI 483718 |
| | | | | | | | URIDefaultIndicator 483720 | | | 1 483722 | Indicator 483724 |
| | | | | | | | URIDescription 483726 | | | 0..N 483728 | Description 483730 |

FIG. 48-139

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | ContactPerson 483732 | | | | | ContactPerson 483734 | | | | | | 0..N 483736 | ContactPerson 483738 |
| | | | | | | | | | InternalID 483740 | | | | | 0..1 483742 | ContactPersonInternalID 483744 |
| | | | | | | | | | BuyerID 483746 | | | | | 0..1 483748 | ContactPersonPartyID 483750 |
| | | | | | | | | | SellerID 483752 | | | | | 0..1 483754 | ContactPersonPartyID 483756 |
| | | | | | | | | | ProductRecipientID 483758 | | | | | 0..1 483760 | ContactPersonPartyID 483762 |

FIG. 48-140

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | VendorID 483764 | | | | | 0..1 483766 | ContactPersonPartyID 483768 |
| | | | | | BillToID 483770 | | | | | 0..1 483772 | ContactPersonPartyID 483774 |
| | | | | | BillFromID 483776 | | | | | 0..1 483778 | ContactPersonPartyID 483780 |
| | | | | | BidderID 483782 | | | | | 0..1 483784 | ContactPersonPartyID 483786 |
| | | | | | AddressReference 483788 | | | | | 0..1 483790 | PartyAddressReference 483792 |

FIG. 48-141

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | Address 483794 | | | | | | Address 483796 | | | | | 0..1 483798 | Address 483800 |
| | | | | | | | | | | | OrganisationFormOfAddress 483802 | | | | 0..1 483804 | FormOfAddress 483806 |
| | | | | | | | | | | | OrganisationFormattedName 483808 | | | | 0..N 483810 | LANGUAGEINDEPENDENT_MEDIUM_Name 483812 |
| | | | | | | | | | | | PersonName 483814 | | | | 0..1 483816 | PersonName 483818 |

FIG. 48-142

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FunctionalTitleName 483820 | | | | 0..1 483822 | LANGUAGEINDEPENDENT_MEDIUM_Name 483824 |
| | | | | | | DepartmentName 483826 | | | | 0..1 483828 | LANGUAGEINDEPENDENT_MEDIUM_Name 483830 |
| | | | | | | Office 483834 | | | | 0..1 483836 | Office 483838 |
| | | | | | | PhysicalAddress 483842 | | | | 0..1 483844 | PhysicalAddress 483846 |

FIG. 48-143

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | | CountryCode 483848 | | | 0..1 483850 | CountryCode 483852 |
| | | | | | | | | | | | | CountryName 483854 | | | 0..1 483856 | MEDIUM_Name 483858 |
| | | | | | | | | | | | | RegionCode 483860 | | | 0..1 483862 | RegionCode 483864 |
| | | | | | | | | | | | | RegionName 483866 | | | 0..1 483868 | LANGUAGEINDEPENDENT_MEDIUM_Name 483870 |
| | | | | | | | | | | | | StreetPostalCode 483872 | | | 0..1 483874 | PostalCode 483876 |

FIG. 48-144

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxPostalCode 483878 | | | 0..1 483880 | PostalCode 483882 |
| | | | | | | | CompanyPostalCode 483884 | | | 0..1 483886 | PostalCode 483888 |
| | | | | | | | CityName 483890 | | | 0..1 483892 | LANGUAGEINDEPENDENT_MEDIUM_Name 483894 |
| | | | | | | | AdditionalCityName 483896 | | | 0..1 483898 | LANGUAGEINDEPENDENT_MEDIUM_Name 483900 |

FIG. 48-145

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DistrictName 483902 | | | 0..1 483904 | LANGUAGEINDEPENDENT_MEDIUM_Name 483906 |
| | | | | | | | POBoxID 483908 | | | 0..1 483910 | POBoxID 483912 |
| | | | | | | | POBoxIndicator 483914 | | | 0..1 483916 | Indicator 483918 |
| | | | | | | | POBoxCountryCode 483920 | | | 0..1 483922 | CountryCode 483924 |

FIG. 48-146

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxCountryName 483926 | | | 0..1 483928 | MEDIUM_Name 483930 |
| | | | | | | | POBoxRegionCode 483932 | | | 0..1 483934 | RegionCode 483936 |
| | | | | | | | POBoxRegionName 483938 | | | 0..1 483940 | LANGUAGEINDEPENDENT_MEDIUM_Name 483942 |
| | | | | | | | POBoxCityName 483944 | | | 0..1 483946 | LANGUAGEINDEPENDENT_MEDIUM_Name 483948 |

FIG. 48-147

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 483950 | | | 0..1 483952 | StreetName 483954 |
| | | | | | | | StreetPrefixName 483956 | | | 0..N 483958 | LANGUAGEINDEPENDENT_MEDIUM_Name 483960 |
| | | | | | | | StreetSuffixName 483962 | | | 0..N 483964 | LANGUAGEINDEPENDENT_MEDIUM_Name 483966 |
| | | | | | | | HouseID 483968 | | | 0..1 483970 | HouseID 483972 |

FIG. 48-148

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 483974 | | | 0..1 483976 | HouseID 483978 |
| | | | | | | | BuildingID 483980 | | | 0..1 483982 | BuildingID 483984 |
| | | | | | | | FloorID 483986 | | | 0..1 483988 | FloorID 483990 |
| | | | | | | | RoomID 483992 | | | 0..1 483994 | RoomID 483996 |
| | | | | | | | CareOfName 483998 | | | 0..1 484000 | LANGUAGEINDEPENDENT_MEDIUM_Name 484002 |

FIG. 48-149

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Description 484004 | | | 0..N 484006 | Description 484008 |
| | | | | | | TaxJurisdictionCode 484010 | | | | 0..1 484012 | TaxJurisdictionCode 484014 |
| | | | | | | TimeZoneDifferenceValue 484016 | | | | 0..1 484018 | TimeZoneDifferenceValue 484020 |
| | | | | | | GeoCoordinates 484022 | | | | 0..1 484024 | GeoCoordinates 484026 |
| | | | | | | Communication 484030 | | | | 0..1 484032 | Communication 484034 |

FIG. 48-150

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 484036 | | | 0..1 484038 | LanguageCode 484040 |
| | | | | | | | CorrespondenceLanguageName 484042 | | | 0..1 484044 | MEDIUM_Name 484046 |
| | | | | | | | Telephone 484048 | | | 0..N 484050 | Telephone 484052 |
| | | | | | | | | Number 484054 | | 1 484056 | PhoneNumber 484058 |

FIG. 48-151

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | SMSEnabledIndicator 484060 | | 0..1 484062 | Indicator 484064 |
| | | | | | | | | NumberDefaultIndicator 484066 | | 1 484068 | Indicator 484070 |
| | | | | | | | | NumberDescription 484072 | | 0..N 484074 | Description 484076 |
| | | | | | | | | NumberUsageDenialIndicator 484078 | | 1 484080 | Indicator 484082 |

FIG. 48-152

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | MobilePhone 484084 | | | 0..N 484086 | Telephone 484088 |
| | | | | | | | | Number 484090 | | 1 484092 | PhoneNumber 484094 |
| | | | | | | | | SMSEnabledIndicator 484096 | | 0..1 484098 | Indicator 484100 |
| | | | | | | | | NumberDefaultIndicator 484102 | | 1 484104 | Indicator 484106 |
| | | | | | | | | NumberDescription 484108 | | 0..N 484110 | Description 484112 |

FIG. 48-153

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 484114 | | 1 484116 | Indicator 484118 |
| | | | | | | | Facsimile 484120 | | | 0..N 484122 | Facsimile 484124 |
| | | | | | | | | Number 484126 | | 1 484128 | PhoneNumber 484130 |
| | | | | | | | | NumberDefaultIndicator 484132 | | 1 484134 | Indicator 484136 |
| | | | | | | | | NumberDescription 484138 | | 0..N 484140 | Description 484142 |

FIG. 48-154

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 484144 | | 1 484146 | Indicator 484148 |
| | | | | | | | Email 484150 | | | 0..N 484152 | Email 484154 |
| | | | | | | | | URI 484156 | | 1 484158 | EmailURI 484160 |
| | | | | | | | | URIDefaultIndicator 484162 | | 1 484164 | Indicator 484166 |
| | | | | | | | | URIDescription 484168 | | 0..N 484170 | Description 484172 |

FIG. 48-155

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIUsageDenialIndicator 484174 | | 1 484176 | Indicator 484178 |
| | | | | | | | Web 484180 | | | 0..N 484182 | Web 484184 |
| | | | | | | | | URI 484186 | | 1 484188 | WebURI 484190 |
| | | | | | | | | URIDefaultIndicator 484192 | | 1 484194 | Indicator 484196 |
| | | | | | | | | URIDescription 484198 | | 0..N 484200 | Description 484202 |

FIG. 48-156

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | AttachmentFolder 484204 | | | | | | AttachmentFolder 484206 | | | | | | | 0..1 484208 | AttachmentFolder 484210 |
| | | | | | | | | | @actionCode 484212 | | | | | | 0..1 484214 | |
| | | | Document 484216 | | | | | | Document 484218 | | | | | | 0..N 484220 | Document 484222 |
| | | | | | | | | | | @actionCode 484224 | | | | | 0..1 484226 | ActionCode 484228 |
| | | | | | | | | | | PathName 484230 | | | | | 1 484232 | LANGUAGEINDEPENDENT_Name 484234 |

FIG. 48-157

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Name 484236 | | | | | 1 484238 | LANGUAGEINDEPENDENT_Name 484240 |
| | | | | | VersionID 484242 | | | | | 0..1 484244 | VersionID 484246 |
| | | | | | SystemAdministrativeData 484248 | | | | | 1 484250 | SystemAdministrativeData 484252 |
| | | | | | LinkInternalIndicator 484254 | | | | | 0..1 484256 | Indicator 484258 |

FIG. 48-158

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | VisibleIndicator 484260 | | | | | 1 484262 | Indicator 484264 |
| | | | | | VersioningEnabledIndicator 484266 | | | | | 1 484268 | Indicator 484270 |
| | | | | | CategoryCode 484272 | | | | | 1 484274 | DocumentCategoryCode 484276 |
| | | | | | TypeCode 484278 | | | | | 0..1 484280 | DocumentTypeCode 484282 |
| | | | | | MIMECode 484284 | | | | | 0..1 484286 | MIMECode 488288 |

FIG. 48-159

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | AlternativeName 484290 | | | | | 0..1 484292 | LANGUAGEINDEPENDENT_Name 484294 |
| | | | | | InternalLinkPathName 484296 | | | | | 0..1 484298 | LANGUAGEINDEPENDENT_Name 484300 |
| | | | | | Description 484302 | | | | | 0..1 484304 | Description 484306 |
| | | | | | ExternalLinkWebURI 484308 | | | | | 0..1 484310 | WebURI 484312 |

FIG. 48-160

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | FileContentURI 484314 | | | | | 0..1 484316 | URI 484318 |
| | | | | | FileSizeMeasure 484320 | | | | | 0..1 484322 | Measure 484324 |
| | | | | | FileContentBinaryObject 484326 | | | | | 0..1 484328 | BinaryObject 484330 |
| | | | | | Attachment 484332 | | | | | 0..1 484334 | Attachment 484336 |
| | | | | | Property 484340 | | | | | 0..N 484342 | DocumentProperty 484344 |

FIG. 48-161

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | @actionCode 484346 | | | | 0..1 484348 | ActionCode 484350 |
| | | | | | | Name 484352 | | | | 1 484354 | LANGUAGEINDEPENDENT_Name 484356 |
| | | | | | | DataTypeFormatCode 484358 | | | | 1 484360 | PropertyDataTypeFormatCode 484362 |
| | | | | | | VisibleIndicator 484364 | | | | 1 484366 | Indicator 484368 |

FIG. 48-162

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | ChangeAllowedIndicator 484370 | | | | 1 484372 | Indicator 484374 |
| | | | | | | | | | | | MultipleValueIndicator 484376 | | | | 1 484378 | Indicator 484380 |
| | | | | | | | | | | | NamespaceURI 484382 | | | | 0..1 484384 | NamespaceURI 484386 |
| | | | | | | | | | | | Description 484388 | | | | 0..1 484390 | Description 484392 |

FIG. 48-163

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Value 484396 | | | | 0..N 484398 | DocumentPropertyValue 484400 |
| | | | | | | | Text 484402 | | | 0..1 484404 | LANGUAGEINDEPENDENT_Text 484406 |
| | | | | | | | Indicator 484408 | | | 0..1 484410 | Indicator 484412 |
| | | | | | | | DateTime 484414 | | | 0..1 484416 | DateTime 484418 |
| | | | | | | | IntegerValue 484420 | | | 0..1 484422 | IntegerValue 484424 |

FIG. 48-164

| Package | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|
| TextCollection 484426 | | | | TextCollection 484428 | | | | | | | 0..1 484430 | TextCollection 484432 |
| | | | | | @actionCode 484434 | | | | | | 0..1 484436 | ActionCode 484438 |
| | Text 484440 | | | | Text 484442 | | | | | | 0..N 484444 | TextCollectionText 484446 |
| | | | | | | @actionCode 484448 | | | | | 0..1 484450 | ActionCode 484452 |
| | | | | | | TypeCode 484454 | | | | | 0..1 484456 | TextCollectionTextTypeCode 484458 |

FIG. 48-165

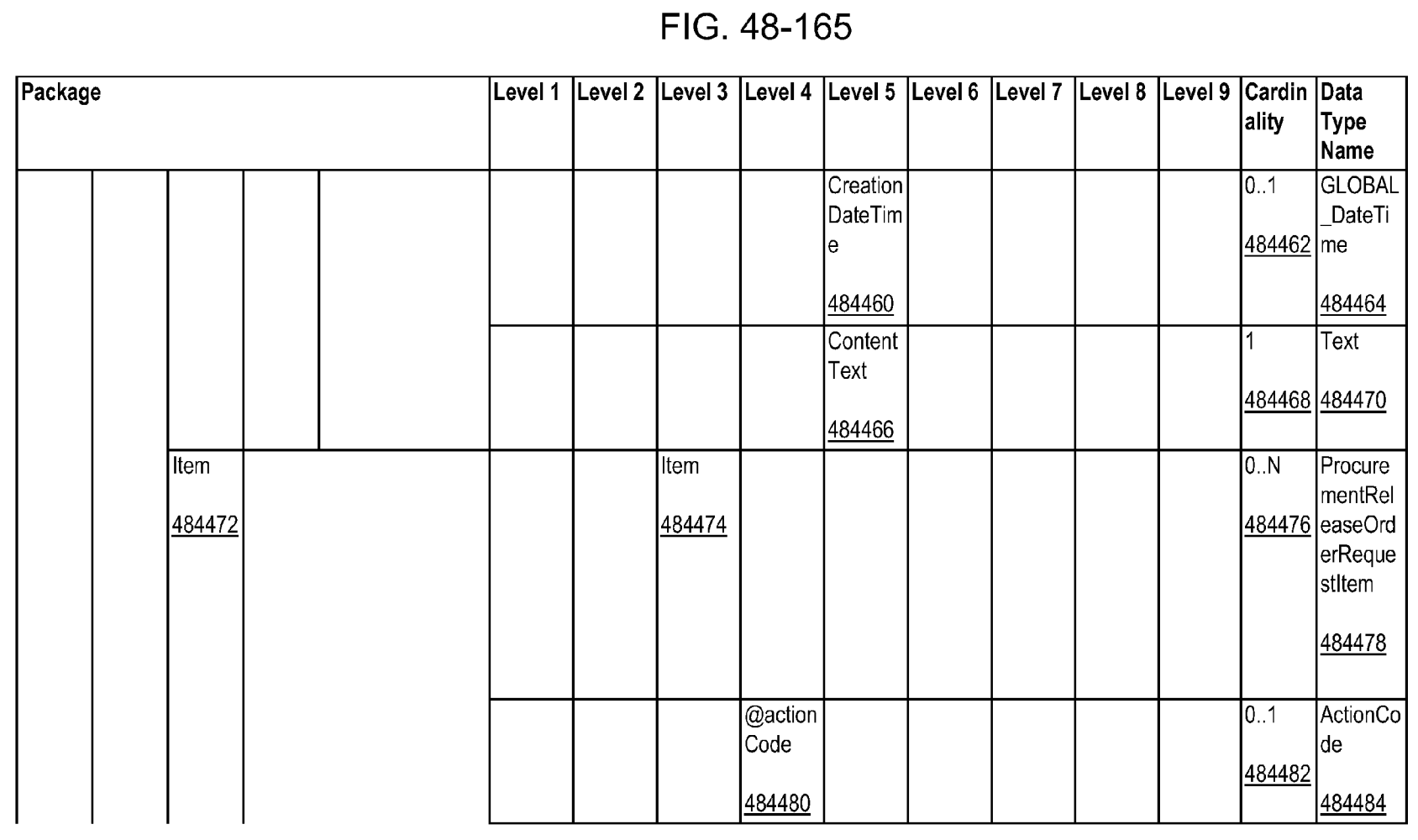

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | CreationDateTime 484460 | | | | | 0..1 484462 | GLOBAL_DateTime 484464 |
| | | | | | ContentText 484466 | | | | | 1 484468 | Text 484470 |
| Item 484472 | | | Item 484474 | | | | | | | 0..N 484476 | ProcurementReleaseOrderRequestItem 484478 |
| | | | | @actionCode 484480 | | | | | | 0..1 484482 | ActionCode 484484 |

FIG. 48-166

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ID 484486 | | | | | | 0..1 484488 | BusinessTransactionDocumentItemID 484490 |
| | | | | TypeCode 484492 | | | | | | 0..1 484494 | BusinessTransactionDocumentItemTypeCode 484496 |
| | | | | CancellationDocumentIndicator 484498 | | | | | | 0..1 484500 | Indicator 484502 |

FIG. 48-167

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | BusinessTransactionDocumentReference 484504 | | | | | PurchasingContractReference 484506 | | | | | | 1 484508 | BusinessTransactionDocumentReference 484510 |
| | | | | | | | | SalesOrderReference 484514 | | | | | | 1 484516 | BusinessTransactionDocumentReference 484518 |
| | | | | | | | | OriginPurchaseOrderReference 484522 | | | | | | 1 484524 | BusinessTransactionDocumentReference 484526 |

FIG. 48-168

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Party 484528 | | | | | ProductRecipientParty 484530 | | | | | | 0..1 484532 | BusinessTransactionDocumentParty 484534 |
| | | | | | | | | | InternalID 484536 | | | | | 0..1 484538 | PartyInternalID 484540 |
| | | | | | | | | | StandardID 484542 | | | | | 0..N 484544 | PartyStandardID 484546 |
| | | | | | | | | | BuyerID 484548 | | | | | 0..1 484550 | PartyPartyID 484552 |
| | | | | | | | | | SellerID 484554 | | | | | 1 484556 | PartyPartyID 484558 |

FIG. 48-169

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ProductRecipientID 484560 | | | | | 0..1 484562 | PartyPartyID 484564 |
| | | | | | VendorID 484566 | | | | | 0..1 484568 | PartyPartyID 484570 |
| | | | | | BillToID 484572 | | | | | 0..1 484574 | PartyPartyID 484576 |
| | | | | | BillFromID 484578 | | | | | 0..1 484580 | PartyPartyID 484582 |
| | | | | | BidderID 484584 | | | | | 0..1 484586 | PartyPartyID 484588 |

FIG. 48-170

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PaymentTransactionInitiatorID 484590 | | | | | 0..1 484592 | PartyPartyID 484594 |
| | | | | | PaymentTransactionDestinatedID 484596 | | | | | 0..1 484598 | PartyPartyID 484600 |
| | | | | | TaxID 484602 | | | | | 0..1 484604 | PartyTaxID 484606 |
| | | | | | ClearingHouseID 484608 | | | | | 0..1 484610 | PartyPartyID 484612 |

FIG. 48-171

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TypeCode 484614 | | | | | 0..1 484616 | BusinessObjectTypeCode 484618 |
| | | | | | DeterminationMethodCode 484620 | | | | | 0..1 484622 | PartyDeterminationMethodCode 484624 |
| | | | | | AddressReference 484626 | | | | | 0..1 484628 | PartyAddressReference 484630 |
| Address 484632 | | | | | Address 484634 | | | | | 0..1 484636 | Address 484638 |

FIG. 48-172

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormOfAddress 484640 | | | | 0..1 484642 | FormOfAddress 484644 |
| | | | | | | OrganisationFormattedName 484646 | | | | 0..N 484648 | LANGUAGEINDEPENDENT_MEDIUM_Name 484650 |
| | | | | | | PersonName 484652 | | | | 0..1 484654 | PersonName 484656 |
| | | | | | | FunctionalTitleName 484658 | | | | 0..1 484660 | LANGUAGEINDEPENDENT_MEDIUM_Name 484662 |

FIG. 48-173

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DepartmentName 484664 | | | | 0..1 484666 | LANGUAGEINDEPENDENT_MEDIUM_Name 484668 |
| | | | | | | Office 484672 | | | | 0..1 484674 | Office 484676 |
| | | | | | | Physical Address 484680 | | | | 0..1 484682 | Physical Address 484684 |
| | | | | | | | Country Code 484686 | | | 0..1 484688 | CountryCode 484690 |
| | | | | | | | Country Name 484692 | | | 0..1 484694 | MEDIUM_Name 484696 |

FIG. 48-174

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | RegionCode 484698 | | | 0..1 484700 | RegionCode 484702 |
| | | | | | | | RegionName 484704 | | | 0..1 484706 | LANGUAGEINDEPENDENT_MEDIUM_Name 484708 |
| | | | | | | | StreetPostalCode 484710 | | | 0..1 484712 | PostalCode 484714 |
| | | | | | | | POBoxPostalCode 484716 | | | 0..1 484718 | PostalCode 484720 |

FIG. 48-175

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CompanyPostalCode 484722 | | | 0..1 484724 | PostalCode 484726 |
| | | | | | | | CityName 484728 | | | 0..1 484730 | LANGUAGEINDEPENDENT_MEDIUM_Name 484732 |
| | | | | | | | AdditionalCityName 484734 | | | 0..1 484736 | LANGUAGEINDEPENDENT_MEDIUM_Name 484738 |

FIG. 48-176

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DistrictName 484740 | | | 0..1 484742 | LANGUAGEINDEPENDENT_MEDIUM_Name 484744 |
| | | | | | | | POBoxID 484746 | | | 0..1 484748 | POBoxID 484750 |
| | | | | | | | POBoxIndicator 484752 | | | 0..1 484754 | Indicator 484756 |
| | | | | | | | POBoxCountryCode 484758 | | | 0..1 484760 | CountryCode 484762 |

FIG. 48-177

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxCountryName 484764 | | | 0..1 484766 | MEDIUM_Name 484768 |
| | | | | | | | POBoxRegionCode 484770 | | | 0..1 484772 | RegionCode 484774 |
| | | | | | | | POBoxRegionName 484776 | | | 0..1 484778 | LANGUAGEINDEPENDENT_MEDIUM_Name 484780 |
| | | | | | | | POBoxCityName 484782 | | | 0..1 484784 | LANGUAGEINDEPENDENT_MEDIUM_Name 484786 |

FIG. 48-178

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 484788 | | | 0..1 484790 | StreetName 484792 |
| | | | | | | | StreetPrefixName 484794 | | | 0..N 484796 | LANGUAGEINDEPENDENT_MEDIUM_Name 484798 |
| | | | | | | | StreetSuffixName 484800 | | | 0..N 484802 | LANGUAGEINDEPENDENT_MEDIUM_Name 484804 |
| | | | | | | | HouseID 484806 | | | 0..1 484808 | HouseID 484810 |

FIG. 48-179

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 484812 | | | 0..1 484814 | HouseID 484816 |
| | | | | | | | BuildingID 484818 | | | 0..1 484820 | BuildingID 484822 |
| | | | | | | | FloorID 484824 | | | 0..1 484826 | FloorID 484828 |
| | | | | | | | RoomID 484830 | | | 0..1 484832 | RoomID 484834 |
| | | | | | | | CareOfName 484836 | | | 0..1 484838 | LANGUAGEINDEPENDENT_MEDIUM_Name 484840 |

FIG. 48-180

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Description 484842 | | | 0..N 484844 | Description 484846 |
| | | | | | | TaxJurisdictionCode 484848 | | | | 0..1 484850 | TaxJurisdictionCode 484852 |
| | | | | | | TimeZoneDifferenceValue 484854 | | | | 0..1 484856 | TimeZoneDifferenceValue 484858 |
| | | | | | | GeoCoordinates 484860 | | | | 0..1 484862 | GeoCoordinates 484864 |
| | | | | | | Communication 484868 | | | | 0..1 484870 | Communication 484872 |

FIG. 48-181

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 484874 | | | 0..1 484876 | LanguageCode 484878 |
| | | | | | | | CorrespondenceLanguageName 484880 | | | 0..1 484882 | MEDIUM_Name 484884 |
| | | | | | | | Telephone 484886 | | | 0..N 484888 | Telephone 484890 |
| | | | | | | | | Number 484892 | | 1 484894 | PhoneNumber 484896 |

FIG. 48-182

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | | | SMSEnabledIndicator 484898 | | 0..1 484900 | Indicator 484902 |
| | | | | | | | | | | | | | NumberDefaultIndicator 484904 | | 1 484906 | Indicator 484908 |
| | | | | | | | | | | | | | NumberDescription 484910 | | 0..N 484912 | Description 484914 |
| | | | | | | | | | | | | | NumberUsageDenialIndicator 484916 | | 1 484918 | Indicator 484920 |

FIG. 48-183

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | MobilePhone 484922 | | | 0..N 484924 | Telephone 484926 |
| | | | | | | | | Number 484928 | | 1 484930 | PhoneNumber 484932 |
| | | | | | | | | SMSEnabledIndicator 484934 | | 0..1 484936 | Indicator 484938 |
| | | | | | | | | NumberDefaultIndicator 484940 | | 1 484942 | Indicator 484944 |
| | | | | | | | | NumberDescription 484946 | | 0..N 484948 | Description 484950 |

FIG. 48-184

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 484952 | | 1 484954 | Indicator 484956 |
| | | | | | | | Facsimile 484958 | | | 0..N 484960 | Facsimile 484962 |
| | | | | | | | | Number 484964 | | 1 484966 | PhoneNumber 484968 |
| | | | | | | | | NumberDefaultIndicator 484970 | | 1 484972 | Indicator 484974 |
| | | | | | | | | NumberDescription 484976 | | 0..N 484978 | Description 484980 |

FIG. 48-185

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 484982 | | 1 484984 | Indicator 484986 |
| | | | | | | | Email 484988 | | | 0..N 484990 | Email 484992 |
| | | | | | | | | URI 484994 | | 1 484996 | EmailURI 484998 |
| | | | | | | | | URIDefaultIndicator 485000 | | 1 485002 | Indicator 485004 |
| | | | | | | | | URIDescription 485006 | | 0..N 485008 | Description 485010 |

FIG. 48-186

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIUsageDenialIndicator 485012 | | 1 485014 | Indicator 485016 |
| | | | | | | | Web 485018 | | | 0..N 485020 | Web 485022 |
| | | | | | | | | URI 485024 | | 1 485026 | WebURI 485028 |
| | | | | | | | | URIDefaultIndicator 485030 | | 1 485032 | Indicator 485034 |
| | | | | | | | | URIDescription 485036 | | 0..N 485038 | Description 485040 |

FIG. 48-187

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| Contact Person 485042 | | | | | Contact Person 485044 | | | | | 0..N 485046 | ContactPerson 485048 |
| | | | | | | InternalID 485050 | | | | 0..1 485052 | ContactPersonInternalID 485054 |
| | | | | | | BuyerID 485056 | | | | 0..1 485058 | ContactPersonPartyID 485060 |
| | | | | | | SellerID 485062 | | | | 0..1 485064 | ContactPersonPartyID 485066 |
| | | | | | | ProductRecipientID 485068 | | | | 0..1 485070 | ContactPersonPartyID 485072 |

FIG. 48-188

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | VendorID 485074 | | | | 0..1 485076 | ContactPersonPartyID 485078 |
| | | | | | | BillToID 485080 | | | | 0..1 485082 | ContactPersonPartyID 485084 |
| | | | | | | BillFromID 485086 | | | | 0..1 485088 | ContactPersonPartyID 485090 |
| | | | | | | BidderID 485092 | | | | 0..1 485094 | ContactPersonPartyID 485096 |
| | | | | | | AddressReference 485098 | | | | 0..1 485100 | PartyAddressReference 485102 |

FIG. 48-189

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| Address 485104 | | | | | | Address 485106 | | | | 0..1 485108 | Address 485110 |
| | | | | | | | OrganisationFormOfAddress 485112 | | | 0..1 485114 | FormOfAddress 485116 |
| | | | | | | | OrganisationFormattedName 485118 | | | 0..N 485120 | LANGUAGEINDEPENDENT_MEDIUM_Name 485122 |
| | | | | | | | PersonName 485124 | | | 0..1 485126 | PersonName 485128 |

FIG. 48-190

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | FunctionalTitleName 485130 | | | 0..1 485132 | LANGUAGEINDEPENDENT_MEDIUM_Name 485134 |
| | | | | | | | DepartmentName 485136 | | | 0..1 485138 | LANGUAGEINDEPENDENT_MEDIUM_Name 485140 |
| | | | | | | | Office 485144 | | | 0..1 485146 | Office 485148 |
| | | | | | | | PhysicalAddress 485152 | | | 0..1 485154 | PhysicalAddress 485156 |

FIG. 48-191

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Country Code 485158 | | 0..1 485160 | CountryCode 485162 |
| | | | | | | | | Country Name 485164 | | 0..1 485166 | MEDIUM_Name 485168 |
| | | | | | | | | RegionCode 485170 | | 0..1 485172 | RegionCode 485174 |
| | | | | | | | | RegionName 485176 | | 0..1 485178 | LANGUAGEINDEPENDENT_MEDIUM_Name 485180 |
| | | | | | | | | StreetPostalCode 485182 | | 0..1 485184 | PostalCode 485186 |

FIG. 48-192

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBoxPostalCode 485188 | | 0..1 485190 | PostalCode 485192 |
| | | | | | | | | CompanyPostalCode 485194 | | 0..1 485196 | PostalCode 485198 |
| | | | | | | | | CityName 485200 | | 0..1 485202 | LANGUAGEINDEPENDENT_MEDIUM_Name 485204 |
| | | | | | | | | AdditionalCityName 485206 | | 0..1 485208 | LANGUAGEINDEPENDENT_MEDIUM_Name 485210 |

FIG. 48-193

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | DistrictName 485212 | | 0..1 485214 | LANGUAGEINDEPENDENT_MEDIUM_Name 485216 |
| | | | | | | | | POBoxID 485218 | | 0..1 485220 | POBoxID 485222 |
| | | | | | | | | POBoxIndicator 485224 | | 0..1 485226 | Indicator 485228 |
| | | | | | | | | POBoxCountryCode 485230 | | 0..1 485232 | CountryCode 485234 |

FIG. 48-194

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | POBoxCountryName 485236 | | 0..1 485238 | MEDIUM_Name 485240 |
| | | | | | | | | POBoxRegionCode 485242 | | 0..1 485244 | RegionCode 485246 |
| | | | | | | | | POBoxRegionName 485248 | | 0..1 485250 | LANGUAGEINDEPENDENT_MEDIUM_Name 485252 |
| | | | | | | | | POBoxCityName 485254 | | 0..1 485256 | LANGUAGEINDEPENDENT_MEDIUM_Name 485258 |

FIG. 48-195

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | StreetName 485260 | | 0..1 485262 | StreetName 485264 |
| | | | | | | | | StreetPrefixName 485266 | | 0..N 485268 | LANGUAGEINDEPENDENT_MEDIUM_Name 485270 |
| | | | | | | | | StreetSuffixName 485272 | | 0..N 485274 | LANGUAGEINDEPENDENT_MEDIUM_Name 485276 |
| | | | | | | | | HouseID 485278 | | 0..1 485280 | HouseID 485282 |

FIG. 48-196

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | AdditionalHouseID 485284 | | 0..1 485286 | HouseID 485288 |
| | | | | | | | | BuildingID 485290 | | 0..1 485292 | BuildingID 485294 |
| | | | | | | | | FloorID 485296 | | 0..1 485298 | FloorID 485300 |
| | | | | | | | | RoomID 485302 | | 0..1 485304 | RoomID 485306 |
| | | | | | | | | CareOfName 485308 | | 0..1 485310 | LANGUAGEINDEPENDENT_MEDIUM_Name 485312 |

FIG. 48-197

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Description 485314 | | 0..N 485316 | Description 485318 |
| | | | | | | | TaxJurisdictionCode 485320 | | | 0..1 485322 | TaxJurisdictionCode 485324 |
| | | | | | | | TimeZoneDifferenceValue 485326 | | | 0..1 485328 | TimeZoneDifferenceValue 485330 |
| | | | | | | | GeoCoordinates 485332 | | | 0..1 485334 | GeoCoordinates 485336 |
| | | | | | | | Communication 485340 | | | 0..1 485342 | Communication 485344 |

FIG. 48-198

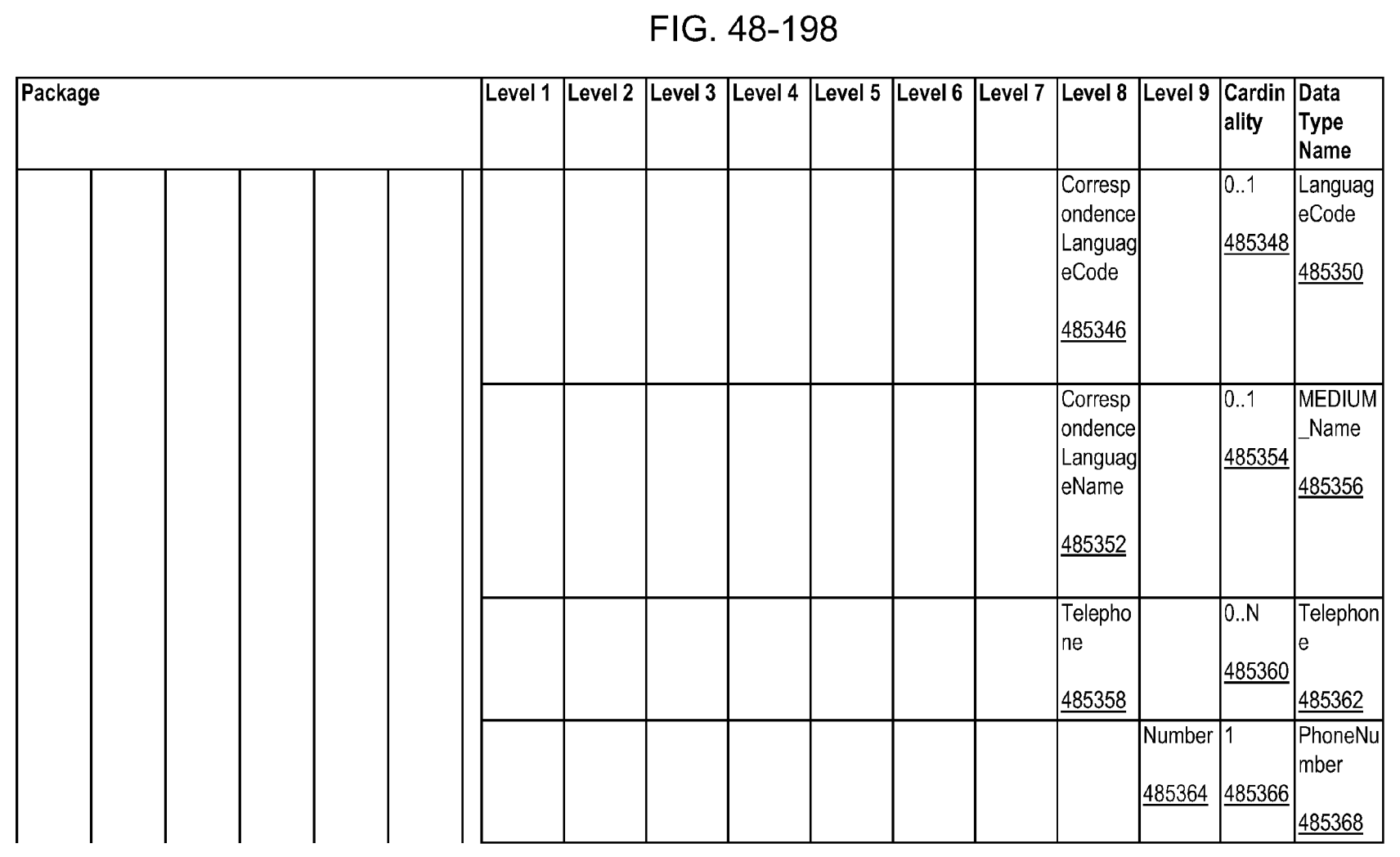

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | CorrespondenceLanguageCode 485346 | | 0..1 485348 | LanguageCode 485350 |
| | | | | | | | | CorrespondenceLanguageName 485352 | | 0..1 485354 | MEDIUM_Name 485356 |
| | | | | | | | | Telephone 485358 | | 0..N 485360 | Telephone 485362 |
| | | | | | | | | | Number 485364 | 1 485366 | PhoneNumber 485368 |

FIG. 48-199

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | SMSEnabledIndicator 485370 | 0..1 485372 | Indicator 485374 |
| | | | | | | | | | NumberDefaultIndicator 485376 | 1 485378 | Indicator 485380 |
| | | | | | | | | | NumberDescription 485382 | 0..N 485384 | Description 485386 |
| | | | | | | | | | NumberUsageDenialIndicator 485388 | 1 485390 | Indicator 485392 |

FIG. 48-200

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | MobilePhone 485394 | | 0..N 485396 | Telephone 485398 |
| | | | | | | | | | Number 485400 | 1 485402 | PhoneNumber 485404 |
| | | | | | | | | | SMSEnabledIndicator 485406 | 0..1 485408 | Indicator 485410 |
| | | | | | | | | | NumberDefaultIndicator 485412 | 1 485414 | Indicator 485416 |
| | | | | | | | | | NumberDescription 485418 | 0..N 485420 | Description 485422 |

FIG. 48-201

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | Number UsageDenialIndicator 485424 | 1 485426 | Indicator 485428 |
| | | | | | | | | Facsimile 485430 | | 0..N 485432 | Facsimile 485434 |
| | | | | | | | | | Number 485436 | 1 485438 | PhoneNumber 485440 |
| | | | | | | | | | Number DefaultIndicator 485442 | 1 485444 | Indicator 485446 |
| | | | | | | | | | Number Description 485448 | 0..N 485450 | Description 485452 |

FIG. 48-202

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | NumberUsageDenialIndicator 485454 | 1 485456 | Indicator 485458 |
| | | | | | | | | Email 485460 | | 0..N 485462 | Email 485464 |
| | | | | | | | | | URI 485466 | 1 485468 | EmailURI 485470 |
| | | | | | | | | | URIDefaultIndicator 485472 | 1 485474 | Indicator 485476 |
| | | | | | | | | | URIDescription 485478 | 0..N 485480 | Description 485482 |

FIG. 48-203

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | URIUsageDenialIndicator 485484 | 1 485486 | Indicator 485488 |
| | | | | | | | | Web 485490 | | 0..N 485492 | Web 485494 |
| | | | | | | | | | URI 485496 | 1 485498 | WebURI 485500 |
| | | | | | | | | | URIDefaultIndicator 485502 | 1 485504 | Indicator 485506 |
| | | | | | | | | | URIDescription 485508 | 0..N 485510 | Description 485512 |

FIG. 48-204

| Package | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|
| | | | Location 485514 | | | | | ShipToLocation 485516 | | | | | | 0..1 485518 | BusinessTransactionDocumentLocation 485520 |
| | | | | | | | | | InternalID 485522 | | | | | 0..1 485524 | LocationInternalID 485526 |
| | | | | | | | | | StandardID 485528 | | | | | 0..N 485530 | LocationStandardID 485532 |
| | | | | | | | | | BuyerID 485534 | | | | | 0..1 485536 | LocationPartyID 485538 |
| | | | | | | | | | SellerID 485540 | | | | | 0..1 485542 | LocationPartyID 485544 |

FIG. 48-205

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ProductRecipientID 485546 | | | | | 0..1 485548 | LocationPartyID 485550 |
| | | | | | VendorID 485552 | | | | | 0..1 485554 | LocationPartyID 485556 |
| | | | | | BillToID 485558 | | | | | 0..1 485560 | LocationPartyID 485562 |
| | | | | | BillFromID 485564 | | | | | 0..1 485566 | LocationPartyID 485568 |
| | | | | | BidderID 485570 | | | | | 0..1 485572 | LocationPartyID 485574 |

FIG. 48-206

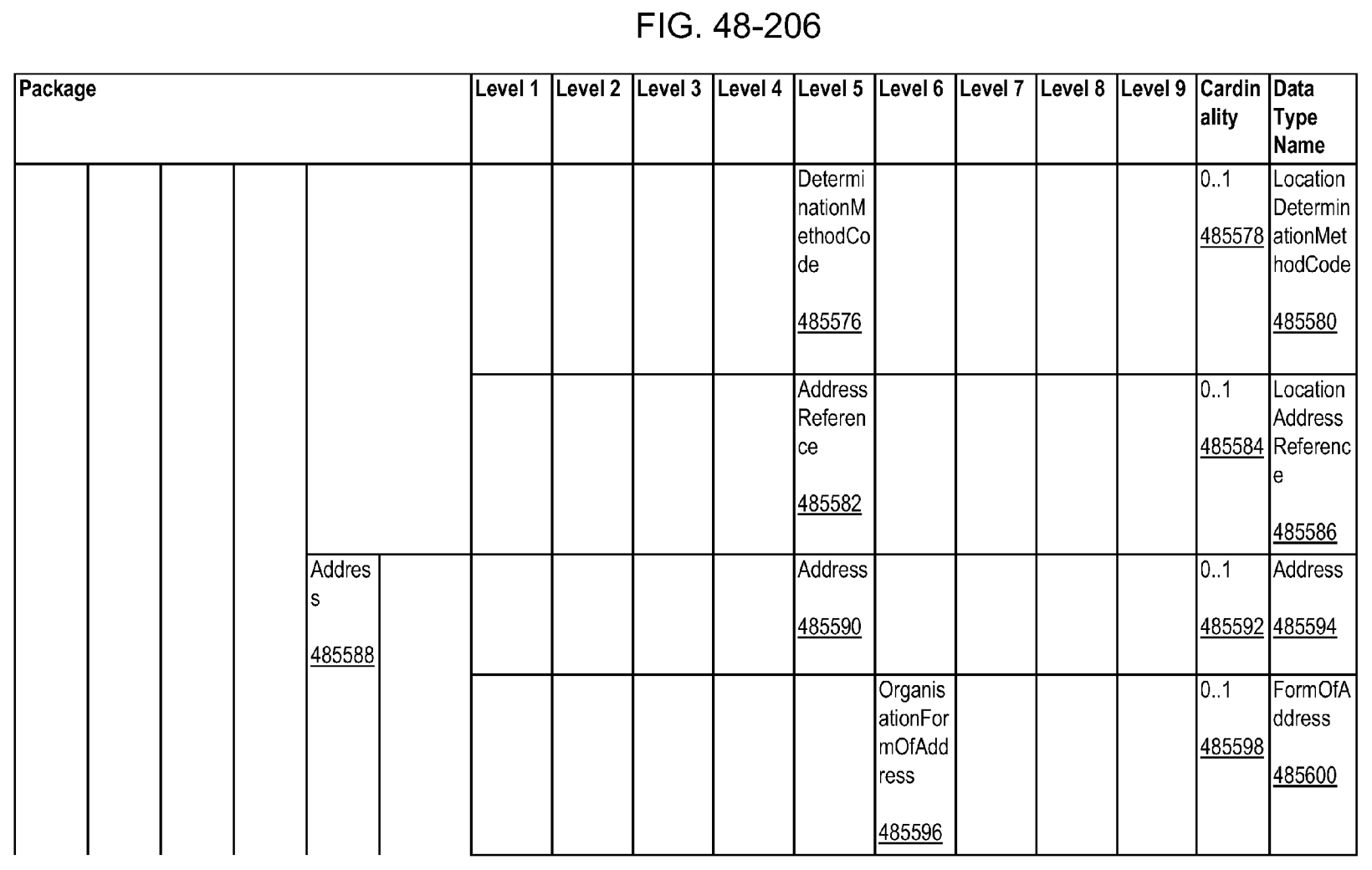

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | DeterminationMethodCode 485576 | | | | | 0..1 485578 | LocationDeterminationMethodCode 485580 |
| | | | | | | | | | | | AddressReference 485582 | | | | | 0..1 485584 | LocationAddressReference 485586 |
| | | | | | Address 485588 | | | | | | Address 485590 | | | | | 0..1 485592 | Address 485594 |
| | | | | | | | | | | | | OrganisationFormOfAddress 485596 | | | | 0..1 485598 | FormOfAddress 485600 |

FIG. 48-207

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OrganisationFormattedName 485602 | | | | 0..N 485604 | LANGUAGEINDEPENDENT_MEDIUM_Name 485606 |
| | | | | | | PersonName 485608 | | | | 0..1 485610 | PersonName 485612 |
| | | | | | | FunctionalTitleName 485614 | | | | 0..1 485616 | LANGUAGEINDEPENDENT_MEDIUM_Name 485618 |

FIG. 48-208

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DepartmentName 485620 | | | | 0..1 485622 | LANGUAGEINDEPENDENT_MEDIUM_Name 485624 |
| | | | | | | Office 485628 | | | | 0..1 485630 | Office 485632 |
| | | | | | | Physical Address 485636 | | | | 0..1 485638 | Physical Address 485640 |
| | | | | | | | Country Code 485642 | | | 0..1 485644 | CountryCode 485646 |
| | | | | | | | Country Name 485648 | | | 0..1 485650 | MEDIUM_Name 485652 |

FIG. 48-209

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | RegionCode 485654 | | | 0..1 485656 | RegionCode 485658 |
| | | | | | | | RegionName 485660 | | | 0..1 485662 | LANGUAGEINDEPENDENT_MEDIUM_Name 485664 |
| | | | | | | | StreetPostalCode 485666 | | | 0..1 485668 | PostalCode 485670 |
| | | | | | | | POBoxPostalCode 485672 | | | 0..1 485674 | PostalCode 485676 |

FIG. 48-210

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CompanyPostalCode 485678 | | | 0..1 485680 | PostalCode 485682 |
| | | | | | | | CityName 485684 | | | 0..1 485686 | LANGUAGEINDEPENDENT_MEDIUM_Name 485688 |
| | | | | | | | AdditionalCityName 485690 | | | 0..1 485692 | LANGUAGEINDEPENDENT_MEDIUM_Name 485694 |

FIG. 48-211

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DistrictName 485696 | | | 0..1 485698 | LANGUAGEINDEPENDENT_MEDIUM_Name 485700 |
| | | | | | | | POBoxID 485702 | | | 0..1 485704 | POBoxID 485706 |
| | | | | | | | POBoxIndicator 485708 | | | 0..1 485710 | Indicator 485712 |
| | | | | | | | POBoxCountryCode 485714 | | | 0..1 485716 | CountryCode 485718 |

FIG. 48-212

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | POBoxCountryName 485720 | | | 0..1 485722 | MEDIUM_Name 485724 |
| | | | | | | | POBoxRegionCode 485726 | | | 0..1 485728 | RegionCode 485730 |
| | | | | | | | POBoxRegionName 485732 | | | 0..1 485734 | LANGUAGEINDEPENDENT_MEDIUM_Name 485736 |
| | | | | | | | POBoxCityName 485738 | | | 0..1 485740 | LANGUAGEINDEPENDENT_MEDIUM_Name 485742 |

FIG. 48-213

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StreetName 485744 | | | 0..1 485746 | StreetName 485748 |
| | | | | | | | StreetPrefixName 485750 | | | 0..N 485752 | LANGUAGEINDEPENDENT_MEDIUM_Name 485754 |
| | | | | | | | StreetSuffixName 485756 | | | 0..N 485758 | LANGUAGEINDEPENDENT_MEDIUM_Name 485760 |
| | | | | | | | HouseID 485762 | | | 0..1 485764 | HouseID 485766 |

FIG. 48-214

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AdditionalHouseID 485768 | | | 0..1 485770 | HouseID 485772 |
| | | | | | | | BuildingID 485774 | | | 0..1 485776 | BuildingID 485778 |
| | | | | | | | FloorID 485780 | | | 0..1 485782 | FloorID 485784 |
| | | | | | | | RoomID 485786 | | | 0..1 485788 | RoomID 485790 |
| | | | | | | | CareOf Name 485792 | | | 0..1 485794 | LANGUAGEINDEPENDENT_MEDIUM_Name 485796 |

FIG. 48-215

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Description 485798 | | | 0..N 485800 | Description 485802 |
| | | | | | | TaxJurisdictionCode 485804 | | | | 0..1 485806 | TaxJurisdictionCode 485808 |
| | | | | | | TimeZoneDifferenceValue 485810 | | | | 0..1 485812 | TimeZoneDifferenceValue 485814 |
| | | | | | | GeoCoordinates 485816 | | | | 0..1 485818 | GeoCoordinates 485820 |
| | | | | | | Communication 485824 | | | | 0..1 485826 | Communication 485828 |

FIG. 48-216

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CorrespondenceLanguageCode 485830 | | | 0..1 485832 | LanguageCode 485834 |
| | | | | | | | CorrespondenceLanguageName 485836 | | | 0..1 485838 | MEDIUM_Name 485840 |
| | | | | | | | Telephone 485842 | | | 0..N 485844 | Telephone 485846 |
| | | | | | | | | Number 485848 | | 1 485850 | PhoneNumber 485852 |

FIG. 48-217

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | SMSEnabledIndicator 485854 | | 0..1 485856 | Indicator 485858 |
| | | | | | | | | NumberDefaultIndicator 485860 | | 1 485862 | Indicator 485864 |
| | | | | | | | | NumberDescription 485866 | | 0..N 485868 | Description 485870 |
| | | | | | | | | NumberUsageDenialIndicator 485872 | | 1 485874 | Indicator 485876 |

FIG. 48-218

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | MobilePhone 485878 | | | 0..N 485880 | Telephone 485882 |
| | | | | | | | | Number 485884 | | 1 485886 | PhoneNumber 485888 |
| | | | | | | | | SMSEnabledIndicator 485890 | | 0..1 485892 | Indicator 485894 |
| | | | | | | | | NumberDefaultIndicator 485896 | | 1 485898 | Indicator 485900 |
| | | | | | | | | NumberDescription 485902 | | 0..N 485904 | Description 485906 |

FIG. 48-219

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 485908 | | 1 485910 | Indicator 485912 |
| | | | | | | | Facsimile 485914 | | | 0..N 485916 | Facsimile 485918 |
| | | | | | | | | Number 485920 | | 1 485922 | PhoneNumber 485924 |
| | | | | | | | | NumberDefaultIndicator 485926 | | 1 485928 | Indicator 485930 |
| | | | | | | | | NumberDescription 485932 | | 0..N 485934 | Description 485936 |

FIG. 48-220

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | NumberUsageDenialIndicator 485938 | | 1 485940 | Indicator 485942 |
| | | | | | | | Email 485944 | | | 0..N 485946 | Email 485948 |
| | | | | | | | | URI 485950 | | 1 485952 | EmailURI 485954 |
| | | | | | | | | URIDefaultIndicator 485956 | | 1 485958 | Indicator 485960 |
| | | | | | | | | URIDescription 485962 | | 0..N 485964 | Description 485966 |

FIG. 48-221

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | URIUsageDenialIndicator 485968 | | 1 485970 | Indicator 485972 |
| | | | | | | | Web 485974 | | | 0..N 485976 | Web 485978 |
| | | | | | | | | URI 485980 | | 1 485982 | WebURI 485984 |
| | | | | | | | | URIDefaultIndicator 485986 | | 1 485988 | Indicator 485990 |
| | | | | | | | | URIDescription 485992 | | 0..N 485994 | Description 485996 |

FIG. 48-222

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | Note 485998 | | | | | 0..1 486000 | Note 486002 |
| | | | Product Information 486004 | | | | | | Product 486006 | | | | | | 1 486008 | BusinessTransactionDocumentProduct 486010 |
| | | | | | | | | | | InternalID 486012 | | | | | 0..1 486014 | ProductInternalID 486016 |
| | | | | | | | | | | StandardID 486018 | | | | | 0..N 486020 | ProductStandardID 486022 |
| | | | | | | | | | | BuyerID 486024 | | | | | 0..1 486026 | ProductPartyID 486028 |

FIG. 48-223

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | SellerID 486030 | | | | | 0..1 486032 | ProductPartyID 486034 |
| | | | | | ProductRecipientID 486036 | | | | | 0..1 486038 | ProductPartyID 486040 |
| | | | | | VendorID 486042 | | | | | 0..1 486044 | ProductPartyID 486046 |
| | | | | | ManufacturerID 486048 | | | | | 0..1 486050 | ProductPartyID 486052 |
| | | | | | BillToID 486054 | | | | | 0..1 486056 | ProductPartyID 486058 |
| | | | | | BillFromID 486060 | | | | | 0..1 486062 | ProductPartyID 486064 |

FIG. 48-224

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BidderID 486066 | | | | | 0..1 486068 | ProductPartyID 486070 |
| | | | | | TypeCode 486072 | | | | | 0..1 486074 | ProductTypeCode 486076 |
| | | | | | Note 486078 | | | | | 0..1 486080 | Note 486082 |
| | | | | | ChangeID 486084 | | | | | 0..1 486086 | ProductChangeID 486088 |
| | | | | | DiscontinuationIndicator 486090 | | | | | 0..1 486092 | Indicator 486094 |

FIG. 48-225

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | Package Quantity 486096 | | | | | 0..1 486098 | Quantity 486100 |
| | | | TextCollection 486102 | | | | | | TextCollection 486104 | | | | | | 0..1 486106 | TextCollection 486108 |
| | | | | | | | | | | @actionCode 486110 | | | | | 0..1 486112 | ActionCode 486114 |
| | | | | Text 486116 | | | | | | Text 486118 | | | | | 0..N 486120 | TextCollectionText 486122 |
| | | | | | | | | | | | @actionCode 486124 | | | | 0..1 486126 | ActionCode 486128 |

FIG. 48-226

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TypeCode 486130 | | | | 0..1 486132 | TextCollectionTextTypeCode 486134 |
| | | | | | | CreationDateTime 486136 | | | | 0..1 486138 | GLOBAL_DateTime 486140 |
| | | | | | | ContentText 486142 | | | | 1 486144 | Text 486146 |
| AttachmentFolder 486148 | | | | AttachmentFolder 486150 | | | | | | 0..1 486152 | AttachmentFolder 486154 |
| | | | | | @actionCode 486156 | | | | | 0..1 486158 | |

FIG. 48-227

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| Document 486160 | | | | | Document 486162 | | | | | 0..N 486164 | Document 486166 |
| | | | | | | @actionCode 486168 | | | | 0..1 486170 | ActionCode 486172 |
| | | | | | | PathName 486174 | | | | 1 486176 | LANGUAGEINDEPENDENT_Name 486178 |
| | | | | | | Name 486180 | | | | 1 486182 | LANGUAGEINDEPENDENT_Name 486184 |
| | | | | | | VersionID 486186 | | | | 0..1 486188 | VersionID 486190 |

FIG. 48-228

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | SystemAdministrativeData 486192 | | | | 1 486194 | SystemAdministrativeData 486196 |
| | | | | | | LinkInternalIndicator 486198 | | | | 0..1 486200 | Indicator 486202 |
| | | | | | | VisibleIndicator 486204 | | | | 1 486206 | Indicator 486208 |
| | | | | | | VersioningEnabledIndicator 486210 | | | | 1 486212 | Indicator 486214 |

FIG. 48-229

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CategoryCode 486216 | | | | 1 486218 | DocumentCategoryCode 486220 |
| | | | | | | TypeCode 486222 | | | | 0..1 486224 | DocumentTypeCode 486226 |
| | | | | | | MIMECode 486228 | | | | 0..1 486230 | MIMECode 486232 |
| | | | | | | AlternativeName 486234 | | | | 0..1 486236 | LANGUAGEINDEPENDENT_Name 486238 |

FIG. 48-230

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | InternalLinkPathName 486240 | | | | 0..1 486242 | LANGUAGEINDEPENDENT_Name 486244 |
| | | | | | | Description 486246 | | | | 0..1 486248 | Description 486250 |
| | | | | | | ExternalLinkWebURI 486252 | | | | 0..1 486254 | WebURI 486256 |
| | | | | | | FileContentURI 486258 | | | | 0..1 486260 | URI 486262 |
| | | | | | | FileSizeMeasure 486264 | | | | 0..1 486266 | Measure 486268 |

FIG. 48-231

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | FileContentBinaryObject 486270 | | | | 0..1 486272 | BinaryObject 486274 |
| | | | | | | Attachment 486276 | | | | 0..1 486278 | Attachment 486280 |
| | | | | | | Property 486284 | | | | 0..N 486286 | DocumentProperty 486288 |
| | | | | | | | @actionCode 486290 | | | 0..1 486292 | ActionCode 486294 |
| | | | | | | | Name 486296 | | | 1 486298 | LANGUAGEINDEPENDENT_Name 486300 |

FIG. 48-232

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DataTypeFormatCode 486302 | | | 1 486304 | PropertyDataTypeFormatCode 486306 |
| | | | | | | | VisibleIndicator 486308 | | | 1 486310 | Indicator 486312 |
| | | | | | | | ChangeAllowedIndicator 486314 | | | 1 486316 | Indicator 486318 |
| | | | | | | | MultipleValueIndicator 486320 | | | 1 486322 | Indicator 486324 |

FIG. 48-233

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | NamespaceURI 486326 | | | 0..1 486328 | NamespaceURI 486330 |
| | | | | | | | Description 486332 | | | 0..1 486334 | Description 486336 |
| | | | | | | | Value 486340 | | | 0..N 486342 | DocumentPropertyValue 486344 |
| | | | | | | | | Text 486346 | | 0..1 486348 | LANGUAGEINDEPENDENT_Text 486350 |
| | | | | | | | | Indicator 486352 | | 0..1 486354 | Indicator 486356 |

FIG. 48-234

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | | | DateTime 486358 | | 0..1 486360 | DateTime 486362 |
| | | | | | | | | | | | | | IntegerValue 486364 | | 0..1 486366 | IntegerValue 486368 |
| | | | Request 486370 | | | | | | Request 486372 | | | | | | 1 486374 | ProcurementReleaseOrderRequestItemRequest 486376 |
| | | | | | | | | | | ID 486378 | | | | | 1 486380 | ReleaseOrderItemRequestID 486382 |

FIG. 48-235

| Package | | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|---|
| | | | | | | | | | | | CreationDateTime 486384 | | | | | 0..1 486386 | LOCALNORMALISED_DateTime 486388 |
| | | | | | | | | | | | PreviousItemRequestID 486390 | | | | | 0..1 486392 | ReleaseOrderItemRequestID 486394 |
| | | | | | Schedule Line 486396 | | | | | | ScheduleLine 486398 | | | | | 0..N 486400 | ProcurementReleaseOrderRequestItemRequestScheduleLine 486402 |

FIG. 48-236

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | ID 486404 | | | | 0..N 486406 | ReleaseOrderItemRequestScheduleLineID 486408 |
| | | | | | | RequestedArrivalDateTimePeriod 486410 | | | | 0..1 486412 | UPPEROPEN_LOCALNORMALISED_DateTimePeriod 486414 |
| | | | | | | RequestedQuantity 486416 | | | | 1 486418 | Quantity 486420 |

FIG. 48-237

| Package | | | | | | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|---|---|---|---|---|
| | | | | | | | | | | | RequestedQuantityTypeCode 486422 | | | | 0..1 486424 | QuantityTypeCode 486426 |

MANAGING CONSISTENT INTERFACES FOR GOODS TAG, PRODUCTION BILL OF MATERIAL HIERARCHY, AND RELEASE ORDER TEMPLATE BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a tangible computer readable medium includes program code for providing a message-based interface for exchanging goods tag-related information for an electronic device or other small piece, part or label that is attached to a product or package and that contains selected information about the product or package. The medium comprises program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting to form mixed content package tag notification that includes a first message package derived from the common business object model and hierarchically organized in memory as a form mixed content package tag notification message entity and a goods tag package comprising a goods tag entity, a delivery package, a business transaction document references package and a site package, where the goods tag entity includes an identifier (ID), a creation context depending date, an output request creation date time and an output request creation identity ID, where the delivery package includes a delivery entity, where the business transaction document references package includes a business transaction document references entity, where the site package includes a site entity, and further where the site entity includes a site ID and a site description.

The medium further comprises program code for processing the first message according to the hierarchical organization of the first message package, where processing the first message includes unpacking the first message package based on the common business object model.

The medium further comprises program code for sending a second message to the heterogeneous application responsive to the first message, where the second message includes a second message package derived from the common business object model to provide consistent semantics with the first message package.

Implementations can include the following. The goods tag entity further comprises at least one of the following: a production date, a shipping date, a goods receipt date, a shipping package attached indicator, a gross weight measure, a gross weight measure type code, a gross weight measure type name, a gross weight measure unit code name, a gross volume measure, a gross volume measure type code, a gross volume measure type name, a gross volume measure unit code name, an output request creation business partner formatted name, an image file content binary object, and a transport tracking. The goods tag package further comprises at least one of the following: a text collection package, a logistic unit package, and an identified logistic unit package.

In another aspect, a distributed system operates in a landscape of computer systems providing message-based services defined in a service registry. The system comprises a graphical user interface comprising computer readable instructions, embedded on tangible media, for a request to form a mixed content package tag notification for goods tag-related information for an electronic device or other small piece, part or label that is attached to a product or package and that contains selected information about the product or package using a request.

The system further comprises a first memory storing a user interface controller for processing the request and involving a message including a message package derived from a common business object model, where the common business object model includes business objects having relationships that enable derivation of message-based service interfaces and message packages, the message package hierarchically organized as a form mixed content package tag notification message entity and a goods tag package comprising a goods tag entity, a delivery package, a business transaction document references package and a site package, where the goods tag entity includes an identifier (ID), a creation context depending date, an output request creation date time and an output request creation identity ID, where the delivery package includes a delivery entity, where the business transaction document references package includes a business transaction document references entity, where the site package includes a site entity, and further where the site entity includes a site ID and a site description.

The system further comprises a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

Implementations can include the following. The first memory is remote from the graphical user interface. The first memory is remote from the second memory.

In another aspect, a tangible computer readable medium includes program code for providing a message-based interface for exchanging information for a hierarchy of production bills of material. The medium comprises program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for a request to form information for a production bill of material hierarchy that includes a first message package derived from the common business object model and hierarchically organized in memory as a form production bill of material hierarchy request message entity and a production bill of material hierarchy package comprising a production bill of material hierarchy entity and an item package, where the production bill of material hierarchy entity includes a production bill of material ID, a production bill of material variant ID, a material ID, an explosion date and a quantity, and where the item package includes an item entity, and further where the item entity includes a hierarchy level ordinal number value, an ordinal number value, a material ID, a quantity and a production bill of material item group item change state quantity fixed indicator.

The medium further comprises program code for processing the first message according to the hierarchical organization of the first message package, where processing the first message includes unpacking the first message package based on the common business object model.

The medium further comprises program code for sending a second message to the heterogeneous application responsive to the first message, where the second message includes a second message package derived from the common business object model to provide consistent semantics with the first message package.

Implementations can include the following. The production bill of material hierarchy entity further comprises at least one of the following: a production bill of material description, a production bill of material variant description, a material description, and a maximum hierarchy level ordinal number value.

In another aspect, a distributed system operates in a landscape of computer systems providing message-based services defined in a service registry. The system comprises a graphical user interface comprising computer readable instructions, embedded on tangible media, for a request to form information for a production bill of material hierarchy using a request.

The system further comprises a first memory storing a user interface controller for processing the request and involving a message including a message package derived from a common business object model, where the common business object model includes business objects having relationships that enable derivation of message-based service interfaces and message packages, the message package hierarchically organized as a form production bill of material hierarchy request message entity and a production bill of material hierarchy package comprising a production bill of material hierarchy entity and an item package, where the production bill of material hierarchy entity includes a production bill of material ID, a production bill of material variant ID, a material ID, an explosion date and a quantity, and where the item package includes an item entity, and further where the item entity includes a hierarchy level ordinal number value, an ordinal number value, a material ID, a quantity and a production bill of material item group item change state quantity fixed indicator.

The system further comprises a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

Implementations can include the following. The first memory is remote from the graphical user interface. The first memory is remote from the second memory.

In another aspect, a tangible computer readable medium includes program code for providing a message-based interface for exchanging information for a template that includes a maximal possible set of nodes, relationships, attributes and operations for a procurement release order and other objects derived from the template. The medium comprises program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for requesting a procurement release order that includes a first message package derived from the common business object model and hierarchically organized in memory as a procurement release order request message entity and a procurement release order package comprising a procurement release order entity, where the procurement release order entity includes an action code, an ID, a creation date time, an ordered date time, and an item list complete transmission indicator.

The medium further comprises program code for processing the first message according to the hierarchical organization of the first message package, where processing the first message includes unpacking the first message package based on the common business object model.

The medium further comprises program code for sending a second message to the heterogeneous application responsive to the first message, where the second message includes a second message package derived from the common business object model to provide consistent semantics with the first message package.

Implementations can include the following. The procurement release order package further comprises at least one of the following: a business transaction document reference package, a party package, an attachment folder package, a text collection package, and an item package. The procurement release order entity further comprises a reconciliation period counter value.

In another aspect, a distributed system operates in a landscape of computer systems providing message-based services defined in a service registry. The system comprises a graphical user interface comprising computer readable instructions, embedded on tangible media, for requesting a procurement release order that is based on a template that includes a maximal possible set of nodes, relationships, attributes and operations for a procurement release order and other objects derived from the template using a request.

The system further comprises a first memory storing a user interface controller for processing the request and involving a message including a message package derived from a common business object model, where the common business object model includes business objects having relationships that enable derivation of message-based service interfaces and message packages, the message package hierarchically organized as a procurement release order request message entity and a procurement release order package comprising a procurement release order entity, where the procurement release order entity includes an action code, an ID, a creation date time, an ordered date time, and an item list complete transmission indicator.

The system further comprises a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

Implementations can include the following. The first memory is remote from the graphical user interface. The first memory is remote from the second memory.

BRIEF DESCRIPTION OF THE DRAWINGS

FIGS. 32-1 through 32-7 depict an example object model for a business object Goods Tag.

FIGS. 34-1 through 34-2 depict an example Form Serialised Material Tag Notification Message Data Type.

FIGS. 35-1 through 35-2 depict an example Form Uniform Content Package Tag Notification Message Data Type.

FIGS. 37-1 through 37-26 show an example configuration of an Element Structure that includes a FormMixedContentPackageTagNotification package.

FIGS. 38-1 through 38-24 show an example configuration of an Element Structure that includes a FormSerialisedMaterialTagNotification package.

FIGS. 39-1 through 39-27 show an example configuration of an Element Structure that includes a FormUniformContentPackageTagNotification package.

FIGS. 40-1 through 40-21 show an example configuration of an Element Structure that includes a FormUnspecifiedContentPackageTagNotification package.

FIGS. 41-1 through 41-4 depict an example object model for a business object Production Bill of Material Hierarchy.

FIGS. 43-1 through 43-6 show an example configuration of an Element Structure that includes a FormProductionBillOfMaterialHierarchy package.

FIGS. 44-1 through 44-21 depict an example object model for a business object ReleaseOrder_Template.

FIGS. 45-1 through 45-4 depict an example Form Procurement Release Order Request Message Data Type.

FIGS. 46-1 through 46-4 depict an example ProcurementReleaseOrderRequest Message Data Type.

FIGS. 47-1 through 47-64 show an example configuration of an Element Structure that includes a FormProcurementReleaseOrderRequest package.

FIGS. 48-1 through 48-237 show an example configuration of an Element Structure that includes a ProcurementReleaseOrderRequest package.

DETAILED DESCRIPTION

A. Overview

Figure 1:
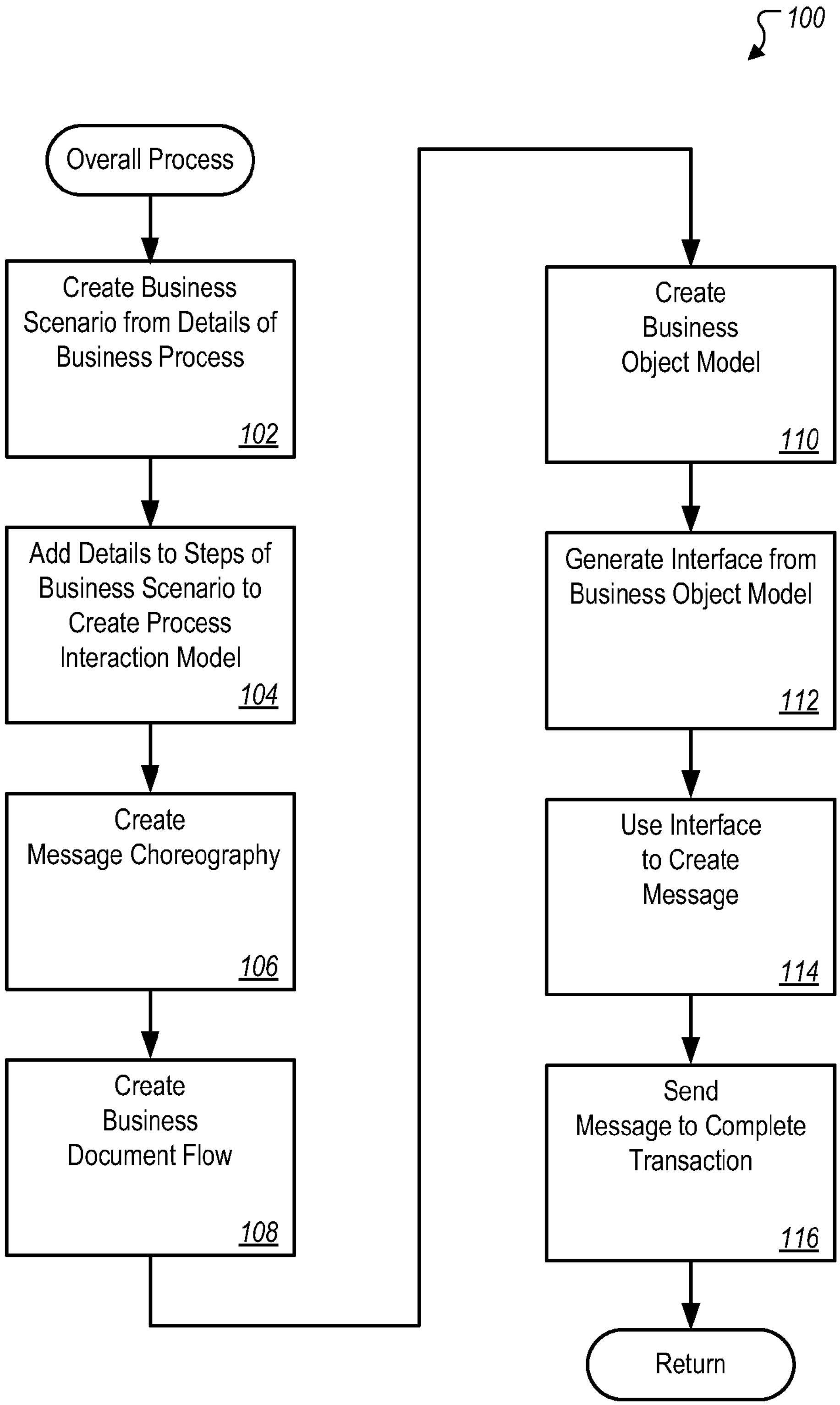
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as HI appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
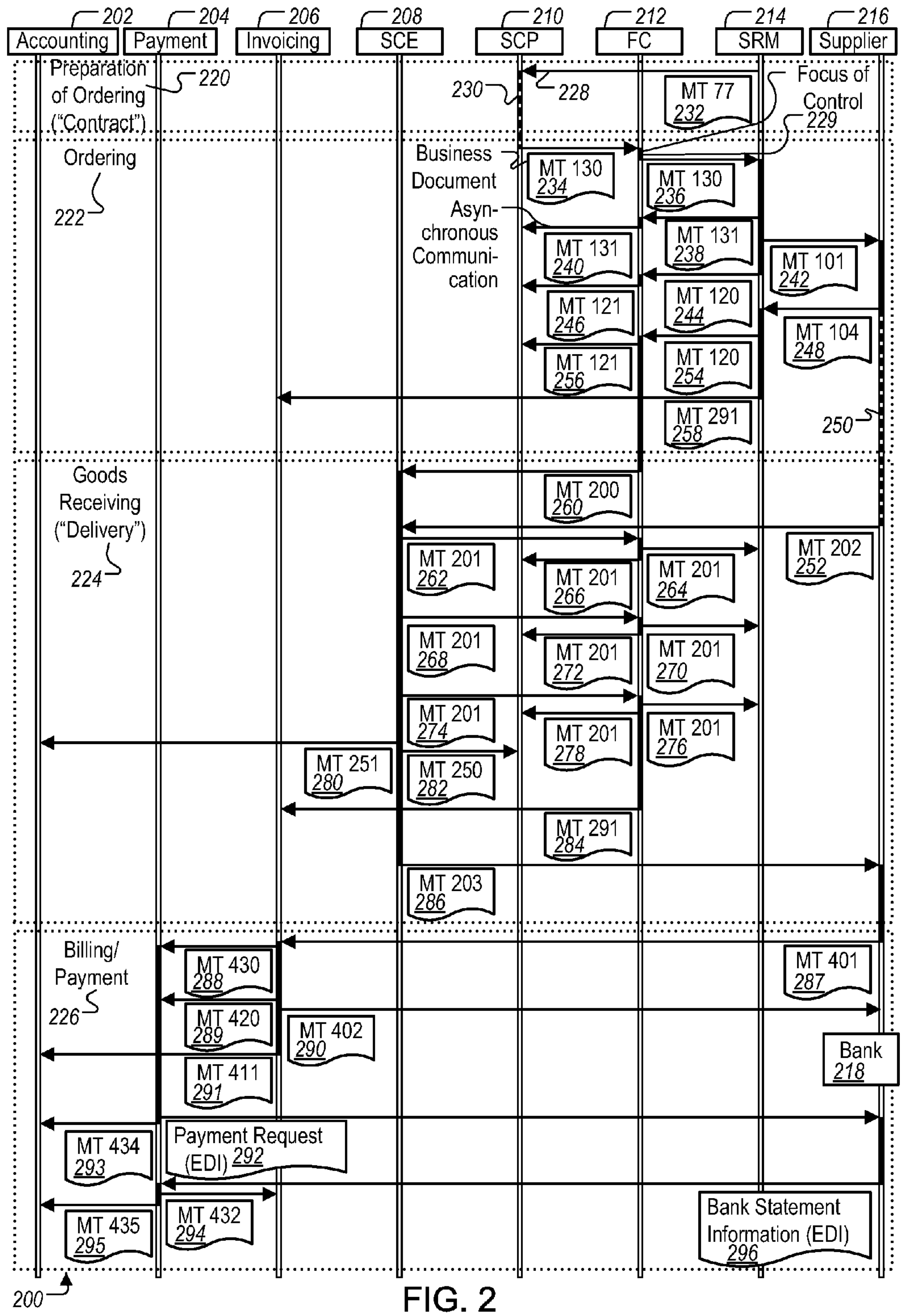
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
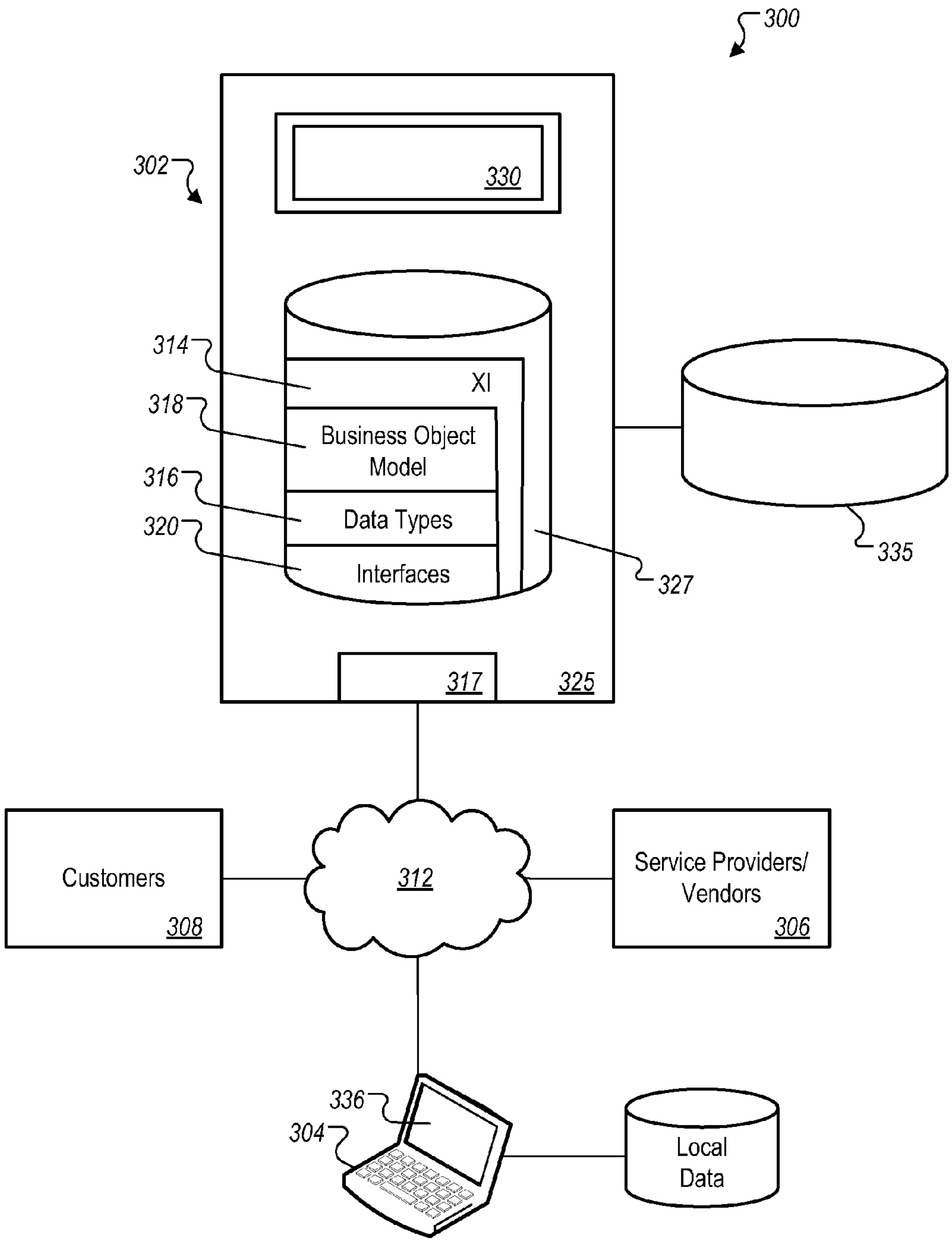
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
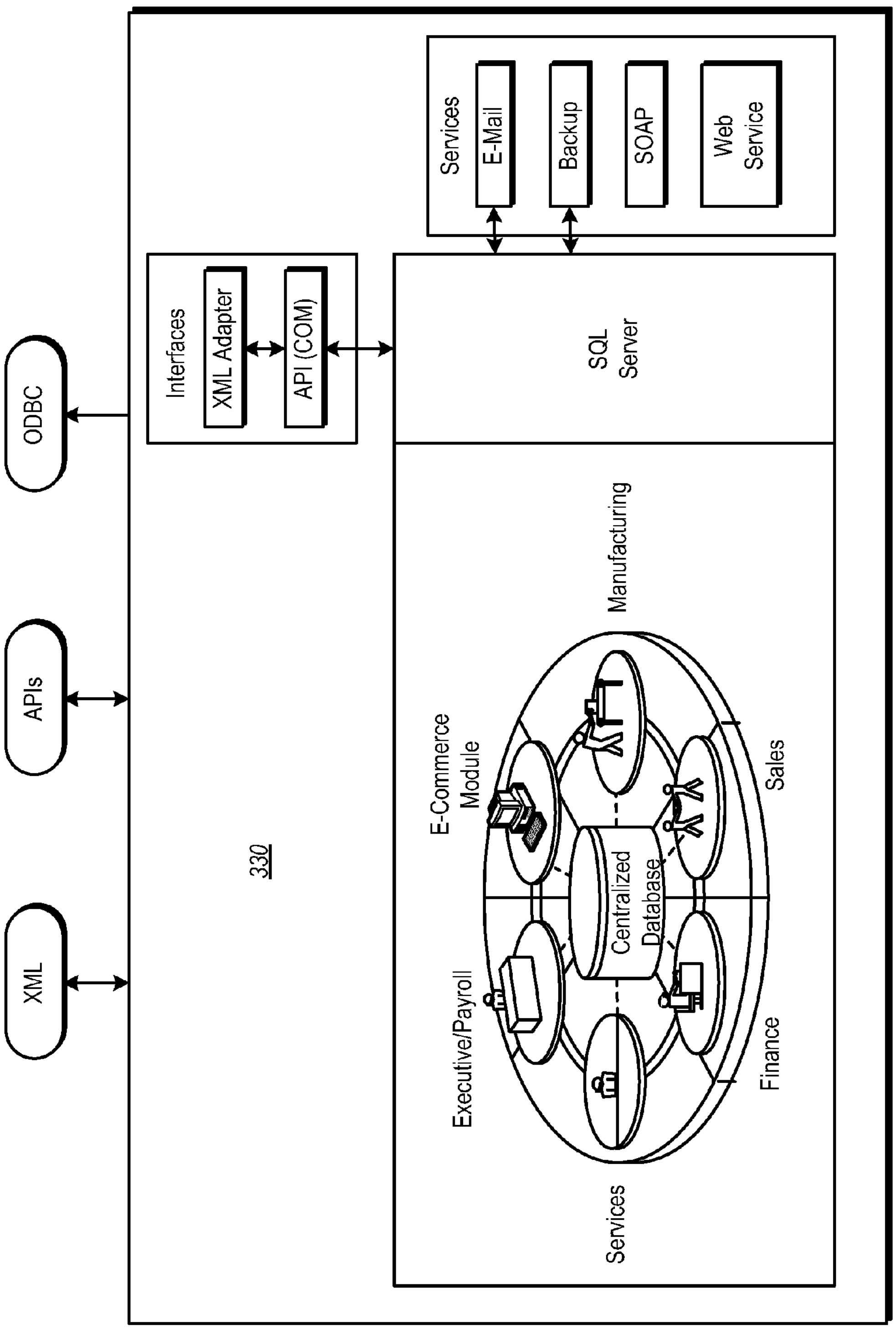
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
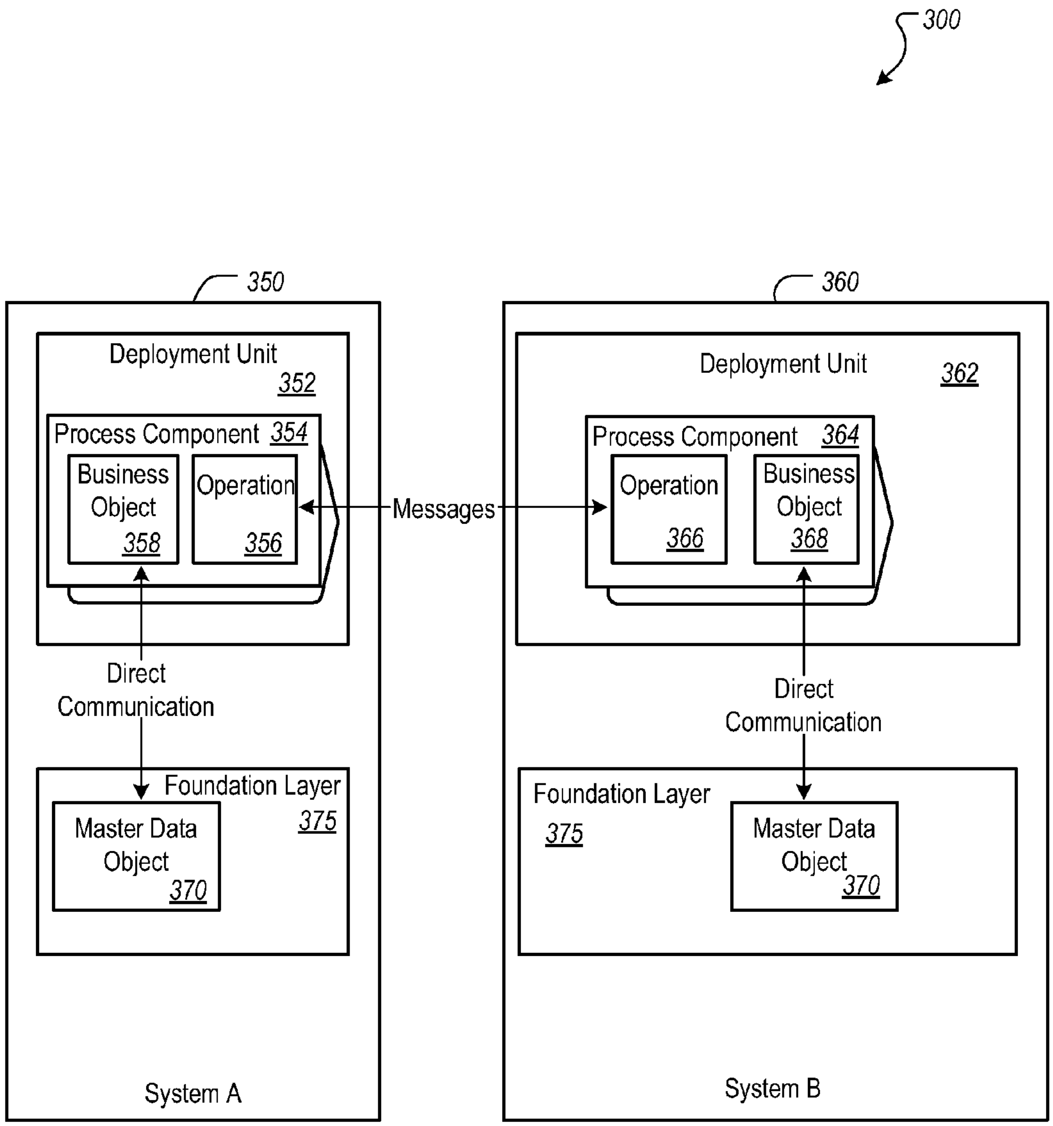

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
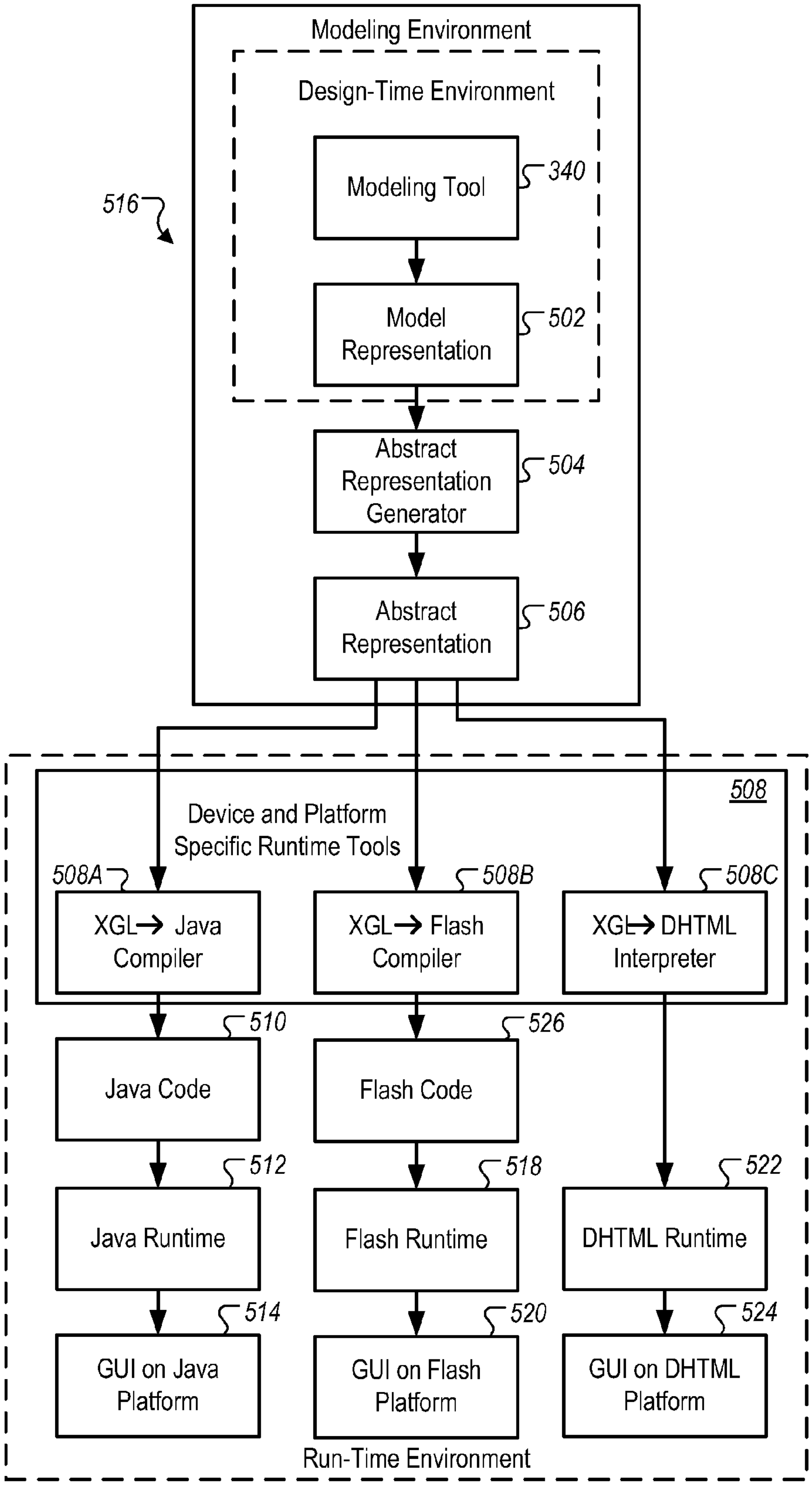
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
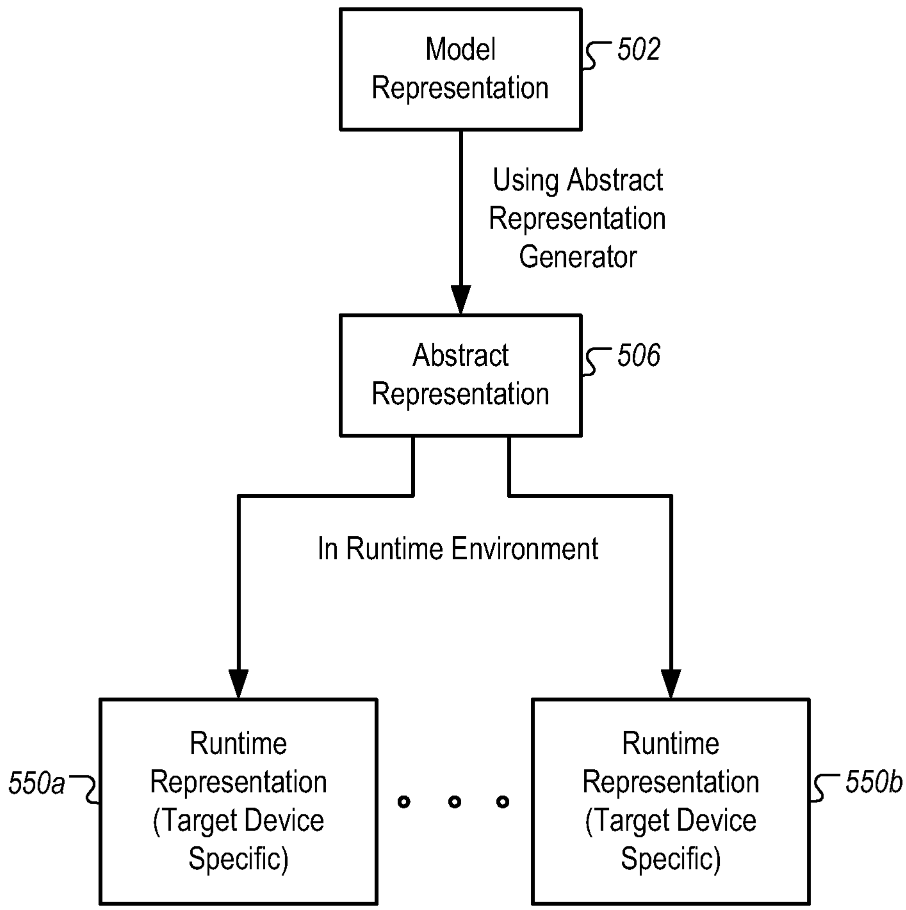
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
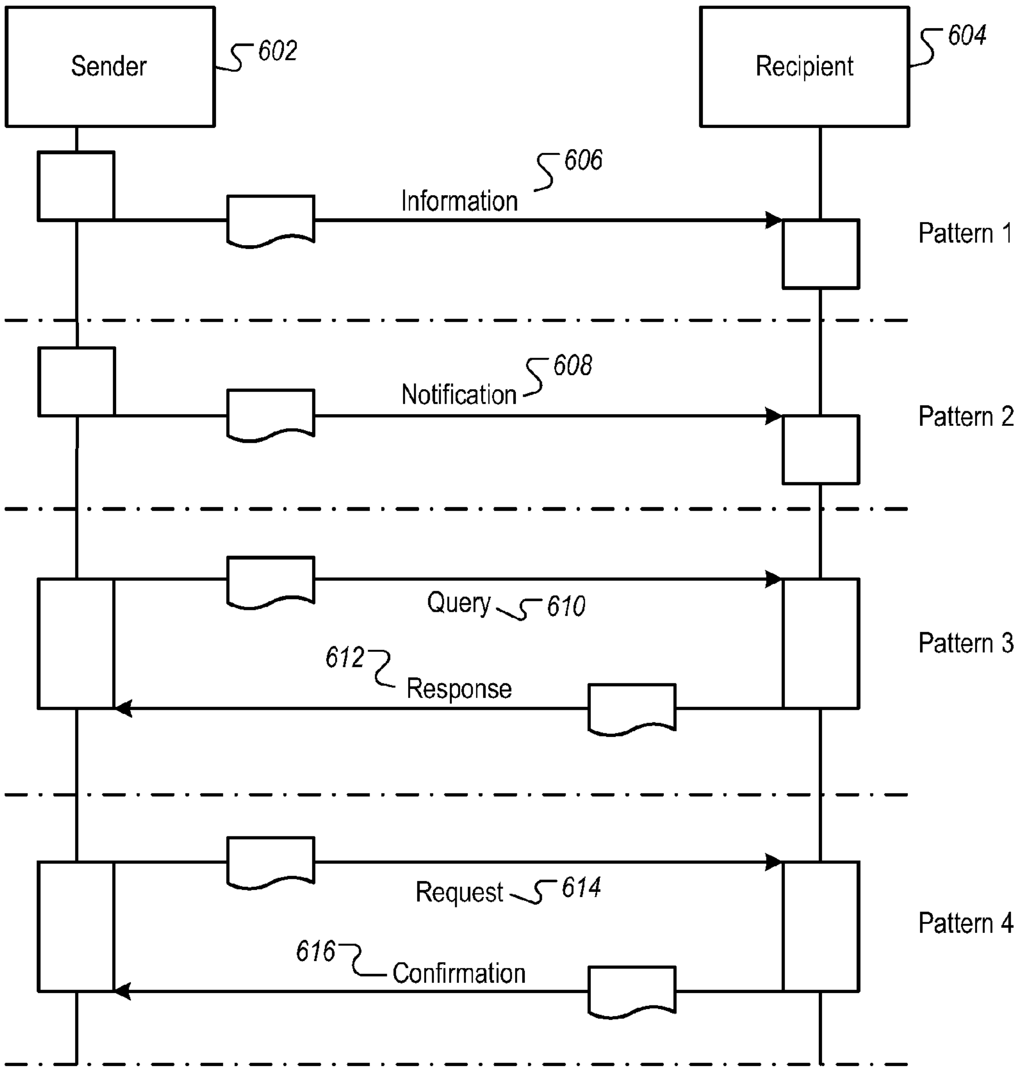
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of “information” are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message “lifecycle” as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled “Consistent Set Of Interfaces Derived From A Business Object Model.” For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party’s identity, the party’s address, the party’s contact person and the contact person’s address. BusinessTransactionDocumentParty also includes the role of the party, e.g., a buyer, seller, product recipient, or vendor.

The data types are based on Core Component Types (“CCTs”), which themselves are based on the World Wide Web Consortium (“W3C”) data types. “Global” data types represent a business situation that is described by a fixed structure. Global data types include both context-neutral generic data types (“GDTs”) and context-based context data types (“CDTs”). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type “GeoCoordinates” is built using the data type “Measure” so that the measures in a GeoCoordinate (i.e., the latitude measure and the longitude measure) are represented the same as other “Measures” that appear in the business object model.

b) Entities

Entities are discrete business elements that are used during a business transaction. Entities are not to be confused with business entities or the components that interact to perform a transaction. Rather, “entities” are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include “sub”-packages, i.e., the packages may be nested.

Figure 7:
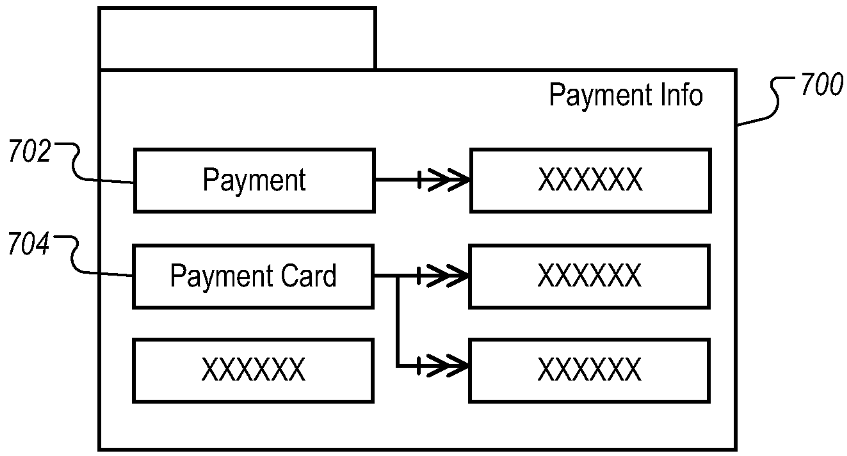
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
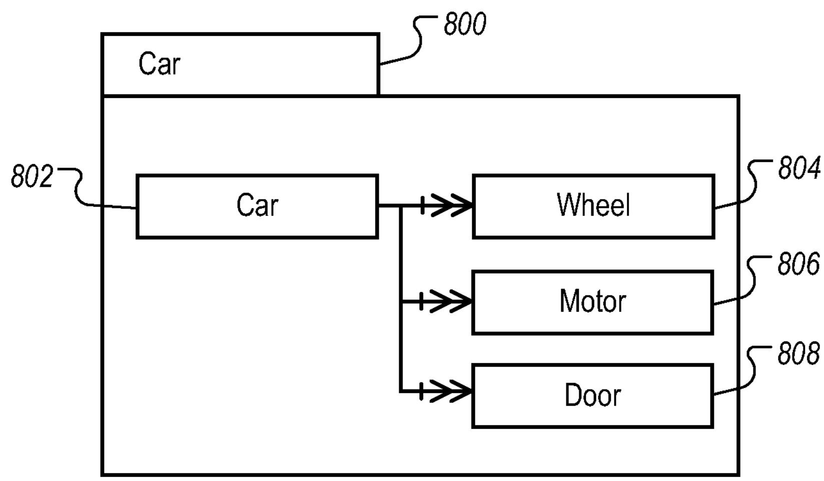
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition “Car” 802. The “Car” package 800 includes the wheels, motor and doors as well as the composition “Car.”

Figure 9:
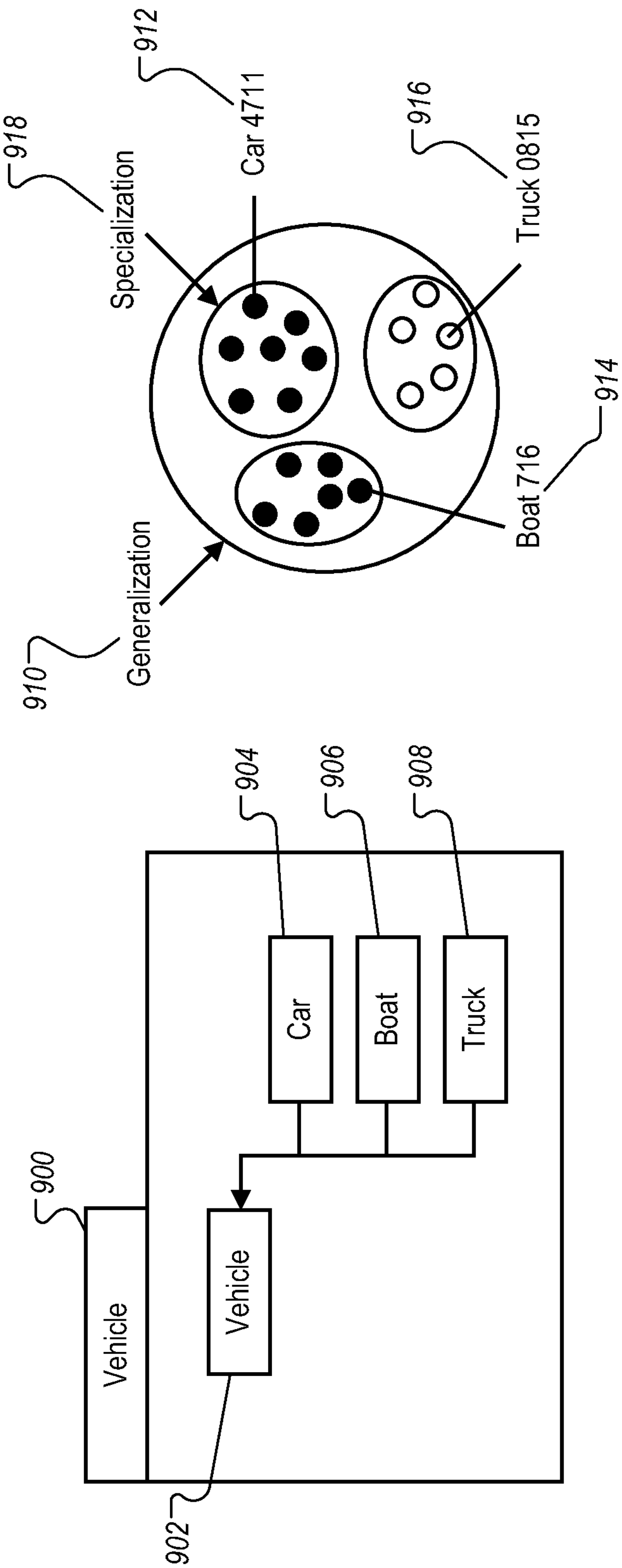
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
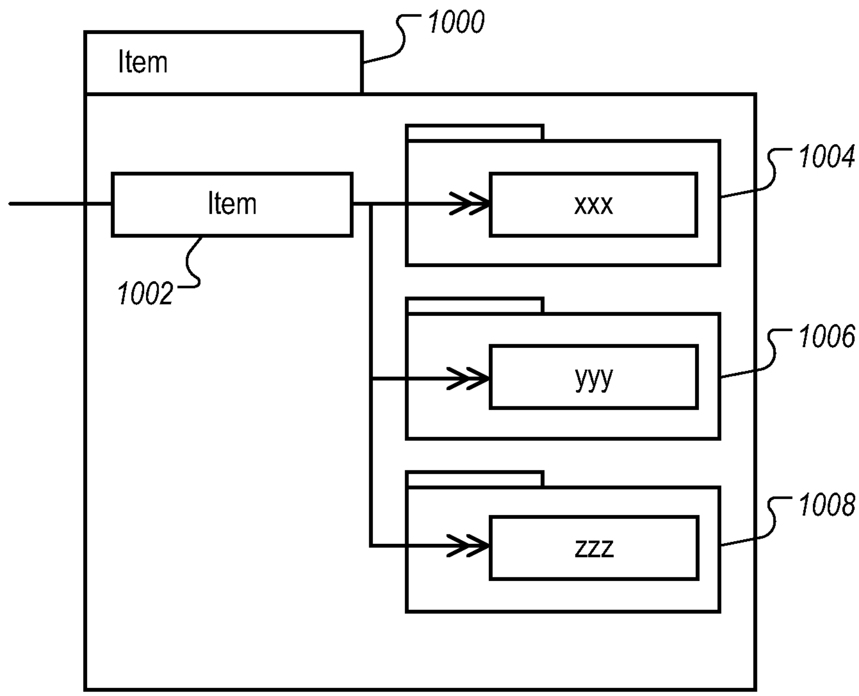
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
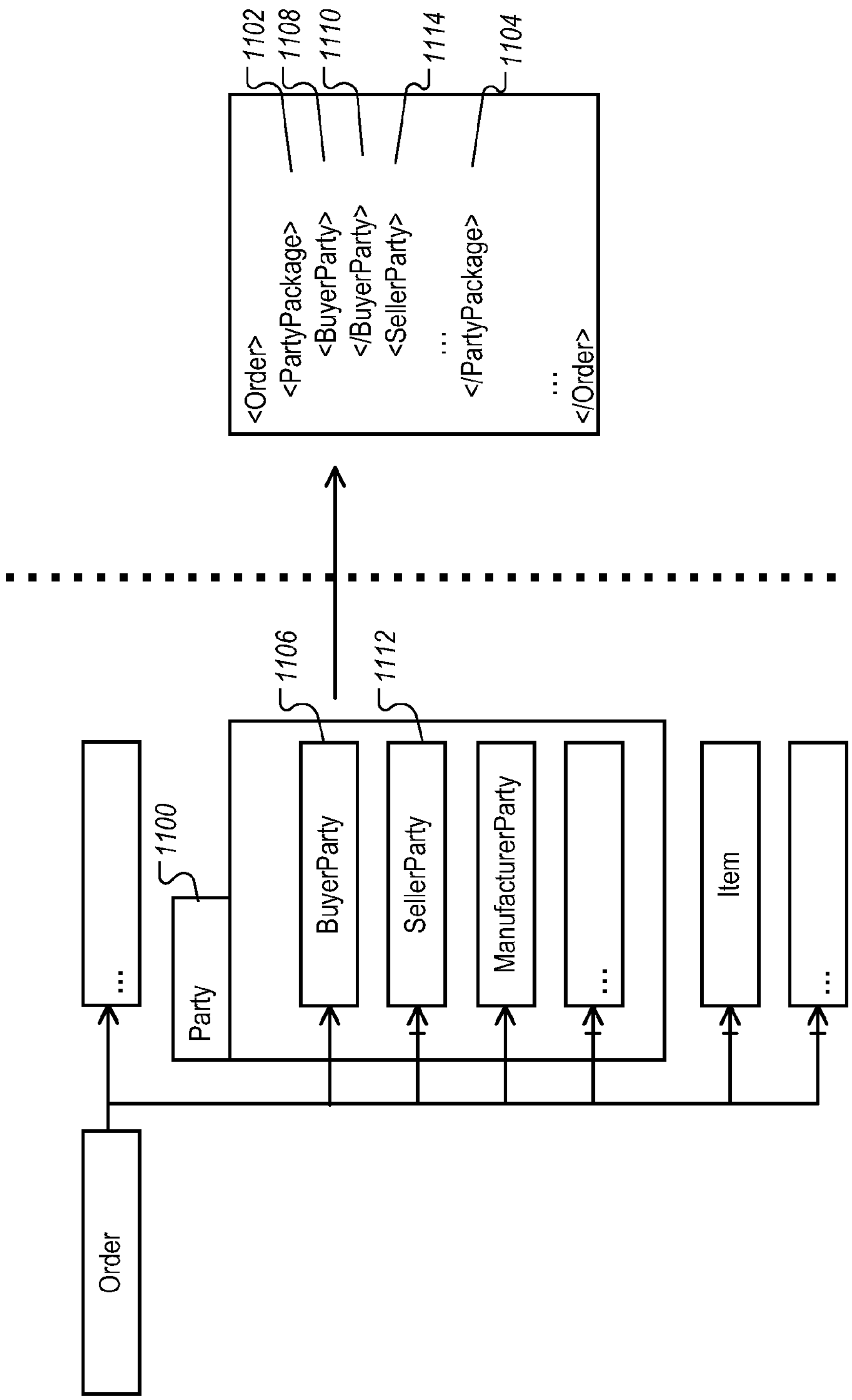
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix “Package.” For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
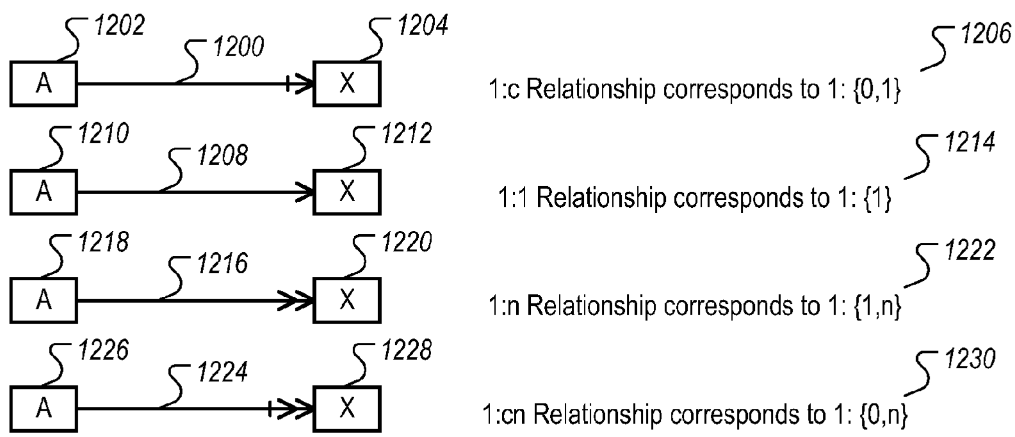
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
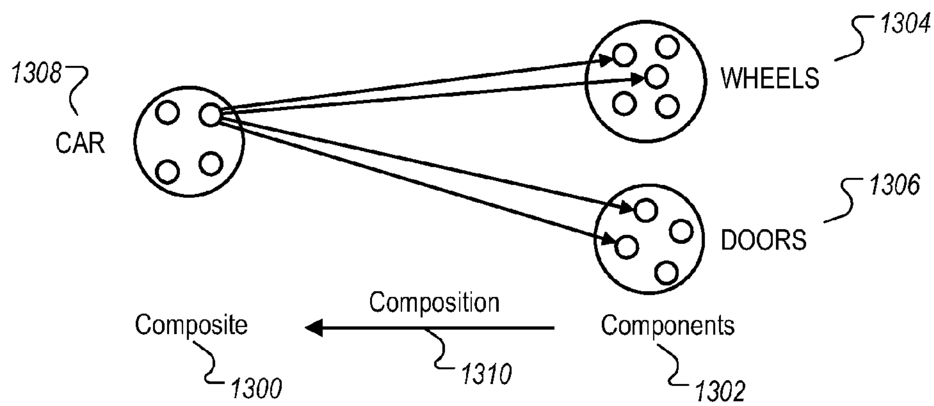
FIG. 13 depicts an example of a composition in accordance with methods and systems consistent with the subject matter described herein.
Figure 14:
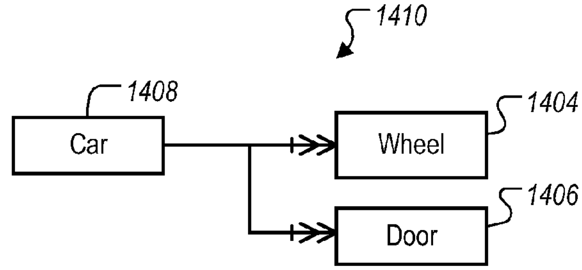
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
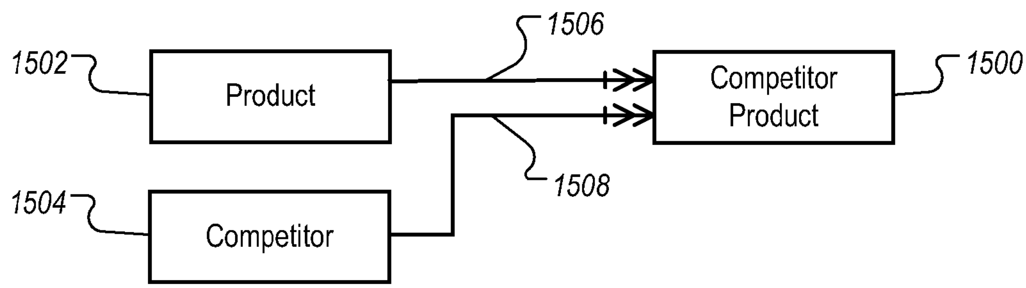
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
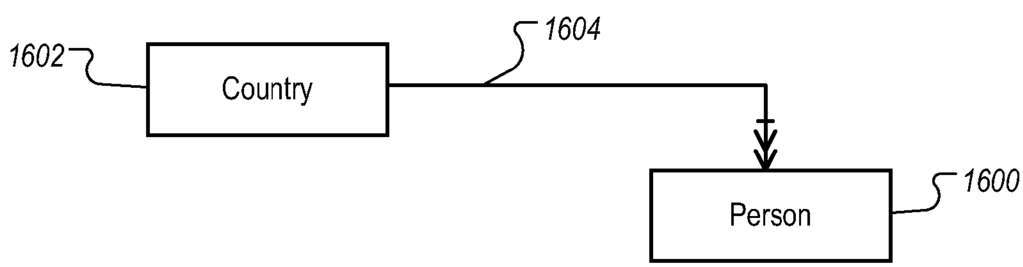
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600.

The values of the attributes of the person 1600 are not determined by the country 1602.

(3) Specialization

Figure 17:
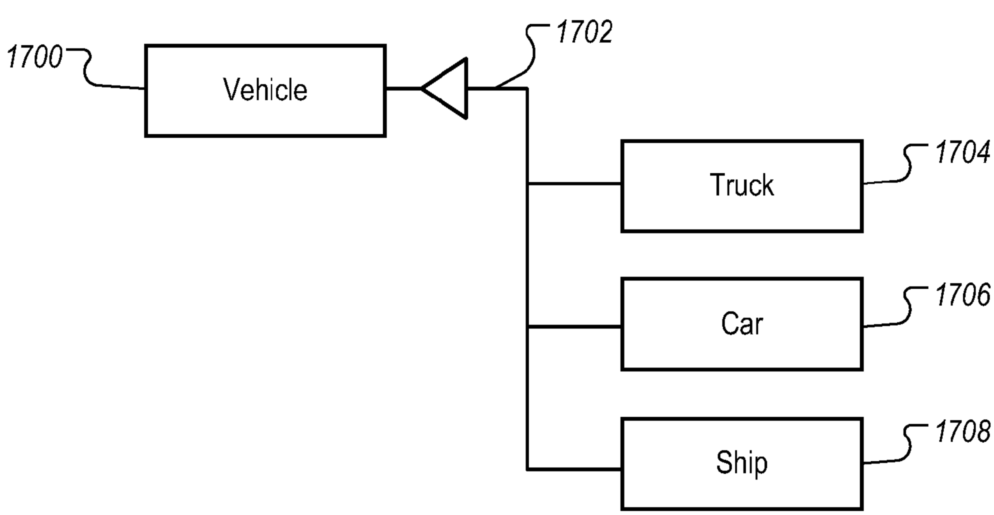
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
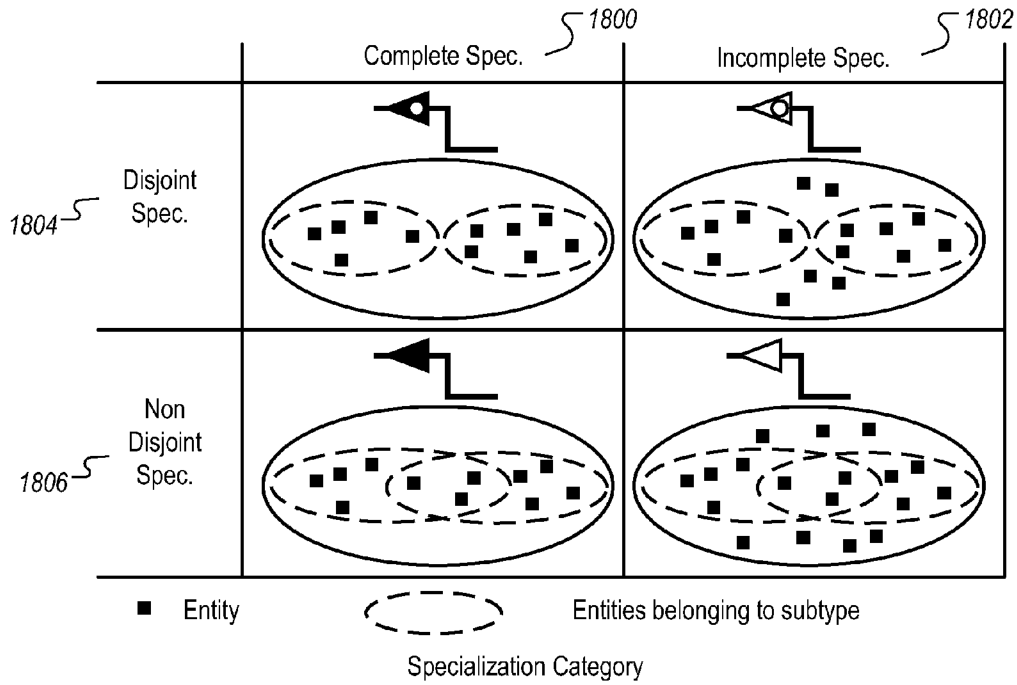
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
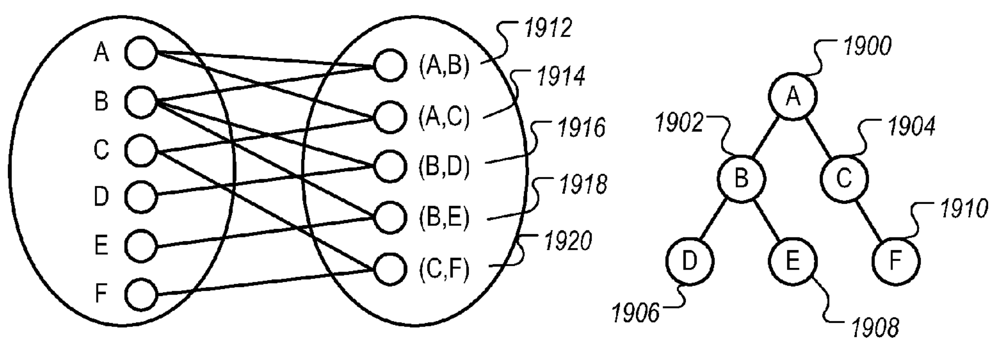
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
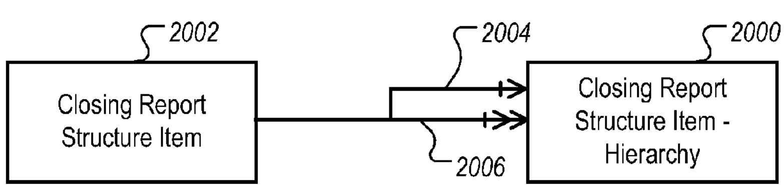
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
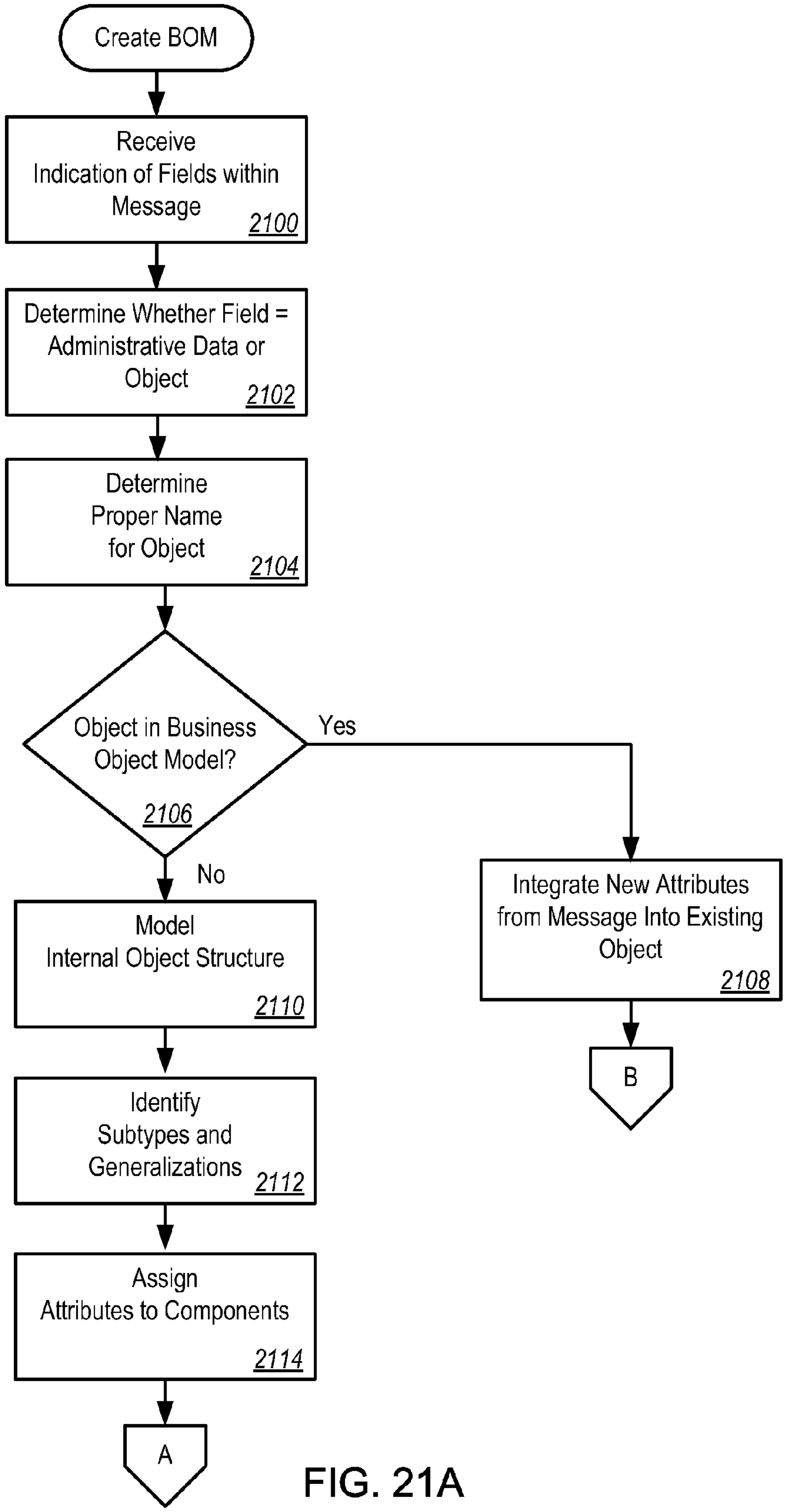
FIGS. 21A-B depict a flow diagram of the steps performed to create a business object model in accordance with methods and systems consistent with the subject matter described herein.
Figure 21B:
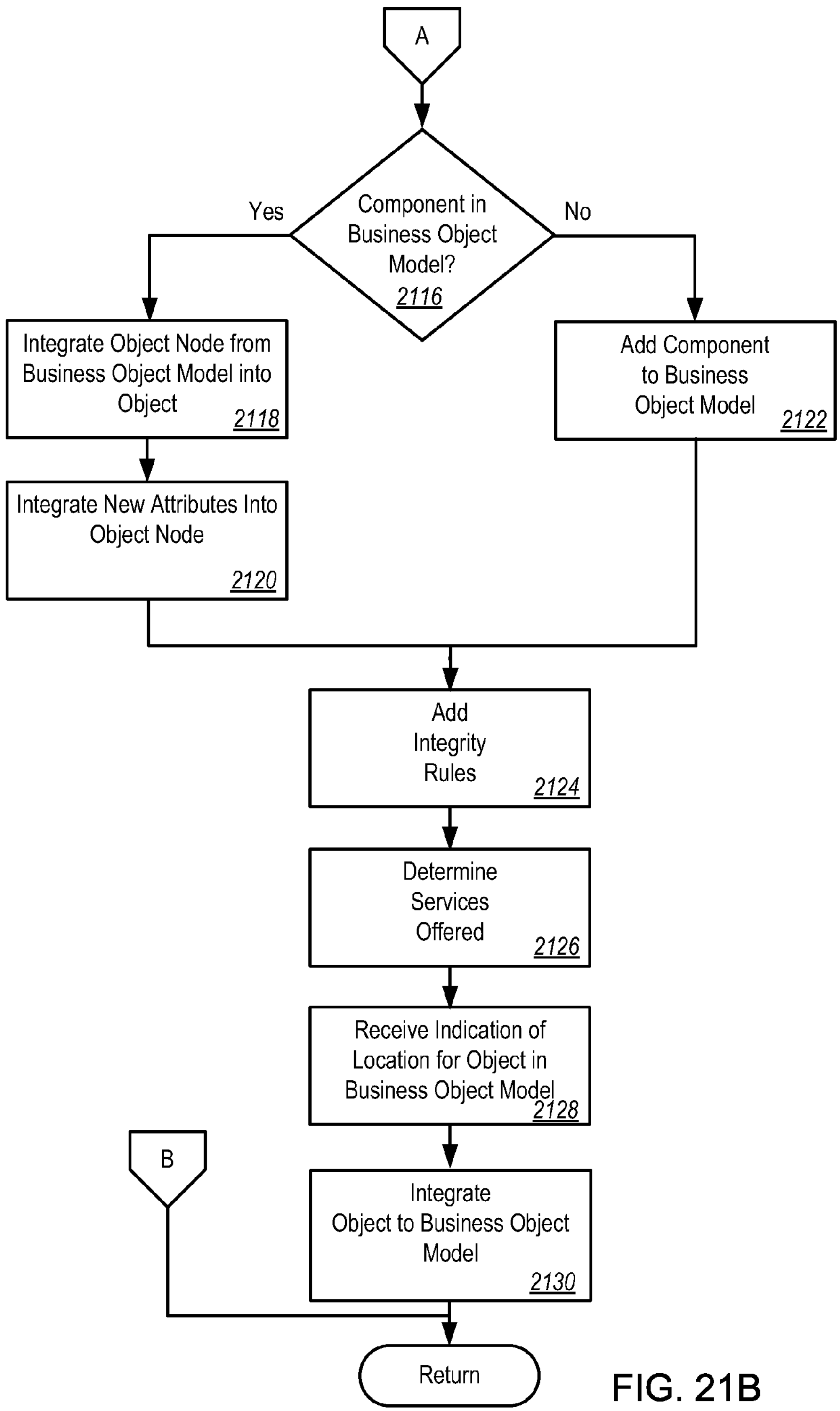

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |

-continued

| |
|---|
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase | |
| AdditionalID | Order | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | | Seller |
| SellerAddress | | |
| Location | | Location |
| LocationType | | |
| DeliveryItemGroupID | | Delivery |
| DeliveryPriority | | Terms |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | | Payment |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |

-continued

| | | |
|---|---|---|
| ItemID | Purchase | |
| ParentItemID | Order | |
| HierarchyType | Item | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobilNumber | | |
| Facsimile | | |
| Email | | |
| ItemSeller | | Seller |
| ItemSellerAddress | | |
| ItemLocation | | Location |
| ItemLocationType | | |
| ItemDeliveryItemGroupID | | |
| ItemDeliveryPriority | | |
| ItemDeliveryCondition | | |
| ItemTransferLocation | | |
| ItemNumberofPartial Delivery | | |
| ItemQuantityTolerance | | |
| ItemMaximumLeadTime | | |
| ItemTransportServiceLevel | | |
| ItemTranportCondition | | |
| ItemTransportDescription | | |
| ContractReference | | Contract |
| QuoteReference | | Quote |
| CatalogueReference | | Catalogue |
| ItemAttachmentID | | |
| ItemAttachmentFilename | | |
| ItemDescription | | |
| ScheduleLineID | | |
| DeliveryPeriod | | |
| Quantity | | |
| ConfirmedScheduleLineID | | |
| ConfirmedDeliveryPeriod | | |
| ConfirmedQuantity | | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |

-continued

| | | | |
|---|---|---|---|
| Seller | | | 0 . . . 1 |
| Location | | | 0 . . . 1 |
| | Address | | 0 . . . 1 |
| DeliveryTerms | | | 0 . . . 1 |
| | Incoterms | | 0 . . . 1 |
| | PartialDelivery | | 0 . . . 1 |
| | QuantityTolerance | | 0 . . . 1 |
| | Transport | | 0 . . . 1 |
| CashDiscount Terms | | | 0 . . . 1 |
| | MaximumCashDiscount | | 0 . . . 1 |
| | NormalCashDiscount | | 0 . . . 1 |
| PaymentForm | | | 0 . . . 1 |
| | PaymentCard | | 0 . . . 1 |
| Attachment | | | 0 . . . n |
| Description | | | 0 . . . 1 |
| Confirmation | | | 0 . . . 1 |
| Description | | | |
| Item | | | 0 . . . n |
| | HierarchyRelationship | | 0 . . . 1 |
| | Product | | 0 . . . 1 |
| | ProductCategory | | 0 . . . 1 |
| | Price | | 0 . . . 1 |
| | | NetunitPrice | 0 . . . 1 |
| | ConfirmedPrice | | 0 . . . 1 |
| | | NetunitPrice | 0 . . . 1 |
| | Buyer | | 0 . . . 1 |
| | Seller | | 0 . . . 1 |
| | Location | | 0 . . . 1 |
| | DeliveryTerms | | 0 . . . 1 |
| | Attachment | | 0 . . . n |
| | Description | | 0 . . . 1 |
| | ConfirmationDescription | | 0 . . . 1 |
| | ScheduleLine | | 0 . . . n |
| | | DeliveryPeriod | 1 |
| | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |

-continued

| | | | |
|---|---|---|---|
| Attachment | | | 0 . . . n |
| Description | | | 0 . . . 1 |
| Confirmation Description | | | 0 . . . 1 |
| Item | | | 0 . . . n |
| | HierarchyRelationship | | 0 . . . 1 |
| | Product | | 0 . . . 1 |
| | ProductCategory | | 0 . . . 1 |
| | Price | | 0 . . . 1 |
| | | NetunitPrice | 0 . . . 1 |
| | ConfirmedPrice | | 0 . . . 1 |
| | | NetunitPrice | 0 . . . 1 |
| | Party | | |
| | | BuyerParty | 0 . . . 1 |
| | | SellerParty | 0 . . . 1 |
| | Location | | |
| | | ShipTo Location | 0 . . . 1 |
| | | ShipFrom Location | 0 . . . 1 |
| | DeliveryTerms | | 0 . . . 1 |
| | Attachment | | 0 . . . n |
| | Description | | 0 . . . 1 |
| | Confirmation Description | | 0 . . . 1 |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product | | | 0 . . . 1 |
| | RecipientParty | | | |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo | | | 0 . . . 1 |

-continued

| | | |
|---|---|---|
| Location | | |
| | StandardID | 0 . . . n |
| | BuyerID | 0 . . . 1 |
| | SellerID | 0 . . . 1 |
| | Address | 0 . . . 1 |
| ShipFrom Location | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |

-continued

| | | |
|---|---|---|
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
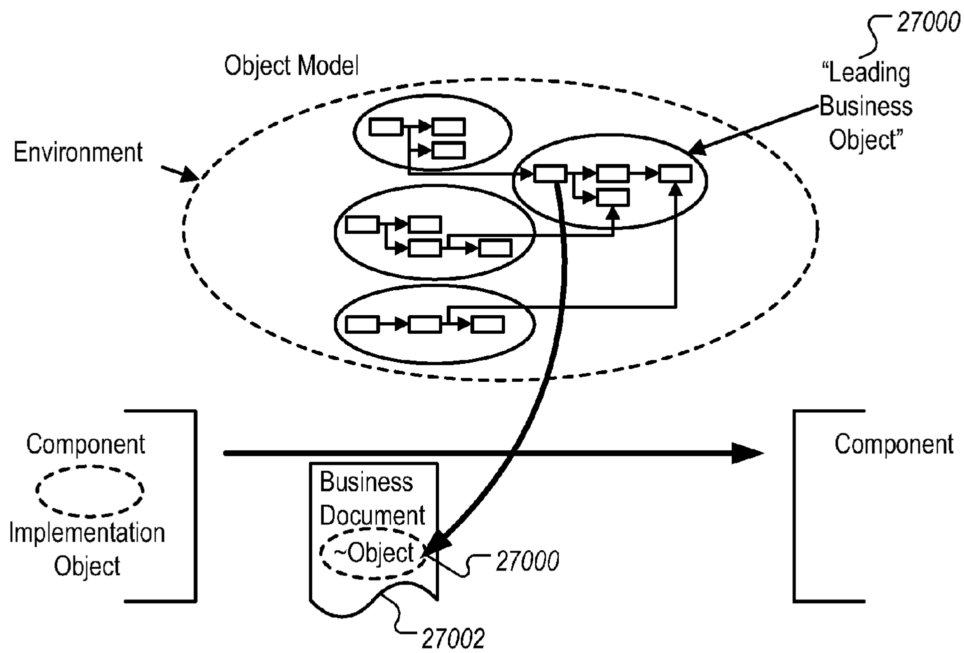
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
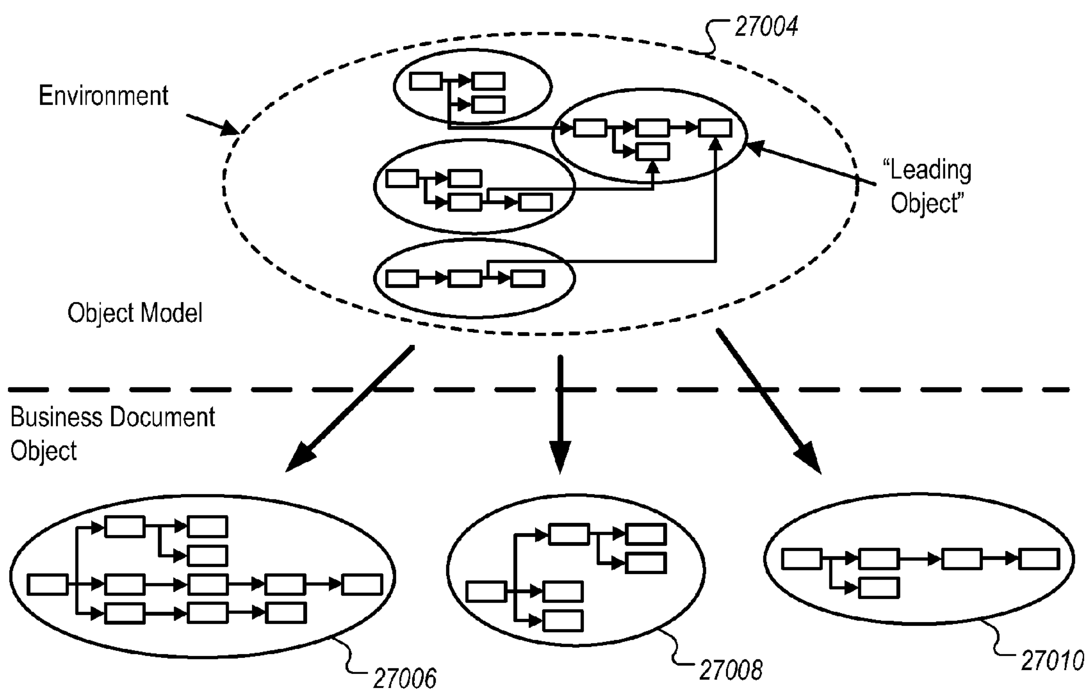

As illustrated in FIG. 27B, several business document objects 27006, 27008, and 27010 as overlapping views may be derived for a given leading object 27004. Each business document object results from the object model by hierarchization.

Figure 27C:
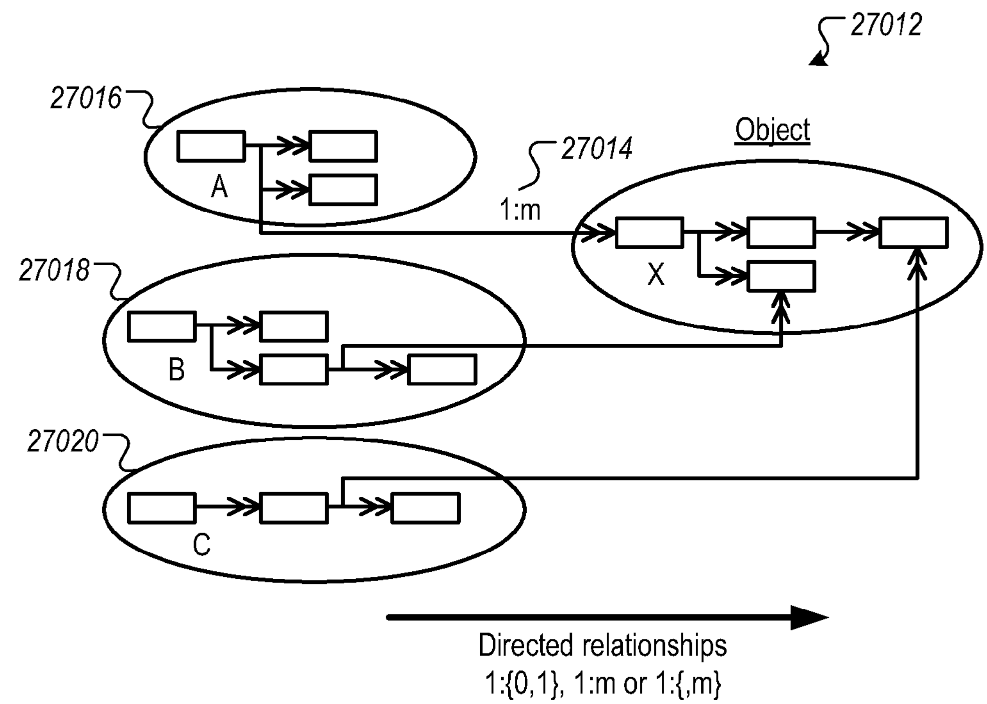

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
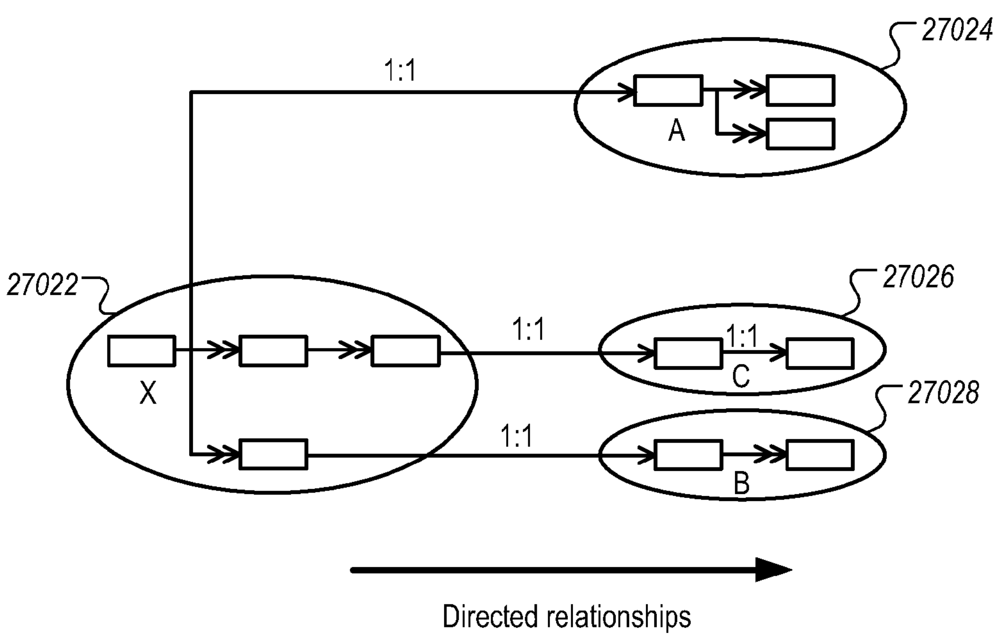

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
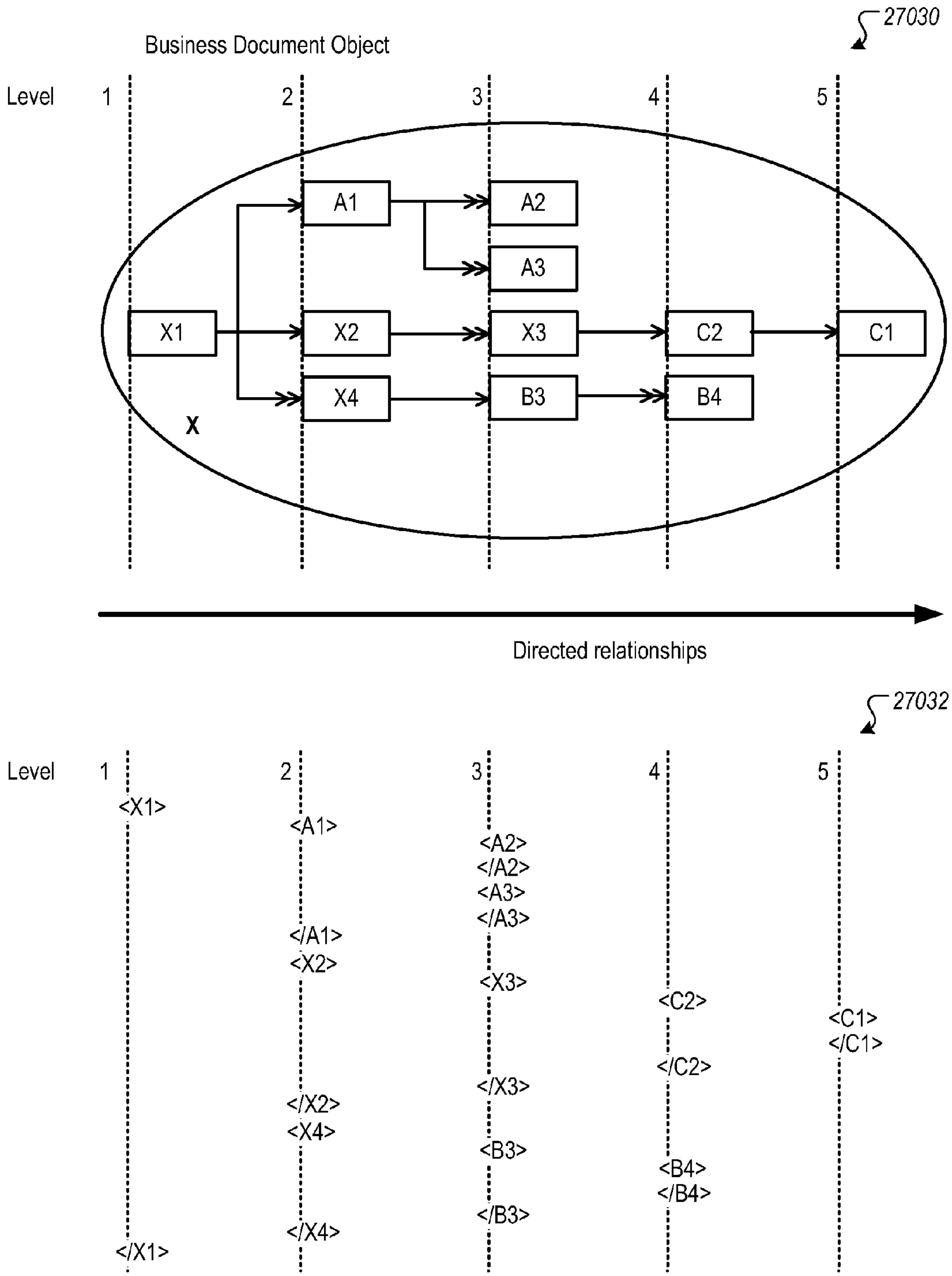

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message." For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
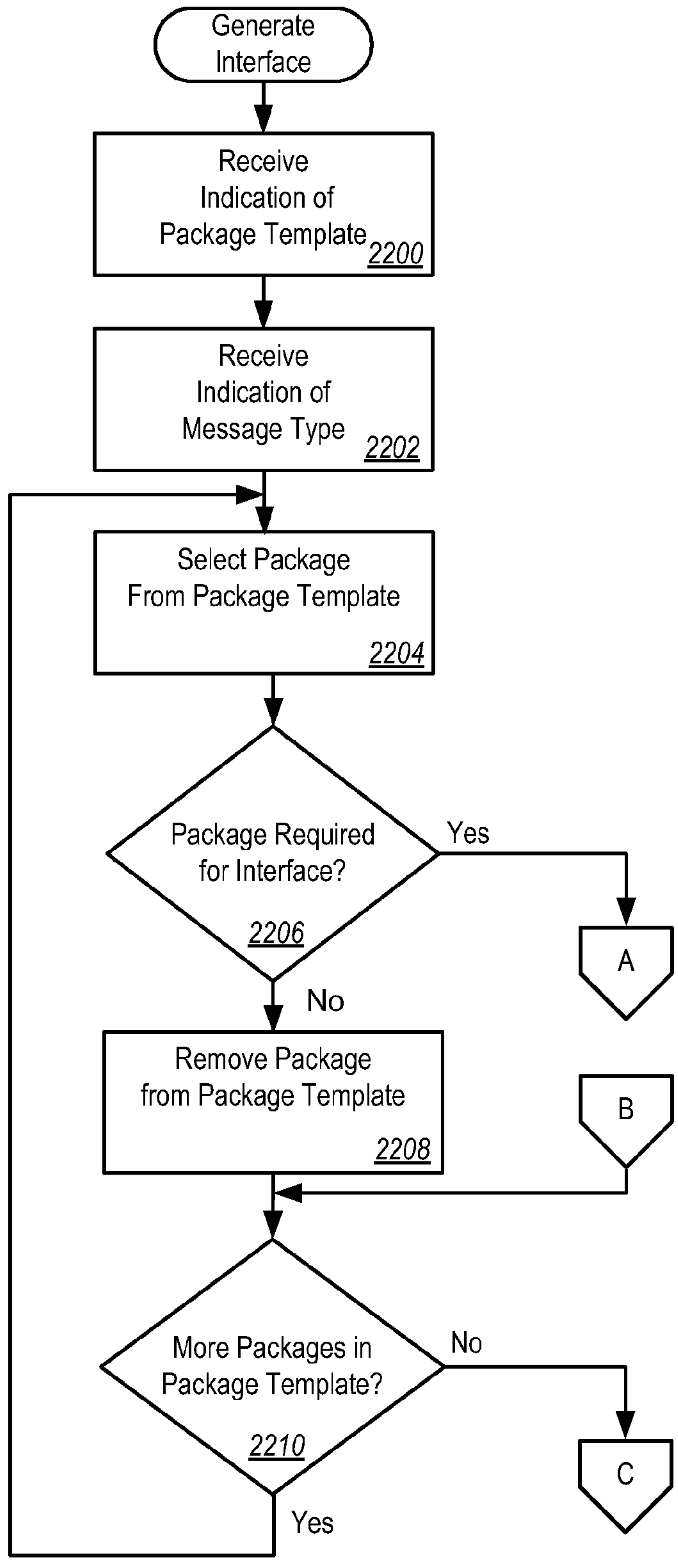
FIGS. 22A-F depict a flow diagram of the steps performed to generate an interface from the business object model in accordance with methods and systems consistent with the subject matter described herein.
Figure 22B:
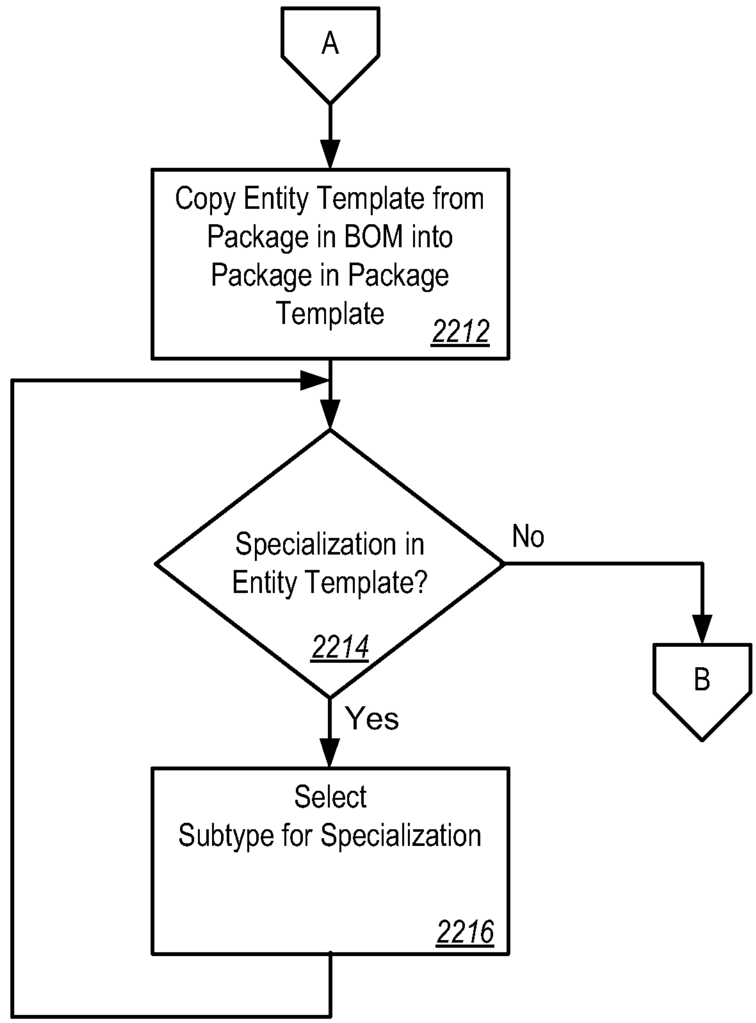
Figure 22C:
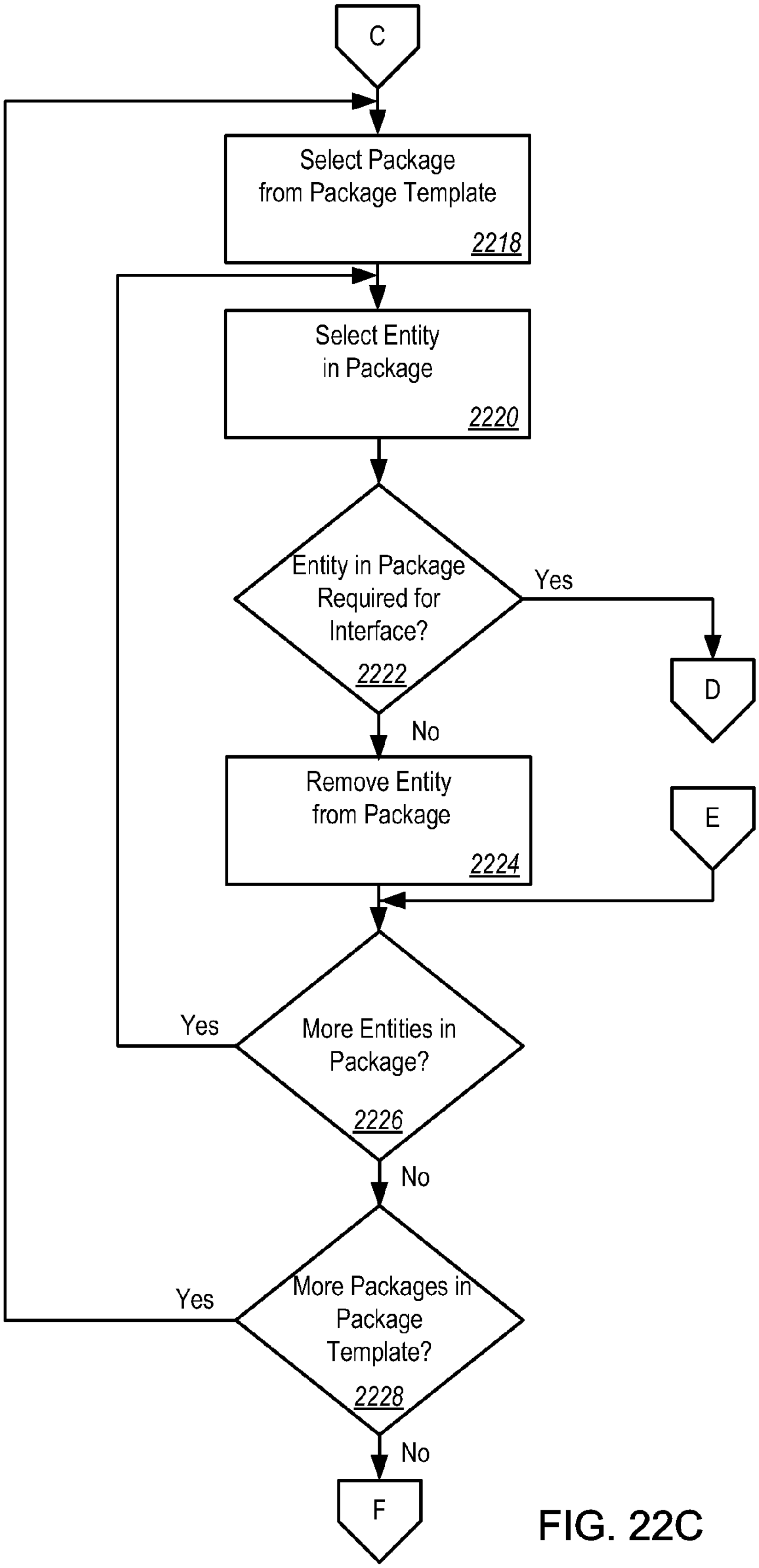

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
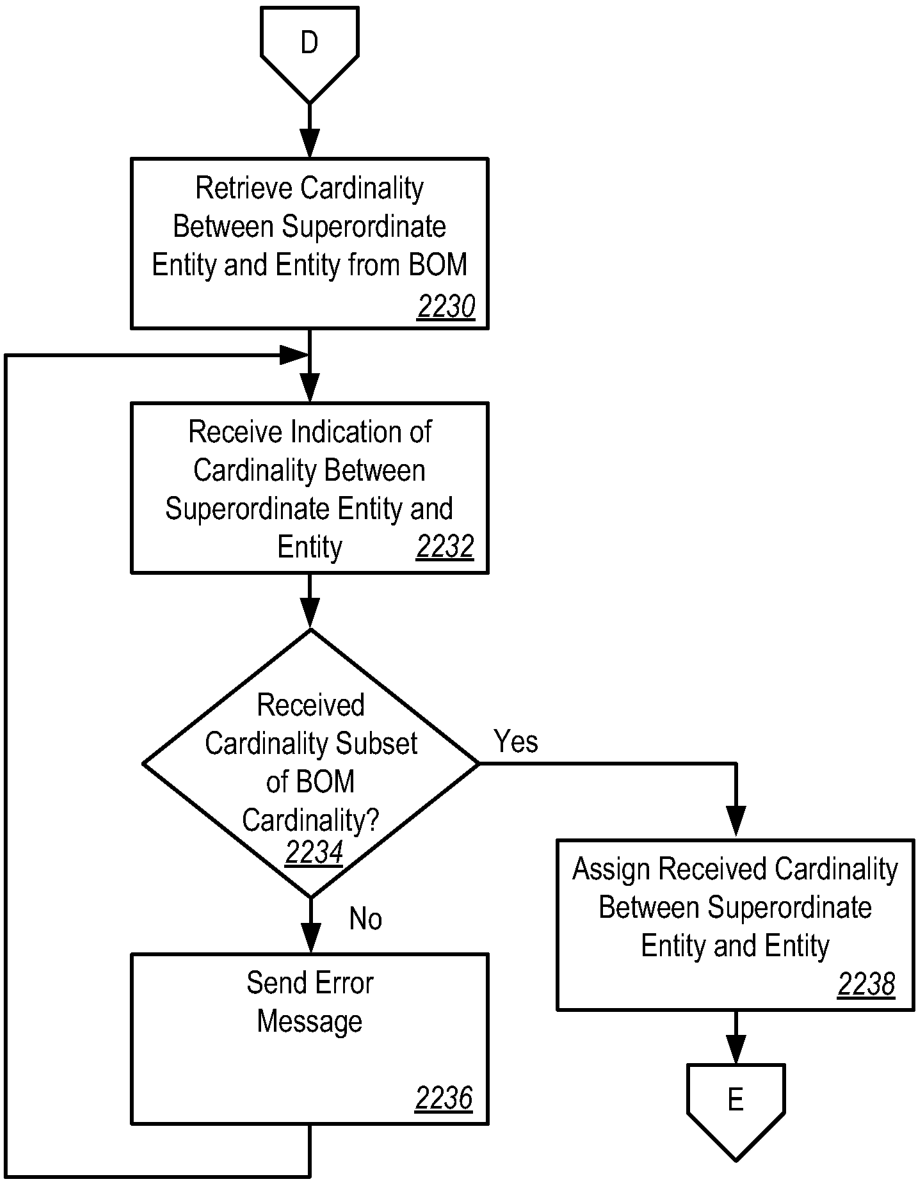

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
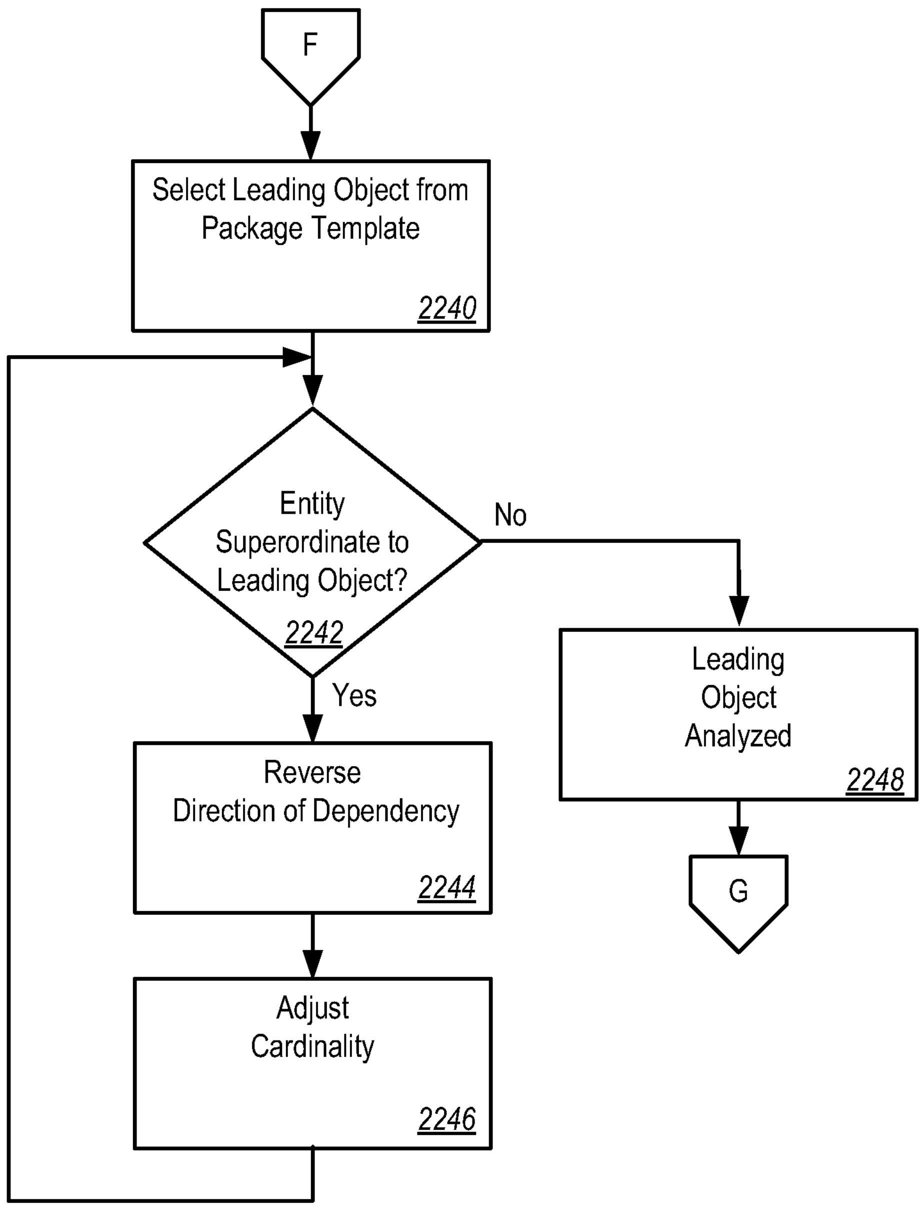

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
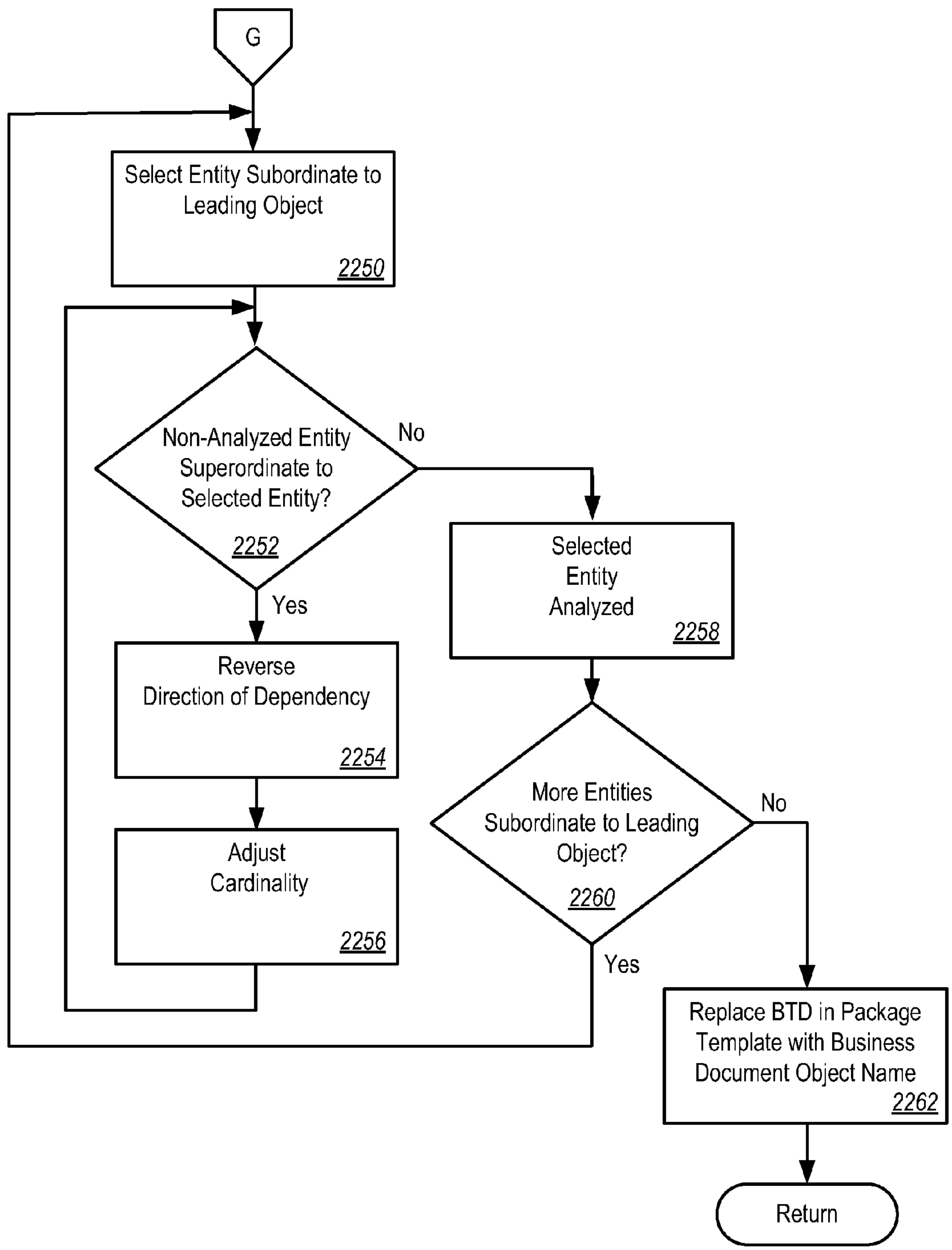

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
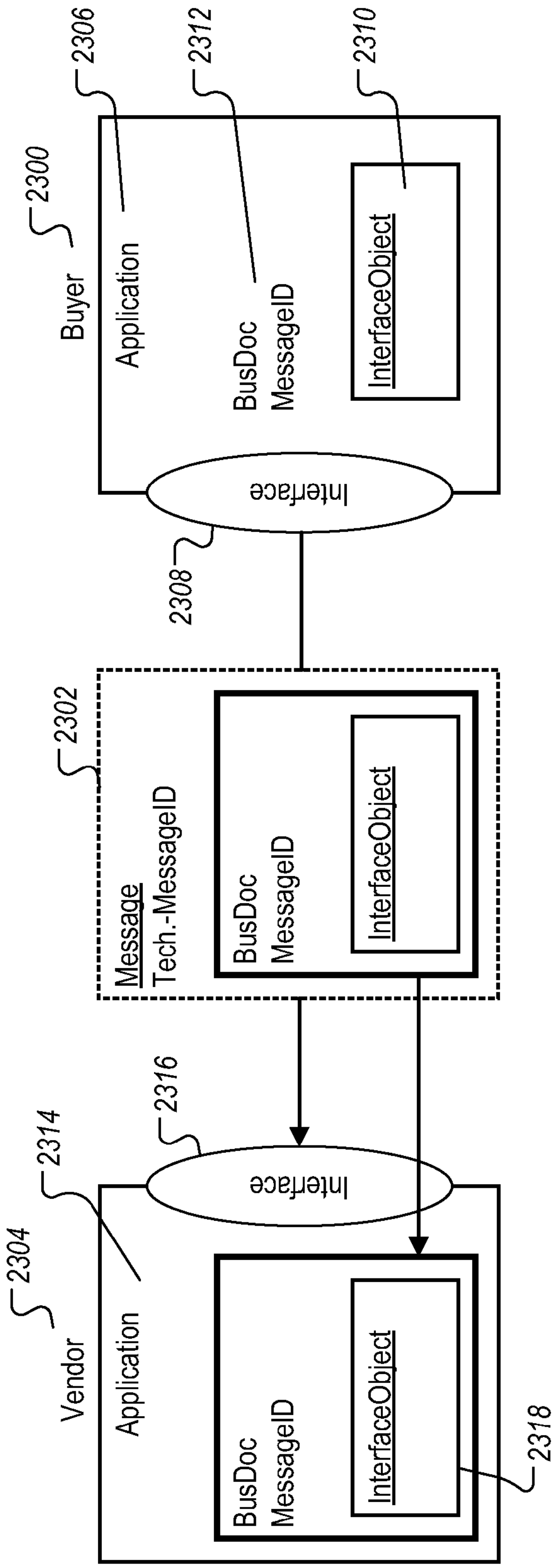
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
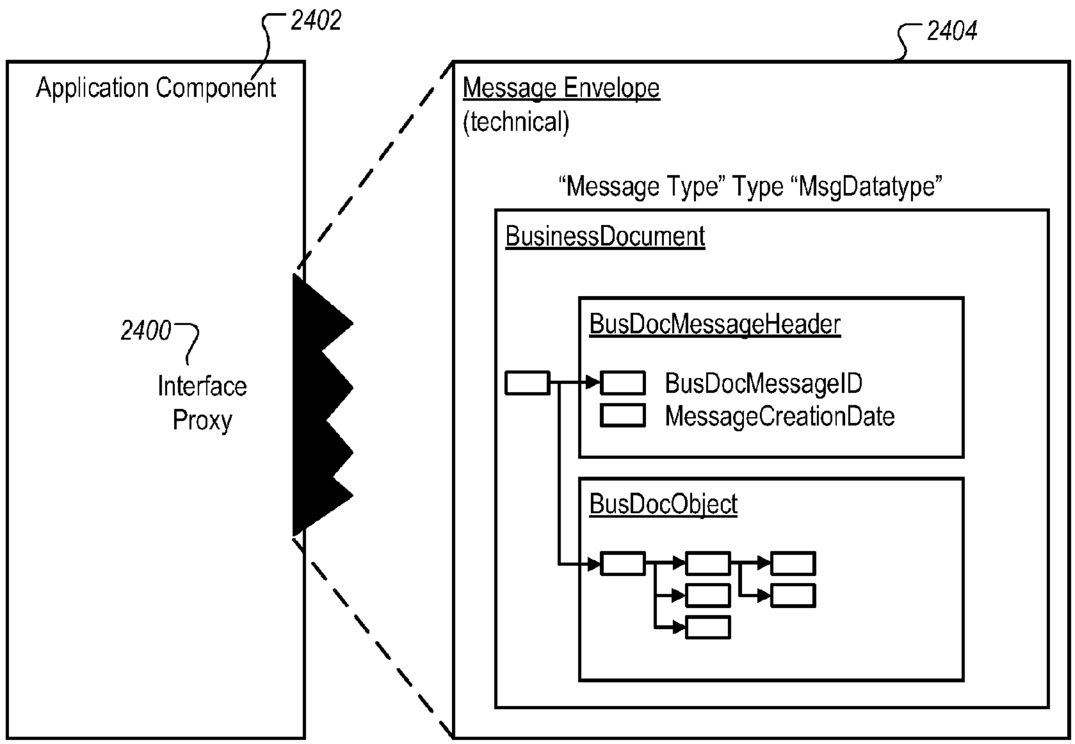
FIG. 24 depicts an interface proxy in accordance with methods and systems consistent with the subject matter described herein.
Figure 25:
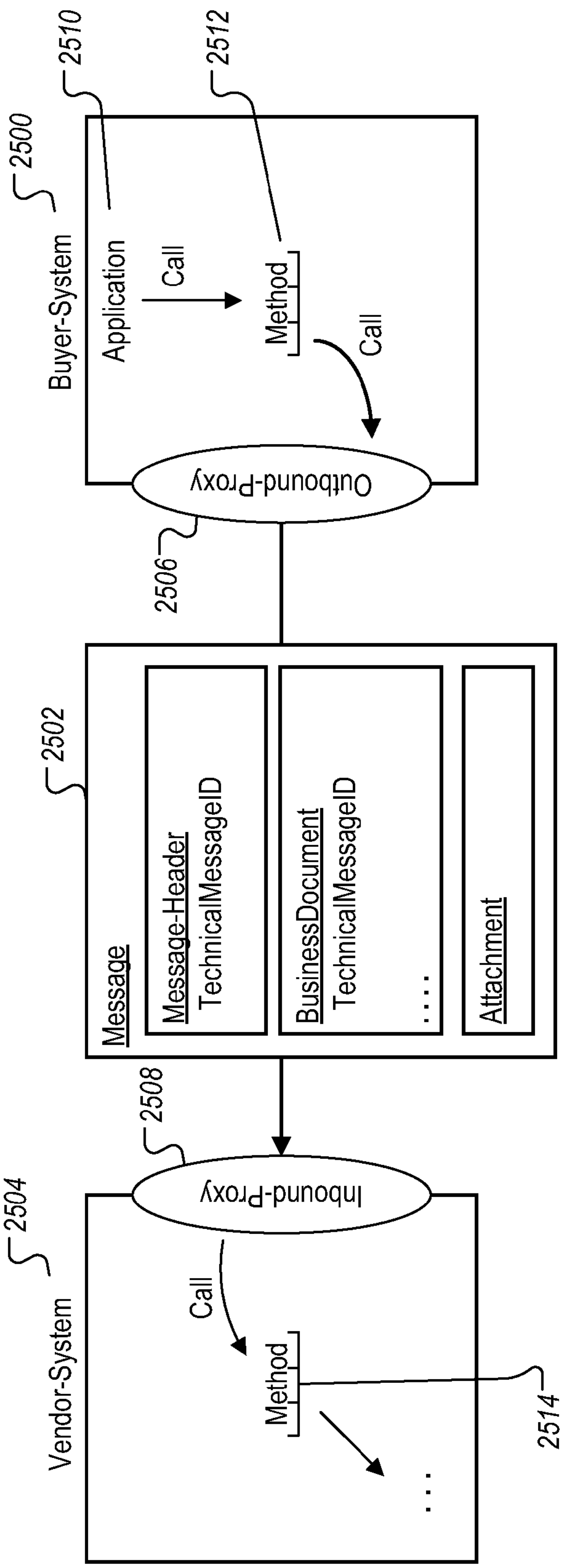
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
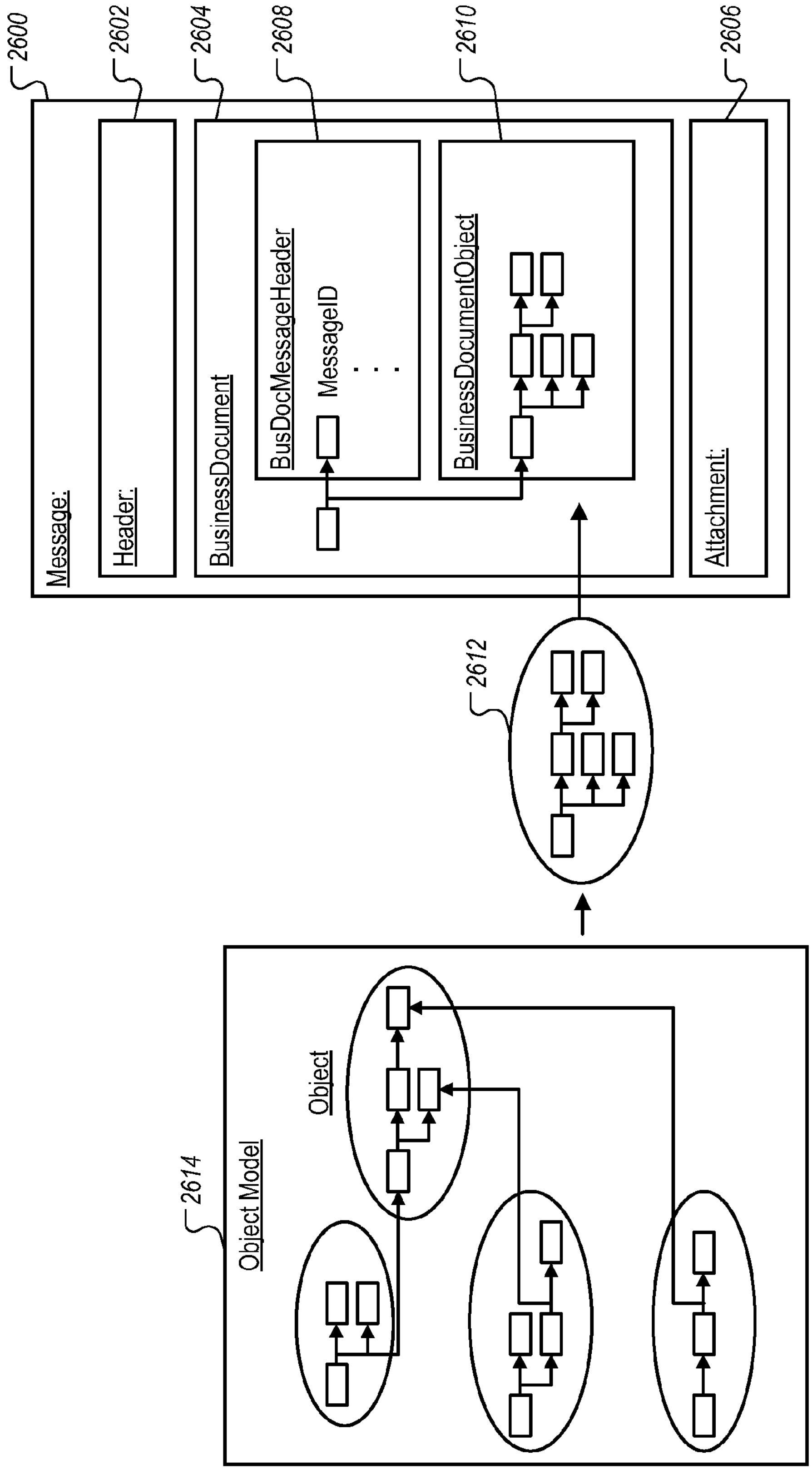
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
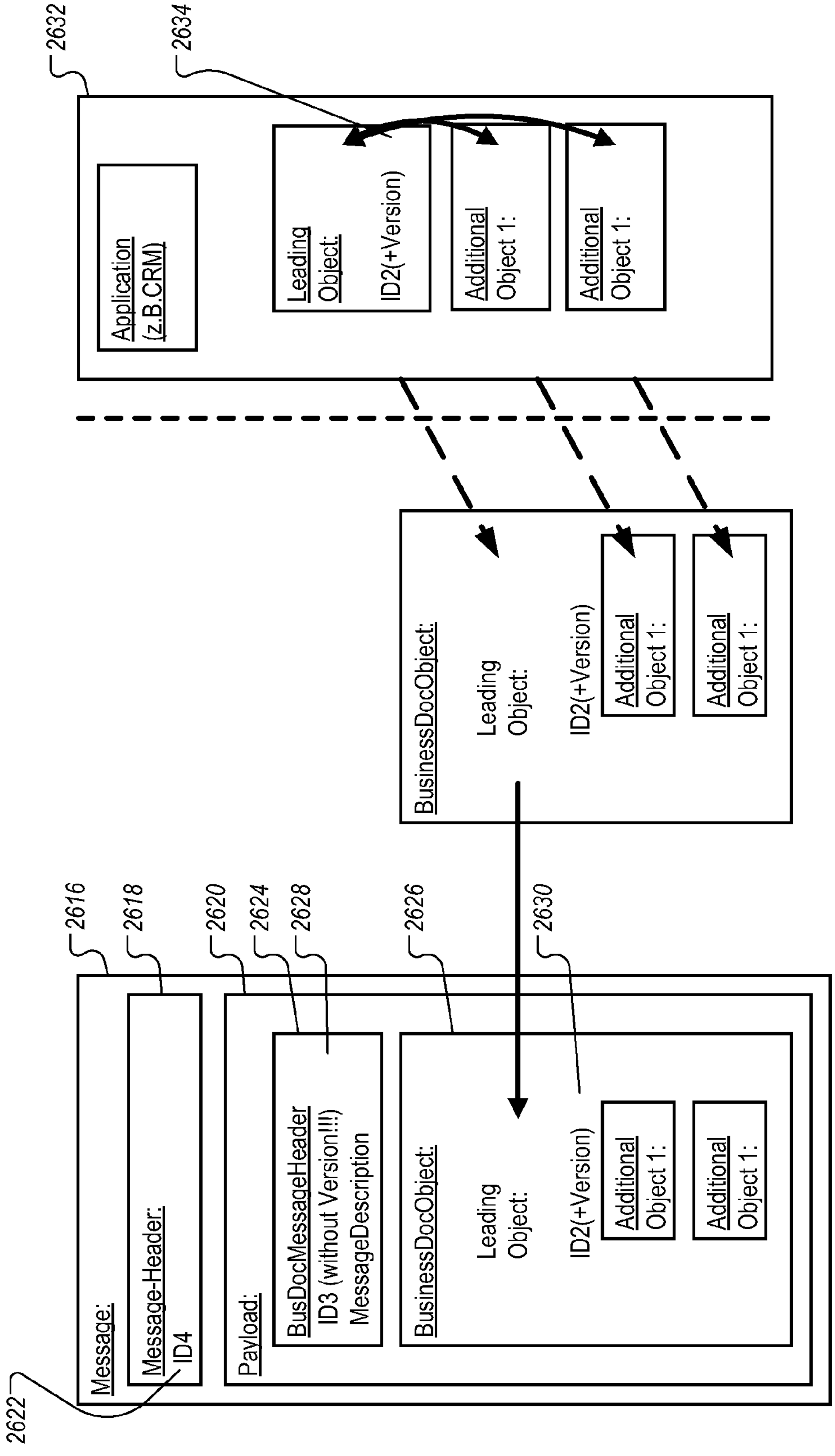
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
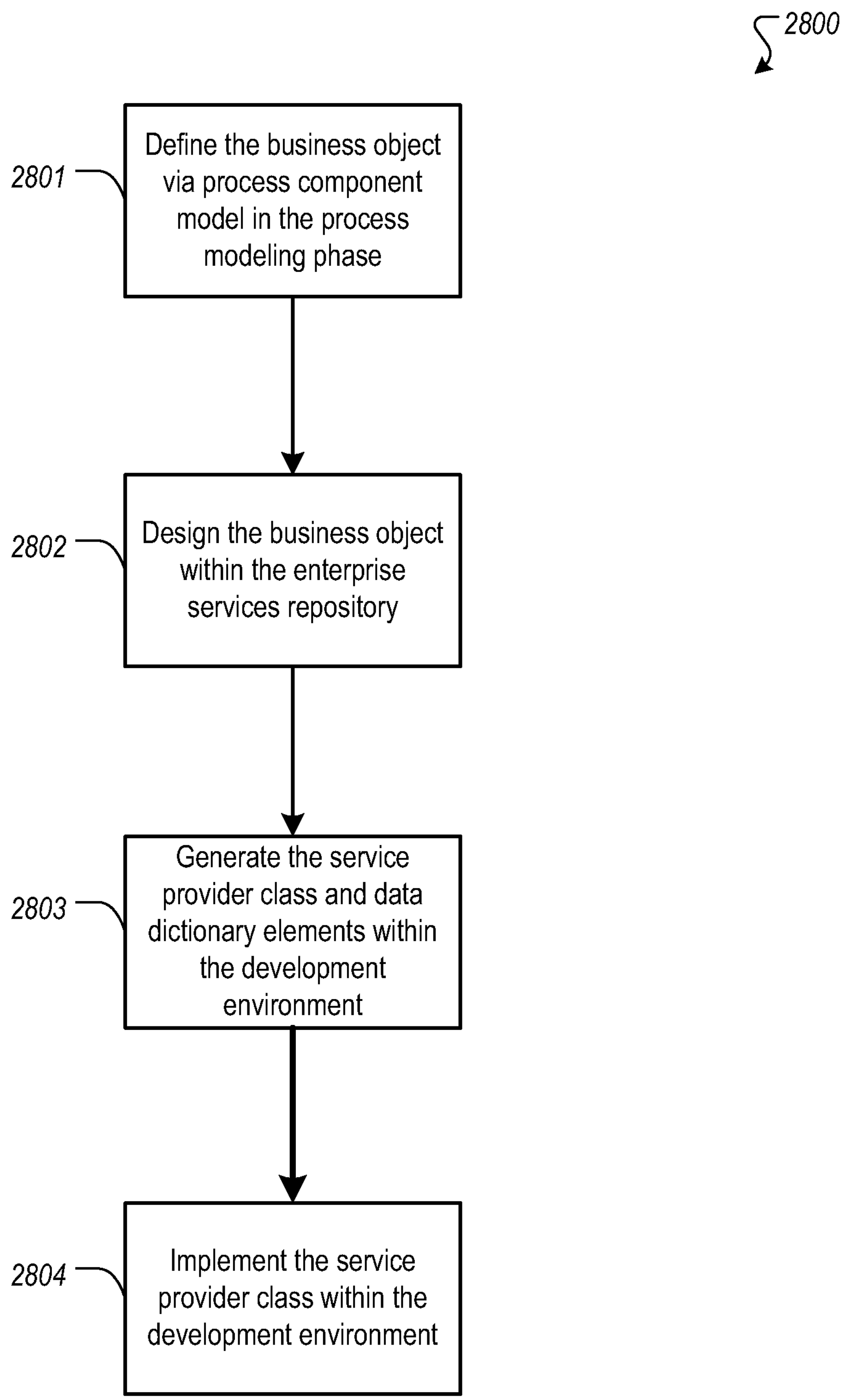
FIG. 28 illustrates an example method for service enabling in accordance with one embodiment of the present disclosure.
Figure 29:
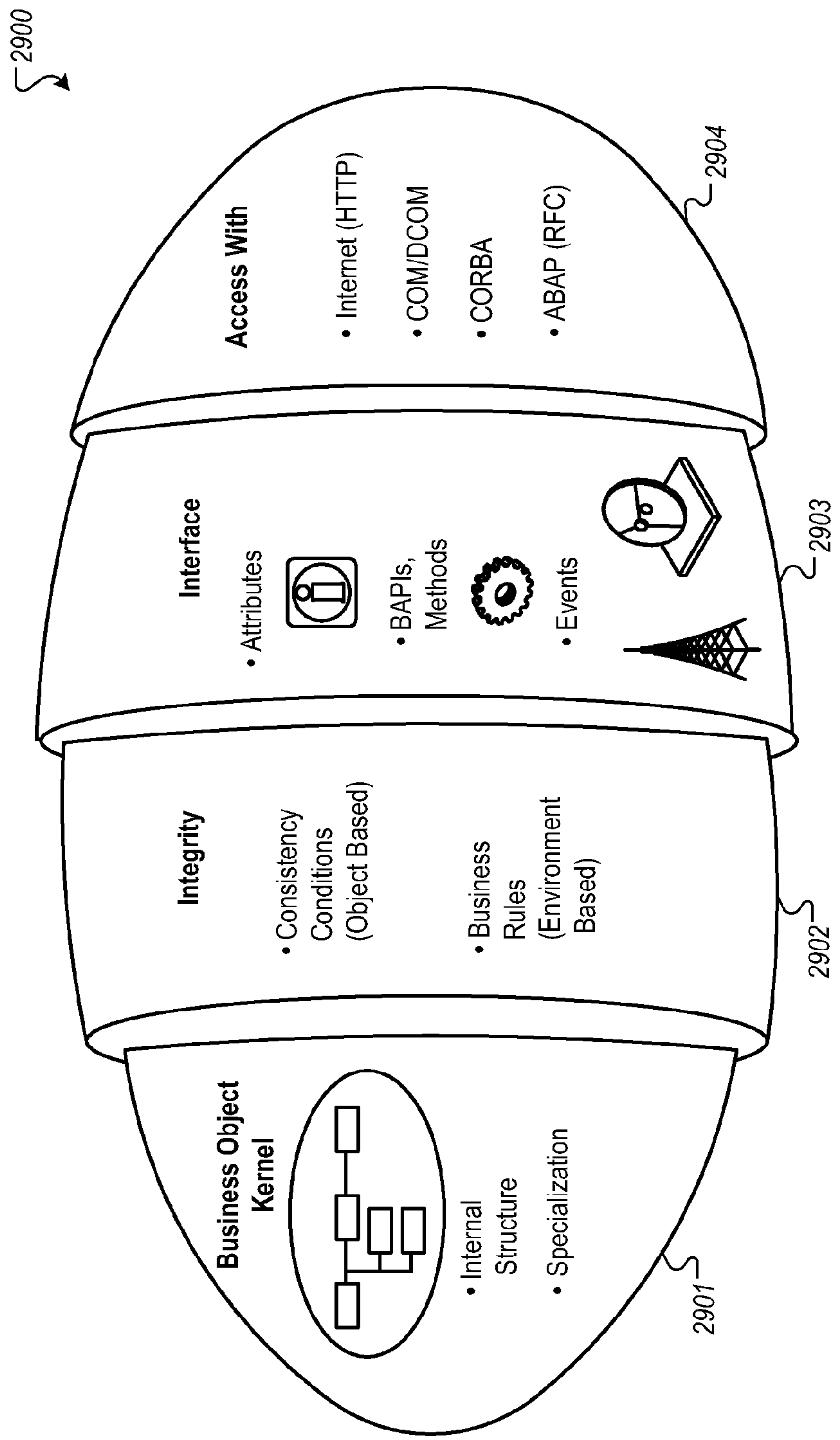
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
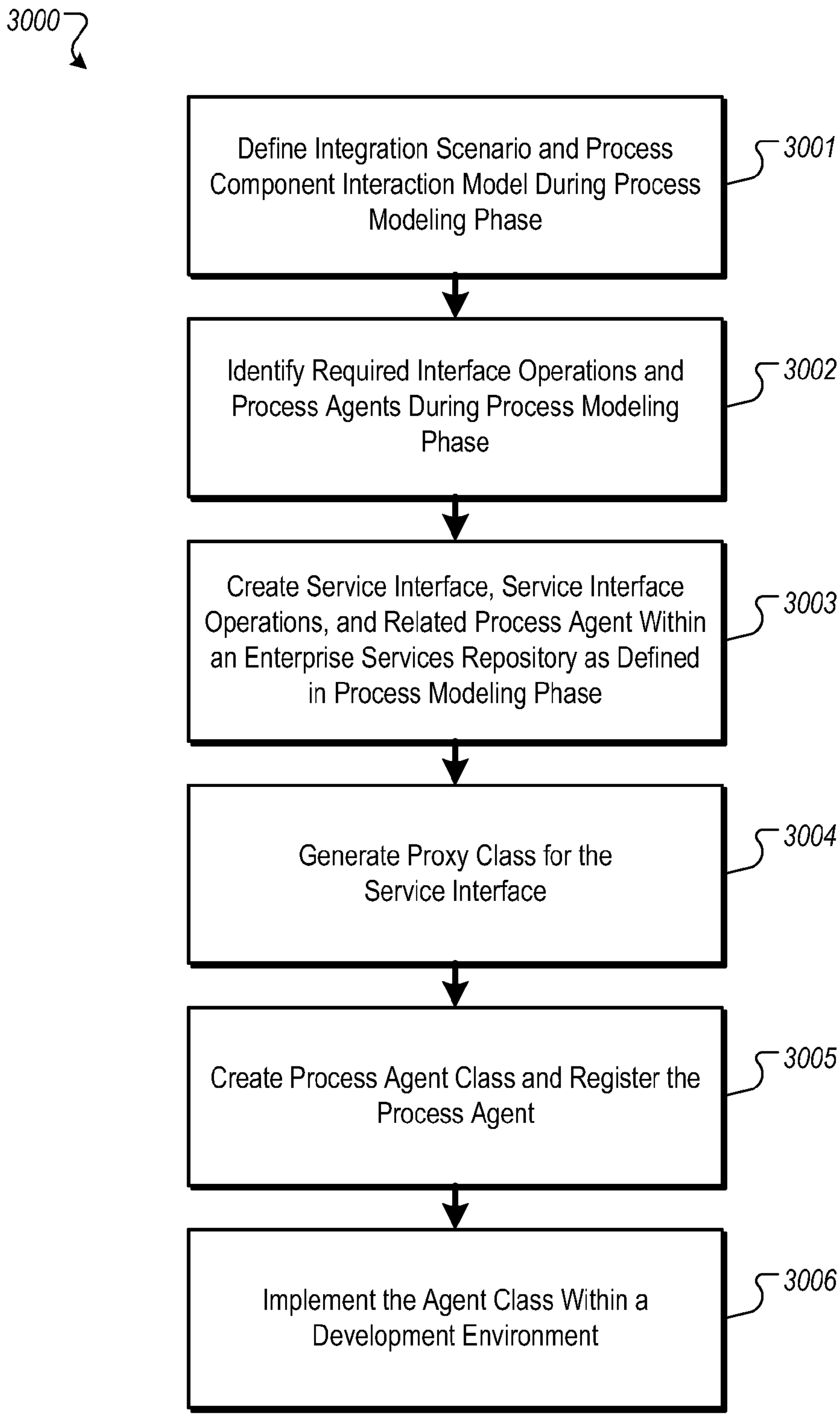
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
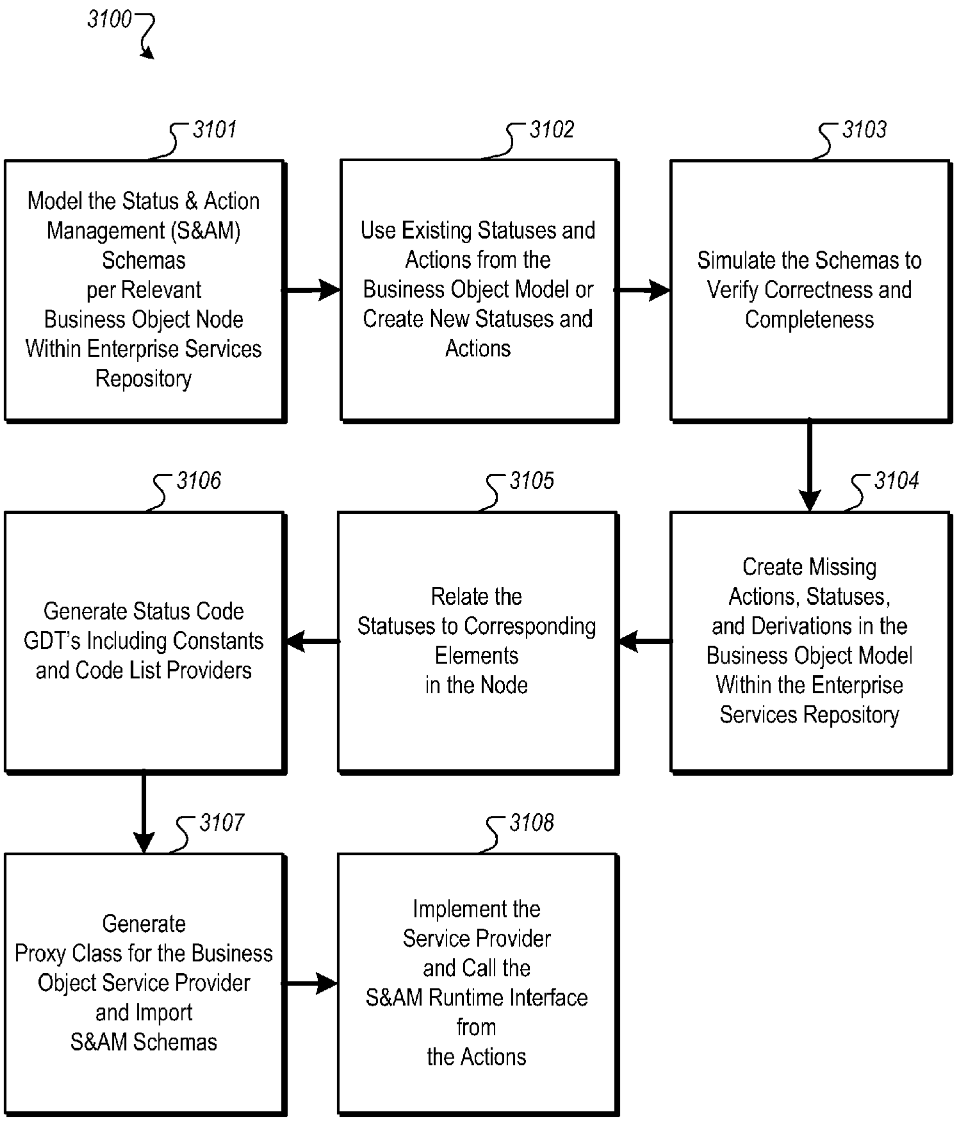
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figures 1, 32:
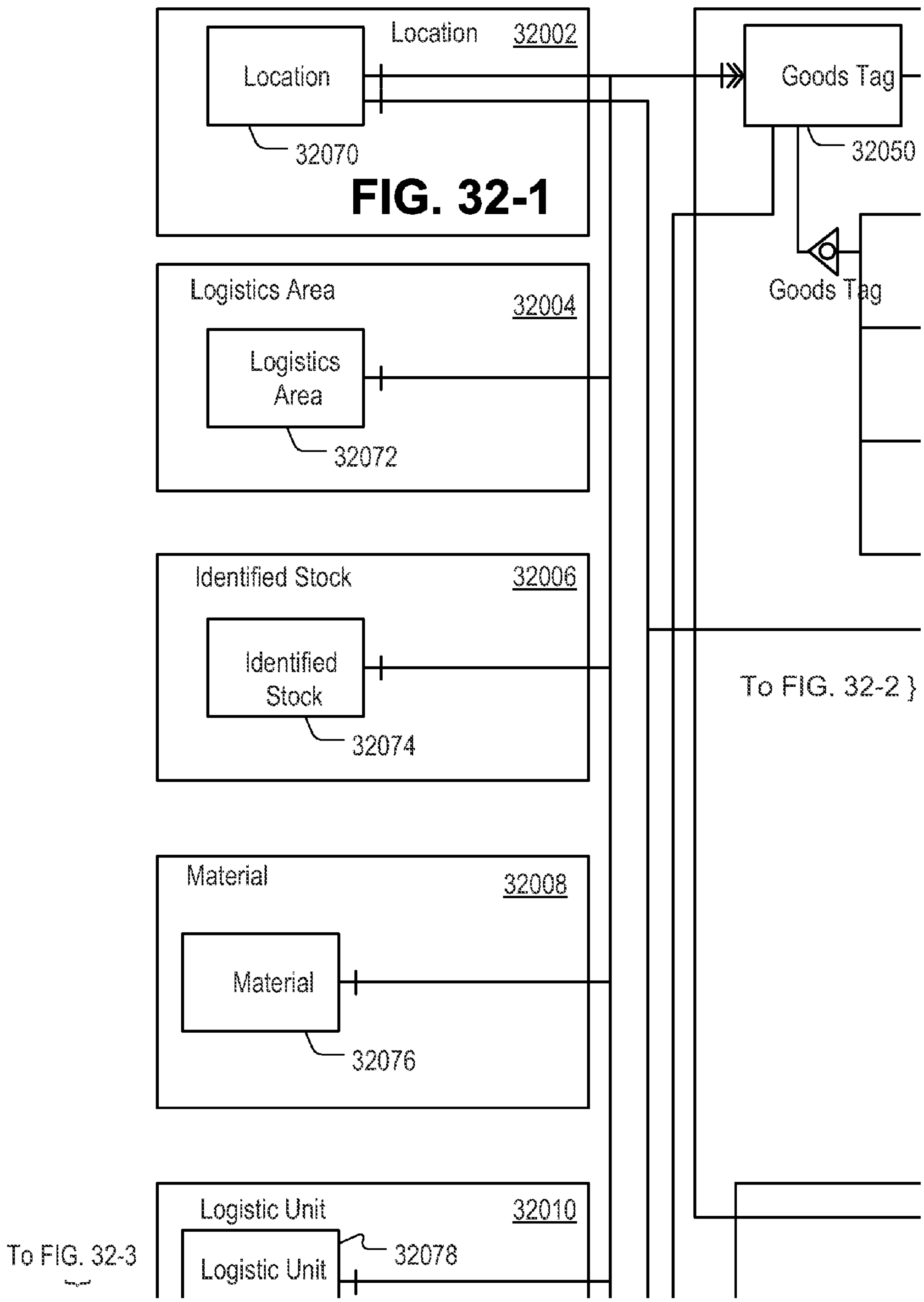
Figures 2, 32:
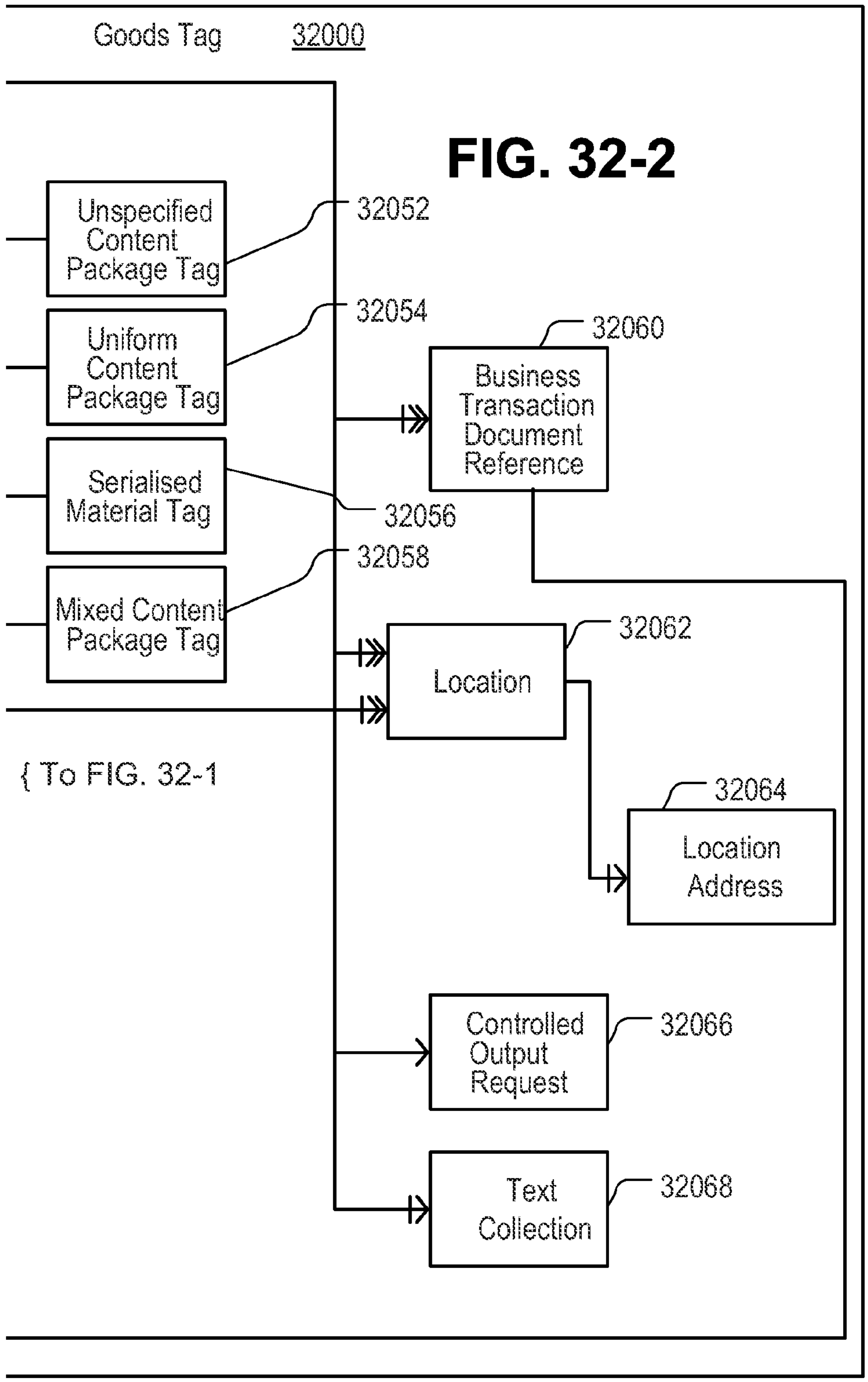
Figures 3, 32:
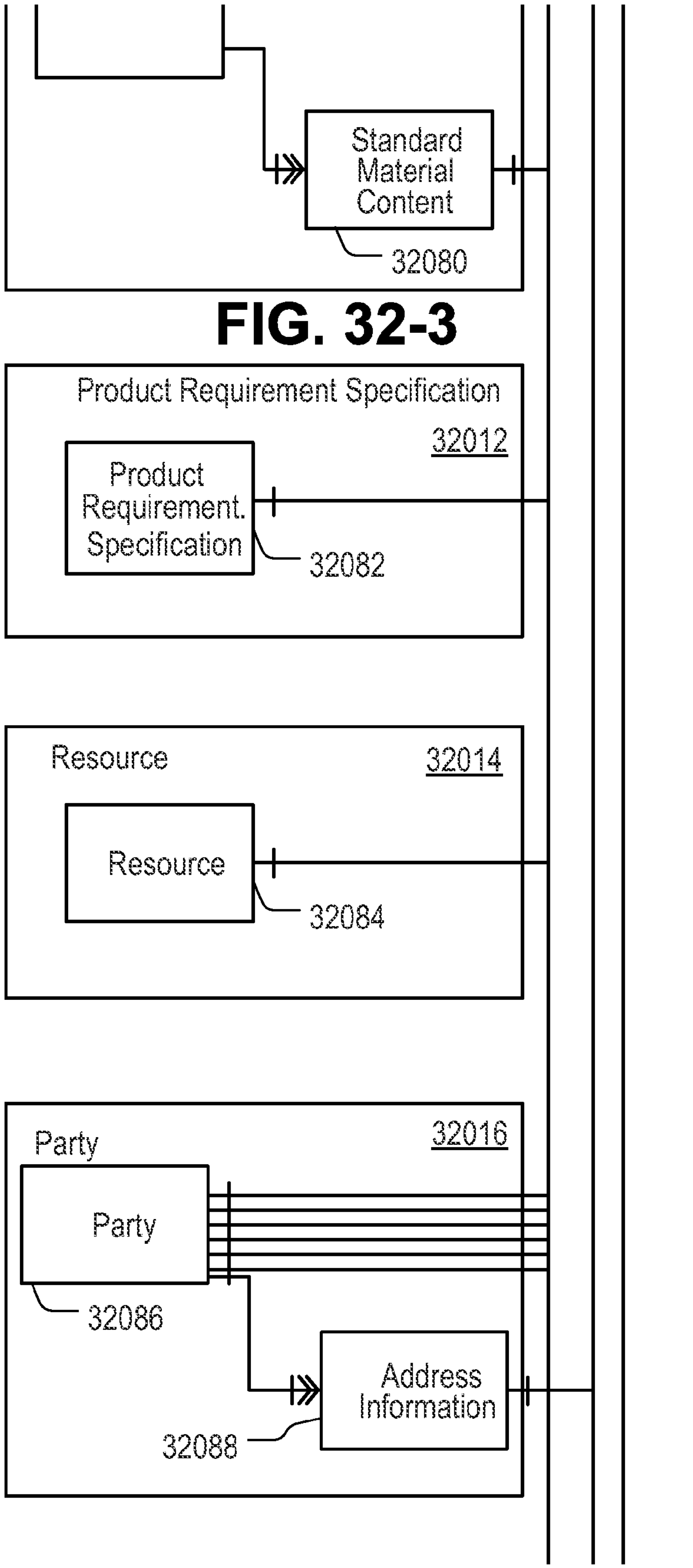
Figures 4, 32:
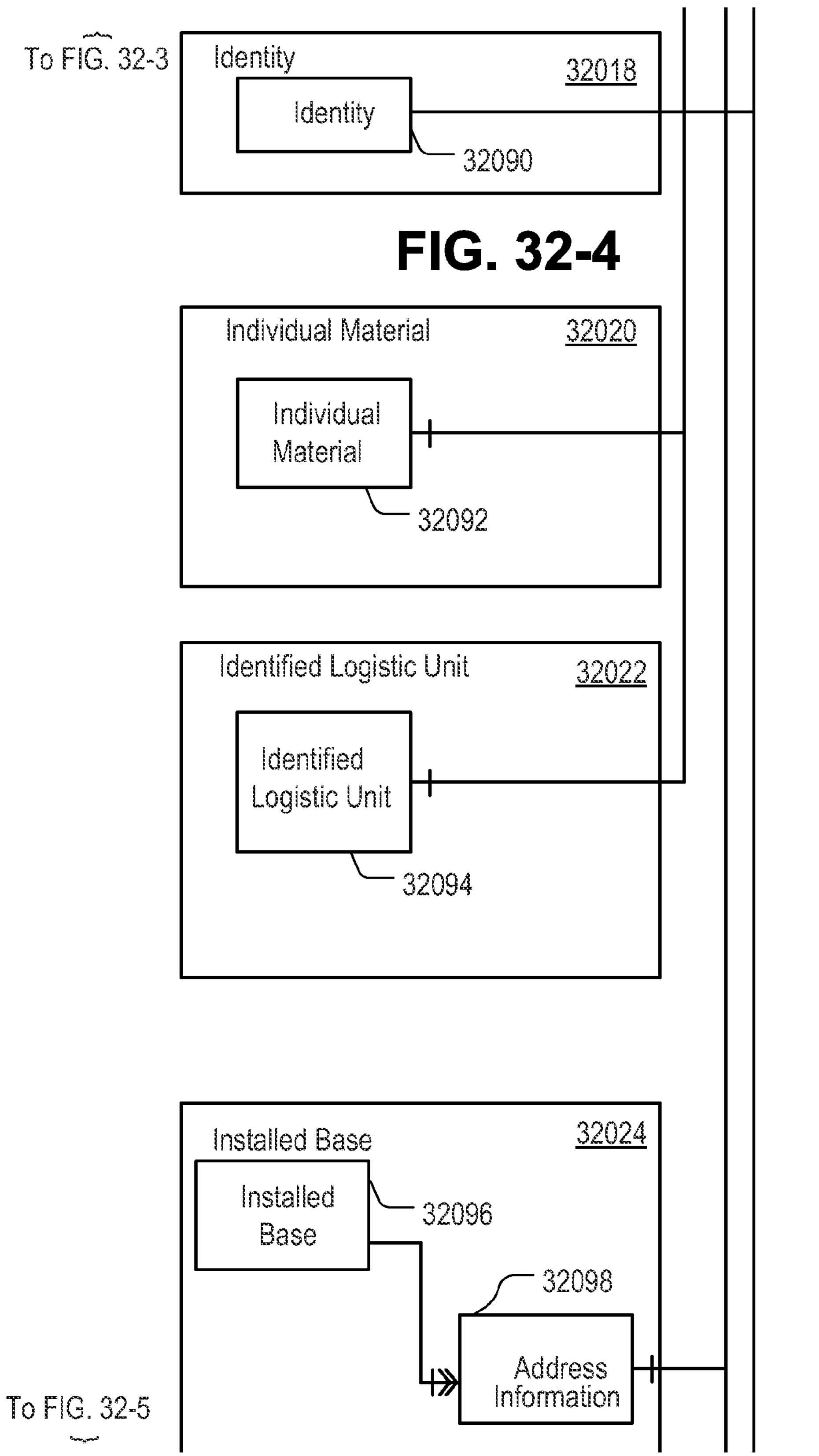
Figures 5, 32:
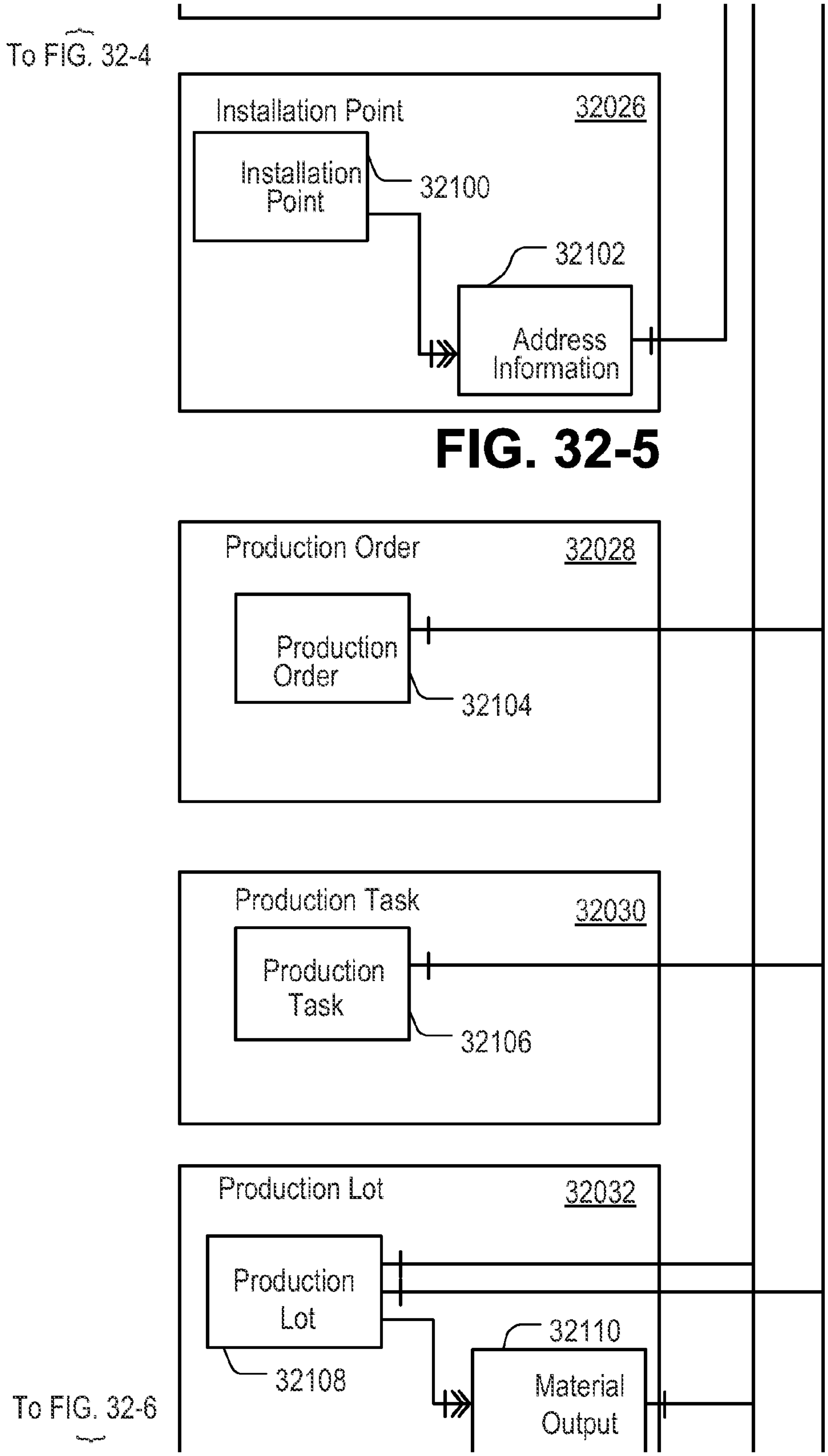
Figures 6, 32:
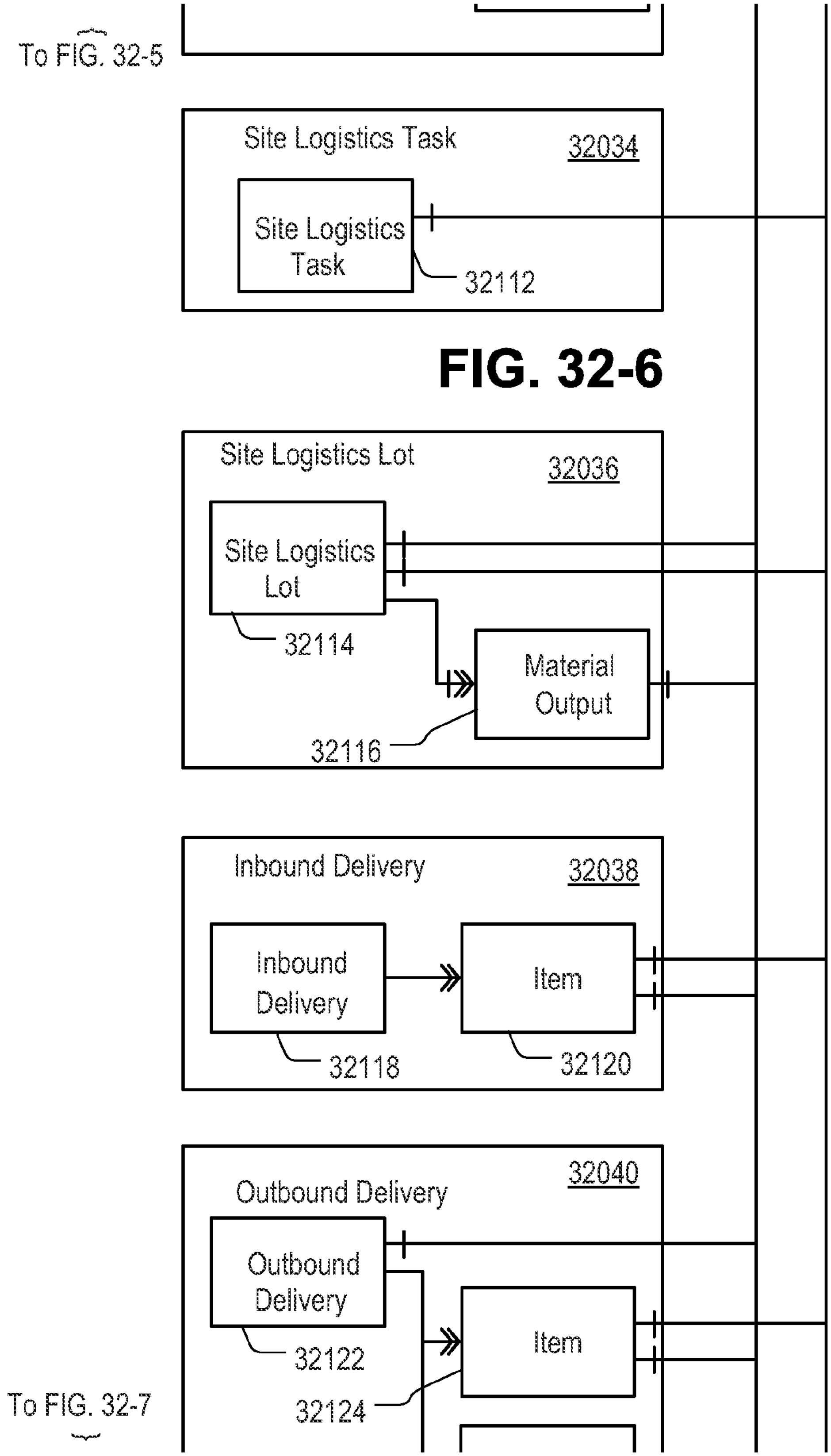
Figures 7, 32:
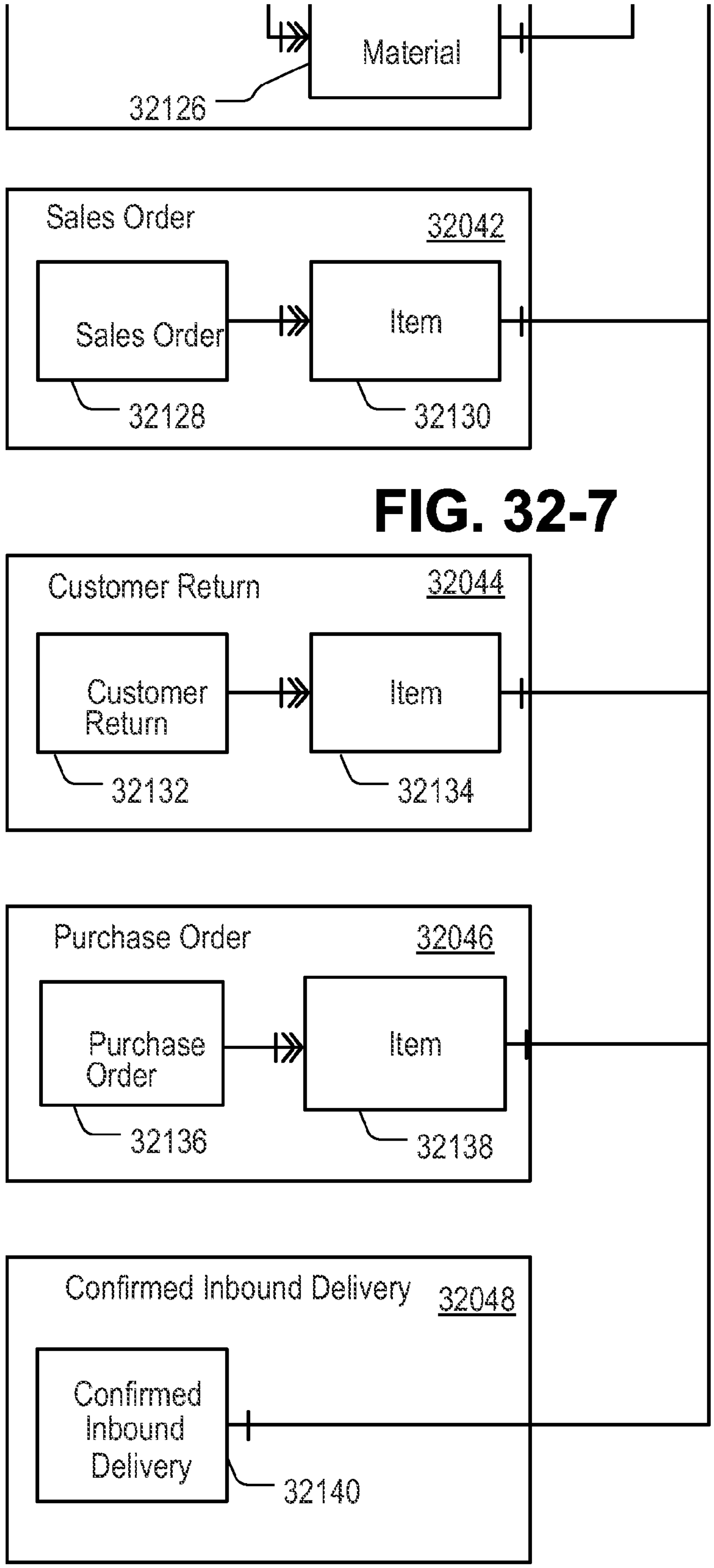

FIGS. 32-1 through 32-7 depict an example object model for a business object Goods Tag 32000. The business object 32000 has relationships with other objects 32002-32048, as shown with lines and arrows. The business object 32000 hierarchically comprises elements 32050-32068. The other objects 32002-32048 include respective elements 32070-32140 as shown.

The business object Goods Tag is an electronic device, a small piece or part, or a label that is attached to a product or package and that includes selected information about this product or package. It can present this information to a reader. The process component Goods Tag Processing includes the business object Goods Tag. The selected information can include descriptive and/or identification data. The observer can be a person or a technical device, such as, a bar code reader, a camera, or an RFID reader. Goods tags can be paper tags with or without bar codes, or RFID tags or transponders. They can be used for manual processes and/or in conjunction with bar code or RFID technology. In some implementations, Goods tags may not be used for tagging objects other than products or packages.

The Goods Tag business object includes information that will be printed on the tag, as well as a reference to the business transaction document that was the basis for the creation of the goods tag. It includes additional references to business transaction documents whose identifiers could be additionally printed on the label. It includes a text and an attachment that can be printed on the label.

The Goods Tag business object is involved in the Goods Tag ProcessingGoods Tag Processing process component interaction model. The technical name for Service Interface Goods Tag Output Out is GoodsTagProcessingGoodsTagOutputOut. The Service Interface Goods Tag Output Out is part of the Goods Tag ProcessingGoods Tag Processing process component interaction model. The Service Interface Goods Tag Output Out is an interface to group the operations that request the output of goods tags.

The technical name for Notify of Uniform Content Package Tag is GoodsTagProcessingGoodsTagOutputOut.NotifyOfUniformContentPackageTag. The Notify of Uniform Content Package Tag can request the output of goods tags of the type "uniform content package tag." The operation can be based on message type Form Uniform Content Package Tag Notification (derived from business object Goods Tag).

The technical name for Notify of Unspecified Content Package Tag is GoodsTagProcessingGoodsTagOutputOut.NotifyOfUnspecifiedContentPackageTag. The Notify of Unspecified Content Package Tag can request the output of goods tags of the type "unspecified content package tag." The operation can be based on message type Form Unspecified Content Package Tag Notification (derived from business object Goods Tag).

The technical name for Notify of Serialised Material Tag is GoodsTagProcessingGoodsTagOutputOut.NotifyOfSerialisedMaterialTag. The Notify of Serialised Material Tag can request the output of goods tags of the type "serialised material tag." The operation can be based on message type Form Serialised Material Tag Notification (derived from business object Goods Tag).

The business object Goods Tag is an electronic device, a small piece or part, or a label that includes selected information about a product or package. The Goods Tag can occur in the following specializations: Unspecified Content Package Tag, Uniform Content Package Tag, Serialised Material Tag, and Mixed Content Package Tag. In some implementations, specialization type Goods Tag can be implemented by Type Attribute.

The elements located at the node Goods Tag can be defined by the data type GoodsTagElements. These elements include: UUID, ID, PartySerialID, IndividualMaterialUUID, TypeCode, CreationContextCode, MaterialQuantity, MaterialQuantityTypeCode, BaseBusinessTransactionDocumentReference, ShippingDate ProductionDate, ReceiptDate, MaterialUUID, GlobalTradeItemNumberID, IdentifiedStockUUID, ProductRequirementSpecificationVersionUUID, LogisticUnitUUID, LogisticUnitStandardMaterialContentUUID, ResourceUUID, SiteUUID, LogisticsAreaUUID, BuyerPartyUUID, SellerPartyUUID, RecipientPartyUUID, VendorPartyUUID, CarrierPartyUUID, FreightForwarderPartyUUID, GrossWeightMeasure, GrossWeightMeasureTypeCode, GrossVolumeMeasure, GrossVolumeMeasureTypeCode, ShippingPackageAttachedIndicator, Incoterms, ProductSellerID, SystemAdministrativeData, GoodsTagAssignmentObjectNodeReference, IdentifiedLogisticUnitUUID, and TransportTracking.

UUID is a globally unique identifier and alternative key for a goods tag. It may be based on datatype GDT: UUID. In some implementations, UUID is used as an alternative key. ID is an identifier and alternative key for a goods tag. It may be based on datatype GDT: GoodsTagID. In some implementations, ID is used as an alternative key. PartySerialID is an identifier for an individual piece of material that is defined by an external system or party. It may be based on datatype GDT: SerialID, Qualifier: Party. IndividualMaterialUUID is a globally unique identifier for an individual piece of material. It may be based on datatype GDT: UUID. TypeCode is a coded representation of the type of the goods tag. It may be based on datatype GDT: GoodsTagTypeCode. CreationContextCode is a coded representation of the context within which the goods tag was created, for example, Inbound, Outbound, or Production. It may be based on datatype GDT: GoodsTagCreationContextCode. MaterialQuantity is a quantity of the tagged product or package content. It may be based on datatype GDT: Quantity, Qualifier: Material. MaterialQuantityTypeCode is a coded representation of the quantity type of the tagged product or package content. It may be based on datatype GDT: QuantityTypeCode, Qualifier: Material. BaseBusinessTransactionDocumentReference is a reference to the business transaction document that was the basis for the creation of the goods tag. It may be based on datatype GDT: BusinessTransactionDocumentReference, Qualifier: Base. ShippingDate represents a point in time at which the tagged product or package is shipped. It may be based on datatype GDT: Date, Qualifier: Shipping. ProductionDate represents a point in time at which the tagged product or package content is produced. It may be based on datatype GDT: Date, Qualifier: Production. ReceiptDate represents a point in time at which the tagged product or package is received. It may be based on datatype GDT: Date, Qualifier: Receipt. MaterialUUID is a globally unique identifier for the material that is tagged by the goods tag or that is included in the tagged package. It may be based on datatype GDT: UUID. GlobalTradeItemNumberID is a quantity-dependent identifier for the product following the European Article Numbering and Uniform Code Council system. It may be based on datatype GDT: ProductStandardID. IdentifiedStockUUID is a globally unique identifier for the identified stock of the tagged product or of the content of the tagged package. It may be based on datatype GDT: UUID. ProductRequirementSpecificationVersionUUID is a globally unique identifier for the product requirement specification version that specifies the tagged product or the content of the tagged package. It may be based on datatype GDT: UUID. LogisticUnitUUID is a globally unique identifier for the logistic unit of the package that is tagged by the goods tag. It may be based on datatype GDT: UUID. LogisticUnitStandardMaterialContentUUID is a globally unique identifier for the standard material content of the assigned logistic unit for the assigned material. It may be based on datatype GDT: UUID. ResourceUUID is a globally unique identifier for the resource that was used to produce the tagged product or the content of the tagged package. It may be based on datatype GDT: UUID. SiteUUID is a globally unique identifier for the site that is assigned to the goods tag. It may be based on datatype GDT: UUID. LogisticsAreaUUID is a globally unique identifier for the logistics area that is assigned to the goods tag. It may be based on datatype GDT: UUID. BuyerPartyUUID is a globally unique identifier for the party who buys the tagged product or package. It may be based on datatype GDT: UUID. SellerPartyUUID is a globally unique identifier for the party who sells the tagged product or package. It may be based on datatype GDT: UUID. RecipientPartyUUID is a globally unique identifier for the party who receives the tagged product or package. It may be based on datatype GDT: UUID. VendorPartyUUID is a globally unique identifier for the party who delivers the tagged product or package. It may be based on datatype GDT: UUID. CarrierPartyUUID is a globally unique identifier for the party responsible for the transportation of the tagged product or package. It may be based on datatype GDT: UUID. FreightForwarderPartyUUID is a globally unique identifier for the party responsible for organizing the transportation of the tagged product or package. It may be based on datatype GDT: UUID. GrossWeightMeasure is a measure for the gross weight of the tagged product or package. It may be based on datatype GDT: Measure, Qualifier: GrossWeight. GrossWeightMeasureTypeCode is a coded representation of the gross weight type of the tagged product or package. It may be based on datatype GDT: MeasureTypeCode, Qualifier: GrossWeight. GrossVolumeMeasure is a measure for the gross volume of the tagged product or package. It may be based on datatype GDT: Measure, Qualifier: GrossVolume. GrossVolumeMeasureTypeCode is a coded representation of the gross volume type of the tagged product or package. It may be based on datatype GDT: MeasureTypeCode, Qualifier: GrossVolume. ShippingPackageAttachedIndicator is an indicator that specifies whether the goods tag is attached to a shipping package. It may be based on datatype GDT: Indicator, Qualifier: Attached. Incoterms represents contract formulations for the delivery of the tagged product or package. It may be based on datatype GDT: Incoterms. ProductSellerID is an identifier for the tagged product that was defined by the seller of the tagged product or package. It may be based on datatype GDT: ProductPartyID. ProductBuyerID is an identifier for the tagged product that was defined by the buyer of the tagged product or package. It may be based on datatype GDT: ProductPartyID. SystemAdministrativeData is administrative data recorded by the system. This data includes system users and change dates or times. It may be based on datatype GDT: SystemAdministrativeData. GoodsTagAssignmentObjectNodeReference is a generic reference to the node to which the goods tag shall be assigned automatically. It may be based on datatype GDT: ObjectNodeReference. IdentifiedLogisticUnitUUID is a globally unique identifier for the identified logistic unit that is tagged by the goods tag. It may be based on datatype GDT: UUID. TransportTracking is transport-related information that can be used for tracking the tagged product or package. It may be based on datatype GDT: TransportTracking.

A composition relationship to a BusinessTransactionDocumentReference subordinate node can exist with a 1:CN cardinality relationship. This relationship may be filtered. The filter elements can be defined by the data type GoodsTagBusinessTransactionDocumentReferenceFilterElements. These elements include BusinessTransactionDocumentTypeCode and BusinessTransactionDocumentItem TypeCode. BusinessTransactionDocumentTypeCode may be based on datatype GDT: BusinessTransactionDocumentTypeCode. BusinessTransactionDocumentItemTypeCode may be based on datatype GDT: BusinessTransactionDocumentItemTypeCode. A composition relationship to a Location subordinate node can exist in a 1:CN cardinality relationship. A composition relationship to a Controlled OutputRequest subordinate node can exist in a 1:1 cardinality relationship. A composition relationship to a TextCollection subordinate node can exist in a 1:C cardinality relationship.

An inbound aggregation relationship may exist from the business object Identified Logistic Unit/node Identified Logistic Unit to IdentifiedLogisticUnit with a cardinality of C:CN, which may represent an identified logistic unit that is tagged by the goods tag. An inbound aggregation relationship may exist from the business object Identified Stock/node Identified Stock to IdentifiedStock with a cardinality of C:CN, which may represent an identified stock of the product or the content of the package that is tagged by the goods tag. An inbound aggregation relationship may exist from the business object Individual Material/node Individual Material to IndividualMaterial with a cardinality of C:CN, which may represent an individual material that is directly tagged by the goods tag. An inbound aggregation relationship may exist from the business object Location/node Location to Site with a cardinality of C:CN, which may represent a site to which the goods tag is assigned. An inbound aggregation relationship may exist from the business object Logistic Unit/node Logistic Unit to LogisticUnit with a cardinality of C:CN, which may represent a logistic unit of the package that is tagged by the goods tag. An inbound aggregation relationship may exist from the business object Logistic Unit/node Standard Material Content to LogisticUnitStandardMaterialContent with a cardinality of C:CN, which may represent a logistic unit standard material content for the assigned material and logistic unit. An inbound aggregation relationship may exist from the business object Logistics Area/node Logistics Area to LogisticsArea with a cardinality of C:CN, which may represent a logistics area to which the goods tag is assigned. An inbound aggregation relationship may exist from the business object Material/node Material to Material with a cardinality of C:CN, which may represent material included in the tagged package or the material that is directly tagged by the goods tag. An inbound aggregation relationship may exist from the business object Party/node Party to VendorParty with a cardinality of C:CN, which may represent a vendor party of the product or package. An inbound aggregation relationship may exist from the business object Party/node Party to BuyerParty with a cardinality of C:CN, which may represent a buyer party of the product or package. An inbound aggregation relationship may exist from the business object Party/node Party to RecipientParty with a cardinality of C:CN, which may represent a recipient party of the product or package. An inbound aggregation relationship may exist from the business object Party/node Party to CarrierParty with a cardinality of C:CN, which may represent a carrier party of the product or package. An inbound aggregation relationship may exist from the business object Party/node Party to SellerParty with a cardinality of C:CN, which may represent a seller party of the product or package. An inbound aggregation relationship may exist from the business object Party/node Party to FreightForwarderParty with a cardinality of C:CN, which may represent a freight forwarder of the product or package. An inbound aggregation relationship may exist from the business object Product Requirement Specification/node Product Requirement Specification to ProductRequirementSpecification with a cardinality of C:CN, which may represent a product requirement specification that specifies the content of the tagged package or the tagged product. An inbound aggregation relationship may exist from the business object Resource/node Resource to Resource with a cardinality of C:CN, which may represent the last resource on which the tagged product or package was produced.

An inbound association relationship may exist from the business object Identity/node Identity to CreationIdentity with a cardinality of 1:CN, which may represent the identity that created the goods tag. An inbound association relationship may exist from the business object Inbound Delivery/node Item to InboundDeliveryItem with a cardinality of C:CN, which may represent the inbound delivery item that was the basis document for the creation of the goods tag. An inbound association relationship may exist from the business object Outbound Delivery/node Item to OutboundDeliveryItem with a cardinality of C:CN, which may represent an outbound delivery item that was the basis document for the creation of the goods tag. An inbound association relationship may exist from the business object Outbound Delivery/node Material to OutboundDeliveryMaterial with a cardinality of C:CN, which may represent a material node of an outbound delivery for which a goods tag assignment will be created. An inbound association relationship may exist from the business object Outbound Delivery/node Outbound Delivery to OutboundDelivery with a cardinality of C:CN, which may represent an outbound delivery for which a goods tag assignment will be created. An inbound association relationship may exist from the business object Production Lot/node Material Output to ProductionLotMaterialOutput with a cardinality of C:CN, which may represent a material output node of a production lot for which a goods tag assignment will be created. An inbound association relationship may exist from the business object Production Lot/node Production Lot to ProductionLot with a cardinality of C:CN, which may represent a production lot that was the basis document for the creation of the goods tag. An inbound association relationship may exist from the business object Site Logistics Lot/node Material Output to SiteLogisticsLotMaterialOutput with a cardinality of C:CN, which may represent a material output node of a site logistics lot for which a goods tag assignment will be created. An inbound association relationship may exist from the business object Site Logistics Lot/node Site Logistics Lot to SiteLogisticsLot with a cardinality of C:CN, which may represent a site logistics lot that was the basis document for the creation of the goods tag.

A specialization association for navigation relationship may exist from the business object Material/node Overview to MaterialOverview with a target cardinality of :CN, which may represent an overview of the Material contained by the tagged package or the Material that is directly tagged by the GoodsTag. A specialization association for navigation relationship may exist from the business object IndividualMaterial/node Overview to IndividualMaterialOverview with a target cardinality of :CN, which may represent an overview of the Individual Material that is directly tagged by the Goods Tag. A specialization association for navigation relationship may exist from the business object UsedAddress/node Root to ShipFromAddress with a target cardinality of :CN, which may represent an address of the location from which the tagged product or package is shipped. A specialization association for navigation relationship may exist from the business object UsedAddress/node Root to ShipToAddress with a target cardinality of :CN, which may represent an address of the location to which the tagged product or package is shipped.

Units of measure and factor are both maintained or both initial for measures and quantities. No identified stock is maintained if no material is maintained. If an identified stock is maintained, it exists for the maintained material. The quantity type code can be convertible to the base quantity type code of the material.

Goods Tag may be associated with the following enterprise service infrastructure actions: ApplyIdentifiedLogisticUnitChanges, and RemoveFromIdentifiedLogisticUnit. ApplyIdentifiedLogisticUnitChanges applies changes of identified logistic unit to the assigned goods tags. Gross weight, gross volume and the shipping package attached indicator of the goods tag are adapted based on the changes of the respective identified logistic unit. If there are changes to the object, gross weight, gross volume and the shipping package attached indicator are adapted based on the information of the identified logistic units. RemoveFromIdentifiedLogisticUnit removes a goods tag from an identified logistic unit. If there are changes to the object, the universally unique identified logistic unit identifier in the goods tag that denotes the identified logistic unit that the goods tag is attached to gets reset. Goods Tag may be associated with a Query By Elements query. Query By Elements returns a list of all goods tags according to the specified selection elements. The goods tags that fulfill the selection conditions for the following attributes include: ID, External Serial ID, Type Code, Creation Context Code, Quantity, Quantity Type Code, Creation Business Transaction Document Reference, Business Transaction Document Reference, Shipping Date, Production Date, Receipt Date, Material ID, Global Trade Item Number ID, Identified Stock ID, Product Requirement Specification ID, Logistic Unit ID, Resource ID, Logistic Area ID, Buyer Party ID, Seller Party ID, Vendor Party ID, Recipient Party ID, Carrier Party ID, Freight Forwarder ID, Gross Weight, Gross Weight Type Code, Gross Volume, Gross Volume Type Code, Shipping Package Attached Indicator, Incoterms, Product Seller ID, Product Buyer ID, System-Administratrive Data.

The query elements can be defined by the data type Goods TagElementsQueryElements. These elements include: ID, PartySerialID, SerialID, TypeCode, CreationContextCode, MaterialQuantity, MaterialQuantityTypeCode, BaseBusinessTransactionDocumentReference, BusinessTransactionDocumentReference, ShippingDate, ProductionDate, ReceiptDate, MaterialKey, GlobalTradeItemNumberID, IdentifiedStockKey, ProductRequirementSpecificationKey, LogisticUnitID, ResourceID, LogisticsAreaKey, BuyerPartyKey, SellerPartyKey, VendorPartyKey, RecipientPartyKey, FreightForwarderPartyKey, CarrierPartyKey, GrossWeightMeasure, GrossWeightMeasureTypeCode, GrossVolumeMeasure, GrossVolumeMeasureTypeCode, ShippingPackageAttachedIndicator, Incoterms, ProductSellerID, ProductBuyerID, SystemAdministrativeData, IdentifiedLogisticUnitInternalID, and TransportTracking. MaterialKey includes the ProductTypeCode, ProductIdentifierTypeCode, the ProductID elements. IdentifiedStockKey includes the IdentifiedStockID and MaterialKey elements. ProductRequirementSpecificationKey includes the RequirementSpecificationID and RequirementSpecificationVersionID elements. LogisticsAreaKey includes the ID, SiteID, elements. BuyerPartyKey, SellerPartyKey, VendorPartyKey, RecipientPartyKey, FreightForwarderPartyKey, and CarrierPartyKey, include the PartyTypeCode and PartyID elements. SystemAdministrativeData includes the CreationDateTime, CreationIdentityUUID, CreationIdentityID, CreationIdentityBusinessPartnerinternalID, CreationIdentityBusiness PartnerPersonFamilyName, CreationIdentityBusinessPartnerPersonGivenName, CreationIdentityEmployeeID, LastChangeDateTime, LastChange IdentityUUID, LastChangeIdentityID, LastChangeIdentityBusinessPartnerInternalID, LastChangeIdentityBusinessPartner PersonFamilyName, LastChangeIdentityBusinessPartner PersonGivenName, and LastChangeIdentity EmployeeID elements. ID may be based on datatype GDT: GoodsTagID. PartySerialID may be based on datatype GDT: SerialID, Qualifier: Party. SerialID may be based on datatype GDT: SerialID. TypeCode may be based on datatype GDT: Goods TagTypeCode. CreationContextCode may be based on datatype GDT: GoodsTagCreationContextCode. MaterialQuantity may be based on datatype GDT: Quantity, Qualifier: Material. MaterialQuantityTypeCode may be based on datatype GDT: QuantityTypeCode, Qualifier: Material. BaseBusinessTransactionDocumentReference may be based on datatype GDT: BusinessTransactionDocumentReference, Qualifier: Base. BusinessTransactionDocumentReference may be based on datatype GDT: BusinessTransactionDocumentReference. ShippingDate may be based on datatype GDT: Date, Qualifier: Shipping. ProductionDate may be based on datatype GDT: Date, Qualifier: Production. ReceiptDate may be based on datatype GDT: Date, Qualifier: Receipt. MaterialKey is a grouping of elements that uniquely identifies a material, a sub-quantity of which is identified by the identified stock. It may be based on datatype KDT: ProductKey. ProductTypeCode is a coded representation of a product type such as a material or service. It may be based on datatype GDT: ProductTypeCode. ProductIdentifierTypeCode is a coded representation of a product identifier type. It may be based on datatype GDT: ProductIdentifierTypeCode. ProductID is an identifier for a product. It may be based on datatype GDT: ProductID. GlobalTradeItemNumberID may be based on datatype GDT: ProductStandardID. IdentifiedStockKey may be based on datatype KDT: IdentifiedStockKey. IdentifiedStockID is an identifier for the identified stock in the context of a material ID. It may be based on datatype GDT: IdentifiedStockID. ProductRequirementSpecificationKey may be based on datatype KDT: RequirementSpecificationKey. RequirementSpecificationID is an identifier for a requirement specification that is unique within one system. It may be based on datatype GDT: RequirementSpecificationID. RequirementSpecificationVersionID is an identifier for the version of a requirement specification. It may be based on datatype GDT: VersionID. LogisticUnitID may be based on datatype GDT: LogisticUnitID. ResourceID may be based on datatype GDT: ResourceID. LogisticsAreaKey may be based on datatype KDT: LogisticsAreaKey. ID is an identifier for the logistics area. It may be based on datatype GDT: LogisticsAreaID. SiteID is an identifier for the site at which the logistics area is located. It may be based on datatype GDT: LocationID. BuyerPartyKey may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. SellerPartyKey may be based on datatype KDT: PartyKey. VendorPartyKey may be based on datatype KDT: PartyKey. RecipientPartyKey may be based on datatype KDT: PartyKey. FreightForwarderPartyKey may be based on datatype KDT: PartyKey. CarrierPartyKey may be based on datatype KDT: PartyKey. GrossWeightMeasure may be based on datatype GDT: Measure, Qualifier: GrossWeight. GrossWeightMeasureTypeCode may be based on datatype GDT: MeasureTypeCode, Qualifier: GrossWeight. GrossVolumeMeasure may be based on datatype GDT: Measure, Qualifier: GrossVolume. GrossVolumeMeasureTypeCode may be based on datatype GDT: MeasureTypeCode, Qualifier: GrossVolume. ShippingPackageAttachedIndicator may be based on datatype GDT: Indicator, Qualifier: Attached. Incoterms may be based on datatype GDT: Incoterms. ProductSellerID may be based on datatype GDT: ProductPartyID. ProductBuyerID may be based on datatype GDT: ProductPartyID. SystemAdministrativeData may be based on datatype QueryIDT: QueryElementSystemAdministrativeData. CreationDateTime represents the point in time (e.g., date and time stamp) of the creation. It may be based on datatype GDT: GLOBAL_DateTime. CreationIdentityUUID is a globally unique identifier for the identity who did the creation. It may be based on datatype GDT: UUID. CreationIdentityID is an identifier for the identity who did the creation. It may be based on datatype GDT: IdentityID. CreationIdentityBusinessPartnerInternalID is a proprietary identifier for the business partner that is attributed to the creation identity and that can be reached following the relationships of the creation identity. It may be based on datatype GDT: BusinessPartnerInternalID. CreationIdentityBusinessPartnerPersonFamilyName is the family name of the business partner of the category person that is attributed to the creation identity and that can be reached following the relationships of the creation identity. It may be based on datatype GDT: LANGUAGEINDEPENDENT_MEDIUM_Name. CreationIdentityBusinessPartnerPersonGivenName is the given name of the business partner of the category person that is attributed to the creation identity and that can be reached following the relationships of the creation identity. It may be based on datatype GDT: LANGUAGEINDEPENDENT_MEDIUM_Name. CreationIdentityEmployeeID is an identifier for the employee that is attributed to the creation identity and that can be reached following the relationships of the creation identity. It may be based on datatype GDT: EmployeeID. LastChangeDateTime represents the point in time (e.g., date and time stamp) of the last change. It may be based on datatype GDT: GLOBAL_DateTime. LastChangeIdentityUUID is a globally unique identifier for an identity who made the last changes. It may be based on datatype GDT: UUID. LastChangeIdentityID is an identifier for an identity who made the last changes. It may be based on datatype GDT: IdentityID. LastChangeIdentityBusinessPartnerinternalID is a proprietary identifier for the business partner that is attributed to the last change identity and that can be reached following the relationships of the last change identity. It may be based on datatype GDT: BusinessPartnerInternalID. LastChangeIdentityBusinessPartnerPersonFamilyName is the family name of the business partner of the category person that is attributed to the last change identity and that can be reached following the relationships of the last change identity. It may be based on datatype GDT: LANGUAGEINDEPENDENT_MEDIUM_Name. LastChangeIdentityBusinessPartnerPersonGivenName is the given name of the business partner of the category person that is attributed to the last change identity and that can be reached following the relationships of the last change identity. It may be based on datatype GDT: LANGUAGEINDEPENDENT_MEDIUM_Name. LastChangeIdentityEmployeeID is an identifier for the employee that is attributed to the last change identity and that can be reached following the relationships of the last change identity. It may be based on datatype GDT: EmployeeID. IdentifiedLogisticUnitInternalID may be based on datatype GDT: IdentifiedLogisticUnitInternalID. TransportTracking may be based on datatype GDT: TransportTracking The Select All query returns the node IDs of all instances of this node.

Unspecified Content Package Tag is a label that includes selected information about a package and that does not contain a material identifier. In some implementations, Material UUID, Quantity and quantity type code may be initial. Uniform Content Package Tag is an electronic device, a small piece or part, or a label that includes selected information about a package with a uniform content and that also includes a material identifier. In some implementations, Material UUID may not be initial. Serialised Material Tag is an electronic device, a small piece or part, or a label that is attached to one piece of a material and that includes a material identifier. In some implementations, Material UUID may not be initial, and quantity factor may be 1 and quantity type code may be "each." Mixed Content Package Tag is as an electronic device, a small piece or part, or a label that includes selected information about a package with a mixed content and that can include an identified logistic unit identifier. In some implementations, Material UUID, quantity and quantity type code may be initial.

Business Transaction Document Reference is a unique reference between the business object and another business transaction document or business transaction document item. The referenced documents record the process of transportation or production. The identifiers of these documents can be printed on the goods tag. The elements located directly at the node Business Transaction Document Reference can be defined by the data type GoodsTagBusinessTransactionDocumentReferenceElements. These elements include BusinessTransactionDocumentReference. BusinessTransactionDocumentReference is a business transaction document that is referenced by the goods tag. It may be based on datatype GDT: BusinessTransactionDocumentReference.

An inbound association relationship may exist from the business object Confirmed Inbound Delivery/node Confirmed Inbound Delivery to ConfirmedInboundDelivery with a cardinality of C:CN, which may represent a confirmed inbound delivery to which the goods tag is assigned. An inbound association relationship may exist from the business object Customer Return/node Item to CustomerReturnItem with a cardinality of C:CN, which may represent a customer return item to which the goods tag is assigned. An inbound association relationship may exist from the business object Inbound Delivery/node Item to InboundDeliveryItem with a cardinality of C:CN, which may represent an inbound delivery item to which the goods tag is assigned. An inbound association relationship may exist from the business object Outbound Delivery/node Item to OutboundDeliveryItem with a cardinality of C:CN, which may represent an outbound delivery item to which the goods tag is assigned. An inbound association relationship may exist from the business object Production Lot/node Production Lot to ProductionLot with a cardinality of C:CN, which may represent a production lot to which the goods tag is assigned. An inbound association relationship may exist from the business object Production Order/node Production Order to ProductionOrder with a cardinality of C:CN, which may represent a production order to which the goods tag is assigned. An inbound association relationship may exist from the business object Production Task/node Production Task to ProductionTask with a cardinality of C:CN, which may represent a production task to which the goods tag is assigned. An inbound association relationship may exist from the business object Purchase Order/node Item to PurchaseOrderItem with a cardinality of C:CN, which may represent a purchase order item to which the goods tag is assigned. An inbound association relationship may exist from the business object Sales Order/node Item to SalesOrderItem with a cardinality of C:CN, which may represent a sales order item to which the goods tag is assigned. An inbound association relationship may exist from the business object Site Logistics Lot/node Site Logistics Lot to SiteLogisticsLot with a cardinality of C:CN, which may represent a site logistics lot to which the goods tag is assigned. An inbound association relationship may exist from the business object Site Logistics Task/node Site Logistics Task to SiteLogisticsTask with a cardinality of C:CN, which may represent a site logistics task to which the goods tag is assigned.

Location represents a physical or logical location that can be printed on a goods tag in a location role. A physical location can be determined using spatial coordinates, for example, an address containing the street and house number. A logical location may not be determined by spatial coordinates, for example, a PO box or an e-mail address. It may not be necessary to know the physical location of a logical location. A goods tag location can be a reference to one of the following: a location, the address of a party, representative of a business partner and an organizational unit, the address of an installed base, or the address of an installation point.

The elements located directly at the node Location can be defined by the data type GoodsTagLocationElements. These elements include: LocationID, LocationUUID, AddressReference, RoleCode, and RoleCategoryCode. AddressReference includes the AddressHostUUID, BusinessObj ectTypeCode, AddressHostTypeCode, PartyKey, InstalledBaseID, and InstallationPointID elements. PartyKey includes the PartyTypeCode and PartyID elements.

LocationID is an identifier for the business object Location. It may be based on datatype GDT: LocationID. LocationUUID is a globally unique identifier for the business object Location. It may be based on datatype GDT: UUID. AddressReference is a reference to the address of a party, an installed base, or an installation point. It may be based on datatype BOIDT: ObjectNodeLocationAddressReference. AddressHostUUID is a universally unique identifier for the address of the business partner, the organizational unit or its specializations, the business object InstalledBase, or the business object InstallationPoint. It may be based on datatype GDT: UUID. BusinessObjectTypeCode is a coded representation of the type of the business object, in which the address referenced in the LocationAddressUUID is integrated as a dependent object. It may be based on datatype GDT: BusinessObjectTypeCode. AddressHostTypeCode is a coded representation of the address host type of the address referenced by the AddressUUID or the address included using the Location Address composition. It may be based on datatype GDT: AddressHostTypeCode. PartyKey is an alternative identifier of a party, which represents a business partner or an organizational unit, which references the address using the AddressUUID. It may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. InstalledBaseID is an identifier for an installed base that references the address using the AddressUUID. It may be based on datatype GDT: InstalledBaseID. InstallationPointID is an identifier for an installation point that references the address using the AddressUUID. It may be based on datatype GDT: InstallationPointID. RoleCode is a coded representation of the role of the goods tag location in the business document or the master data object. It may be based on datatype GDT: LocationRoleCode. RoleCategoryCode is a coded representation of the role category of the goods tag location in the business document or the master data object. It may be based on datatype GDT: LocationRoleCategoryCode.

A composition relationship to subordinate LocationAddress node may exist in a 1:C cardinality relationship. An inbound aggregation relationship may exist from the business object Installation Point/node Address Information to InstallationPointAddressInformation with a cardinality of C:CN, which may represent address information of an installation point corresponding to the goods tag location. An inbound aggregation relationship may exist from the business object Installed Base/node Address Information to InstalledBaseAddressInformation with a cardinality of C:CN, which may represent address information of an installed base corresponding to the goods tag location. An inbound aggregation relationship may exist from the business object Location/node Location to Location with a cardinality of C:CN, which may represent a location corresponding to the goods tag location. An inbound aggregation relationship may exist from the business object Party/node Address Information to PartyAddressInformation with a cardinality of C:CN, which may the represent address information of a representative of a business partner or organizational centre corresponding to the goods tag location.

A specialization association for navigation relationship may exist from UsedAddress/node Root to UsedAddress with a target cardinality of :CN, which may represent a referenced address of a master data object or the address that is integrated via the composition relationship LocationAddress. Which address applies can be determined by looking at the element AddressHostTypeCode. The instance of the TO UsedAddress represents this address. The association is implemented. The referenced address of a master data object is used if the elements AddressBusinessObjectTypeCode, AddressUUID and AddressHostTypeCode are used to determine the Node ID of the node in the master data object, which holds the composition relationship with DO Address, which is to be represented by TO Used Address. Also, the following information is sent to the TO Used Address in the implemented address: that it is a master data address, and the BusinessObjectTypeCode, BusinessObjectNodeTypeCode and Node ID of an object node Location node. In some implementations, this is required if changes are made to the TO Used Address. The TO Used Address copies the master data address, the changes are applied and the corresponding DO Address is generated on the <Object Node> Location node via the composition relationship Location Address. The address that is integrated via the composition relationship LocationAddress is used if the BusinessObjectTypeCode, BusinessObjectNode TypeCode and Node ID of the own <Object Node> Location are communicated to the TO Used Address. Whether or not it is a referenced address is also included. The TO Used Address may represent the DO Address that is integrated via the composition relationship on the <Object Node> Location.

In some implementations, there can be either just one aggregation or composition relationship to the dependent object. If there is an aggregation relationship to the BO Location, the LocationID attribute can be filled with the ID of BO Location. All other ID fields (e.g., PartyID, InstalledBaseID and InstallationPointID) remain blank. If the address of a party is referenced, representative of a BusinessPartners or an OrganisationalCentre, the PartyID attribute can be filled with the ID of the Party. All other ID fields (e.g., LocationID, InstalledBaseID and InstallationPointID) remain blank. The reference is kept in the AddressUUID attribute. If there is an aggregation relationship to the address of an InstalledBase, the InstalledBaseID attribute can be filled with the ID of the InstalledBase. All other ID fields (e.g., LocationID, PartyID and InstallationPointID) remain blank. The reference is kept in the AddressUUID InstalledBaseAddressInformationUUID attribute. If there is an aggregation relationship to the address of an InstallationPoint, the InstallationPointID attribute can be filled with the ID of the InstallationPoint. All other ID fields (e.g., LocationID, PartyID and InstalledBaseID) remain blank. The reference is kept in the AddressUUID attribute. In some implementations, if an address is referenced via the element AddressUUID, then elements AddressBusinessObjectTypeCode and AddressHostTypeCode may also be filled.

The Location Address includes data necessary to describe a physical or logical location. The Controlled Output Request is a controller of output requests and output history entries. Text Collection is a collection of natural-language text with additional information about the product or package.

Figure 33:
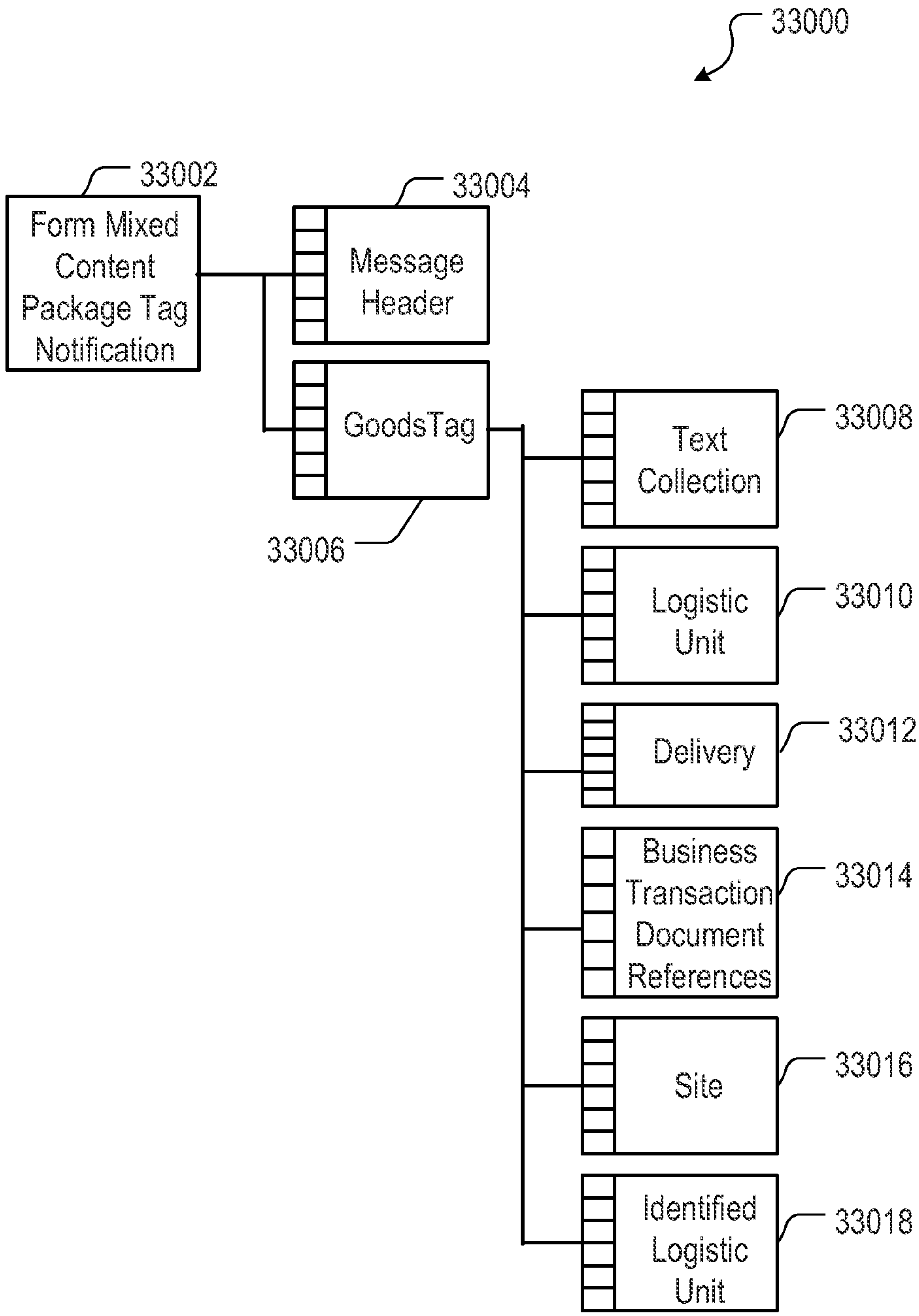
FIG. 33 depicts an example Form Mixed Content Package Tag Notification Message Data Type.

FIG. 33 depicts an example Form Mixed Content Package Tag Notification Message Data Type 33000, which comprises elements 33002-33018, hierarchically related as shown. For example, the Form Mixed Content Package Tag Notification 33002 includes a Message Header 33004.

The message type Form Mixed Content Package Tag Notification is derived from the business object GoodsTag leading object together with its operation signature. Form Mixed Content Package Tag Notification is a notification about the printing or creation of package tags of the type "mixed content." The "mixed content" package tag is a label for an identified logistics unit which includes data such as weight and other measurements but also content information. A mixed content package tag can be used for packages or pallets with a mixed content or for tracking the package material itself. The structure of this message type can be determined by the message data type FormMixedContentPackageTagNotificationMessage.

The FormMixedContentPackageTagNotificationMessage message data type includes an object GoodsTag which is included in a business document, and business information that is relevant for sending a business document in a message. It includes the MessageHeader and GoodsTag packages. This message data type provides the structure for the Form Mixed Content Package Tag Notification message types and the operations that are based on it.

The MessageHeader package is a grouping of business information that is relevant for sending a business document in a message. It includes the Message Header node. The MessageHeader is a grouping of business information from the perspective of the sending application. It includes information to identify the business document in a message, information about the sender, and optionally, information about the recipient. The MessageHeader includes the SenderParty and RecipientParty elements. The MessageHeader may be based on the datatype GDT:BusinessDocumentMessageHeader. The elements of the GDT used include RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime.

The SenderParty is a partner responsible for sending a business document at a business application level. The RecipientParty may be based on the datatype GDT:BusinessDocumentMessageHeaderParty. RecipientParty is a partner responsible for receiving a business document at a business application level. The SenderParty may be based on the datatype GDT:BusinessDocumentMessageHeaderParty.

The GoodsTag package is the grouping of GoodsTag with its packages. The packages include: TextCollection, LogisticUnit, Delivery, BusinessTransactionDocumentReferences, Site, and IdentifiedLogisticUnit. It also includes a GoodsTag entity. The GoodsTag entity represents an electronic device, a small piece or part, or a label that contains selected information about a product or package. GoodsTag includes the non-node elements: ID, PartySerialID, ProductionDate, ShippingDate, GoodsReceiptDate, ShippingPackage AttachedIndicator, CreationContextDependingDate, GrossWeightMeasure, GrossWeightMeasureTypeCode, GrossWeightMeasureTypeName, GrossWeightMeasureUnitCodeName, GrossVolumeMeasure, GrossVolumeMeasure TypeCode, GrossVolumeMeasureTypeName, GrossVolumeMeasureUnitCodeName, OutputRequestCreationDateTime, OutputRequestCreationIdentityID, OutputRequestCreationBusinessPartnerFormattedName, ImageFileContentBinaryObject, and TransportTracking ID may be based on datatype GDT:GoodsTagID. PartySerialID may be based on datatype GDT:SerialID with Qualifier:Party. ProductionDate may be based on datatype CDT:Date. ShippingDate may be based on datatype CDT:Date. GoodsReceiptDate may be based on datatype CDT:Date. ShippingPackageAttachedIndicator may be based on datatype CDT:Indicator. CreationContextDependingDate may be based on datatype CDT:Date. GrossWeightMeasure may be based on datatype CDT:Measure. GrossWeightMeasureTypeCode may be based on datatype GDT:MeasureTypeCode. GrossWeightMeasureTypeName may be based on datatype CDT:LONG_Name. GrossWeightMeasureUnitCodeName may be based on datatype CDT:Name. GrossVolumeMeasure may be based on datatype CDT:Measure. GrossVolumeMeasureTypeCode may be based on datatype GDT:MeasureTypeCode. GrossVolumeMeasureTypeName may be based on datatype CDT:LONG_Name.

GrossVolumeMeasureUnitCodeName may be based on datatype CDT:Name. OutputRequestCreationDateTime may be based on datatype CDT:LOCAL_DateTime. OutputRequestCreationIdentityID may be based on datatype GDT:IdentityID. OutputRequestCreationBusinessPartner FormattedName may be based on datatype CDT:LANGUAGEINDEPENDENT_LONG_Name. ImageFile ContentBinaryObject may be based on datatype CDT:BinaryObject. TransportTracking may be based on datatype GDT:TransportTracking. The GoodsTag package includes a node element TextCollection in a 1:C cardinality relationship, a node element LogisticUnit in a 1:C cardinality relationship, a node element Delivery in a 1:1 cardinality relationship, a BusinessTransactionDocumentReferences in a 1:1 cardinality relationship, a node element Site in a 1:1 cardinality relationship, and a node element IdentifiedLogisticUnit in a 1:C cardinality relationship.

The GoodsTagTextCollection package includes the TextCollection entity. TextCollection is a collection of natural-language text with additional information about a product or package. TextCollection includes a non-node element TextCollection. TextCollection may be based on datatype MAGDT:TextCollection.

The GoodsTagLogisticUnit package includes a LogisticUnit entity. LogisticUnit denotes the logistic unit of the package that is tagged by the goods tag. LogisticUnit includes the non-node elements: LogisticUnitID, LogisticUnitDescription, LogisticUnitQuantity, LogisticUnitQuantityTypeCode, and LogisticUnitQuantityTypeName. LogisticUnitID may be based on datatype GDT:LogisticUnitID. LogisticUnitDescription may be based on datatype GDT: SHORT_Description. LogisticUnitQuantity may be based on datatype CDT: Quantity. LogisticUnitQuantityTypeCode may be based on datatype GDT: QuantityTypeCode. LogisticUnitQuantityTypeName may be based on datatype CDT:SHORT_Name.

The GoodsTagDelivery package includes a Delivery entity. Delivery denotes the delivery to which the goods tag is assigned. Delivery includes the non-node elements: ShipToAddress, ShipToAddressPostalCode, ShipToCountryCode, ShipToCountryName, ShipFromAddress, ShipFromCountryCode, ShipFromCountryName, Incoterms, BuyerPartyID, BuyerPartyFormattedName, SellerPartyID, SellerPartyFormattedName, RecipientPartyID, RecipientPartyFormattedName, VendorPartyID, VendorPartyFormattedName, FreightForwarderPartyID, and FreightForwarderPartyFormattedName. Incoterms includes the elements ClassificationCode, ClassificationName, and TransferLocationName. ShipToAddress may be based on datatype GDT: FormAddress. ShipToAddressPostalCode may be based on datatype GDT:PostalCode with Qualifier:Address. ShipToCountryCode may be based on datatype GDT:CountryCode. ShipToCountryName may be based on datatype CDT:MEDIUM_Name. ShipFromAddress may be based on datatype GDT:FormAddress. ShipFromCountryCode may be based on datatype GDT:CountryCode. ShipFromCountryName may be based on datatype CDT:MEDIUM_Name. Incoterms may be based on datatype FMIDT:FormIncoterms. ClassificationCode may be based on datatype GDT:IncotermsClassificationCode. ClassificationName may be based on datatype CDT:Name. TransferLocationName may be based on datatype GDT:IncotermsTransferLocationName. BuyerPartyID may be based on datatype GDT:PartyID. BuyerPartyFormattedName may be based on datatype CDT:LANGUAGEINDEPENDENT_LONG_Name. SellerPartyID may be based on datatype GDT:PartyID. SellerPartyFormattedName may be based on datatype CDT:LANGUAGEINDEPENDENT_LONG_Name. RecipientPartyID may be based on datatype GDT:PartyID. RecipientPartyFormattedName may be based on datatype CDT:LANGUAGEINDEPENDENT_LONG_Name. VendorPartyID may be based on datatype GDT:PartyID. VendorPartyFormattedName may be based on datatype CDT:LANGUAGEINDEPENDENT_LONG_Name. FreightForwarderPartyID may be based on datatype GDT:PartyID. FreightForwarderPartyFormattedName may be based on datatype CDT:LANGUAGEINDEPENDENT_LONG_Name.

The GoodsTagBusinessTransactionDocumentReferences package includes a BusinessTransactionDocumentReferences entity. BusinessTransactionDocument References is a unique reference between a business object and another business transaction document or business transaction document item. The referenced documents record a process of transportation or production. The identifiers of these documents can be printed on the goods tag. BusinessTransactionDocumentReferences includes the non-node elements: InboundDeliveryID, InboundDeliveryItemID, ConfirmedInboundDeliveryID, ConfirmedInboundDeliveryItemID, OutboundDeliveryID, OutboundDeliveryItemID, CreationContextDependingDeliveryID, CreationContextDepending DeliveryItemID, SalesOrderID, SalesOrderItemID, PurchaseOrderID, PurchaseOrderItemID, CustomerReturnID, CustomerReturnItemID, OriginPurchaseOrderID, and OriginPurchaseOrderItemID. InboundDeliveryID may be based on datatype GDT:BusinessTransactionDocumentID. InboundDeliveryItemID may be based on datatype GDT: BusinessTransactionDocumentItemID. ConfirmedInboundDeliveryID may be based on datatype GDT:BusinessTransactionDocumentID. ConfirmedInboundDeliveryItemID may be based on datatype GDT:BusinessTransactionDocumentItemID. OutboundDeliveryID may be based on datatype GDT:BusinessTransactionDocumentID. OutboundDeliveryItemID may be based on datatype GDT:BusinessTransactionDocumentItemID. CreationContextDependingDeliveryID may be based on datatype GDT:BusinessTransactionDocumentID. CreationContextDependingDeliveryItemID may be based on datatype GDT:BusinessTransactionDocumentItemID. SalesOrderID may be based on datatype GDT:BusinessTransactionDocumentID. SalesOrderItemID may be based on datatype GDT:BusinessTransactionDocumentItemID. PurchaseOrderID may be based on datatype GDT: BusinessTransactionDocumentID. PurchaseOrderItemID may be based on datatype GDT:BusinessTransactionDocumentItemID. CustomerReturnID may be based on datatype GDT:BusinessTransactionDocumentID. CustomerReturnItemID may be based on datatype GDT:BusinessTransactionDocumentItemID. OriginPurchaseOrderID may be based on datatype GDT:BusinessTransactionDocumentID. OriginPurchaseOrderItemID may be based on datatype GDT:BusinessTransactionDocumentItemID.

The GoodsTagSite package includes a Site entity. Site denotes the site to which the goods tag is assigned. Site includes the non-node elements SiteID and SiteDescription. SiteID may be based on datatype GDT:LocationID. SiteDescription may be based on datatype GDT: SHORT_Description.

The GoodsTagIdentifiedLogisticUnit package includes an IdentifiedLogisticUnit entity. IdentifiedLogisticUnit denotes the identified logistic unit that is tagged by the goods tag. IdentifiedLogisticUnit includes the non-node elements: IdentifiedLogisticUnitInternalID, GrossVolumeMeasure, GrossWeightMeasure, NetVolumeMeasure, NetWeightMeasure, HeightMeasure, WidthMeasure, LengthMeasure, and TareWeightMeasure. GrossVolumeMeasure, GrossWeightMeasure, NetVolumeMeasure, NetWeightMeasure, HeightMeasure, WidthMeasure, LengthMeasure, and TareWeightMeasure include the elements Measure and MeasureUnitCodeName. IdentifiedLogisticUnitInternalID may be based on datatype GDT:IdentifiedLogisticUnitInternalID. GrossVolumeMeasure may be based on datatype FMIDT: FormMeasure. GrossWeightMeasure may be based on datatype FMIDT:FormMeasure. NetVolumeMeasure may be based on datatype FMIDT:FormMeasure. NetWeightMeasure may be based on datatype FMIDT:FormMeasure. HeightMeasure may be based on datatype FMIDT:FormMeasure. WidthMeasure may be based on datatype FMIDT:FormMeasure. LengthMeasure may be based on datatype FMIDT: FormMeasure. TareWeightMeasure may be based on datatype FMIDT:FormMeasure. Measure may be based on datatype CDT:Measure. MeasureUnitCodeName may be based on datatype CDT:Name.

Figures 1, 34:
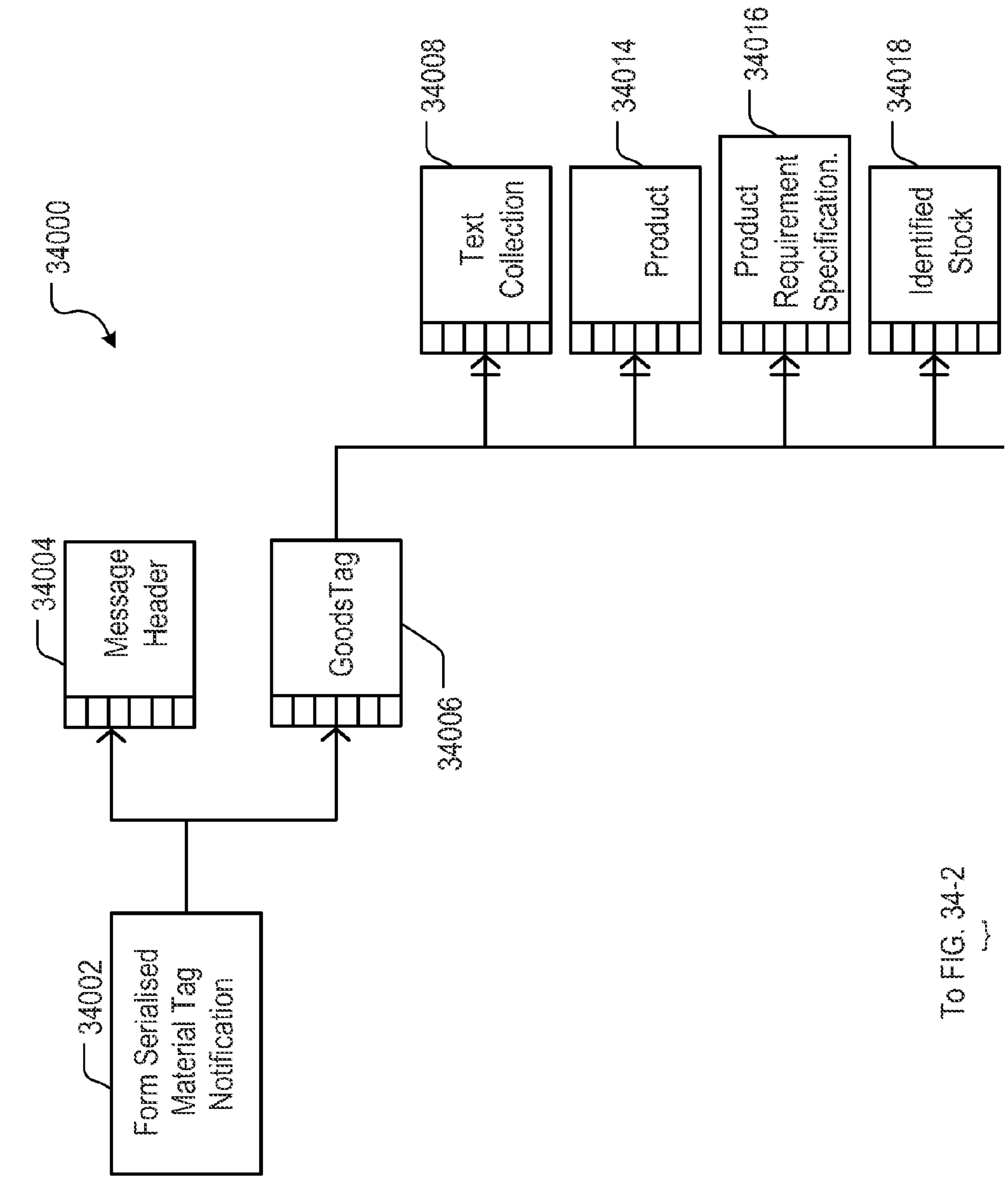
Figures 2, 34:
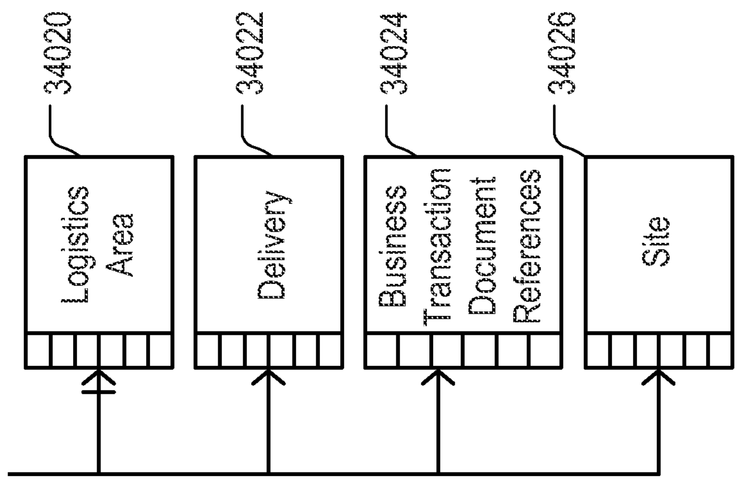

FIGS. 34-1 through 34-2 depict an example Form Serialised Material Tag Notification Message Data Type 34000, which comprises elements 34002-34026, hierarchically related as shown. For example, the Form Serialised Material Tag Notification 34002 includes a Message Header 34004.

The message type Form Serialised Material Tag Notification is derived from the business object Goods Tag leading object together with its operation signature. Form Serialised Material Tag Notification is a notification about the printing or creation of material tags of the type "serialised." The "serialised" material tag is a label or a tag that clearly identifies a unique product. A field for the external serial number is available on the label in addition to the tag ID. The structure of the Form Serialised Material Tag Notification message type can be determined by the message data type FormSerialisedMaterialTagNotificationMessage.

The FormSerialisedMaterialTagNotificationMessage message data type includes an object GoodsTag which is included in the business document, and business information that is relevant for sending a business document in a message. It includes the MessageHeader and GoodsTag packages. This message data type can provide the structure for the Form Serialised Material Tag Notification message type and the operations that are based on it.

The MessageHeader package is a grouping of business information that is relevant for sending a business document in a message. It includes the MessageHeader node. A MessageHeader is a grouping of business information from the perspective of the sending application. It includes information to identify the business document in a message, information about the sender, and optionally, information about the recipient.

The MessageHeader includes the SenderParty and RecipientParty elements. MessageHeader may be based on the datatype GDT:BusinessDocumentMessageHeader. The elements of the GDT used include: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. The SenderParty is a partner responsible for sending a business document at a business application level. The SenderParty may be based on the datatype GDT: BusinessDocumentMessageHeaderParty. The RecipientParty is a partner responsible for receiving a business document at a business application level. The RecipientParty may be based on the datatype GDT: BusinessDocumentMessageHeaderParty.

The GoodsTag package is the grouping of GoodsTag with its packages. It includes the packages TextCollection, Product, ProductRequirementSpecification, IdentifiedStock, LogisticsArea, Delivery, BusinessTransactionDocument References, and Site. It also includes a GoodsTag entity. The GoodsTag entity represents an electronic device, a small piece or part, or a label that includes selected information about a product or package. GoodsTag includes the non-node elements: ID, ExternalSerialID, SerialID, Quantity, QuantityTypeCode, QuantityTypeName, QuantityMeasureUnitCodeName, ProductionDate, ShippingDate, GoodsReceiptDate, ShippingPackageAttachedIndicator, CreationContext DependingDate, GrossWeightMeasure, GrossWeightMeasureTypeCode, GrossWeightMeasureTypeName, GrossWeightMeasureUnitCodeName, GrossVolumeMeasure, GrossVolumeMeasureTypeCode, GrossWeightMeasureTypeName, GrossVolumeMeasureUnitCodeName, OutputRequestCreationDateTime, OutputRequestCreationIdentityID, OutputRequestCreationBusinessPartnerFormatted Name, ImageFileContentBinaryObject, and TransportTracking ID may be based on GDT:GoodsTagID. ExternalSerialID may be based on GDT:SerialID. SerialID may be based on GDT:SerialID. Quantity may be based on CDT: Quantity. QuantityTypeCode may be based on GDT:QuantityTypeCode. QuantityTypeName may be based on CDT:LONG_Name. QuantityMeasureUnitCodeName may be based on CDT:Name. ProductionDate may be based on CDT:Date. ShippingDate may be based on CDT:Date. GoodsReceiptDate may be based on CDT:Date. ShippingPackageAttachedIndicator may be based on CDT:Indicator. CreationContextDependingDate may be based on CDT:Date. GrossWeightMeasure may be based on CDT:Measure. GrossWeightMeasureTypeCode may be based on GDT:MeasureTypeCode. GrossWeightMeasureTypeName may be based on CDT:LONG_Name. GrossWeightMeasureUnitCodeName may be based on CDT:Name. GrossVolumeMeasure may be based on CDT:Measure. GrossVolumeMeasureTypeCode may be based on GDT:MeasureTypeCode. GrossVolumeMeasureTypeName may be based on CDT: LONG_Name. GrossVolumeMeasureUnitCodeName may be based on CDT:Name. OutputRequestCreationDateTime may be based on CDT:LOCAL_DateTime. OutputRequestCreationIdentityID may be based on GDT:IdentityID. OutputRequestCreationBusinessPartnerFormattedName may be based on CDT:LANGUAGEINDEPENDENT_LONG_Name. ImageFileContentBinaryObject may be based on CDT:BinaryObject. TransportTracking may be based on GDT:TransportTracking The GoodsTag package includes a node element TextCollection in a 1:C cardinality relationship, a node element Product in a 1:C cardinality relationship, a node element ProductRequirementSpecification in a 1:C cardinality relationship, a node element IdentifiedStock in a 1:C cardinality relationship, a node element LogisticsArea in a 1:C cardinality relationship, a node element Delivery in a 1:1 cardinality relationship, a node element BusinessTransaction DocumentReferences in a 1:1 cardinality relationship, and a node element Site in a 1:1 cardinality relationship.

The GoodsTagTextCollection package includes a TextCollection entity. TextCollection is a collection of natural-language text with additional information about a product or package. TextCollection includes a non-node element TextCollection. TextCollection may be based on MAGDT:TextCollection.

The GoodsTagProduct package includes a Product entity. Product includes the non-node elements: ProductID, ProductDescription, GlobalTradeItemNumberID, GlobalTradeItemNumberQuantityTypeCode, GlobalTradeItemNumberQuantityTypeName, ProductSellerID, and ProductBuyerID. ProductID may be based on GDT:Product ID. ProductDescription may be based on GDT: SHORT_Description. GlobalTradeItemNumberID may be based on GDT:ProductStandardID. GlobalTradeItemNumberQuantityTypeCode may be based on GDT: QuantityTypeCode. GlobalTradeItemNumberQuantityTypeName may be based on CDT:SHORT_Name. ProductSellerID may be based on GDT:ProductPartyID. ProductBuyerID may be based on GDT:ProductPartyID.

The GoodsTagProductRequirementSpecification package includes a ProductRequirementSpecification entity. ProductRequirementSpecification denotes a product requirement specification that specifies the content of the tagged package or the tagged product. ProductRequirementSpecification includes the non-node elements: ProductRequirementSpecificationID, ProductRequirementSpecificationVersionID, and ProductRequirementSpecificationDescription. ProductRequirementSpecificationID may be based on GDT:RequirementSpecificationID. ProductRequirementSpecificationVersionID may be based on GDT:VersionID. ProductRequirementSpecificationDescription may be based on GDT:MEDIUM_Description.

The GoodsTagIdentifiedStock package includes an IdentifiedStock entity. IdentifiedStock denotes the identified stock of the product or the content of the package that is tagged by the goods tag. IdentifiedStock includes the non-node elements: IdentifiedStockID, IdentifiedStockPartyID, IdentifiedStockDescription, and ExpirationDateTime. Identified- StockID may be based on GDT:IdentifiedStockID. IdentifiedStockPartyID may be based on GDT:Identified-StockPartyID. IdentifiedStockDescription may be based on GDT:MEDIUM_Description. ExpirationDateTime may be based on CDT:LOCAL_DateTime.

The GoodsTagLogisticsArea package includes a LogisticsArea entity. LogisticsArea denotes a logistics area to which the goods tag is assigned. LogisticsArea includes the non-node elements LogisticsAreaID and LogisticsAreaDescription. LogisticsAreaID may be based on GDT:LogisticsAreaID. LogisticsAreaDescription may be based on GDT: SHORT_Description.

The GoodsTagDelivery package includes a Delivery entity. Delivery denotes the delivery to which the goods tag is assigned. Delivery includes the non-node elements: ShipToAddress, ShipToAddressPostalCode, ShipToCountryCode, ShipToCountryName, ShipFromAddress, ShipFromCountryCode, ShipFromCountryName, Incoterms, BuyerPartyID, BuyerPartyFormattedName, SellerPartyID, SellerPartyFormattedName, RecipientPartyID, RecipientPartyFormattedName, VendorPartyID, VendorPartyFormattedName, FreightForwarderPartyID, and FreightForwarderPartyFormattedName. Incoterms includes the elements ClassificationCode, ClassificationName, and TransferLocationName. ShipToAddress may be based on GDT:FormAddress. ShipToAddressPostalCode may be based on GDT: PostalCode. ShipToCountryCode may be based on GDT: CountryCode. ShipToCountryName may be based on CDT: MEDIUM_Name. ShipFromAddress may be based on GDT: FormAddress. ShipFromCountryCode may be based on GDT:CountryCode. ShipFromCountryName may be based on CDT:MEDIUM_Name. Incoterms may be based on FMIDT:FormIncoterms. ClassificationCode may be based on GDT:IncotermsClassificationCode. ClassificationName may be based on CDT:Name. TransferLocationName may be based on GDT:IncotermsTransferLocationName. BuyerPartyID may be based on GDT:PartyID. BuyerPartyFormattedName may be based on CDT:LANGUAGEINDEPENDENT_ LONG_Name. SellerPartyID may be based on GDT: PartyID. SellerPartyFormattedName may be based on CDT: LANGUAGEINDEPENDENT_LONG_Name. Recipient PartyID may be based on GDT:PartyID. RecipientPartyFormattedName may be based on CDT:LANGUAGEINDEPENDENT_LONG_Name. VendorPartyID may be based on GDT:PartyID. VendorPartyFormattedName may be based on CDT:LANGUAGEINDEPENDENT_LONG_Name. Freight ForwarderPartyID may be based on GDT:PartyID. FreightForwarderPartyFormattedName may be based on CDT:LANGUAGEINDEPENDENT_LONG_Name.

The GoodsTagBusinessTransactionDocumentReferences package includes a BusinessTransactionDocument References entity. BusinessTransactionDocument References is a unique reference between a business object and another business transaction document or business transaction document item. The referenced documents record a process of transportation or production. The identifiers of these documents can be printed on the goods tag. BusinessTransactionDocumentReferences includes the non-node elements: ProductionLotID, SiteLogisticsLotID, InboundDeliveryID, InboundDeliveryItemID, OutboundDeliveryID, OutboundDelivery ItemID, ConfirmedInboundDeliveryID, ConfirmedInboundDeliveryItemID, CreationContextDependingDeliveryID, CreationContextDependingDeliveryItemID, SalesOrderID, SalesOrderItemID, PurchaseOrderID, PurchaseOrderItemID, CustomerReturnID, CustomerReturnItemID, OriginPurchaseOrderID, and OriginPurchaseOrderItemID. ProductionLotID may be based on GDT:Business TransactionDocumentID. SiteLogisticsLotID may be based on GDT:BusinessTransactionDocumentID. InboundDeliveryID may be based on GDT:BusinessTransactionDocumentID. InboundDeliveryItemID may be based on GDT:BusinessTransactionDocumentItemID. OutboundDeliveryID may be based on GDT:BusinessTransactionDocumentID. OutboundDeliveryItemID may be based on GDT:BusinessTransactionDocumentItemID. ConfirmedInboundDeliveryID may be based on may be based on GDT:BusinessTransactionDocumentID. ConfirmedInboundDelivery ItemID may be based on GDT:BusinessTransactionDocumentItemID. CreationContextDependingDeliveryID may be based on GDT:Business TransactionDocumentID. CreationContextDepending DeliveryItemID may be based on GDT: BusinessTransactionDocumentItemID. SalesOrderID may be based on GDT:BusinessTransactionDocumentID. SalesOrderItemID may be based on GDT:BusinessTransactionDocumentItemID. PurchaseOrderID may be based on GDT: BusinessTransactionDocumentID. PurchaseOrderItemID may be based on GDT:BusinessTransactionDocumentItemID. CustomerReturnID may be based on GDT:BusinessTransactionDocumentID. CustomerReturnItemID may be based on GDT:BusinessTransactionDocumentItemID). OriginPurchaseOrderID may be based on GDT:BusinessTransactionDocumentID. OriginPurchaseOrderItemID may be based on GDT:Business TransactionDocumentItemID.

The GoodsTagSite package includes a Site entity. Site denotes the site to which the goods tag is assigned. Site includes the non-node elements SiteID and SiteDescription. SiteID may be based on GDT:LocationID. SiteDescription may be based on GDT: SHORT_Description.

Figures 1, 35:
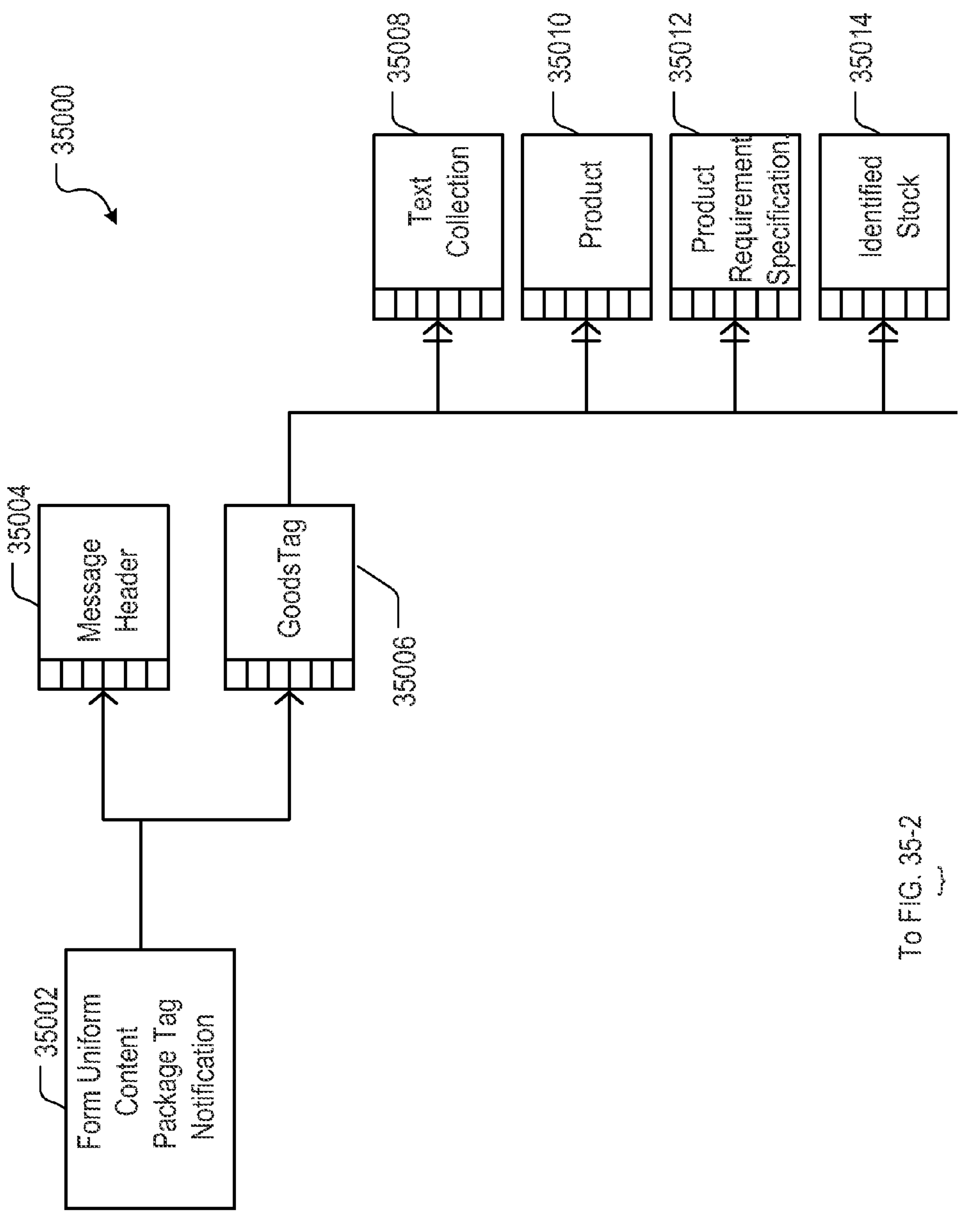
Figures 2, 35:
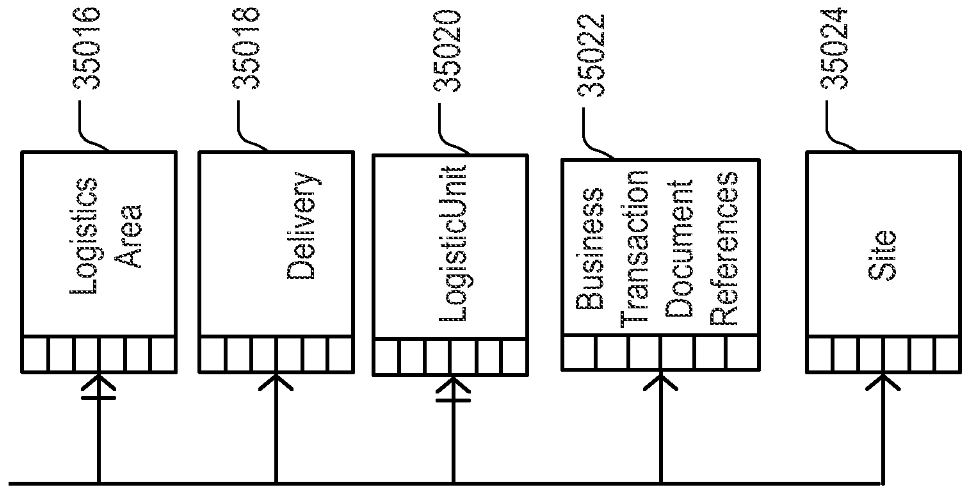

FIGS. 35-1 through 35-2 depict an example Form Uniform Content Package Tag Notification Message Data Type 35000, which comprises elements 35002-35024, hierarchically related as shown. For example, the Form Uniform Content Package Tag Notification 35002 includes a Message Header 35004.

The message type Form Uniform Content Package Tag Notification is derived from the business object Goods Tag leading object together with its operation signature. Form Uniform Content Package Tag Notification is a notification about the printing or creation of package tags of the type "uniform content." The "uniform content" package tag is a label for a package with a uniform content. Such a package includes one material type with one identified stock. On an uniform content label quantity information can be printed. In addition, it can include data derived from a logistics unit such as measurements. The structure of the Form Uniform Content Package Tag Notification message type can be determined by the message data type FormUniformContentPackageTagNotificationMessage.

The FormUniformContentPackageTagNotification Message message data type includes an object GoodsTag which is included in the business document, and business information that can be relevant for sending a business document in a message. The FormUniformContentPackageTagNotificationMessage includes the MessageHeader and Goods Tag packages. This message data type can provide the structure for the Form Uniform Content Package Tag Notification message type and the operations that are based on it.

The MessageHeader package is a grouping of business information that is relevant for sending a business document in a message. It includes a MessageHeader node. The MessageHeader is a grouping of business information from the perspective of the sending application. It includes information to identify the business document in a message, information about the sender, and optionally, information about the recipient. The MessageHeader includes the SenderParty and RecipientParty elements. The MessageHeader may be based on the datatype GDT:BusinessDocumentMessageHeader. The elements of the GDT used include RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime.

The SenderParty is a partner responsible for sending a business document at a business application level. The RecipientParty may be based on the datatype GDT:BusinessDocumentMessageHeaderParty. RecipientParty is a partner responsible for receiving a business document at a business application level. The SenderParty may be based on the datatype GDT:BusinessDocumentMessageHeaderParty.

The GoodsTag package is the grouping of GoodsTag with its packages. It includes the packages: TextCollection, Product, ProductRequirementSpecification, IdentifiedStock, LogisticsArea, Delivery, BusinessTransactionDocumentReferences, Site, and LogisticUnit. It includes a GoodsTag entity.

The GoodsTag package is the grouping of GoodsTag with its packages. GoodsTag includes the non-node elements: ID, ExternalSerialID, Quantity, QuantityTypeCode, QuantityTypeName, QuantityMeasureUnitCodeName, ProductionDate, ShippingDate, GoodsReceiptDate, ShippingPackageAttachedIndicator, CreationContextDependingDate, GrossWeightMeasure, GrossWeightMeasureTypeCode, GrossWeightMeasureTypeName, GrossWeightMeasureUnitCodeName, GrossVolumeMeasure, GrossVolumeMeasureTypeCode, GrossVolumeMeasureTypeName, GrossVolumeMeasureUnitCodeName, OutputRequestCreationDateTime, OutputRequestCreationIdentityID, OutputRequestCreationBusinessPartnerFormattedName, ImageFileContentBinaryObject, and TransportTracking ID may be based on GDT: GoodsTagID. ExternalSerialID may be based on GDT: SerialID. Quantity may be based on CDT:Quantity. QuantityTypeCode may be based on GDT: QuantityTypeCode. QuantityTypeName may be based on CDT:LONG_Name. QuantityMeasureUnitCodeName may be based on CDT:Name. ProductionDate may be based on CDT:Date. ShippingDate may be based on CDT:Date. GoodsReceiptDate may be based on CDT:Date. ShippingPackageAttachedIndicator may be based on CDT:Indicator. CreationContextDependingDate may be based on CDT:Date. GrossWeightMeasure may be based on CDT:Measure. GrossWeightMeasureTypeCode may be based on GDT:MeasureTypeCode. GrossWeightMeasureTypeName may be based on CDT:LONG_Name. GrossWeightMeasureUnitCodeName may be based on CDT:Name. GrossVolumeMeasure may be based on CDT:Measure. GrossVolumeMeasureTypeCode may be based on GDT:MeasureTypeCode. GrossVolumeMeasureTypeName may be based on CDT: LONG_Name. GrossVolumeMeasureUnitCodeName may be based on CDT:Name. OutputRequestCreationDateTime may be based on CDT:LOCAL_DateTime. OutputRequestCreationIdentityID may be based on GDT:IdentityID. OutputRequestCreationBusinessPartnerFormattedName may be based on CDT:LANGUAGEINDEPENDENT_LONG_Name. ImageFileContentBinaryObject may be based on CDT:BinaryObject. TransportTracking may be based on GDT:TransportTracking. The GoodsTag package includes a node element TextCollection in a 1:C cardinality relationship, Product in a 1:C cardinality relationship, ProductRequirementSpecification in a 1:C cardinality relationship, IdentifiedStock in a 1:C cardinality relationship, LogisticsArea in a 1:C cardinality relationship, Delivery in a 1:1 cardinality relationship, BusinessTransactionDocumentReferences in a 1:1 cardinality relationship, Site in a 1:1 cardinality relationship, LogisticUnit in a 1:C cardinality relationship.

The GoodsTagTextCollection package includes a TextCollection entity. TextCollection is a collection of natural-language text with additional information about a product or package. TextCollection includes a non-node element TextCollection. TextCollection may be based on datatype MAGDT:TextCollection.

The GoodsTagProduct package includes a Product entity. Product includes the non-node elements: ProductID, ProductDescription, GlobalTradeItemNumberID, GlobalTradeItemNumberQuantityTypeCode, GlobalTradeItemNumberQuantityTypeName, ProductSellerID, and ProductBuyerID. ProductID may be based on GDT:ProductID. ProductDescription may be based on GDT: SHORT_Description. GlobalTradeItemNumberID may be based on GDT:ProductStandardID. GlobalTradeItemNumberQuantityTypeCode may be based on GDT: QuantityTypeCode. GlobalTradeItemNumberQuantityTypeName may be based on CDT:SHORT_Name. ProductSellerID may be based on GDT:ProductPartyID. ProductBuyerID may be based on GDT:ProductPartyID.

The GoodsTagProductRequirementSpecification package includes a ProductRequirementSpecification entity. ProductRequirementSpecification denotes a product requirement specification that specifies the content of the tagged package or the tagged product. ProductRequirementSpecification includes the non-node elements: ProductRequirementSpecificationID, ProductRequirementSpecificationVersionID, and ProductRequirementSpecificationDescription. ProductRequirementSpecificationID may be based on GDT:RequirementSpecificationID. ProductRequirementSpecificationVersionID may be based on GDT:VersionID. ProductRequirementSpecificationDescription may be based on GDT:MEDIUM_Description.

The GoodsTagIdentifiedStock package includes an IdentifiedStock entity. IdentifiedStock denotes the identified stock of the product or the content of the package that is tagged by the goods tag. IdentifiedStock includes the non-node elements: IdentifiedStockID, IdentifiedStockPartyID, IdentifiedStockDescription, and ExpirationDateTime. IdentifiedStockID may be based on GDT:IdentifiedStockID. IdentifiedStockPartyID may be based on GDT:IdentifiedStockPartyID. IdentifiedStockDescription may be based on GDT:MEDIUM_Description. ExpirationDateTime may be based on CDT:LOCAL_DateTime.

The GoodsTagLogisticsArea package includes a LogisticsArea entity. LogisticsArea denotes a logistics area to which the goods tag is assigned. LogisticsArea includes the non-node elements LogisticsAreaID and LogisticsAreaDescription. LogisticsAreaID may be based on GDT:LogisticsAreaID. LogisticsAreaDescription may be based on GDT: SHORT_Description.

The GoodsTagDelivery package includes a Delivery entity. Delivery denotes the delivery to which the goods tag is assigned. Delivery includes the non-node elements: ShipToAddress, ShipToAddressPostalCode, ShipToCountryCode, ShipToCountryName, ShipFromAddress, ShipFromCountryCode, ShipFromCountryName, Incoterms, BuyerPartyID, BuyerPartyFormattedName, SellerPartyID, SellerPartyFormattedName, RecipientPartyID, Recipient- PartyFormattedName, VendorPartyID, VendorPartyFormattedName, FreightForwarderPartyID, and FreightForwarderPartyFormattedName. Incoterms includes the elements ClassificationCode, ClassificationName, and TransferLocationName. ShipToAddress may be based on GDT:FormAddress. ShipToAddressPostalCode may be based on GDT: PostalCode. ShipToCountryCode may be based on GDT: CountryCode. ShipToCountryName may be based on CDT: MEDIUM_Name. ShipFromAddress may be based on GDT: FormAddress. ShipFromCountryCode may be based on GDT:CountryCode. ShipFromCountryName may be based on CDT:MEDIUM_Name. Incoterms may be based on FMIDT:FormIncoterms. ClassificationCode may be based on GDT:IncotermsClassificationCode. ClassificationName may be based on CDT:Name. TransferLocationName may be based on GDT:IncotermsTransferLocationName. BuyerPartyID may be based on GDT:PartyID. BuyerPartyFormattedName may be based on CDT:LANGUAGEINDEPENDENT_ LONG_Name. SellerPartyID may be based on GDT: PartyID. SellerPartyFormattedName may be based on CDT: LANGUAGEINDEPENDENT_LONG_Name. RecipientPartyID may be based on GDT:PartyID. RecipientPartyFormattedName may be based on CDT:LANGUAGEINDEPENDENT_LONG_Name. VendorPartyID may be based on GDT:PartyID. VendorPartyFormattedName may be based on CDT:LANGUAGEINDEPENDENT_LONG_ Name. FreightForwarderPartyID may be based on GDT:PartyID. FreightForwarderPartyFormattedName may be based on CDT:LANGUAGEINDEPENDENT_LONG_Name.

The GoodsTagBusinessTransactionDocumentReferences package includes a BusinessTransactionDocument References entity. BusinessTransactionDocument References is a unique reference between a business object and another business transaction document or business transaction document item. The referenced documents record a process of transportation or production. The identifiers of these documents can be printed on the goods tag. BusinessTransactionDocumentReferences includes the non-node elements: ProductionLotID, SiteLogisticsLotID, InboundDeliveryID, InboundDeliveryItemID, OutboundDeliveryID, OutboundDeliveryItem ID, ConfirmedInboundDeliveryID, ConfirmedInboundDeliveryItemID, CreationContextDependingDeliveryID, CreationContextDependingDeliveryItemID, SalesOrderID, SalesOrderItemID, PurchaseOrderID, PurchaseOrderItemID, CustomerReturnID, CustomerReturnItemID, OriginPurchaseOrderID, and OriginPurchaseOrderItemID. ProductionLotID may be based on GDT: BusinessTransactionDocumentID. SiteLogisticsLotID may be based on GDT:BusinessTransactionDocumentID. InboundDeliveryID may be based on GDT:BusinessTransactionDocumentID. InboundDeliveryItemID may be based on GDT:BusinessTransactionDocumentItemID. OutboundDeliveryID may be based on GDT:BusinessTransactionDocumentID. OutboundDeliveryItemID may be based on GDT: BusinessTransactionDocumentItemID. Confirmed Inbound DeliveryID may be based on may be based on GDT:BusinessTransactionDocumentID. ConfirmedInboundDeliveryItemID may be based on GDT:BusinessTransactionDocumentItemID. CreationContextDependingDeliveryID may be based on GDT:BusinessTransactionDocumentID. CreationContext DependingDeliveryItemID may be based on GDT: BusinessTransactionDocumentItemID. SalesOrderID may be based on GDT:BusinessTransactionDocumentID. SalesOrderItemID may be based on GDT:BusinessTransactionDocumentItemID. PurchaseOrderID may be based on GDT: BusinessTransactionDocumentID. PurchaseOrderItemID may be based on GDT:BusinessTransactionDocumentItemID. CustomerReturnID may be based on GDT:BusinessTransactionDocumentID. CustomerReturnItemID may be based on GDT:BusinessTransactionDocumentItemID). OriginPurchaseOrderID may be based on GDT:BusinessTransactionDocumentID. OriginPurchaseOrderItemID may be based on GDT:BusinessTransactionDocumentItemID.

The GoodsTagSite package includes a Site entity. Site denotes the site to which the goods tag is assigned. Site includes the non-node elements SiteID and SiteDescription. SiteID may be based on GDT:LocationID. SiteDescription may be based on GDT: SHORT_Description.

The GoodsTagLogisticUnit package includes a LogisticUnit entity. LogisticUnit denotes the logistic unit of the package that is tagged by the goods tag. LogisticUnit includes the non-node elements: LogisticUnitID, LogisticUnitDescription, LogisticUnitQuantity, LogisticUnitQuantityTypeCode, and LogisticUnitQuantityTypeName. LogisticUnitID may be based on GDT:LogisticUnitID. LogisticUnitDescription may be based on GDT: SHORT_Description. LogisticUnitQuantity may be based on CDT:Quantity. LogisticUnitQuantityTypeCode may be based on GDT: QuantityTypeCode. LogisticUnitQuantityTypeName may be based on CDT: SHORT_Name.

Figure 36:
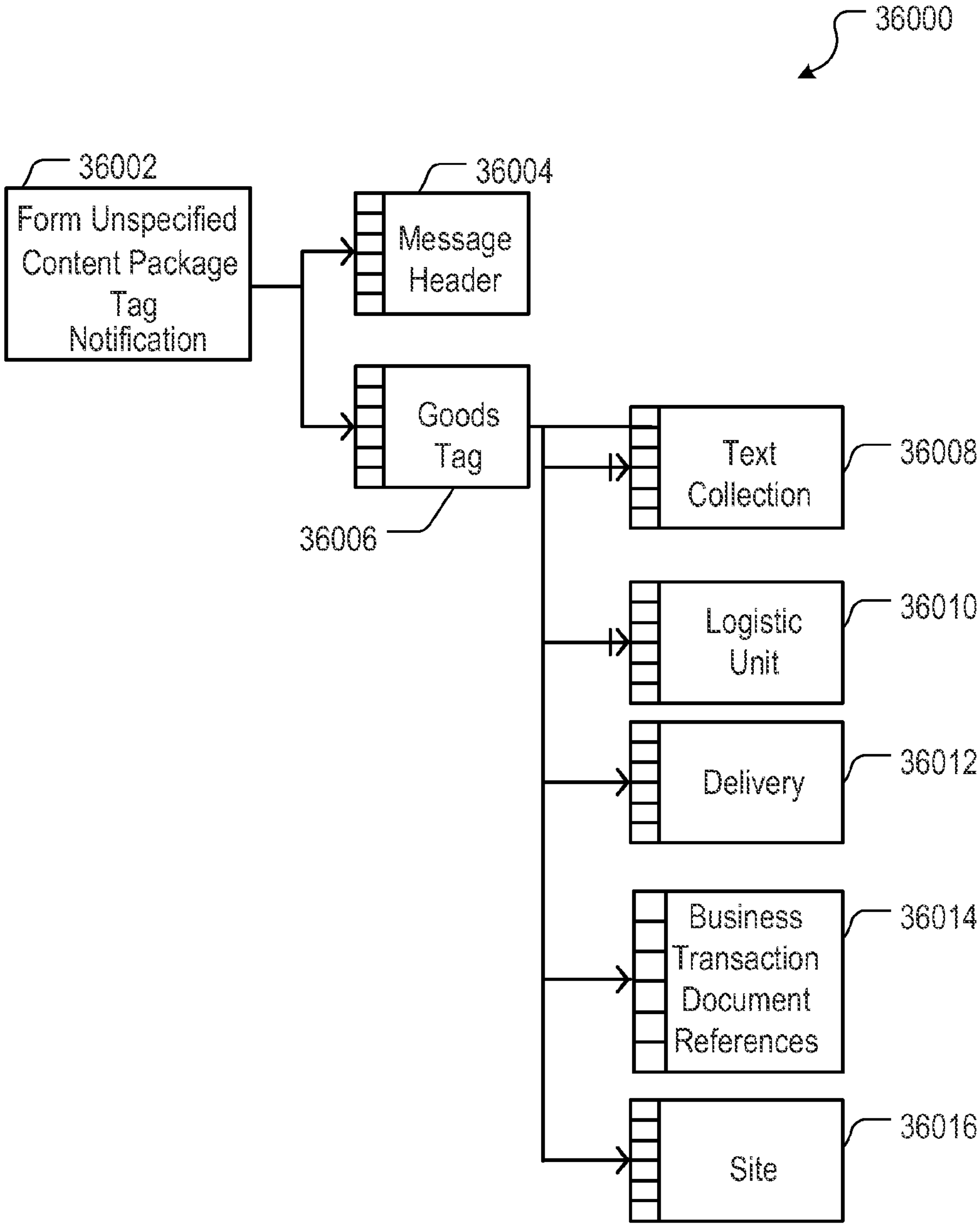
FIG. 36 depicts an example Form Unspecified Content Package Tag Notification Message Data Type.

FIG. 36 depicts an example Form Unspecified Content Package Tag Notification Message Data Type 36000, which comprises elements 36002-36016, hierarchically related as shown. For example, the Form Unspecified Content Package Tag Notification 36002 includes a Message Header 36004.

The message type Form Unspecified Content Package Tag Notification is derived from the business object Goods Tag leading object together with its operation signature. Form Unspecified Content Package Tag Notification is a notification about the printing or creation of package tags of the type “unspecified content.” The “unspecified content” package tag is a label for a logistics unit which includes data such as weight and other measurements but does not include any content information. An unspecified content package tag can be used for packages or pallets with a mixed content or for tracking the package material itself. As the content of the package is unknown to the system it can be called unspecified.

The FormUnspecifiedContentPackageTagNotification Message message data type includes an object GoodsTag that is included in the business document and business information relevant for sending a business document in a message. It includes the MessageHeader and GoodsTag packages. This message data type can provide the structure for the Form Unspecified Content Package Tag Notification message type and the operations that are based on it.

The MessageHeader package is a grouping of business information that is relevant for sending a business document in a message. It includes a MessageHeader node. The MessageHeader is a grouping of business information from the perspective of the sending application. It includes information to identify the business document in a message, information about the sender, and optionally, information about the recipient. The MessageHeader includes the SenderParty and RecipientParty elements. The MessageHeader may be based on the datatype GDT:BusinessDocumentMessageHeader. The elements of the GDT used include RecipientParty, BusinessScope, SenderParty, SenderBusinessSystemID, TestDataIndicator, RecipientBusinessSystemID, Reference ID, ReferenceUUID, ReconciliationIndicator, ID, UUID, and CreationDateTime.

The SenderParty is a partner responsible for sending a business document at a business application level. The RecipientParty may be based on the datatype GDT:BusinessDocumentMessageHeaderParty. RecipientParty is the partner responsible for receiving a business document at a business application level. The SenderParty may be based on the datatype GDT:BusinessDocumentMessageHeaderParty.

The GoodsTag package is the grouping of GoodsTag with its packages. It includes the packages: TextCollection, LogisticUnit, Delivery, BusinessTransactionDocumentReferences, and Site. It includes a GoodsTag entity. GoodsTag includes the non-node elements: ID, ExternalSerialID, ProductionDate, ShippingDate, GoodsReceiptDate, ShippingPackageAttachedIndicator, CreationContextDependingDate, GrossWeightMeasure, Gross WeightMeasureTypeCode, GrossWeightMeasureTypeName, GrossWeight MeasureUnitCodeName, GrossVolumeMeasure, GrossVolumeMeasureTypeCode, GrossVolumeMeasureTypeName, GrossVolumeMeasureUnitCodeName, OutputRequestCreationDateTime, OutputRequestCreationIdentityID, OutputRequestCreationBusinessPartnerFormattedName, ImageFileContentBinaryObject, and TransportTracking ID may be based on GDT:GoodsTagID. ExternalSerialID may be based on GDT:SerialID. ProductionDate may be based on CDT:Date. ShippingDate may be based on CDT:Date. GoodsReceiptDate may be based on CDT:Date. ShippingPackageAttachedIndicator may be based on CDT:Indicator. CreationContextDependingDate may be based on CDT:Date. GrossWeightMeasure may be based on CDT:Measure. GrossWeightMeasureTypeCode may be based on GDT:MeasureTypeCode. GrossWeightMeasureTypeName may be based on CDT:LONG_Name. GrossWeightMeasureUnitCodeName may be based on CDT:Name. GrossVolumeMeasure may be based on CDT:Measure. GrossVolumeMeasureTypeCode may be based on GDT:MeasureTypeCode. GrossVolumeMeasureTypeName may be based on CDT: LONG_Name. GrossVolumeMeasureUnitCodeName may be based on CDT:Name.

OutputRequestCreationDateTime may be based on CDT: LOCAL_DateTime. OutputRequestCreationIdentityID may be based on GDT:IdentityID. OutputRequestCreationBusinessPartnerFormattedName may be based on CDT:LANGUAGEINDEPENDENT_LONG_Name. ImageFileContentBinaryObject may be based on CDT:BinaryObject. TransportTracking may be based on GDT:TransportTracking. The GoodsTag package includes a node element TextCollection in a 1:C cardinality relationship, LogisticUnit in a 1:C cardinality relationship, Delivery in a 1:1 cardinality relationship, BusinessTransactionDocumentReferences in a 1:1 cardinality relationship, and Site in a 1:1 cardinality relationship.

The GoodsTagTextCollection package includes a TextCollection entity. TextCollection is a collection of natural-language text with additional information about a product or package. TextCollection includes a non-node element TextCollection. TextCollection may be based on datatype MAGDT:TextCollection.

The GoodsTagLogisticUnit package includes a LogisticUnit entity. LogisticUnit denotes the logistic unit of the package that is tagged by the goods tag. LogisticUnit includes the non-node elements: LogisticUnitID, LogisticUnitDescription, LogisticUnitQuantity, LogisticUnitQuantityTypeCode, and LogisticUnitQuantityTypeName. LogisticUnitID may be based on GDT:LogisticUnitID. LogisticUnitDescription may be based on GDT: SHORT_Description. LogisticUnitQuantity may be based on CDT:Quantity. LogisticUnitQuantityTypeCode may be based on GDT: QuantityTypeCode. LogisticUnitQuantityTypeName may be based on CDT: SHORT_Name.

The GoodsTagDelivery package includes a Delivery entity. Delivery denotes the delivery to which the goods tag is assigned. Delivery includes the non-node elements: ShipToAddress, ShipToAddressPostalCode, ShipToCountryCode, ShipToCountryName, ShipFromAddress, ShipFromCountryCode, ShipFromCountryName, Incoterms, BuyerPartyID, BuyerPartyFormattedName, SellerPartyID, SellerPartyFormattedName, RecipientPartyID, RecipientPartyFormattedName, VendorPartyID, VendorPartyFormattedName, FreightForwarderPartyID, and FreightForwarderPartyFormattedName. Incoterms includes the elements ClassificationCode, ClassificationName, and TransferLocationName. ShipToAddress may be based on GDT:FormAddress. ShipToAddressPostalCode may be based on GDT: PostalCode. ShipToCountryCode may be based on GDT: CountryCode. ShipToCountryName may be based on CDT: MEDIUM_Name. ShipFromAddress may be based on GDT: FormAddress. ShipFromCountryCode may be based on GDT:CountryCode. ShipFromCountryName may be based on CDT:MEDIUM_Name. Incoterms may be based on FMIDT:FormIncoterms. ClassificationCode may be based on GDT:IncotermsClassificationCode. ClassificationName may be based on CDT:Name. TransferLocationName may be based on GDT:IncotermsTransferLocationName. BuyerPartyID may be based on GDT:PartyID. BuyerPartyFormattedName may be based on CDT:LANGUAGEINDEPENDENT_ LONG_Name. SellerPartyID may be based on GDT: PartyID. SellerPartyFormattedName may be based on CDT: LANGUAGEINDEPENDENT_LONG_Name.
RecipientPartyID may be based on GDT:PartyID. RecipientPartyFormattedName CDT:LANGUAGEINDEPENDENT_ LONG_Name. VendorPartyID may be based on GDT:PartyID. VendorPartyFormattedName may be based on CDT: LANGUAGEINDEPENDENT_LONG_Name. FreightForwarderPartyID may be based on GDT:PartyID. FreightForwarderPartyFormattedName may be based on CDT:LANGUAGEINDEPENDENT_LONG_Name.

The GoodsTagBusinessTransactionDocumentReferences package includes a BusinessTransactionDocument References entity. BusinessTransactionDocument References is a unique reference between a business object and another business transaction document or business transaction document item. The referenced documents record a process of transportation or production. The identifiers of these documents can be printed on the goods tag. BusinessTransactionDocumentReferences includes the non-node elements: InboundDeliveryID, InboundDeliveryItemID, ConfirmedInboundDeliveryID, ConfirmedInboundDeliveryItemID, Outbound DeliveryID, OutboundDeliveryItemID, CreationContextDependingDeliveryID, CreationContextDependingDeliveryItemID, SalesOrderID, SalesOrderItemID, PurchaseOrderID, PurchaseOrderItemID, CustomerReturnID, CustomerReturnItemID, OriginPurchaseOrderID, and OriginPurchaseOrderItemID. InboundDeliveryID may be based on GDT:BusinessTransactionDocumentID. InboundDeliveryItemID may be based on GDT:BusinessTransactionDocumentItemID. ConfirmedInboundDeliveryID may be based on GDT:BusinessTransactionDocumentID. ConfirmedInboundDeliveryItemID may be based on GDT:BusinessTransactionDocumentItemID. OutboundDeliveryID may be based on GDT:BusinessTransactionDocumentID. OutboundDeliveryItemID may be based on GDT:BusinessTransactionDocumentItemID. CreationContextDependingDeliveryID may be based on GDT:BusinessTransactionDocumentID. Creation- ContextDependingDeliveryItemID may be based on GDT: BusinessTransactionDocumentItemID. SalesOrderID may be based on GDT:BusinessTransactionDocumentID. Sales OrderItemID may be based on GDT:BusinessTransactionDocumentItemID. PurchaseOrderID may be based on GDT: BusinessTransactionDocumentID. PurchaseOrderItemID may be based on GDT:BusinessTransactionDocumentItemID. CustomerReturnID may be based on GDT:BusinessTransactionDocumentID. CustomerReturnItemID may be based on GDT:BusinessTransactionDocumentItemID. OriginPurchaseOrderID may be based on GDT:BusinessTransactionDocumentID. OriginPurchaseOrderItemID may be based on GDT:BusinessTransactionDocumentItemID.

The GoodsTagSite package includes a Site entity. Site denotes the site to which the goods tag is assigned. Site includes the non-node elements SiteID and SiteDescription. SiteID may be based on GDT:LocationID. SiteDescription may be based on GDT: SHORT_Description.

FIGS. 37-1 through 37-26 show an example configuration of an Element Structure that includes a FormMixedContentPackageTagNotification 370000 package. Specifically, these figures depict the arrangement and hierarchy of various components such as one or more levels of packages, entities, and datatypes, shown here as 370000 through 370840. As described above, packages may be used to represent hierarchy levels. Entities are discrete business elements that are used during a business transaction. Data types are used to type object entities and interfaces with a structure. For example, the FormMixedContentPackageTagNotification 370000 includes, among other things, a FormMixedContentPackage TagNotification 370002. Accordingly, heterogeneous applications may communicate using this consistent message configured as such.

FIGS. 38-1 through 38-24 show an example configuration of an Element Structure that includes a FormSerialisedMaterialTagNotification 380000 package. Specifically, these figures depict the arrangement and hierarchy of various components such as one or more levels of packages, entities, and datatypes, shown here as 380000 through 380814. As described above, packages may be used to represent hierarchy levels. Entities are discrete business elements that are used during a business transaction. Data types are used to type object entities and interfaces with a structure. For example, the FormSerialisedMaterialTagNotification 380000 includes, among other things, a FormSerialisedMaterialTagNotification 380002. Accordingly, heterogeneous applications may communicate using this consistent message configured as such.

FIGS. 39-1 through 39-27 show an example configuration of an Element Structure that includes a FormUniformContentPackageTagNotification 390000 package. Specifically, these figures depict the arrangement and hierarchy of various components such as one or more levels of packages, entities, and datatypes, shown here as 390000 through 390846. As described above, packages may be used to represent hierarchy levels. Entities are discrete business elements that are used during a business transaction. Data types are used to type object entities and interfaces with a structure. For example, the FormUniformContentPackageTagNotification 390000 includes, among other things, a FormUniformContentPackageTagNotification 390002. Accordingly, heterogeneous applications may communicate using this consistent message configured as such.

Figures 1, 44:
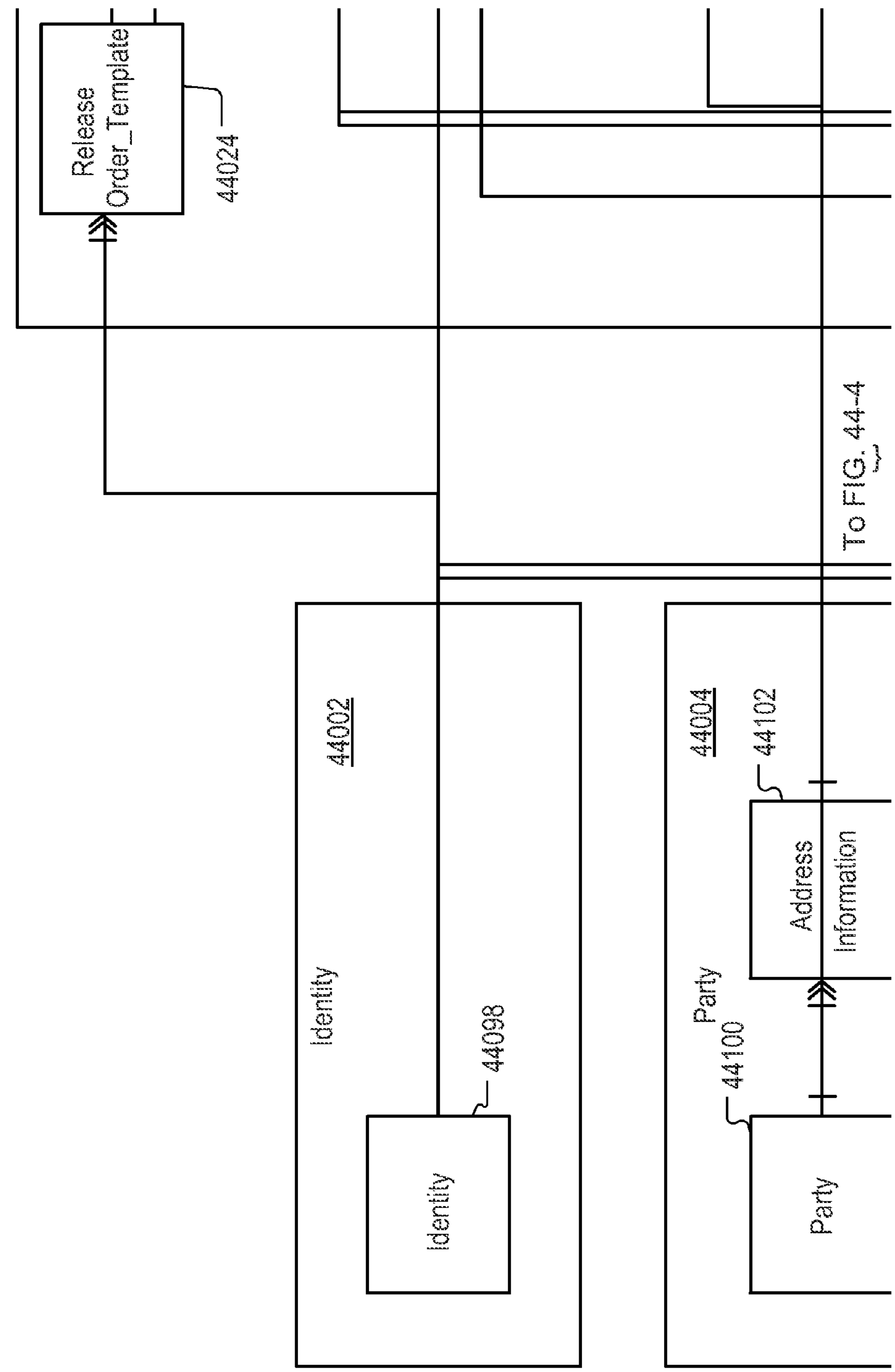
Figures 2, 44:
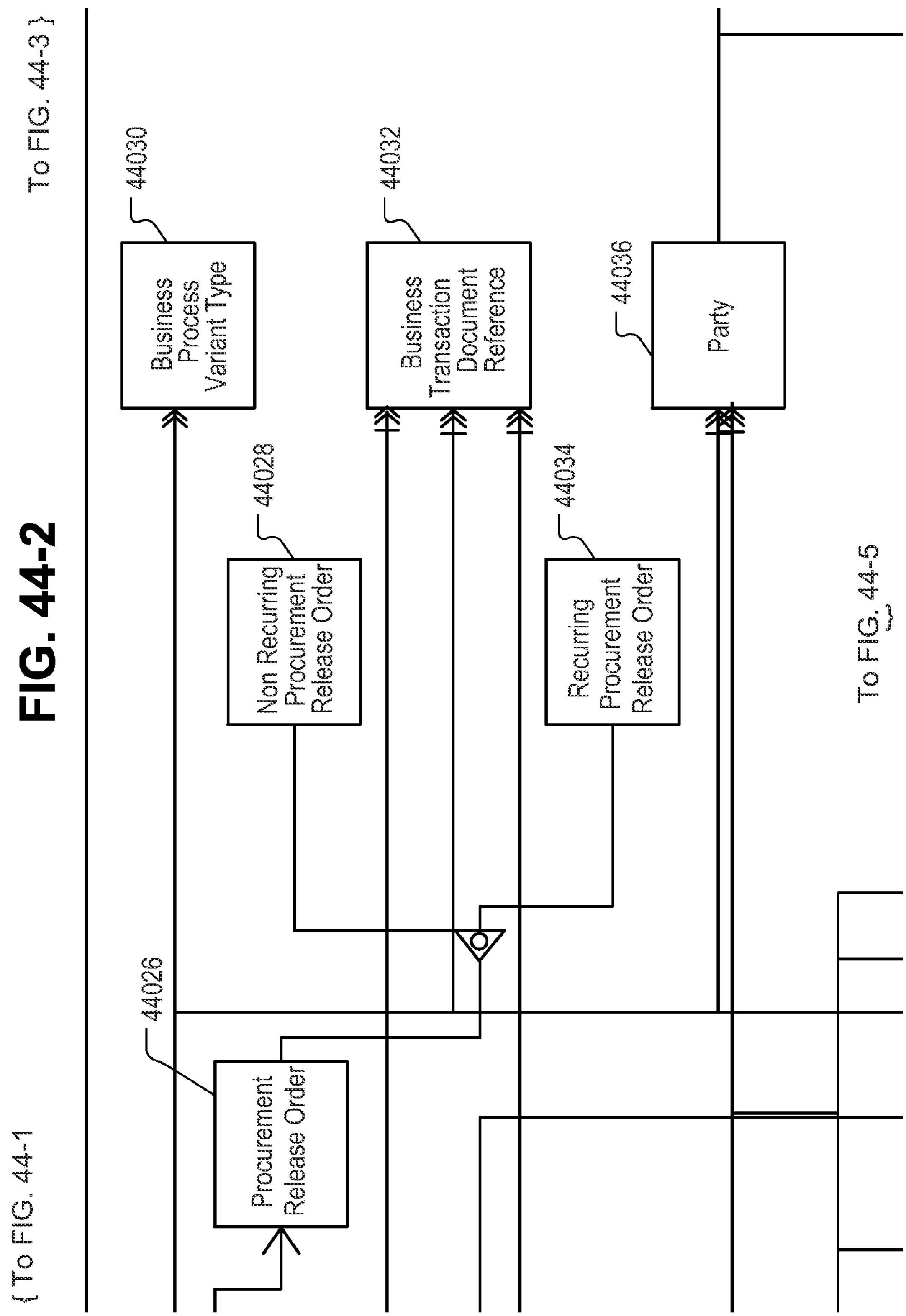
Figures 3, 44:
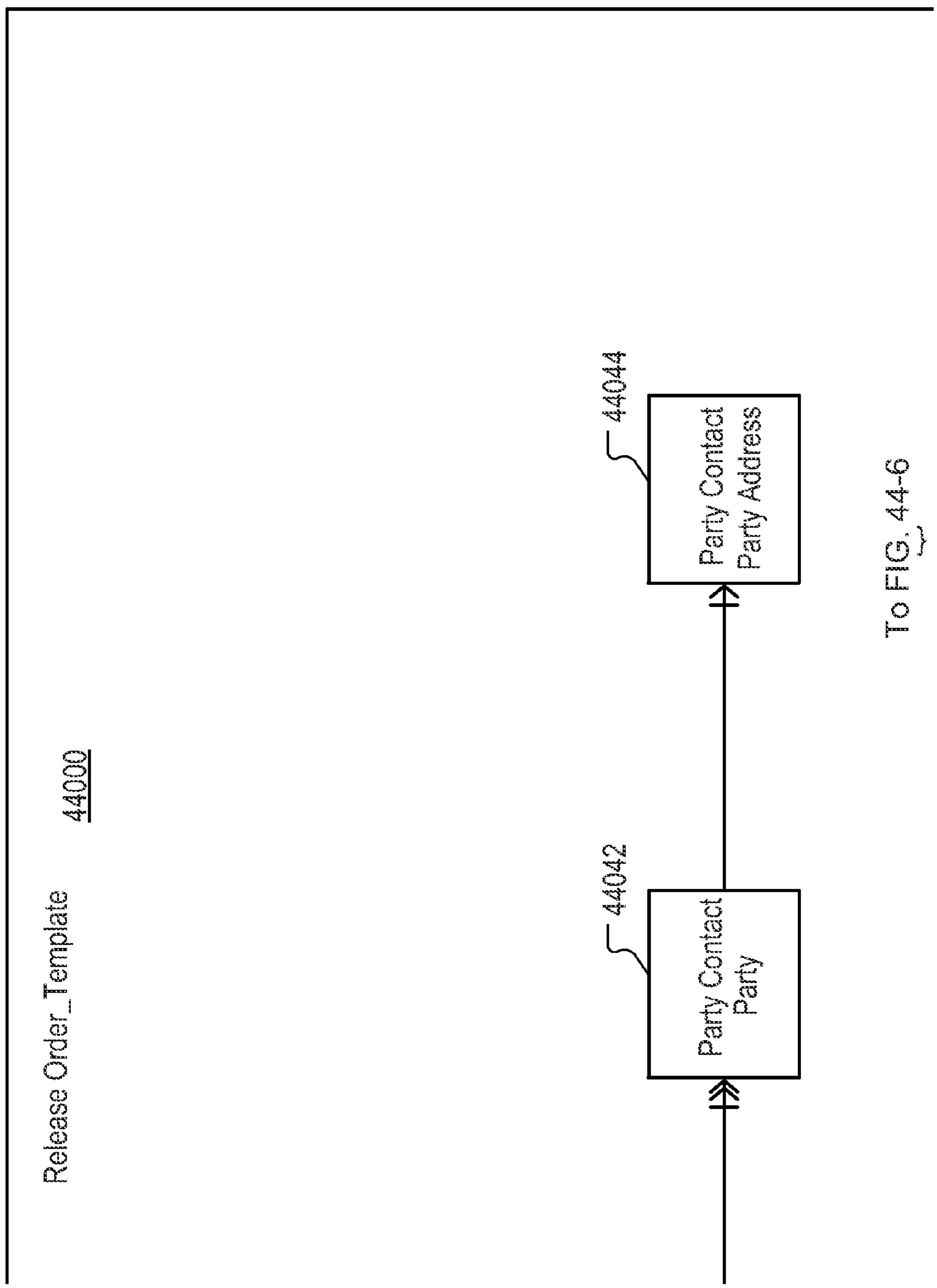
Figures 4, 44:
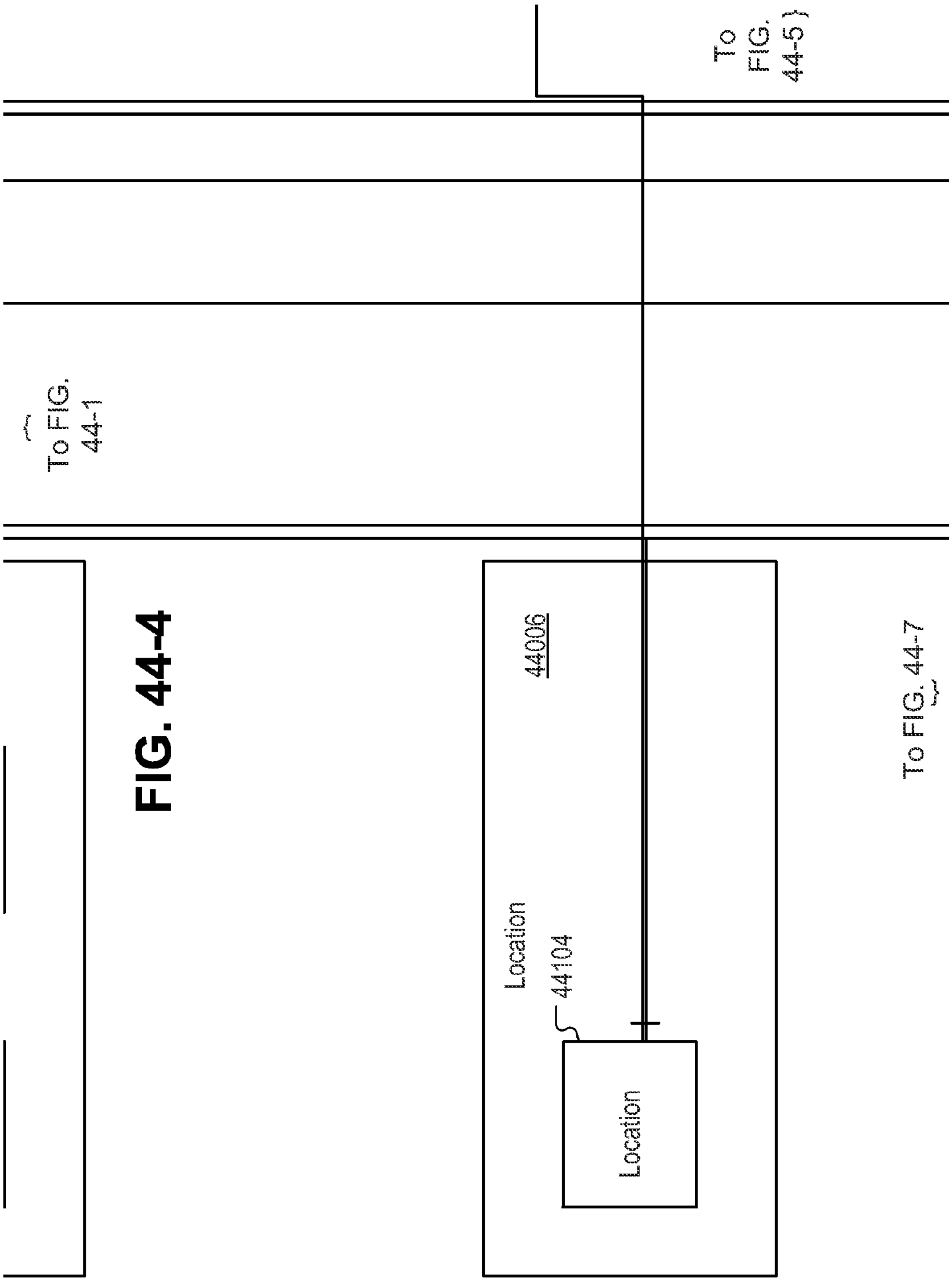
Figures 5, 44:
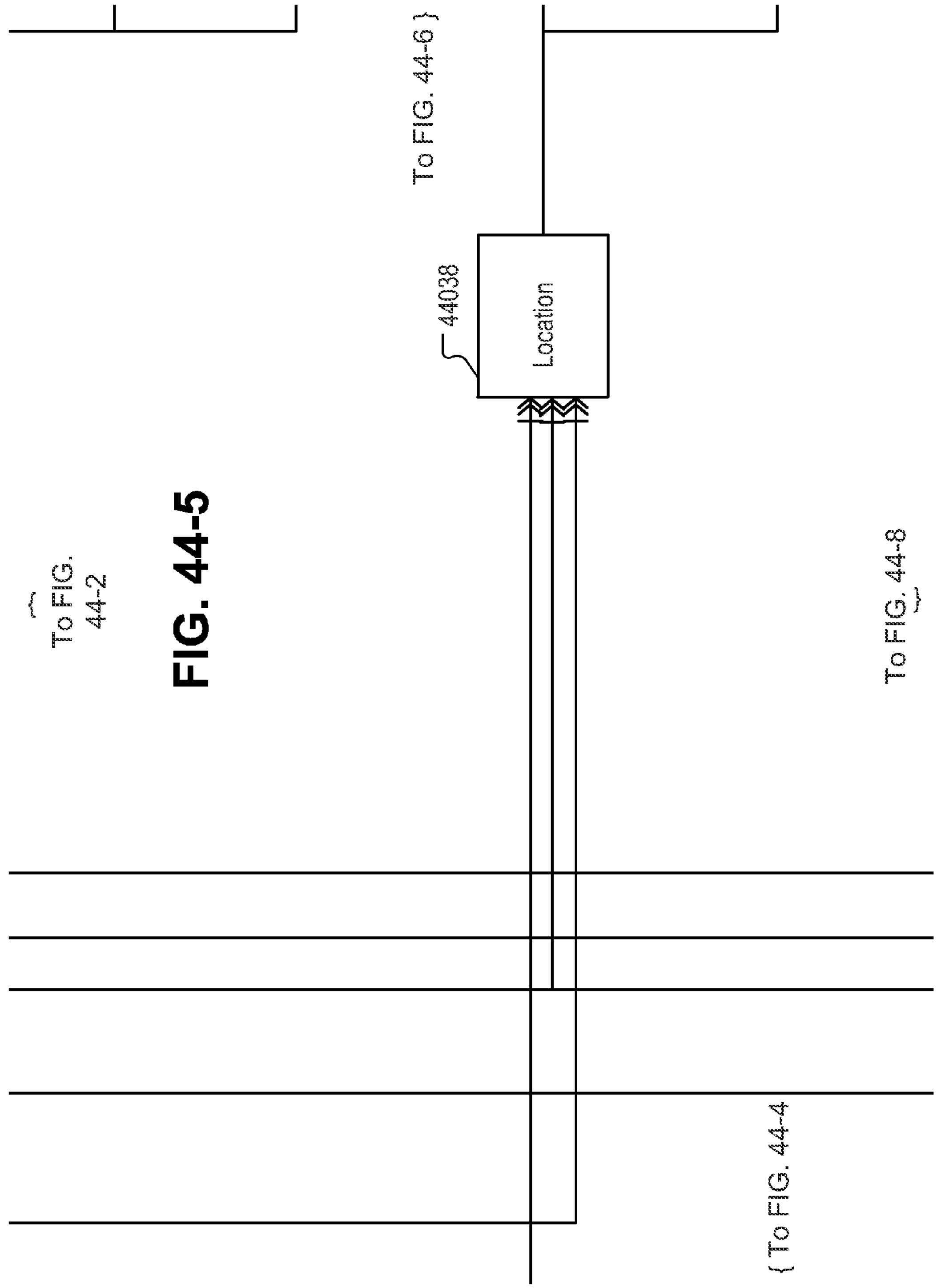
Figures 6, 44:
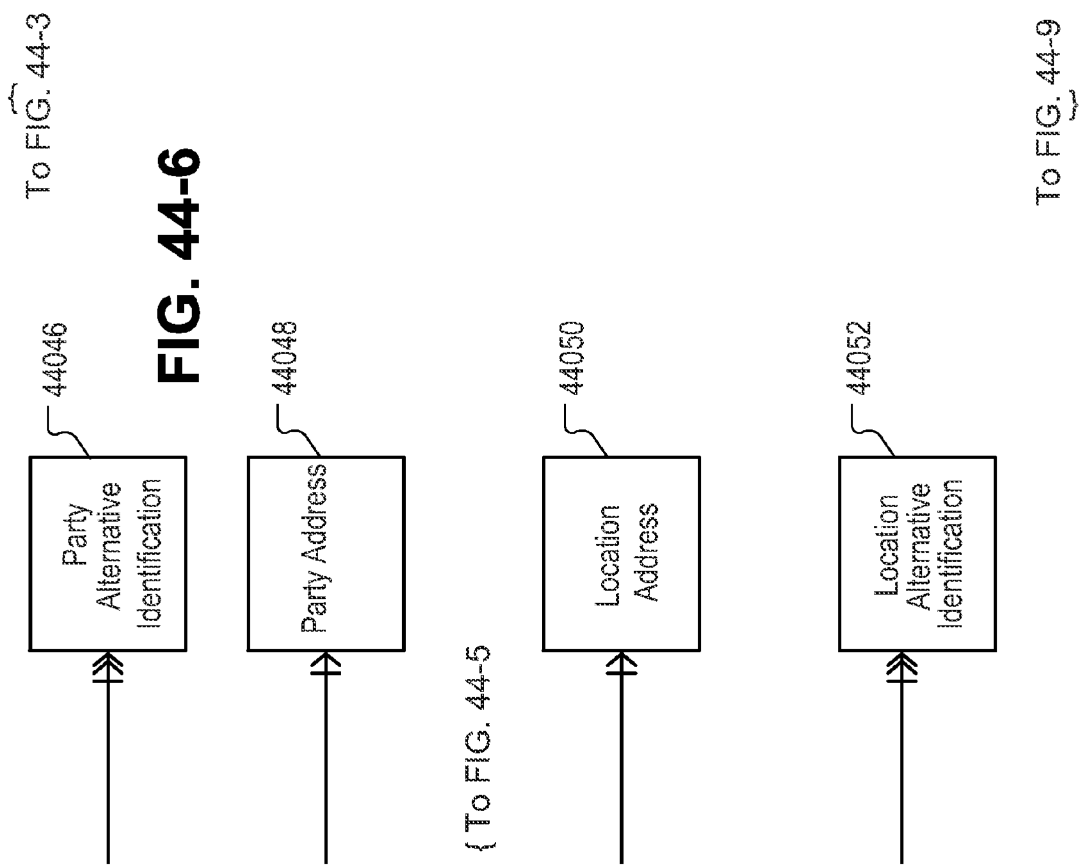
Figures 7, 44:
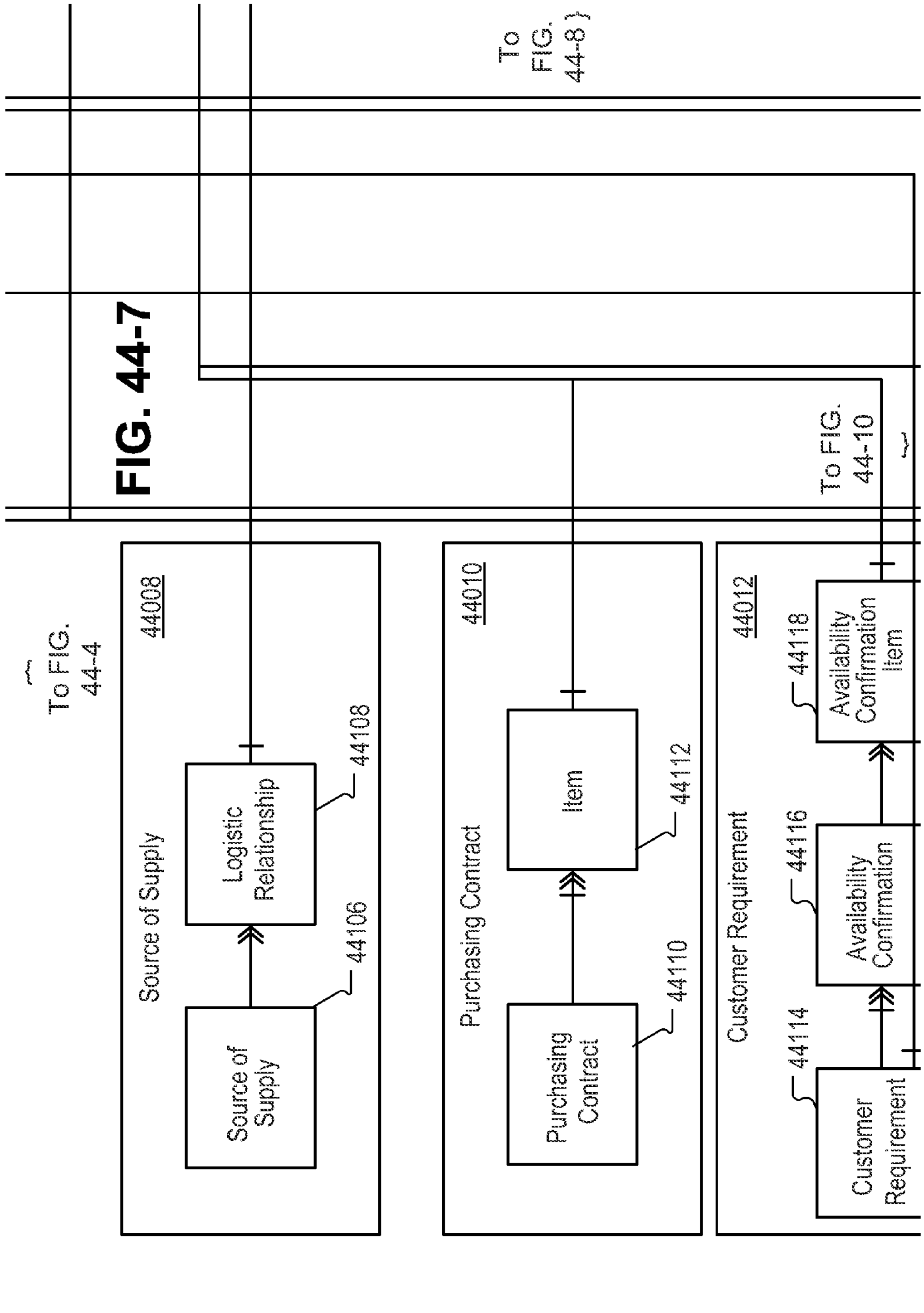
Figures 8, 44:
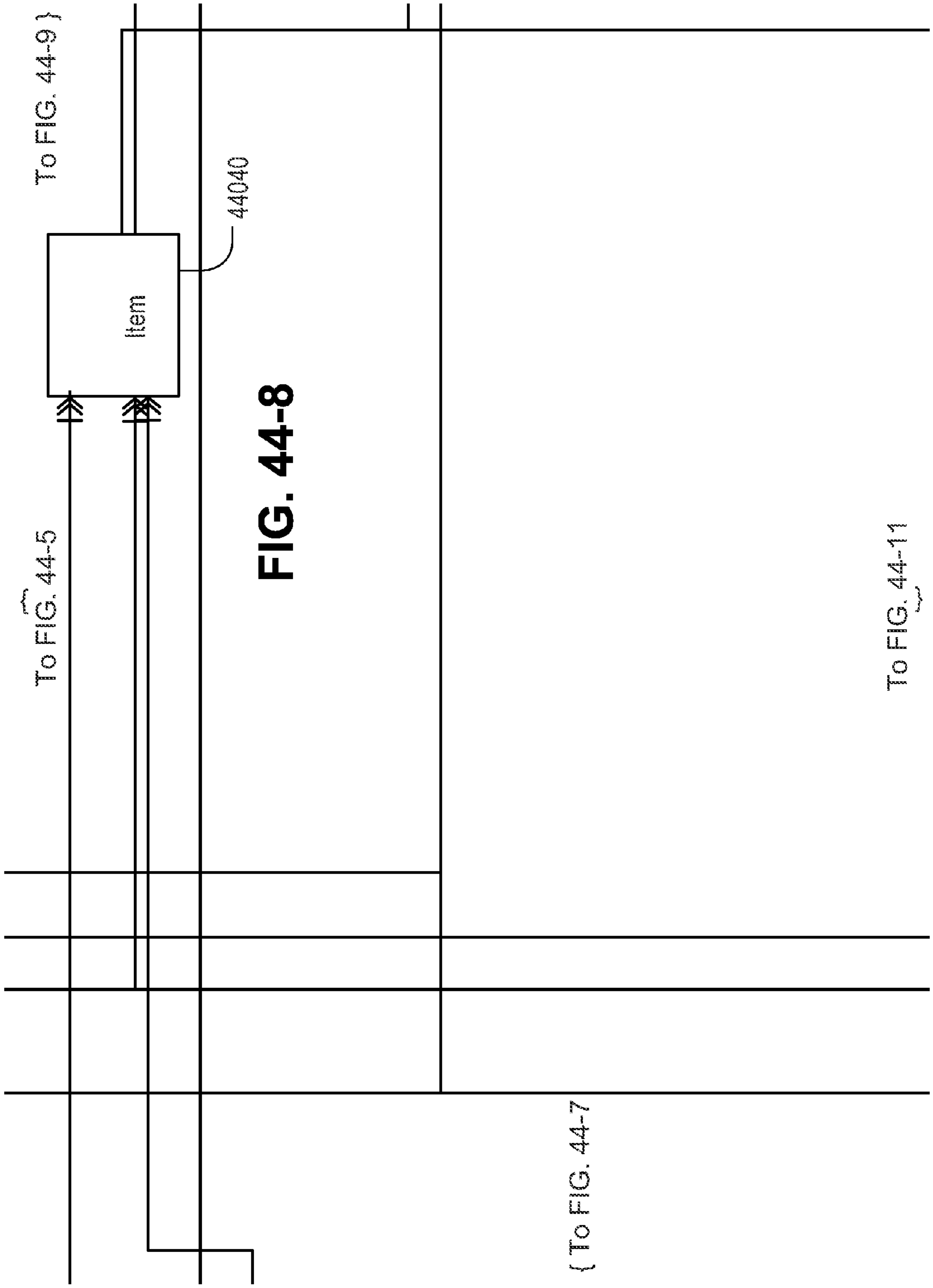
Figures 9, 44:
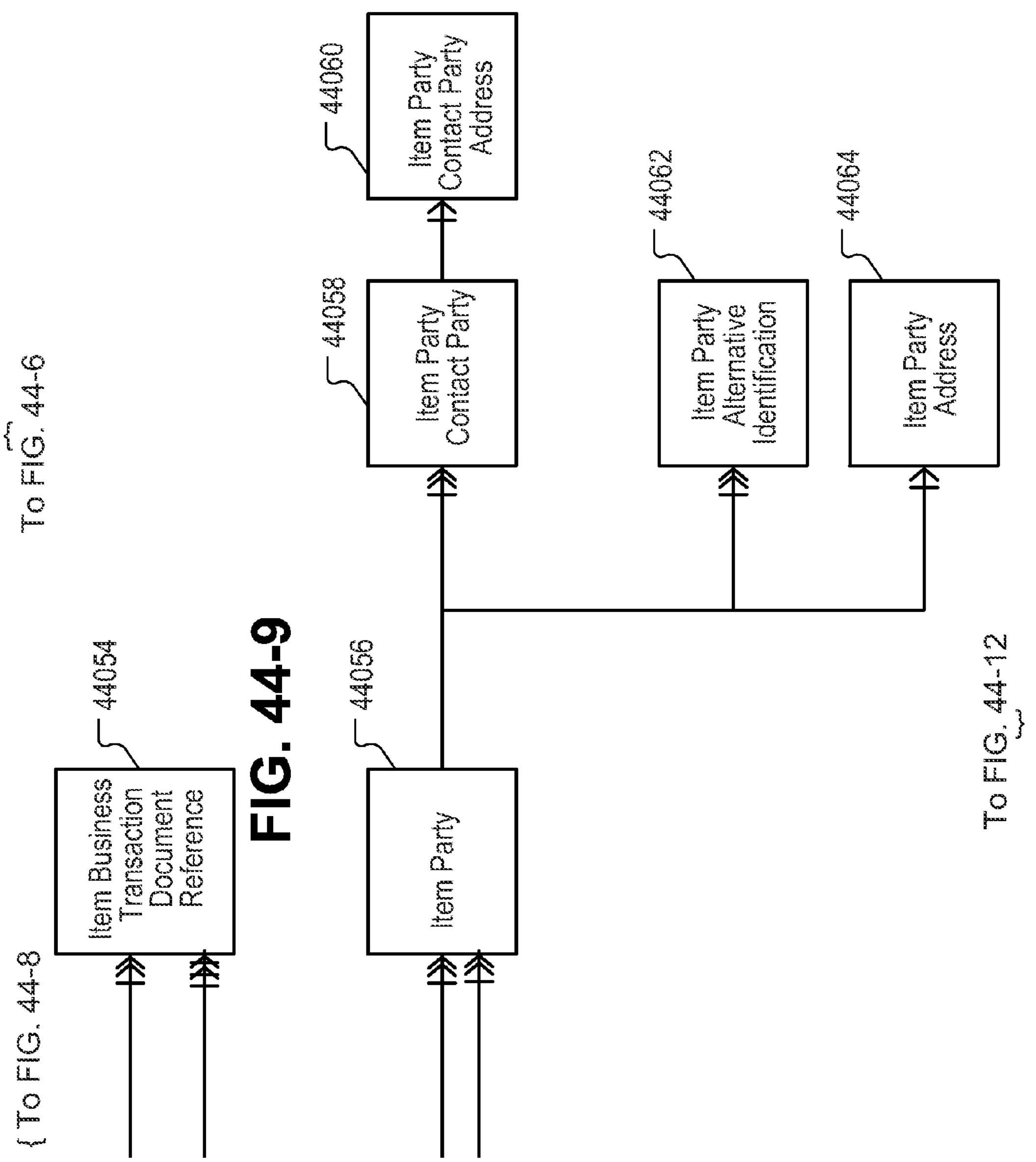
Figures 10, 44:
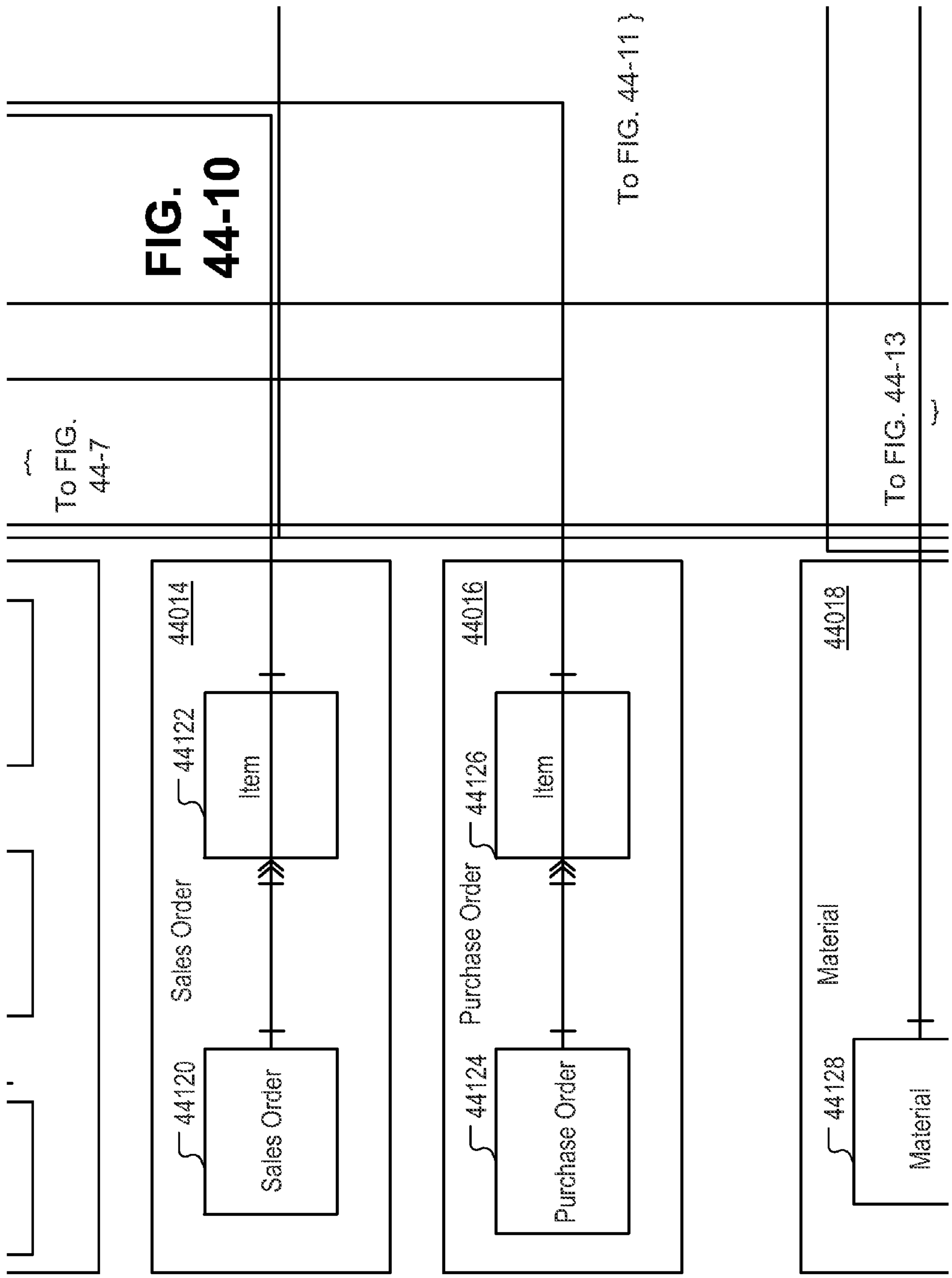
Figures 11, 44:
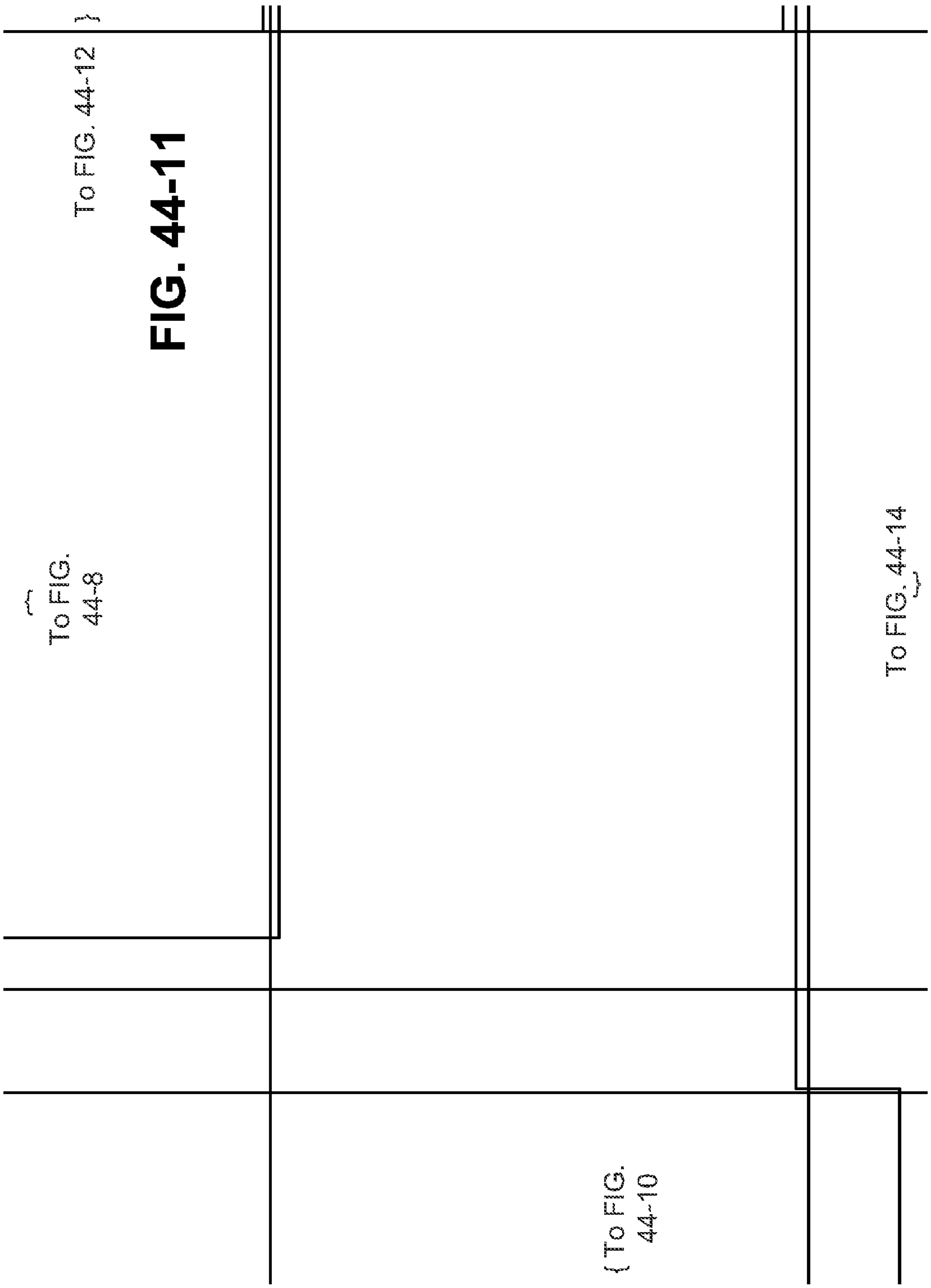
Figures 12, 44:
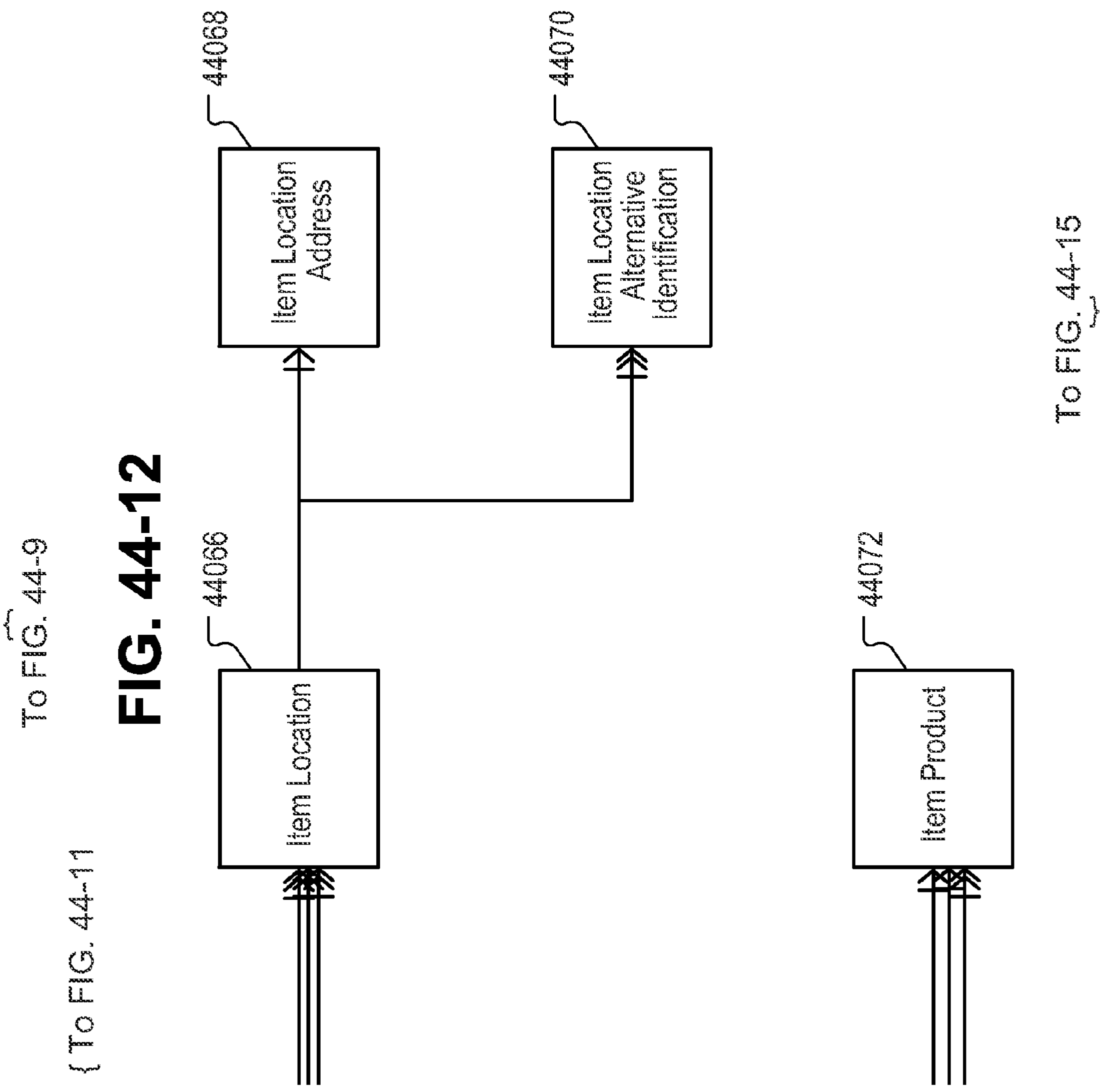
Figures 13, 44:
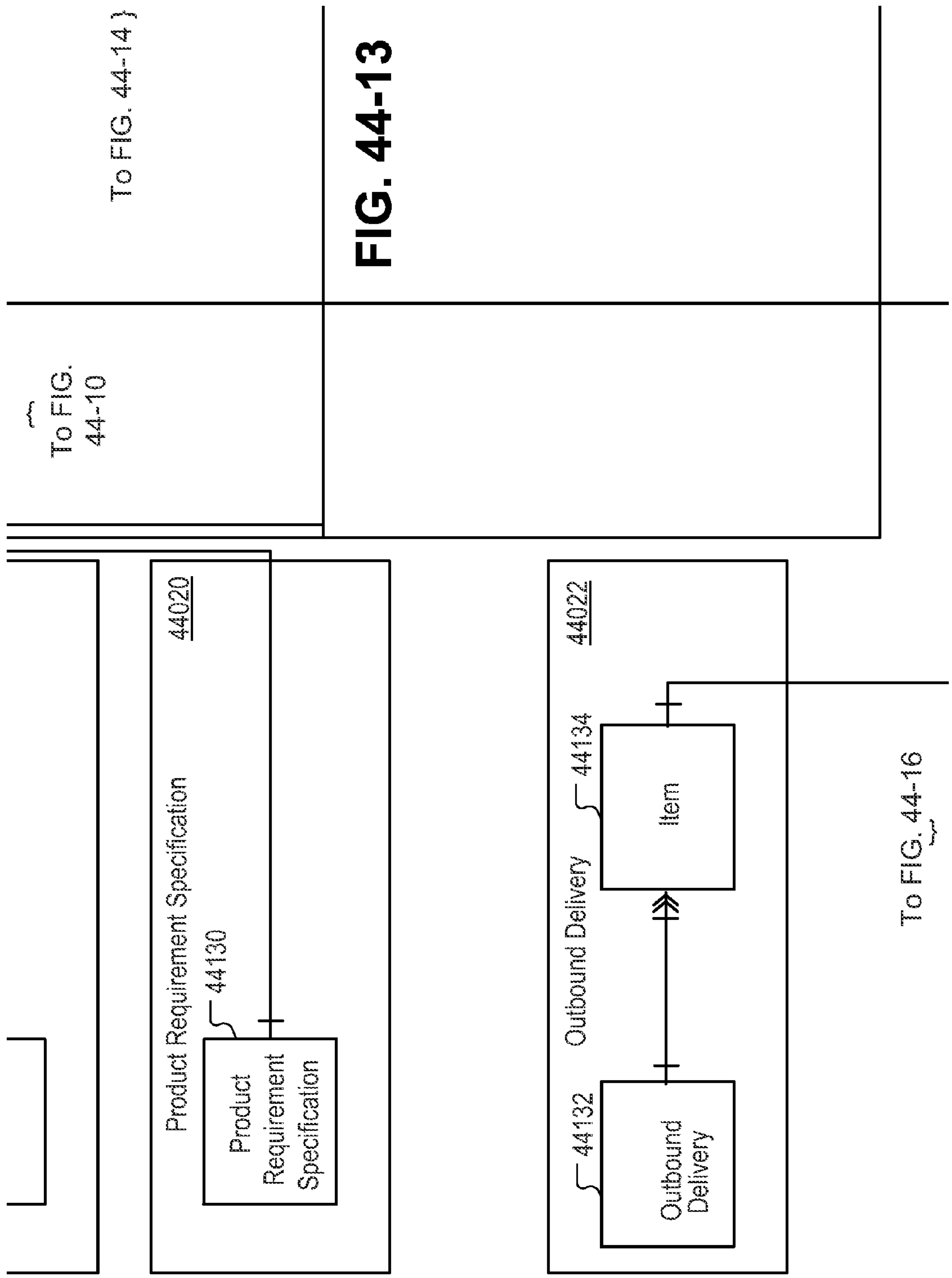
Figures 14, 44:
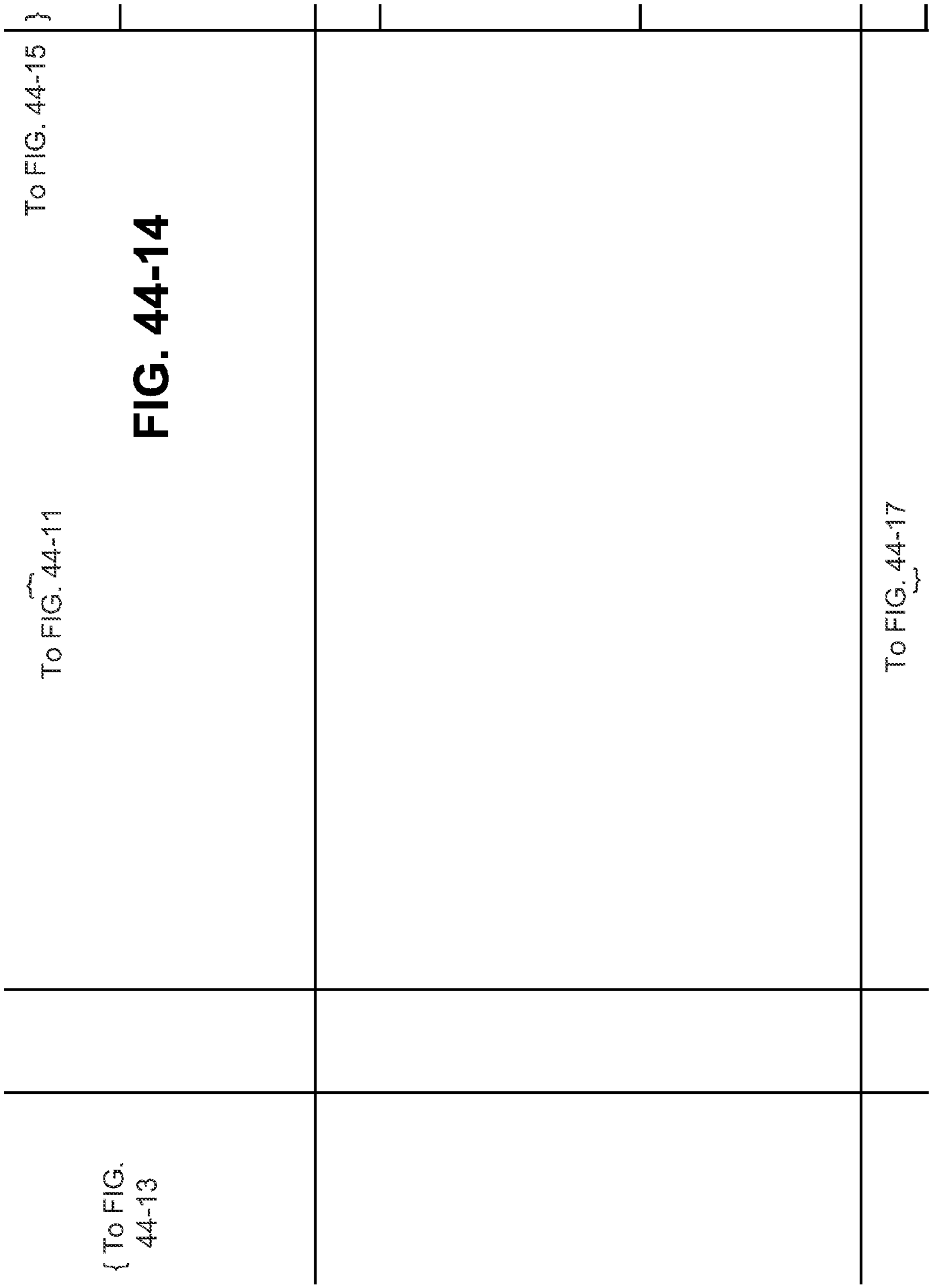
Figures 15, 44:
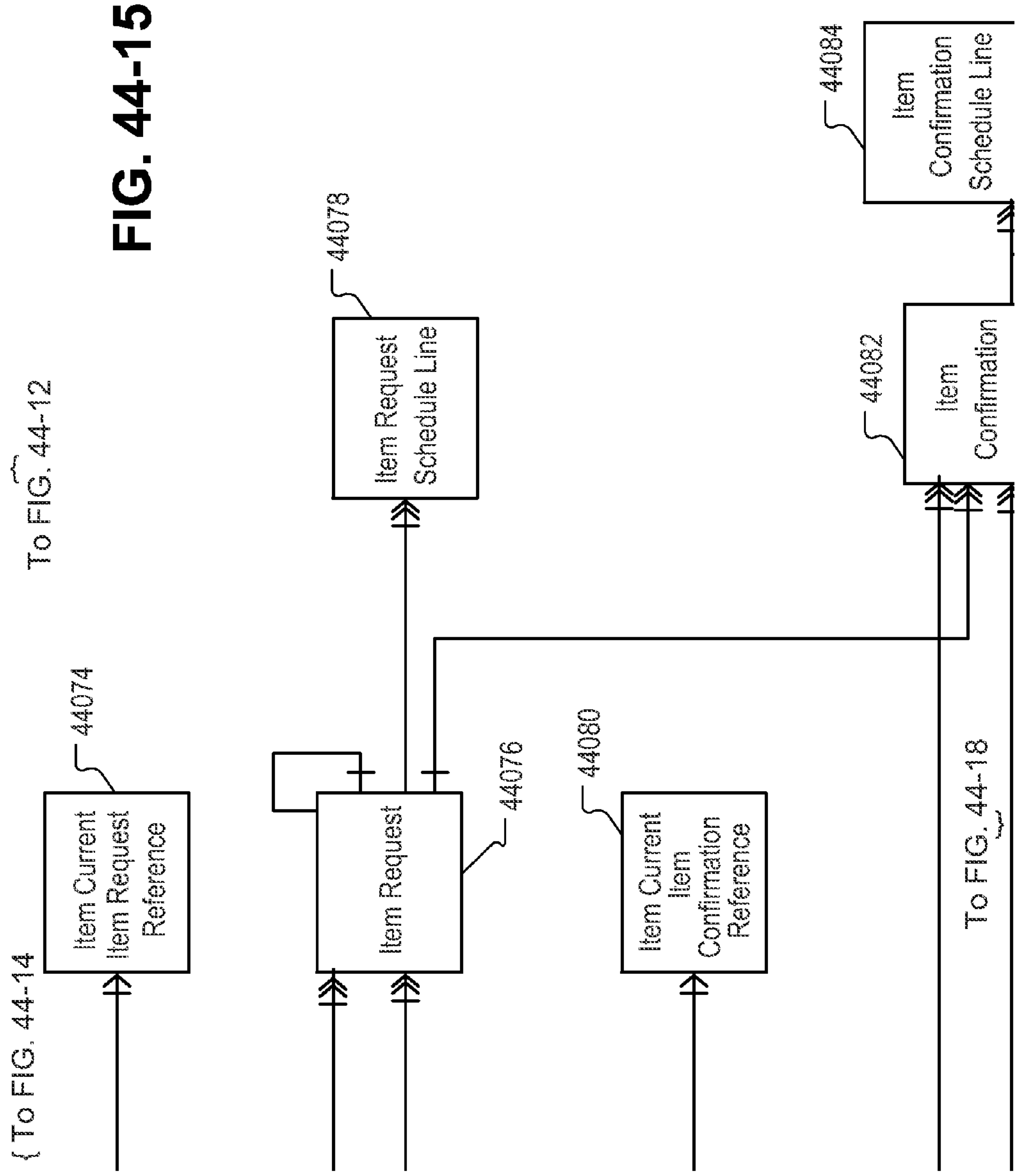
Figures 18, 44:
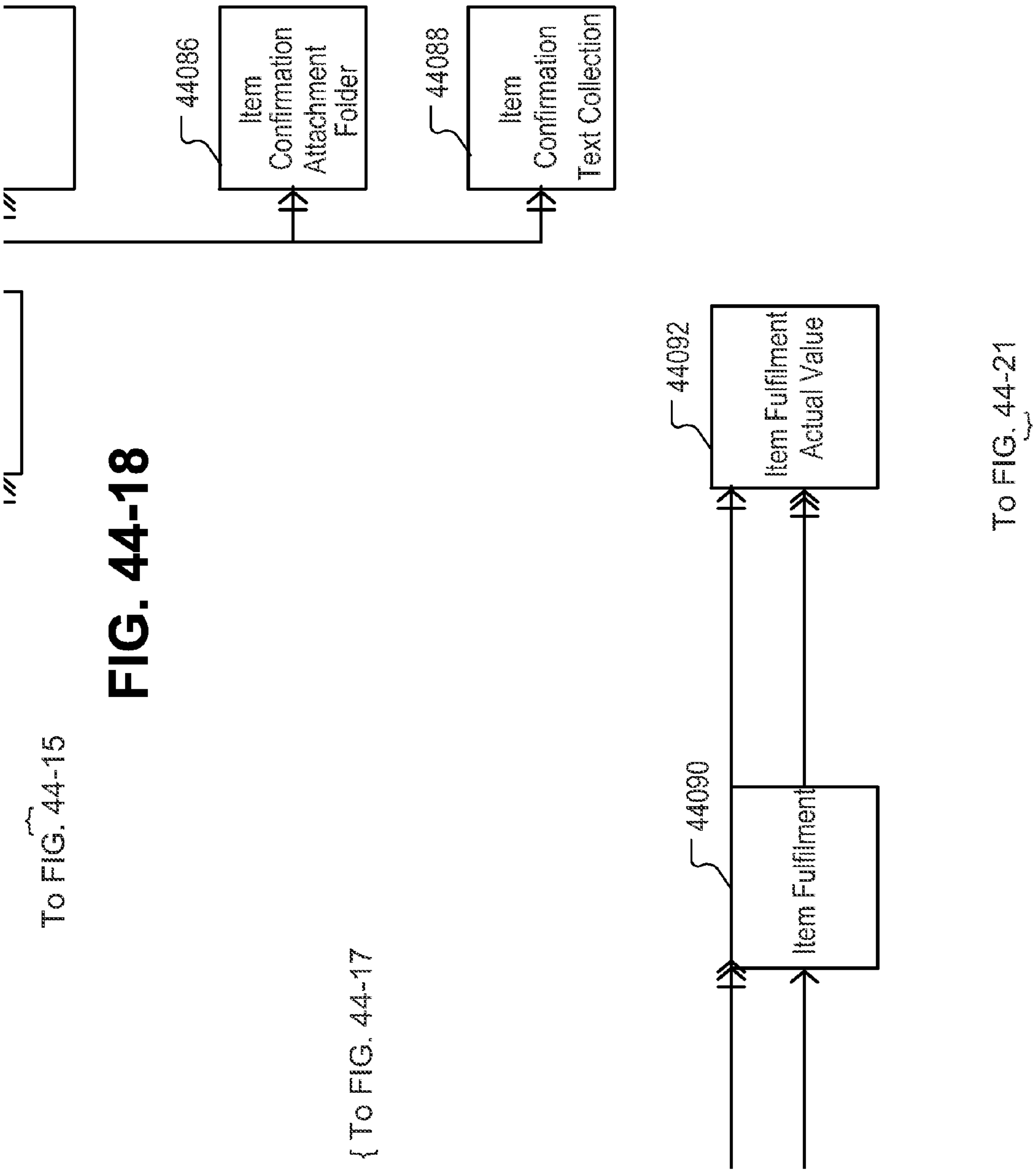
Figures 20, 44:
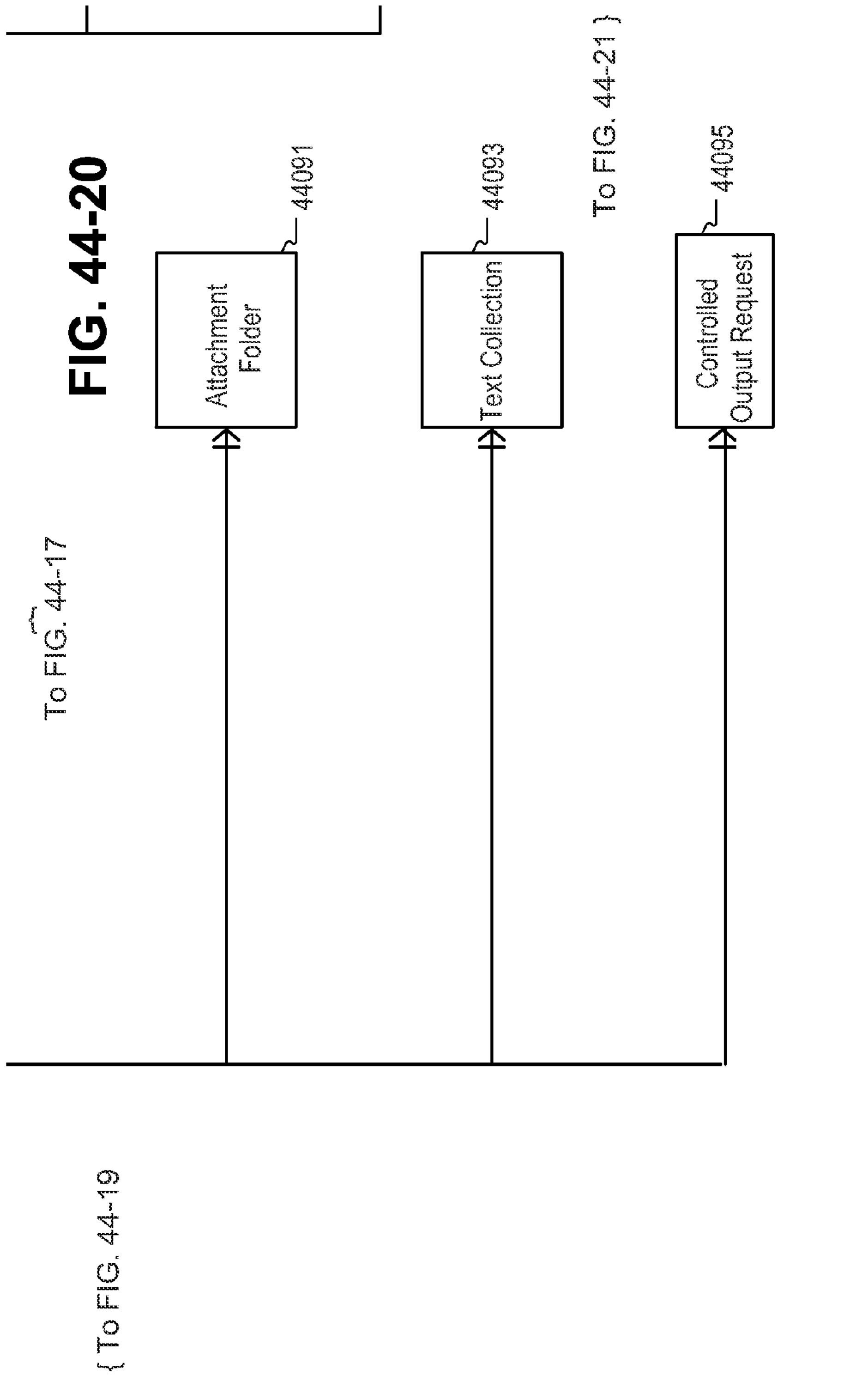
Figures 21, 44:
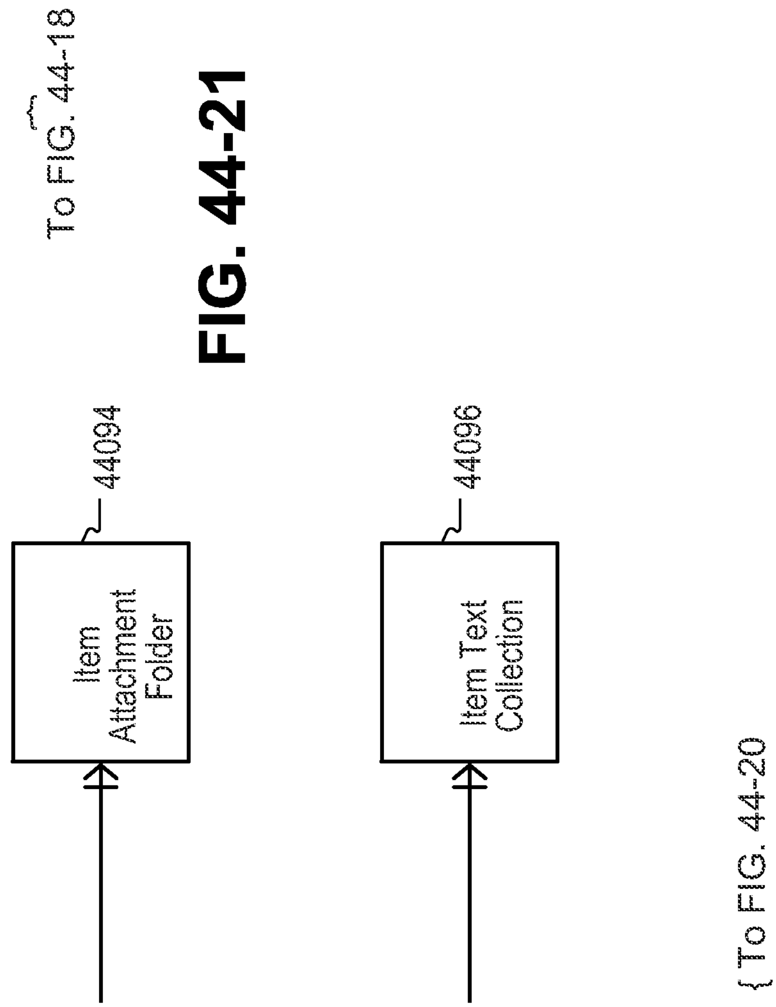

FIGS. 40-1 through 40-21 show an example configuration of an Element Structure that includes a FormUnspecifiedContentPackageTagNotification 400000 package. Specifically, these figures depict the arrangement and hierarchy of various components such as one or more levels of packages, entities, and datatypes, shown here as 400000 through 400682. As described above, packages may be used to represent hierarchy levels. Entities are discrete business elements that are used during a business transaction. Data types are used to type object entities and interfaces with a structure. For example, the FormUnspecifiedContentPackage TagNotification 400000 includes, among other things, a FormUnspecifiedContentPackageTagNotification 400002. Accordingly, heterogeneous applications may communicate using this consistent message configured as such.

Figures 1, 41:
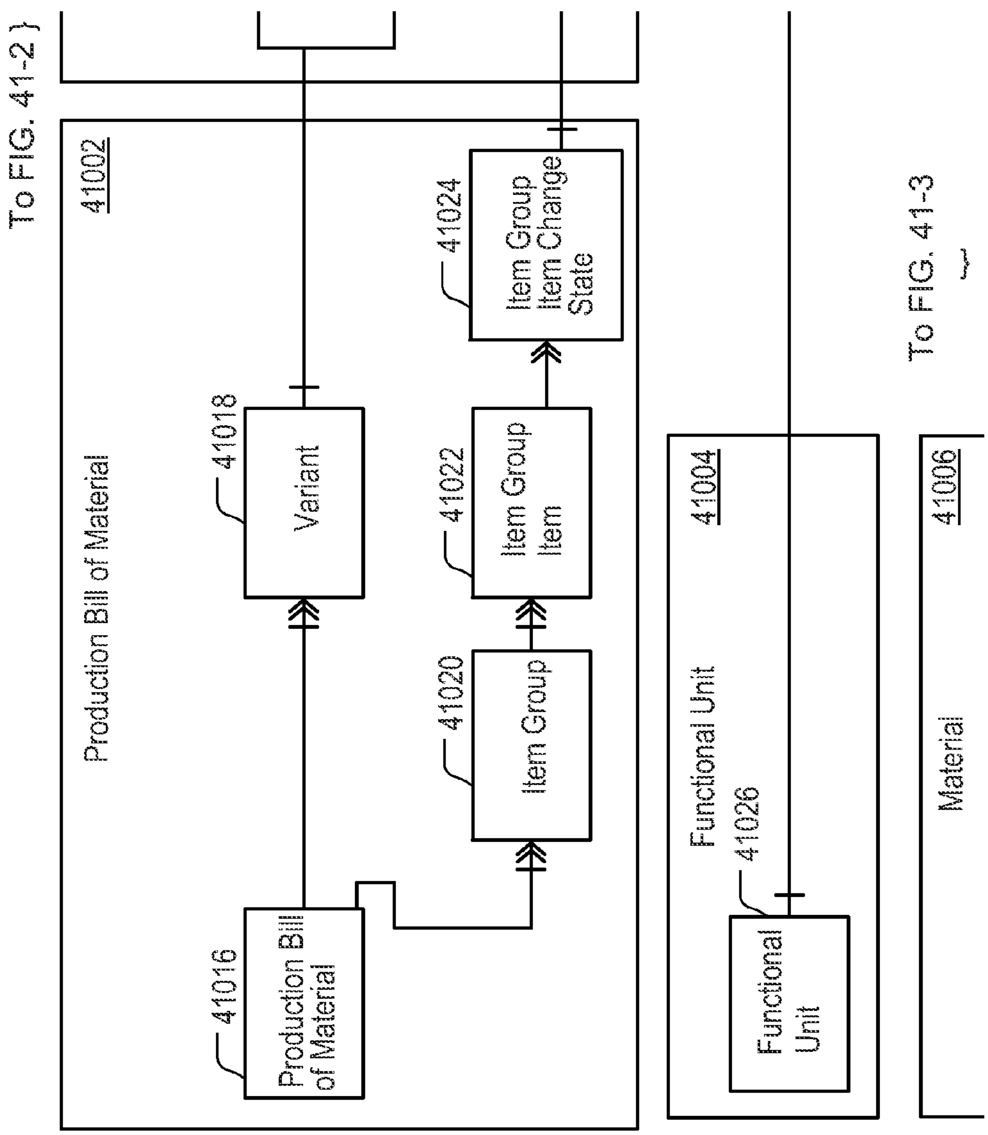
Figures 2, 41:
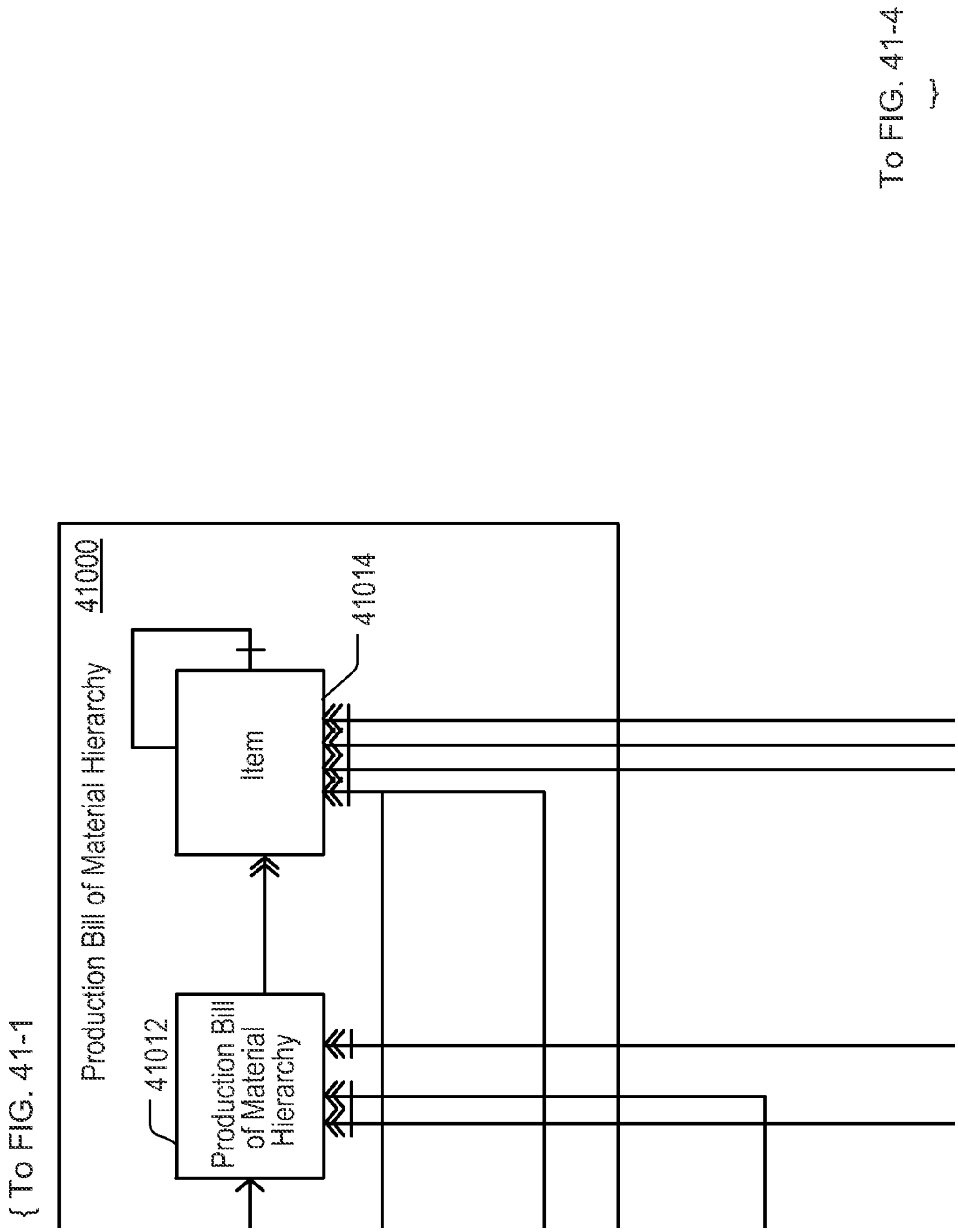
Figures 3, 41:
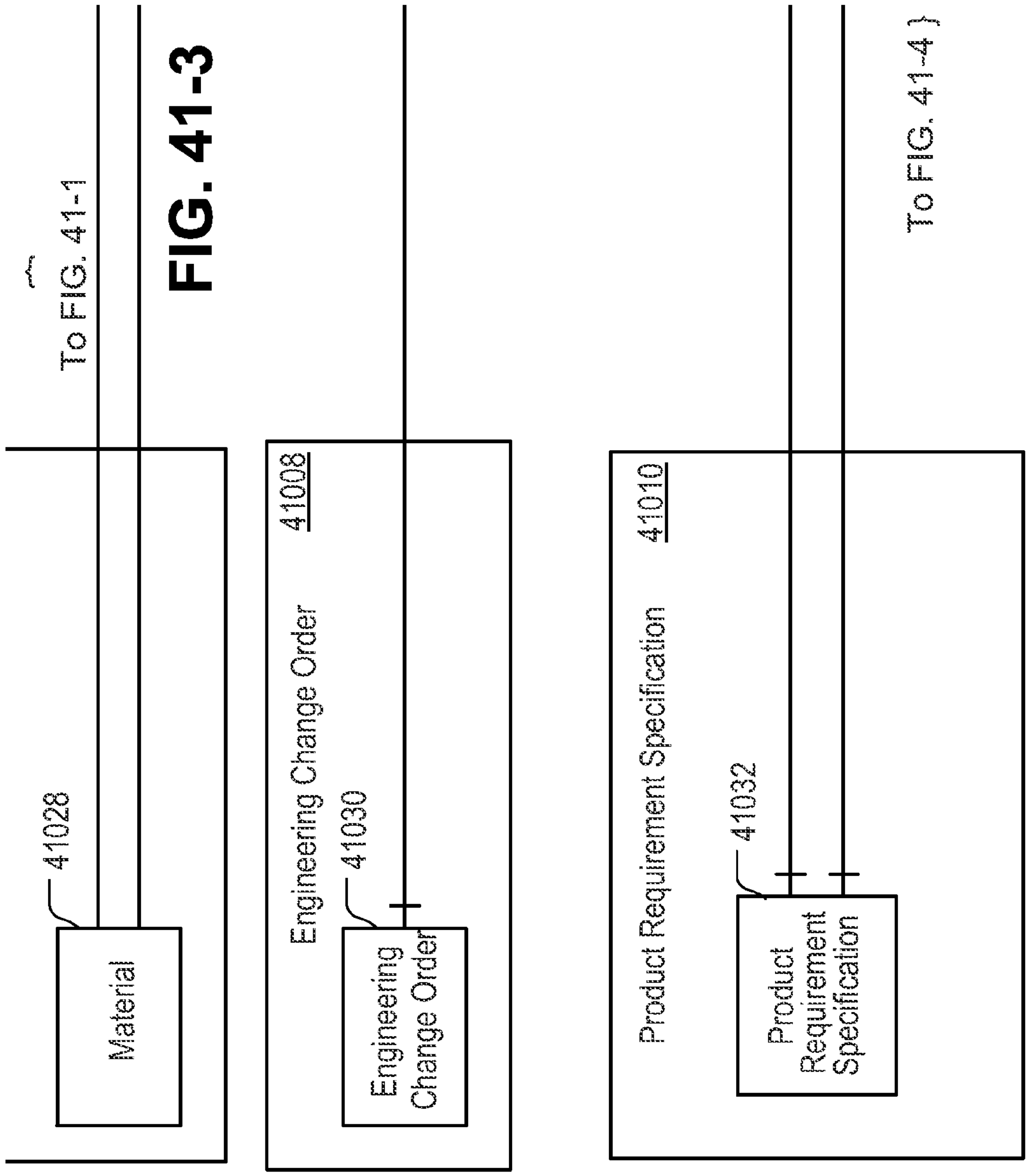
Figures 4, 41:
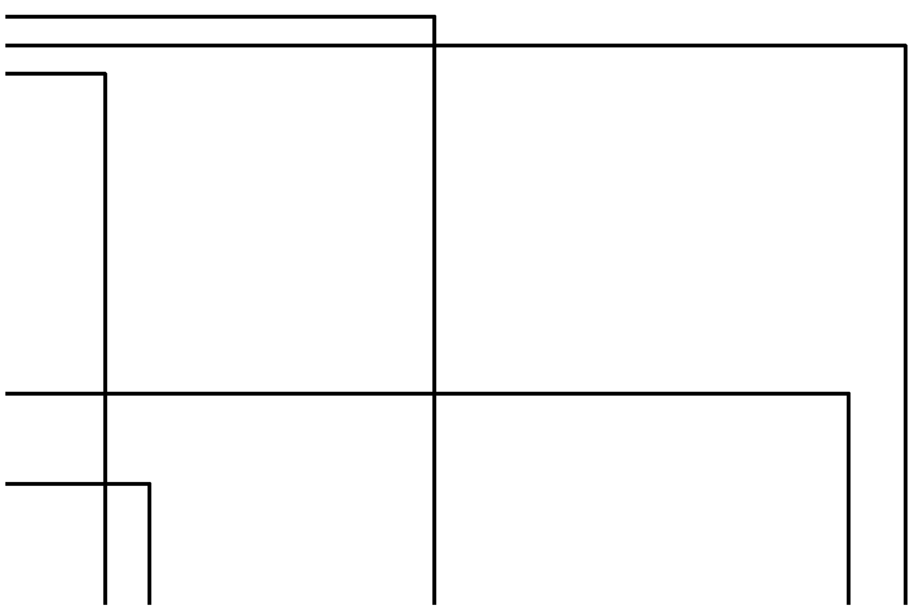

FIGS. 41-1 through 41-4 depict an example object model for a business object Production Bill of Material Hierarchy 41000. The business object 41000 has relationships with other objects 41002-41010, as shown with lines and arrows. The business object 41000 hierarchically comprises elements 41012, 41014. The other objects 41002-41010 include respective elements 41016-41032 as shown.

The business object Production Bill of Material Hierarchy is a hierarchy of production bills of material that are needed to produce a given material. The business object Production Bill of Material Hierarchy belongs to the process component Production Model Management. A production bill of material represents a single level of the assembly of a material. The hierarchy starts at a given production bill of material variant and includes the production bill of materials of all levels below. The production bill of material hierarchy allows for reviewing the complete structure of a complex product. For example, the production bill of material of a bicycle may consist of a frame, a saddle, a front wheel (with tire), a back wheel (with tire), and handlebars. There may be production bill of materials on the second level for the two wheels. The production bill of material of the front wheel (with tire) may consist of a wheel, an inner tube, and a tire. The production bill of material of the front wheel (without tire) may consist of a hub, spokes, and a rim. The production bill of material hierarchy for the bicycle consists of all four production bill of materials. The production bill of material hierarchy of the front wheel with tire consists of the production bill of material of the front wheel with tire and the production bill of material of the front wheel without tire.

The Production Bill of Material Hierarchy business object includes an item that can represent the top-level output of a hierarchy, items at intermediate levels that originate from merging a bill of material input with a bill of material output, and items representing the bottom-level components. The business object Production Bill of Material Hierarchy is a hierarchy of production bills of material needed to produce a given material. It includes detailed information about each element of the hierarchy, (represented in items) such as validity and quantity that were determined for a certain date for a certain output quantity and were calculated to a defined depth.

The elements located at the node Production Bill of Material Hierarchy can be defined by the data type ProductionBillOfMaterialHierarchyElements. These elements include: ProductionBillOfMaterialUUID, ProductionBillOfMaterialVariantUUID, ProductionBillOfMaterialVariantKey, MaterialUUID, LogisticsPreparationFunctionalUnitUUID, LogisticsPreparationFunctionalUnitID, ProductRequirement SpecificationVersionUUID, ProductRequirementSpecificationKey, ExplosionDate, Quantity, QuantityTypeCode, and MaximumHierarchyLevelOrdinalNumberValue. ProductionBillOfMaterialVariantKey includes the elements BillOfMaterialVariantID and BillOfMaterialID. ProductRequirementSpecificationKey includes the elements RequirementSpecificationID and RequirementSpecification- VersionID. ProductionBillOfMaterialUUID is a globally unique identifier for a production bill of material to which the production bill of variant belongs. It may be based on datatype GDT: UUID. ProductionBillOfMaterialVariantUUID is a globally unique identifier for a production bill of material variant for which the multi level hierarchy of parts necessary to produce the material of the variant is presented. It may be based on datatype GDT: UUID. In some implementations, ProductionBillOfMaterialVariantUUID is used as an alternative key. ProductionBillOfMaterialVariantKey is a grouping of elements that uniquely identifies a variant of a bill of material for which the multi level hierarchy of parts necessary to produce the material of the variant is presented. It may be based on datatype KDT: BillOfMaterialVariantKey. BillOfMaterialVariantID is an identifier for the variant of a bill of material. It may be based on datatype GDT: BillOfMaterialVariantID. BillOfMaterialID is an identifier for a bill of material. It may be based on datatype GDT: BillOfMaterialID. MaterialUUID is a globally unique identifier for the material to be assembled. It may be based on datatype GDT: UUID. LogisticsPreparationFunctionalUnitUUID is a globally unique identifier for the functional unit responsible for logistics preparation of the top-level production bill of material. It may be based on datatype GDT: UUID. LogisticsPreparationFunctionalUnitID is an identifier for the functional unit responsible for logistics preparation of the top-level production bill of material. It may be based on datatype GDT: OrganisationalCentreID. ProductRequirementSpecificationVersionUUID is a globally unique identifier for the version of the product requirement specification that is used in the production process for which the production bill of material variant is relevant. It may be based on datatype GDT: UUID. ProductRequirementSpecificationKey is a grouping of elements that uniquely identify the product requirement specification that is used in the production process for which the production bill of material variant is relevant. It may be based on datatype KDT: RequirementSpecificationKey. RequirementSpecificationID is an identifier for a requirement specification that is unique within one system. It may be based on datatype GDT: RequirementSpecificationID. RequirementSpecificationVersionID is an identifier for the version of a requirement specification. It may be based on datatype GDT: VersionID. ExplosionDate represents the point in time when the bill of material is exploded. The explosion date of the root node lies within the validity period of any hierarchy item. The explosion date is used as filter condition for the hierarchy. The current date can be set as the default value for the explosion date. It may be based on datatype GDT: Date, Qualifier: Explosion. Quantity is a quantity of the material used in the calculation of the quantities in the hierarchy items. The quantity of the production bill of material variant can be set as the default value for this quantity. It may be based on datatype GDT: Quantity. QuantityTypeCode is a coded representation of a type of quantity used to uniquely identify the quantity. It may be based on datatype GDT: QuantityTypeCode. MaximumHierarchyLevelOrdinalNumberValue is a number defining the restriction of maximum item levels relevant for the depth calculation of the hierarchy. If the number is empty or equal to zero then it is interpreted as no restriction. It may be based on datatype GDT: OrdinalNumberValue, Qualifier: Level.

A composition relationship to subordinate Item node may exist in a 1:N cardinality relationship. An inbound aggregation relationship may exist from the business object Production Bill of Material/node Variant to ProductionBillOfMaterialVariant with a cardinality of 1:1, which may represent a production bill of material variant which defines the top level of the hierarchy. An inbound association relationship may exist from the business object Functional Unit/node Functional Unit to LogisticsPreparationFunctionalUnit with a cardinality of C:CN, which may represent a Logistics Preparation Functional Unit for the top level of Production Bill Of Material Hierarchy. An inbound association relationship may exist from the business object Material/node Material to Material with a cardinality of 1:CN, which may represent an assembly material which is defined at the top level of production bill of material hierarchy. An inbound association relationship may exist from the business object Product Requirement Specification/node Product Requirement Specification to Product Requirement Specification with a cardinality of C:CN, which may represent the product requirement specification that is assigned to the production bill of material variant. A specialization association for navigation relationship may exist from own business object/node Item to TopLevelItem with a target cardinality of 1, which may represent an item at the top level of the hierarchy. A specialization association for navigation relationship may exist from the business object Material/node Overview to MaterialOverview with a target cardinality of 1, which may represent an overview of the Material. A specialization association for navigation relationship may exist from the business object Production Bill of Material/node Root to ProductionBillOfMaterial with a target cardinality of 1, which may represent a production bill of material to which the variant belongs.

Item details the production bill of material item change state (if the item appears as a component in the hierarchy) and details of the production bill of material variant (if the item appears as an assembly in the hierarchy). It can be time dependent based on Validity Period. A component in a bill of material can be a piece of equipment or material used as part of the bill of material. An assembly can be the output part of a bill of material that can be produced with the usage of component of the bill of material.

The elements located at the node Item can be defined by the data type ProductionBillOfMaterialHierarchyItemElements. These elements include: MaterialUUID, ProductionBillOfMaterialItemGroupItemChangeStateUUID, ProductionBillOfMaterialItemGroupItemKey, ProductionBillOfMaterialUUID, ProductionBillOfMaterialVariantUUID, Production BillOfMaterialVariantKey ProductionBillOfMaterialItemGroupItemChangeStateEngineeringChangeOrderUUID, ProductionBillOfMaterialItemGroupItemChangeState EngineeringChangeOrderID, ProductionBillOfMaterialVariantProductRequirementSpecificationVersionUUID, ProductionBillOfMaterialVariantProductRequirement SpecificationKey, HierarchyLevelOrdinalNumberValue, OrdinalNumberValue, ParentItemOrdinalNumberValue, ValidityDatePeriod, Quantity, QuantityTypeCode, ProductionBillOfMaterialItemGroupItemChangeStateQuantity FixedIndicator, and ChildItemActiveIndicator. ProductionBillOfMaterialItemGroupItemKey includes the elements BillOfMaterialItemGroupItemID and BillOfMaterialItemGroupKey. BillOfMaterialItemGroupKey includes the elements BillOfMaterialItemGroupID and BillOfMaterialID. ProductionBillOfMaterialVariantKey includes the elements ProductionBillOfMaterialVariantKey BillOfMaterialID. ProductionBillOfMaterialVariantProductRequirement SpecificationKey includes the elements RequirementSpecificationID and RequirementSpecificationVersionID. MaterialUUID is a globally unique identifier for the material to be assembled or required as a component for a material to be assembled. It may be based on datatype GDT: UUID. ProductionBillOfMaterialItemGroupItemChangeStateUUID is a globally unique identifier for the production bill of material item group item change state of the hierarchy item. It may be based on datatype GDT: UUID. ProductionBillOfMaterialItemGroupItemKey is a grouping of elements that uniquely identifies the production bill of material item group item to which the represented production bill of material change state of a hierarchy item belongs. It may be based on datatype KDT: BillOfMaterialItemGroupItemKey. BillOfMaterialItemGroupItemID is an identifier for an item group item. It is unique within a bill of material item group. It may be based on datatype GDT: BillOfMaterialItemGroupItemID. BillOfMaterialItemGroupKey is a grouping of elements that uniquely identifies an item group. If an item appears in the hierarchy as a component, then ProductionBillOfMaterialItemGroupItemKey is filled. It may be based on datatype KDT: BillOfMaterialItemGroupKey. BillOfMaterialItemGroupID is an identifier for an item group. It is unique within a bill of material. It may be based on datatype GDT: BillOfMaterialItemGroupID. BillOfMaterialID is an identifier for a bill of material. It may be based on datatype GDT: BillOfMaterialID. ProductionBillOfMaterialUUID is a globally unique identifier for the production bill of material to which the variant of a hierarchy item belongs. It may be based on datatype GDT: UUID. ProductionBillOfMaterialVariantUUID is a globally unique identifier for the production bill of material variant of a hierarchy item. It may be based on datatype GDT: UUID. ProductionBillOfMaterialVariantKey is a grouping of elements that uniquely identifies the production bill of material variant of a hierarchy item. If an item appears in the hierarchy as an assembly, then ProductionBillOfMaterialVariantKey is filled. It may be based on datatype KDT: BillOfMaterialVariantKey. ProductionBillOfMaterialVariantKey is an identifier for the variant of a bill of material. It may be based on datatype GDT: BillOfMaterialVariantID. BillOfMaterialID is an identifier for a bill of material. It may be based on datatype GDT: BillOfMaterialID. ProductionBill OfMaterialItemGroupItemChangeStateEngineering Change OrderUUID is a globally unique identifier for the engineering change order that is assigned to the production bill of material item group item change state of a hierarchy item. It may be based on datatype GDT: UUID. ProductionBillOfMaterialItemGroupItemChangeStateEngineeringChangeOrderID is an identifier for the engineering change order that is assigned to the production bill of material item group item change state of a hierarchy item. It may be based on datatype GDT: EngineeringChangeOrderID. ProductionBillOfMaterialVariantProductRequirementSpecificationVersionUUID is a globally unique identifier for the version of the product requirement specification that is used in the production process for which the production bill of material variant is relevant. In some implementations, ProductRequirementSpecification may be the same ProductRequirementSpecification that is assigned to the production bill of material hierarchy. It may be based on datatype GDT: UUID. ProductionBillOfMaterialVariantProductRequirementSpecificationKey is a grouping of elements that uniquely identify the product requirement specification that is used in the production process for which the production bill of material variant is relevant. In some implementations, the ProductRequirementSpecification may be the same ProductRequirementSpecification that is assigned to the production bill of material hierarchy. It may be based on datatype KDT: RequirementSpecificationKey, Qualifier: Product. RequirementSpecificationID is an identifier for a requirement specification that is unique within one system. It may be based on datatype GDT: RequirementSpecificationID. RequirementSpecificationVersionID is an identifier for the version of a requirement specification. It may be based on datatype GDT: VersionID. HierarchyLevelOrdinalNumberValue represents a level number in the hierarchy at which an item is located. In some implementations, the level number of the top-level item is equal to zero. It may be based on datatype GDT: OrdinalNumberValue, Qualifier: HierarchyLevel. OrdinalNumberValue represents an ordinal number of an item in the hierarchy. It may be based on datatype GDT: OrdinalNumberValue. ParentItemOrdinalNumberValue represents the ordinal number of the parent item. It may be based on datatype GDT: OrdinalNumberValue. ValidityDatePeriod represents a period in which an item is valid. In some implementations, the explosion date of the root node lies within the validity period of any hierarchy item. The validity period can be derived from an engineering change order assigned to the production bill of material item group item change state. It may be based on datatype GDT: CLOSED_DatePeriod, Qualifier: Validity. Quantity is a calculated quantity of an item based on the root quantity. It may be based on datatype GDT: Quantity. QuantityTypeCode is a coded representation of a type of quantity used to uniquely identify the quantity. It may be based on datatype GDT: QuantityTypeCode. ProductionBillOfMaterialItemGroupItemChangeStateQuantityFixedIndicator is an indicator that specifies whether or not the quantity of a production bill of material item group item change state, represented by the hierarchy item, of the assigned component material is fixed and independent of the quantity of the material to be assembled. It may be based on datatype GDT: Indicator, Qualifier: Fixed. ChildItemActiveIndicator is an indicator that specifies whether or not the child items of an item are active. In some implementations, if the HierarchyOrdinalLevelNumberValue of the item is smaller than the MaximumHierarchyOrdinalLevelNumber and the item exists as a production bill of material variant, then its child items are active. It may be based on datatype GDT: Indicator, Qualifier: Active.

An inbound association relationship may exist from the business object Engineering Change Order/node Engineering Change Order to EngineeringChangeOrder with a cardinality of C:CN, which may represent an engineering change order that controls the validity conditions of the change states of the production bill of material item of the hierarchy item. An inbound association relationship may exist from the business object Material/node Material to Material with a cardinality of 1:CN, which may represent material to be assembled or required as a component for a material to be assembled. An inbound association relationship may exist from the business object Product Requirement Specification/node Product Requirement Specification to Product Requirement Specification with a cardinality of C:CN, which may represent a product requirement specification that is assigned to the production bill of material variant of the hierarchy item. An inbound association relationship may exist from the business object Production Bill of Material/node Item Group Item Change State to ProductionBillOfMaterialItemGroupItemChangeState with a cardinality of C:CN, which may represent a production bill of material item group item change state of a hierarchy item which is a component. An inbound association relationship may exist from the business object Production Bill of Material/node Variant to ProductionBillOfMaterialVariant with a cardinality of C:CN, which may represent a production bill of material variant of a hierarchy item which an assembly. An inbound association relationship may exist from the business object Production Bill of Material Hierarchy/node Item to ParentItem with a cardinality of C:CN, which may represent a parent of an item. A specialization association for navigation relationship may exist from own business object/node Item to ChildItem with a target cardinality of CN, which may represent items which are children of a certain item. A specialization association for navigation relationship may exist from business object Material/node Overview to MaterialOverview with a target cardinality of 1, which may represent an overview of the material. A specialization association for navigation relationship may exist from business object Production Bill of Material/node Root to ProductionBillOfMaterial with a target cardinality of C, which may represent a production bill of material to which the item variant belongs.

In some implementations, there is exactly one item that has no parent (concerning the association ParentItem), which is the top-level item. This item can represent the final assembly of the hierarchy. The top-level item and the root include the same production bill of material variant key. In some implementations, the top-level item does not include any production bill of material item group item or item change state information. In some implementations, for any other item the production bill of material item group item change state data is optional. If an item includes production bill of material item group item change state data, it can also include the details for the production bill of material item group item and engineering change order.

Figure 42:
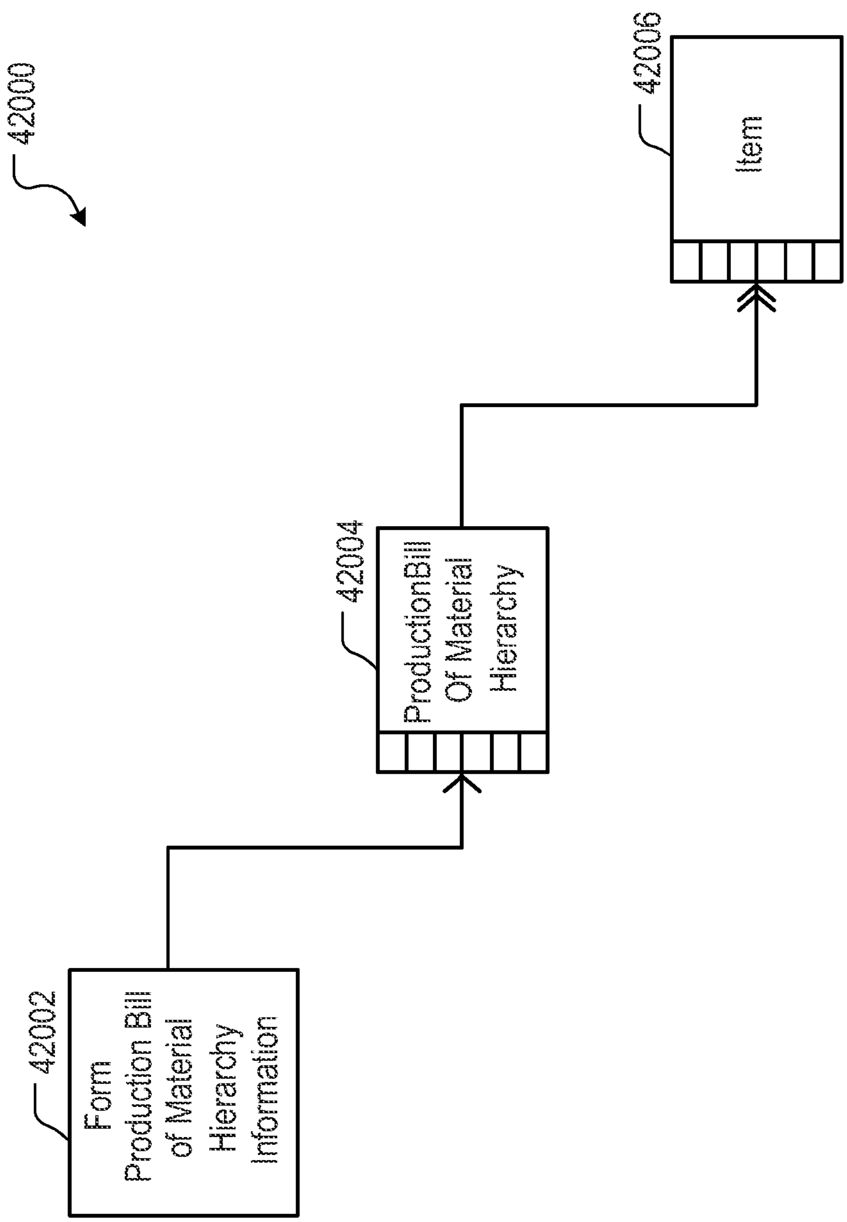
FIG. 42 depicts an example Form Production Bill of Material Hierarchy Information Message Data Type.

FIG. 42 depicts an example Form Production Bill of Material Hierarchy Information Message Data Type 42000, which comprises elements 42002-42006, hierarchically related as shown. For example, the Form Production Bill of Material Hierarchy Information 42002 includes a Production Bill Of Material Hierarchy 42004.

The message type Form Production Bill of Material Hierarchy Information is derived from the business object ProductionBillOfMaterialHierarchy leading object together with its operation signature. Form Production Bill of Material Hierarchy Information is a form for preview and output of a production bill of material hierarchy. The structure of the Form Production Bill of Material Hierarchy Information message type can be determined by the message data type FormProductionBillOfMaterialHierarchyMessage.

The FormProductionBillOfMaterialHierarchyMessage message data type includes the object ProductionBillOfMaterialHierarchy which is included in the business document, and the business information that is relevant for sending a business document in a message. It includes the MessageHeader and ProductionBillOfMaterialHierarchy packages. This message data type provides the structure for the Form Production Bill of Material Hierarchy Information message type and the operations that are based on it.

The MessageHeader package is a grouping of business information that is relevant for sending a business document in a message. It includes the MessageHeader node. MessageHeader is a grouping of business information from the perspective of the sending application. It includes information to identify the business document in a message, information about the sender, and optionally, information about the recipient.

The ProductionBillOfMaterialHierarchy package is a grouping of ProductionBillOfMaterialHierarchy with its packages. It includes the Item package and the ProductionBillOfMaterialHierarchy entity. ProductionBillOfMaterialHierarchy is the hierarchy of production bills of material that are needed to get an overview of all assembly levels required to produce a material.

ProductionBillOfMaterialHierarchy includes the non-node elements: ProductionBillOfMaterialID, ProductionBillOfMaterialDescription, ProductionBillOfMaterialVariantID, ProductionBillOfMaterialVariantDescription, MaterialID, MaterialDescription, ExplosionDate, MaximumHierarchyLevelOrdinalNumberValue, and Quantity. Quantity includes the elements Quantity, QuantityMeasureUnitCodeName, QuantityTypeCode, and QuantityTypeCodeName. ProductionBillOfMaterialID may be based on datatype GDT:BillOfMaterialID. ProductionBillOfMaterialDescription may be based on datatype GDT:MEDIUM_Description. ProductionBillOfMaterialVariantID may be based on datatype GDT:BillOfMaterialVariantID. ProductionBillOfMaterialVariantDescription may be based on datatype GDT:MEDIUM_Description. MaterialID may be based on datatype GDT:ProductID. MaterialDescription may be based on datatype GDT:SHORT_Description. ExplosionDate may be based on datatype CDT:Date. MaximumHierarchyLevelOrdinalNumberValue may be based on datatype GDT:OrdinalNumberValue. Quantity may be based on datatype IDT: FormQuantity. The element Quantity may be based on datatype CDT:Quantity. QuantityMeasureUnitCodeName may be based on datatype CDT:Name. QuantityTypeCode may be based on datatype GDT:QuantityTypeCode. QuantityTypeCodeName may be based on datatype CDT:Name. The ProductionBillOfMaterialHierarchy package includes a node element Item in a 1:N cardinality relationship. The ProductionBillOfMaterialHierarchyItem package includes the Item entity. Item of the Production Bill of Material Hierarchy holds details of the production bill of material item change state (if the item appears as a component in the hierarchy) and details of the production bill of material variant (if the item appears as a sub-assembly in the hierarchy). Item includes the non-node elements: HierarchyLevelOrdinalNumberValue, OrdinalNumberValue, ParentItemOrdinalNumberValue, MaterialID, MaterialDescription, ProductionBillOfMaterialID, ProductionBillOfMaterialDescription, ProductionBillOfMaterialDescription, ProductionBillOfMaterialVariantID, ProductionBillOfMaterialVariantDescription, ProductionBillOfMaterialItemGroupID, ProductionBillOfMaterialItemGroupItemID, ProductionBillOfMaterialItemGroupItemChangeStateEngineering ChangeOrderID, Quantity, ValidityDatePeriod, and ProductionBillOfMaterialItemGroupItemChangeStateQuantity FixedIndicator. Quantity includes the elements Quantity, QuantityMeasureUnitCodeName, QuantityTypeCode, and QuantityTypeCodeName. HierarchyLevelOrdinalNumberValue may be based on datatype GDT: OrdinalNumberValue. OrdinalNumberValue may be based on datatype GDT:OrdinalNumberValue. ParentItemOrdinalNumberValue may be based on datatype GDT:OrdinalNumberValue. MaterialID may be based on datatype GDT:ProductID. MaterialDescription may be based on datatype GDT:SHORT_Description. ProductionBillOfMaterialID may be based on datatype GDT: BillOfMaterialID. ProductionBillOfMaterialDescription may be based on datatype GDT:MEDIUM_Description. ProductionBillOfMaterialVariantID may be based on datatype GDT:BillOfMaterialVariantID. ProductionBillOfMaterialVariantDescription may be based on datatype GDT:MEDIUM_Description. ProductionBillOfMaterialItemGroupID may be based on datatype GDT:BillOfMaterialItemGroupID. ProductionBillOfMaterialItemGroupItemID may be based on datatype GDT:BillOfMaterialItemGroupItemID. ProductionBillOfMaterialItemGroupItemChangeStateEngineering ChangeOrderID may be based on datatype GDT:EngineeringChangeOrderID. Quantity may be based on datatype IDT: FormQuantity. The element Quantity may be based on datatype CDT:Quantity. QuantityMeasureUnitCodeName may be based on datatype CDT:Name. QuantityTypeCode may be based on datatype GDT:QuantityTypeCode. QuantityTypeCodeName may be based on datatype CDT:Name. ValidityDatePeriod may be based on datatype GDT: CLOSED_DatePeriod. ProductionBillOfMaterialItemGroupItemChangeStateQuantityFixedIndicator may be based on datatype CDT:Indicator.

FIGS. 43-1 through 43-6 show an example configuration of an Element Structure that includes a FormProductionBillOfMaterialHierarchy 430000 package. Specifically, these figures depict the arrangement and hierarchy of various components such as one or more levels of packages, entities, and datatypes, shown here as 430000 through 430212. As described above, packages may be used to represent hierarchy levels. Entities are discrete business elements that are used during a business transaction. Data types are used to type object entities and interfaces with a structure. For example, the FormProductionBillOfMaterialHierarchy 430000 includes, among other things, a FormProductionBillOfMaterialHierarchy 430002. Accordingly, heterogeneous applications may communicate using this consistent message configured as such.

FIGS. 44-1 through 44-21 depict an example object model for a business object ReleaseOrder_Template 44000. The business object 44000 has relationships with other objects 44002-44022, as shown with lines and arrows. The business object 44000 hierarchically comprises elements 44024-44096. The other objects 44002-44022 include respective elements 44098-44134 as shown.

The business object ReleaseOrder_Template is a template that includes the maximal possible set of nodes, relationships, attributes, and operations for a procurement release order and similar objects derived from the template. A release order is a request to release a specified quantity of material for delivery within a specified time. This request includes information about the material flow. If the material flow represents a sales process, the financial conditions can be specified by referring to an outline agreement.

The business object is used within Third-Party Direct Ship by a buyer to request that a seller delivers a specified quantity of material within a specified time. It is used during Intra Company Stock Transfer as a means to control the shipment of goods from one location to another within a company.

The ReleaseOrder_Template includes the main parts the Root and the Item. The Root includes information on parties, locations, and status with information on the ordered goods or the goods to be delivered. The Item includes information on the product to be delivered and its quantities, as well as on parties and status.

The Business Object is involved in the Process Component Interaction Models: External Procurement Trigger and Response_Accounting, External Procurement Trigger and Response_Outbound Delivery Processing, External Procurement Trigger and Response_Supplier Invoice Processing, and External Procurement Trigger Response_Customer Requirement Processing at Supplier.

The technical name for Service Interface Sales and Purchasing Accounting Out is ExternalProcurementTriggerAndResponseSalesAndPurchasingAccountingOut. The Service Interface Sales and Purchasing Accounting Out is part of the External Procurement Trigger and Response_Accounting Process Component Interaction Models. It is an interface that informs accounting about the creation or cancellation of a procurement release order, or of accounting-relevant changes to a procurement release order.

The technical name for Notify of Procurement Release Order is ExternalProcurementTriggerAndResponse Sales AndPurchasingAccountingOut.NotifyOfProcurement Release Order. It notifies accounting that a procurement release order has been created, changed, or canceled. The operation can be based on message type Sales And Purchasing Accounting Notification (derived from business object Accounting Notification).

The technical name for Service Interface Delivery Fulfilment In is ExternalProcurementTriggerAndResponse DeliveryFulfilmentIn. The Service Interface Delivery Fulfilment In is part of the External Procurement Trigger and Response_Outbound Delivery Processing Process Component Interaction Models. It is an interface that performs the update of a procurement release order based on delivery fulfillment confirmation and reconciliation.

The technical name for Change Procurement Release Order based on Delivery Fulfilment Confirmation is ExternalProcurementTriggerAndResponseDeliveryFulfilmentIn ChgProcmtReleaseOrder BasedOnDeliveryFulfilmentConfirmation. It updates a procurement release order with fulfillment confirmation data from an outbound delivery request. The operation can be based on message type Delivery Request Fulfilment Confirmation (derived from business object Delivery Request_Template).

The technical name for Service Interface Delivery Fulfilment Out is ExternalProcurementTriggerAnd ResponseDeliveryFulfilmentOut. The Service Interface Delivery Fulfilment Out is part of the External Procurement Trigger and Response_Outbound Delivery Processing Process Component Interaction Models. It is an interface to request delivery fulfillment.

The technical name for Request Delivery Fulfilment is ExternalProcurementTriggerAndResponseDelivery FulfilmentOut.RequestDeliveryFulfilment. It can create or update an outbound delivery request. The operation can be based on message type Delivery Request Fulfilment Request (derived from business object Delivery Request_Template).

The technical name for Service Interface Invoice Verification Out is ExternalProcurementTriggerAnd ResponseInvoiceVerificationOut. The Service Interface Invoice Verification Out is part of the External Procurement Trigger and Response_Supplier Invoice Processing Process Component Interaction Models. It is an interface that informs supplier invoice processing that a procurement release order expects a supplier invoice, as a follow-on document. It provides supplier invoice processing with the data necessary to create a supplier invoice request.

The technical name for Notify of Invoicing Due is ExternalProcurementTriggerAndResponseInvoiceVerificationOut.NotifyOfInvoicingDue. It notifies supplier invoice processing about a new, changed, or canceled procurement release order. The operation can be based on message type Invoicing Due Notification (derived from business object Supplier Invoice Request).

The technical name Service Interface Releasing In is ExternalProcurementTriggerAndResponseReleasingIn. The Service Interface Releasing In is part of the External Procurement Trigger Response_Customer Requirement Processing at Supplier Process Component Interaction Models. It is an interface to update a procurement release order.

The technical name for Change Procurement Release Order based on Procurement Release Order Confirmation is ExternalProcurementTriggerAndResponseReleasing In. ChangeProcurementReleaseOrderBasedOnProcurement ReleaseOrderConfirmation. It updates a procurement release order based on confirmation received from customer requirement processing at a supplier. The operation can be based on message type Procurement Release Order Confirmation (derived from business object Procurement Release Order).

The technical name for Service Interface Releasing Out is ExternalProcurementTriggerAndResponseReleasingOut. The Service Interface Releasing Out is part of the External Procurement Trigger Response_Customer Requirement Processing at Supplier Process Component Interaction Models. It is an interface to request creation, update, or cancelation of a procurement release order.

The technical name for Request Release Order is ExternalProcurementTriggerAndResponseReleasingOut.RequestReleaseOrder. It can create, update, or request the cancelation of a procurement release order. The operation is based on message type Form Procurement Release Order Request (derived from business object Procurement Release Order).

ReleaseOrder_Template root node is a composition of goods provided for shipping by a vendor. ReleaseOrder_Template has a Procurement Release Order projection. The projection is a request sent to a goods supplier from a procurement officer to deliver a specified quantity of material within a specified time. The elements located at the ReleaseOrder_Template node can be defined by the datatype ReleaseOrderElements. These elements include: UUID, ID, TypeCode, ProcessingTypeCode, OrderingDateTime, OrderedDateTime, FulfilmentBlockStartDateTime, System AdministrativeData, and Status. Status includes OrderingStatusCode, FulfilmentBlockingStatusCode, and ItemList LifeCycleStatusCode elements. UUID is a universal unique identifier for a business object derived from ReleaseOrder_Template. It may be based on datatype GDT: UUID. In some implementations, UUID is used as an alternative key. ID is an identifier for ReleaseOrder_Template. It may be based on datatype GDT: BusinessTransactionDocumentID. In some implementations, ID is used as an alternative key. TypeCode is a coded representation of the release order object type. It may be based on datatype GDT: ObjectTypeCode. ProcessingTypeCode is a coded representation of the processing of a release order. It may be based on datatype GDT: BusinessTransactionDocumentProcessingTypeCode. OrderingDateTime represents a point in time when the release order has to be ordered. It may be based on datatype GDT: LOCALNORMALISED_DateTime with Qualifier: Ordering. OrderedDateTime represents a point in time when the release order was ordered. It may be based on datatype GDT: LOCALNORMALISED_DateTime with Qualifier: Ordered. FulfilmentBlockStartDateTime represents a point in time when the fulfillment of a release order is blocked. After this time, the fulfillment of a release order may be blocked. It may be based on datatype GDT: GLOBAL_DateTime with Qualifier: Start. SystemAdministrativeData represents administrative data recorded by the system. This data includes system users and change times. It may be based on datatype GDT: SystemAdministrativeData. Status represents the current status of a release order. It may be based on datatype BOIDT: ReleaseOrderStatus. OrderingStatusCode describes the ordering status of a release order. It may be based on datatype GDT: OrderingStatusCode. FulfilmentBlockingStatusCode describes the fulfillment blocking status of a release order. It may be based on datatype GDT: NOTBLOCKED-BLOCKED_BlockingStatusCode with Qualifier: Fulfilment. ItemListLifeCycleStatusCode describes the lifecycle status of the item list of release order. The life cycle status of the list of items indicates the state of the release order in its life cycle. It may be based on datatype GDT: ReleaseOrderItemList LifeCycleStatusCode. The elements of the present node can be used in every derived BO.

A composition relationship to a BusinessProcessVariantType subordinate node can exist with a 1:N cardinality relationship. A composition relationship to a BusinessTransactionDocumentReference subordinate node can exist with a 1:CN cardinality relationship. A composition relationship to a Party subordinate node can exist with a 1:CN cardinality relationship. A composition relationship to a Location subordinate node can exist with a 1:CN cardinality relationship. A composition relationship to an Item subordinate node can exist with a 1:CN cardinality relationship. A composition relationship to a AttachmentFolder subordinate node can exist with a 1:C cardinality relationship. A composition relationship to a TextCollection subordinate node can exist with a 1:C cardinality relationship. A composition relationship to a ControlledOutputRequest subordinate node can exist with a 1:C cardinality relationship. An inbound association relationship may exist from the business object Identity/node Identity to LastChangeIdentity with a cardinality of 1:CN, which may identify the identity that has last changed the release order. An inbound association relationship may exist from the business object Identity/node Identity to CreationIdentity with a cardinality of 1:CN, which may identify the identity that has created the release order.

The following specialization associations for navigation may exist to the node Party: BuyerParty with a target cardinality of C, EndBuyerParty with a target cardinality of C, SellerParty with a target cardinality of C, FreightForwarderParty with a target cardinality of C and LogisticsRequestResponsibleParty with a target cardinality of C. The following specialization associations for navigation may exist to the node Location: BuyerParty with a target cardinality of C and ShipFromLocation with a target cardinality of C. A BusinessDocumentFlow specialization association for navigation may exist to the business object Business BusinessDocumentFlow/node Root with a target cardinality of 1. The following specialization associations for navigation may exist to the node BusinessTransactionDocumentReference: BaseBusinessTransactionDocumentReference with a target cardinality of C, SalesOrderReference with a target cardinality of C, OriginPurchaseOrderReference with a target cardinality of C, and CustomerRequirementReference with a target cardinality of C. A BuyerParty specialization association for navigation may exist to the node BusinessProcessVariantType with a target cardinality of C.

Release Order_Template may be associated with the following enterprise service infrastructure actions: Order, Block Fulfilment, and Unblock Fulfilment. The Order action can be used to order all items of the release order. In some implementations, this action is applicable only for release orders that are not yet ordered. In response to the Order action, the action sets the “Ordering” status variable to “Ordered.” The Block Fulfilment action can be used to block the release order for delivery by setting a delivery block. In some implementations, this action is valid only for those items that are relevant for delivery. In response to the Block Fulfilment action, the action sets the “Fulfilment blocking” status variable to “Blocked.” The Unblock Fulfilment action can be used to reset the delivery block. In some implementations, this action is applicable for only those delivery-relevant items for which a delivery block has been set. In response to the Unblock Fulfilment action the action changes the “Fulfilment blocking” status variable from “Blocked” to “Not Blocked.”

Release Order_Template may be associated with Query By Elements and Select All queries. The Query By Elements query returns a list of all release orders that satisfy the selection criteria. The query elements can be defined by the datatype ReleaseOrderElementsQueryElements. These elements include: ID, OrderingDateTime, OrderedDateTime, CustomerRequirementAvailabilityConfirmationitem Reference, SalesOrderItemReference, PurchasingContractItemReference, OriginPurchaseOrderItemReference, SellerPartyKey, EndBuyerPartyKey, BuyerPartyKey, Item ProductRecipientPartyKey, ItemProductKey, ProductCategoryIDKey, Status, ItemCancellationInitiatorCode, ItemBaseBusinessTransactionDocumentCancellationRequested Indicator, ItemFulfilmentBlockedIndicator, ItemOpenQuantityCancelledIndicator, ItemConfirmationScheduleLine ArrivalDateTimePeriod, ItemRequestScheduleLineRequestedArrivalDateTimePeriod, ItemProductRequirement SpecificationKey, SystemAdministrativeData, and SearchText. SellerPartyKey, EndBuyerPartyKey, BuyerPartyKey, ItemProductRecipientPartyKey, and ItemProductKey include PartyTypeCode and PartyID elements. ItemProductKey includes the ProductTypeCode, ProductIdentifierTypeCode, and ProductID elements. ProductCategoryIDKey includes ProductCategoryHierarchyID and ProductCategoryInternalID elements. Status includes OrderingStatusCode, ItemListLifeCycleStatusCode, ItemOrderingStatusCode, ItemCancellationStatusCode, ItemFulfilmentProcessingStatusCode, ItemFulfilmentStatusCode, ItemProductAvailabilityConfirmationStatusCode, and ItemLifeCycleStatusCode elements. ItemProductRequirementSpecificationKey includes RequirementSpecificationID and RequirementSpecificationVersionID elements. SystemAdministrativeData includes CreationDateTime, CreationIdentityUUID, CreationIdentityID, CreationIdentityBusiness PartnerinternalID, CreationIdentityBusinessPartnerPerson FamilyName, CreationIdentityBusinessPartnerPerson GivenName, CreationIdentityEmployeeID, LastChangeDateTime, LastChangeIdentityUUID, LastChangeIdentityID, LastChangeIdentityBusinessPartnerInternalID, Last ChangeIdentityBusinessPartnerPersonFamilyName, Last ChangeIdentityBusinessPartnerPersonGivenName, and LastChangeIdentityEmployeeID elements.

The ID of the release order matches the query element ID. It may be based on datatype GDT: BusinessTransactionDocumentID. The OrderingDateTime of the release order matches the query element OrderingDateTime. It may be based on GDT: LOCALNORMALISED_DateTime with Qualifier: Ordering. The OrderedDateTime of the release order matches the query element OrderedDateTime. It may be based on GDT: LOCALNORMALISED_DateTime with Qualifier: Ordered. CustomerRequirementAvailabilityConfirmationitemReference may be based on GDT: BusinessTransactionDocumentReference. SalesOrderItemReference may be based on GDT: Business Transaction DocumentReference. PurchasingContractItemReference may be based on GDT: BusinessTransactionDocumentReference. OriginPurchaseOrderItemReference may be based on GDT: BusinessTransactionDocumentReference. SellerPartyKey may be based on KDT: PartyKey. EndBuyerPartyKey may be based on KDT: PartyKey. BuyerPartyKey may be based on KDT: PartyKey. ItemProductRecipientPartyKey may be based on KDT: PartyKey. PartyTypeCode is a coded representation of a type of party. It may be based on GDT: BusinessObjectTypeCode. PartyID is an identifier for a party. It may be based on GDT: PartyID. ItemProductKey may be based on KDT: ProductKey. ProductTypeCode is a coded representation of a product type such as a material or service. It may be based on GDT: ProductTypeCode. ProductIdentifierTypeCode is a coded representation of a product identifier type. It may be based on GDT: ProductIdentifierTypeCode. ProductID is an identifier for a product. It may be based on GDT: ProductID. ProductCategoryIDKey may be based on KDT: ProductCategoryHierarchyProduct CategoryIDKey. In some implementations, it can be used only for searching in the context of an item product. ProductCategoryHierarchyID is an identifier for a product category hierarchy. It may be based on GDT: ProductCategoryHierarchyID. ProductCategoryInternalID is an identifier for a product category. It may be based on GDT: ProductCategoryInternalID. Status may be based on QueryIDT: QueryElementReleaseOrderStatus. OrderingStatusCode describes the ordering status of a release order. It may be based on GDT: OrderingStatusCode. ItemListLifeCycleStatusCode describes the lifecycle status of the item list of release order. The life cycle status of the list of items indicates the state of the release order in its life cycle. It may be based on GDT: ReleaseOrderItemListLifeCycleStatusCode. ItemOrderingStatusCode describes the ordering status of a release order item. It may be based on GDT: OrderingStatusCode. ItemCancellationStatusCode describes the cancellation status of a release order item. It may be based on GDT: CancellationStatusCode. ItemFulfilmentProcessingStatusCode describes the fulfillment processing status of a release order item. It may be based on GDT: NOTSTARTEDINPROCESSFINISHED_ ProcessingStatusCode with Qualifier: Fulfilment. ItemFulfilmentStatusCode describes the fulfillment status of a release order item. It may be based on GDT: ReleaseOrderItemFulfilmentStatusCode. ItemProductAvailabilityConfirmation StatusCode describes the product availability confirmation status of a release order item. It may be based on GDT: ProductAvailabilityConfirmationStatusCode. ItemLifeCycleStatusCode describes the life cycle status of a release order item. It may be based on GDT: ReleaseOrderItemLifeCycleStatusCode. ItemCancellationInitiatorCode may be based on GDT: CancellationInitiatorCode. ItemBaseBusinessTransactionDocumentCancellationRequestedIndicator may be based on GDT: Indicator with Qualifier: Requested. ItemFulfilmentBlockedIndicator may be based on GDT: Indicator with Qualifier: Blocked. ItemOpenQuantityCancelledIndicator may be based on GDT: Indicator with Qualifier: Cancelled. ItemConfirmationScheduleLineArrivalDateTimePeriod may be based on GDT: UPPEROPEN_LOCALNORMALISED_ DateTimePeriod with Qualifier: Arrival. ItemRequestScheduleLineRequestedArrivalDateTimePeriod may be based on GDT: UPPEROPEN_LOCALNORMALISED_ DateTimePeriod with Qualifier: Arrival. ItemProductRequirementSpecificationKey may be based on KDT: RequirementSpecificationKey. RequirementSpecificationID is an identifier for a requirement specification that is unique within one system. It may be based on GDT: RequirementSpecificationID. RequirementSpecificationVersionID is an identifier for the version of a requirement specification. It may be based on GDT: VersionID. SystemAdministrativeData may be based on QueryIDT: QueryElementSystemAdministrativeData. CreationDateTime represents the point in time (e.g., date and time stamp) of the creation. It may be based on GDT: GLOBAL_DateTime. CreationIdentityUUID is a globally unique identifier for the identity who did the creation. It may be based on GDT: UUID. CreationIdentityID is an identifier for the identity who did the creation. It may be based on GDT: IdentityID. CreationIdentityBusinessPartnerInternalID is a proprietary identifier for the business partner that is attributed to the creation identity and that can be reached following the relationships of the creation identity. It may be based on GDT: BusinessPartnerInternalID. CreationIdentityBusinessPartnerPersonFamilyName represents a family name of the business partner of the category person that is attributed to the creation identity and that can be reached following the relationships of the creation identity. It may be based on GDT: LANGUAGEINDEPENDENT_MEDIUM_Name.

CreationIdentityBusinessPartnerPersonGivenName represents a given name of the business partner of the category person that is attributed to the creation identity and that can be reached following the relationships of the creation identity. It may be based on GDT: LANGUAGEINDEPENDENT_MEDIUM_Name. CreationIdentityEmployeeID is an identifier for the employee that is attributed to the creation identity and that can be reached following the relationships of the creation identity. It may be based on GDT: EmployeeID. LastChangeDateTime represents the point in time (e.g., date and time stamp) of the last change. It may be based on GDT: GLOBAL_DateTime. LastChangeIdentityUUID is a globally unique identifier for an identity who made the last changes. It may be based on GDT: QUID. LastChangeIdentityID is an identifier for an identity who made the last changes. It may be based on GDT: IdentityID. LastChangeIdentityBusinessPartnerInternalID is a proprietary identifier for the business partner that is attributed to the last change identity and that can be reached following the relationships of the last change identity. It may be based on GDT: BusinessPartnerInternalID. LastChangeIdentityBusinessPartnerPersonFamilyName represents a family name of the business partner of the category person that is attributed to the last change identity and that can be reached following the relationships of the last change identity. It may be based on GDT: LANGUAGEINDEPENDENT_MEDIUM_Name. LastChangeIdentityBusinessPartnerPersonGivenName represents a given name of the business partner of the category person that is attributed to the last change identity and that can be reached following the relationships of the last change identity. It may be based on GDT: LANGUAGEINDEPENDENT_MEDIUM_Name. LastChangeIdentityEmployeeID is an identifier for the employee that is attributed to the last change identity and that can be reached following the relationships of the last change identity. It may be based on GDT: EmployeeID. SearchText represents free text including one or several words (e.g., search terms) to search for Release Orders. It may be based on GDT: SearchText.

In some implementations, for every query that includes the SearchText as query parameter, an application-specific subset of the other query parameters is defined. The query result is calculated in a series of steps. The search terms are assigned to the subset of query parameters in such a way that every search term is used exactly once in the assignment. Several search terms may be assigned to the same query parameter. For each of these assignments the query result is calculated. The total result is the union of the results calculated per assignment. The query parameters can be used in every derived BO.

The Select All query provides the NodeIDs of all instances of this node. This query is used to enable the initial load of data for the Fast Search Infrastructure. The actions and queries of the present node can be used in every derived BO.

Business Process Variant Type is the processing of a release order within a process component from a business point of view. A Business Process Variant is a configuration of a process component. In some implementations, a Business Process Variant belongs to exactly one process component. A process component is a software package that realizes a business process and exposes its functionality as services. The functionality includes business transactions. A process component includes one or more semantically related business objects. In some implementations, a business object belongs to exactly one process component.

The elements located at the Business Process Variant Type node can be defined by the datatype ReleaseOrderBusinessProcessVariantTypeElements. These elements include BusinessProcessVariantTypeCode and MainIndicator. BusinessProcessVariantTypeCode is a coded representation of a business process variant type of a ReleaseOrderBusinessProcessVariantType. It may be based on datatype GDT: BusinessProcessVariantTypeCode. MainIndicator is an indicator that specifies if the current BusinessProcessVariantTypeCode is the main one. It may be based on datatype GDT: Indicator with Qualifier: Main. The elements of the present node can be used in every derived BO.

Business Transaction Document Reference is a unique reference to a different business document or the business document relevant to the release order. The elements located at the Business Transaction Document Reference node can be defined by the datatype ReleaseOrderBusinessTransactionDocumentReferenceElements. These elements include BusinessTransactionDocumentReference and BusinessTransactionDocumentRelationshipRoleCode. BusinessTransactionDocumentReference is a unique reference to another business transaction document or business transaction document item. It may be based on datatype GDT: BusinessTransactionDocumentReference. BusinessTransactionDocumentRelationshipRoleCode is a coded representation of the role the referenced document plays in relation to the release order. It may be based on datatype GDT: BusinessTransactionDocumentRelationshipRoleCode. The elements of the present node can be used in every derived BO.

An inbound association relationship may exist from the business object Customer Requirement/node Customer Requirement to CustomerRequirement with a cardinality of C:CN, which may represent the association to the Customer Requirement in the Procurement Release Order. An inbound association relationship may exist from the business object Purchase Order/node Purchase Order to OriginPurchaseOrder with a cardinality of C:CN, which may represent the association to the origin purchase order, the purchase order that was posted by the end-buyer. An inbound association relationship may exist from the business object Sales Order/node Sales Order to SalesOrder with a cardinality of C:CN, which may represent the association to the sales order that triggered the creation of the Procurement Release Order. The inbound aggregation relationship of the BusinessTransactionDocumentReference may depend on the business object derived from the release order template.

Party is a natural or legal person, organization, organizational unit, or group that is involved in a release order processing in a party role. The elements located at the node Party can be defined by the datatype ReleaseOrderPartyElements. These elements include: PartyKey, PartyUUID, RoleCategoryCode, RoleCode, AddressReference, DeterminationMethodCode, MainIndicator, and Name. PartyKey includes the PartyTypeCode and PartyID elements. PartyKey represents a Key of the Party in this PartyRole in the business document or the master data object. It may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. PartyUUID is a unique identifier for a business partner, the organizational unit, or their specializations. It may be based on datatype GDT: UUID. RoleCategoryCode is a Party Role Category of the Party in the business document or the master data object. It may be based on datatype GDT: PartyRoleCategoryCode.

RoleCode is a Party Role of the Party in the business document or the master data object. It may be based on datatype GDT: PartyRoleCode. AddressReference represents information to reference the address of a Party. It may be based on datatype GDT: PartyAddressReference. DeterminationMethodCode is a coded representation of the PartyDeterminationMethod. It may be based on datatype GDT: PartyDeterminationMethodCode. MainIndicator indicates whether or not an ItemParty is emphasized in a group of parties with the same PartyRole. It may be based on datatype GDT: Indicator with Qualifier: Main. Name is a Name of the Party. It may be based on datatype GDT: LONG_Name. The elements of the present node can be used in every derived BO.

A composition relationship to a PartyContactParty subordinate node can exist with a 1:CN cardinality relationship. A composition relationship to a PartyAlternativeIdentification subordinate node can exist with a 1:CN cardinality relationship. A composition relationship to a PartyAddress subordinate node can exist with a 1:C cardinality relationship. An inbound aggregation relationship may exist from the business object Party/node Party to Party with a cardinality of C:CN, which may represent the Referenced Party in master data.

A MainContactParty specialization association for navigation may exist to the node PartyContactParty with a target cardinality of C. A UsedAddress specialization association for navigation may exist to the business object Business UsedAddress/node Root with a target cardinality of CN.

The address used for the Party can be a referenced address of the master data object, or the PartyAddress integrated via the composition relationship. Which address applies can be determined by looking at the PartyAddressHostTypeCode element. The instance of the TO UsedAddress represents this address. The association is implemented. The referenced address of the master data object is used if the node ID of the node in the master data object is determined via the PartyTypeCode, PartyAddressUUID, and PartyAddressHostTypeCode elements, that have the composition relationship to the dependent object address that is to be represented by the TO UsedAddress. The TO UsedAddress in the implemented association is provided with the following information: that this is an example of a master data address, and BusinessObjectTypeCode, BusinessObjectNodeTypeCode, and Node ID of the business object. Party node. In some implementations, this is required in case changes where the TO UsedAddress take place. The master data address is copied by the TO UsedAddress, the changes take place to the copy, and a corresponding DO Address is created at the business object node Party via the PartyAddress composition relationship. The PartyAddress integrated via the composition relationship is used if the TO UsedAddress is informed of the BusinessObjectTypeCode, BusinessObjectNodeTypeCode, and Node ID of the business object-Party. Information is provided that this is not an example of a referenced address. The TO UsedAddress represents the dependent object address used at the business object node-Party via the PartyAddress composition relationship.

An IdentifiedByFreightForwarderParty specialization association for navigation may exist to the node PartyAlternativeIdentification with a target cardinality of C. An IdentifiedByEndBuyerParty specialization association for navigation may exist to the node PartyAlternativeIdentification with a target cardinality of C. An IdentifiedByBuyerParty specialization association for navigation may exist to the node PartyAlternativeIdentification with a target cardinality of C. An IdentifiedBySellerParty specialization association for navigation may exist to the node PartyAlternativeIdentification with a target cardinality of C. A UsedAddressOverview specialization association for navigation may exist to the business object UsedAddress/node Overview with a target cardinality of CN. This association may be equal to the association to UsedAddress-Root.

Party Contact Party is a natural person or organizational unit that can be contacted for the party. The contact may be a contact person or, for example, a secretary's office. Communication data for the contact may be available. The elements located at the Party Contact Party node can be defined by the datatype ReleaseOrderPartyContactPartyElements. These elements include: PartyKey, PartyUUID, AddressReference, MainIndicator, and Name. PartyKey includes the PartyTypeCode and PartyID elements. PartyKey represents the Key of the Party in this PartyRole in the business document or the master data object. It may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. PartyUUID is a unique identifier of the contact in this PartyRole in the business document or the master data object. It may be based on datatype GDT: UUID. AddressReference represents information to reference the address of a Party. It may be based on datatype GDT: PartyAddressReference. MainIndicator indicates whether or not a PartyContactParty is emphasized in a group of contact parties with the same PartyRole. It may be based on datatype GDT: Indicator with Qualifier: Main. Name represents a Name of the PartyContactParty. It may be based on datatype GDT: LONG_Name. The elements of the present node can be used in every derived BO.

A composition relationship to a PartyContactPartyAddress subordinate node can exist with a 1:C cardinality relationship. An inbound aggregation relationship may exist from the business object Party/node Party to Party with a cardinality of C:CN, which may represent the Referenced Party in master data. A UsedAddress specialization association for navigation may exist to the business object UsedAddress/node Root with a target cardinality of CN. Address may be used for Party. This may be the referenced address of a master data object or an address referenced via the composition to PartyAddress. A UsedAddressOverview specialization association for navigation may exist to the business object UsedAddress/node Overview with a target cardinality of CN. This association may be equal to the association to UsedAddress-Root. In some implementations, there may only be one of the associations to the address. This address is a master data address of the business partner, organizational unit, or their specializations referenced by PartyUUID.

Party Contact Party Address (Dependent Object Inclusion Node) is a dependent object address including the document specific address of the contact party. The data can be defined by the dependent object address.

Party Alternative Identification is an alternative identification to the identified party in Party node. The elements located at the node Party Alternative Identification can be defined by the datatype ReleaseOrderPartyAlternative IdentificationElements. These elements include: PartyID, PartyIdentifierTypeCode, IdentifiedByPartyRoleCode, and IdentifiedByPartyRoleCategoryCode. PartyID is an ID of the alternative identified party. It may be based on datatype GDT: NOALPHANUMERICCONVERSION_PartyID. PartyIdentifierTypeCode is a coded representation of a type of identifier for a party. It may be based on datatype GDT: PartyIdentifierTypeCode. IdentifiedByPartyRoleCode is a role code that identifies the party. It may be based on datatypeGDT: PartyRoleCode with Qualifier: IdentifiedBy. IdentifiedByPartyRoleCategoryCode is a role category code that identifies the party. It may be based on datatype GDT: PartyRoleCategoryCode with Qualifier: IdentifiedBy. The elements of the present node can be used in every derived BO.

Party Address is a dependent object address containing the document specific address of the party. The data can be defined by the dependent object address.

Location represents a physical or logical location that is part of the release order process in a location role. A location may keep a reference to a business object location, keep a reference to an address, keep a reference to a business partner or one of its specializations (for example customer, supplier, or employee), or keep a reference to a Reporting Line Unit specialization of an organizational unit. The location role describes the role of a location in the release order process.

The elements located at the node Location can be defined by the datatype ReleaseOrderLocationElements. These elements include: LocationID, LocationUUID, AddressReference, RoleCode, and RoleCategoryCode. AddressReference includes AddressHostUUID, BusinessObj ectTypeCode, AddressHostTypeCode, PartyKey, InstalledBaseID, and InstallationPointID elements. PartyKey includes PartyTypeCode PartyID and elements. LocationID is an identifier of the Location in this LocationRole. It may be based on datatype GDT: LocationID. LocationUUID is a unique identifier for a location, business partner, organizational unit, or their specializations. It may be based on datatype GDT: UUID. AddressReference represents the information to reference the address of a Location. It may be based on datatype BOIDT: ObjectNodeLocationAddressReference. AddressHostUUID is a universally unique identifier for the address of the business partner, the organizational unit or its specializations, the business object InstalledBase, or the business object InstallationPoint. It may be based on datatype GDT: UUID. BusinessObjectTypeCode is a coded representation of the type of the business object, in which the address referenced in the LocationAddressUUID is integrated as a dependent object. It may be based on datatype GDT: BusinessObjectTypeCode. AddressHostTypeCode is a coded representation of the address host type of the address referenced by the AddressUUID or the address included using the Location Address composition. It may be based on datatype GDT: AddressHostTypeCode. PartyKey is an alternative identifier of a party, representing a business partner or an organizational unit, that references the address using the AddressUUID. It may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. InstalledBaseID is an identifier for an installed base that references the address using the AddressUUID. It may be based on datatype GDT: InstalledBaseID. InstallationPointID is an identifier for an installation point that references the address using the AddressUUID. It may be based on datatype GDT: InstallationPointID. RoleCode represents a Location Role of the Location. It may be based on datatype GDT: LocationRoleCode. RoleCategoryCode represents a Location Role Category of the Location. It may be based on datatype GDT: LocationRoleCategoryCode. The elements of the present node can be used in every derived BO.

A composition relationship to a LocationAddress subordinate node can exist with a 1:C cardinality relationship. A composition relationship to a LocationAlternativeIdentification subordinate node can exist with a 1:CN cardinality relationship. An inbound aggregation relationship may exist from the business object Location/node Location to Location with a cardinality of C:CN, which may represent a Location corresponding to the Location. An inbound aggregation relationship may exist from the business object Party/node Address Information to PartyAddressInformation with a cardinality of C:CN, which may represent AddressInformation of a representative of a Business Partner or Organizational Centre corresponding to the Location. A UsedAddressOverview specialization association for navigation may exist to the business object UsedAddress/node Overview with a target cardinality of CN. This association may be equal to the association to UsedAddress-Root. A UsedAddress specialization association for navigation may exist to the business object UsedAddress/node Root with a target cardinality of CN. Address can be used for this location. This can be either a referenced address of a master data object, or an address that is integrated via the composition relationship LocationAddress. Which address applies can be determined by looking at the element AddressHostTypeCode. The instance of the TO UsedAddress represents this address. The association is implemented. The referenced address of a master data object is used if the elements AddressBusinessObjectTypeCode, AddressUUID, and AddressHostTypeCode are used to determine the Node ID of the node in the master data object that holds the composition relationship with Dependent Object Address that is represented by TO UsedAddress. The following information is sent to the TO UsedAddress in the implemented address: the fact that it is a master data address, the BusinessObjectTypeCode, BusinessObjectNodeTypeCode, and Node ID of the business object node Location node. In some implementations, this is required if changes are made to the TO UsedAddress. The TO UsedAddress copies the master data address, the changes are applied, and the corresponding DO Address is generated on the business object nodeLocation node via the composition relationship LocationAddress. The address that is integrated via the composition relationship LocationAddress is used if the BusinessObjectTypeCode, BusinessObjectNodeTypeCode, and Node ID of the business object node Location are communicated to the TO UsedAddress. Information as to whether or not it is a referenced address is also included. The TO UsedAddress represents the DO Address that is integrated via the composition relationship on the business object node Location node. An IdentifiedByProductRecipientParty specialization association for navigation may exist to the node LocationAlternativeIdentification with a target cardinality of C.

In some implementations, there can only be one aggregation or composition relationship to the dependent object. If there is an aggregation relationship to the BO Location, the LocationID attribute can be filled with the ID of the BO Location. All other ID fields, such as PartyID, InstalledBaseID, and InstallationPointID, remain blank. If the address of a party is referenced, representative of a BusinessPartners or an OrganisationalCentre, the PartyID attribute can be filled with the ID of the Party. All other ID fields, such as LocationID, InstalledBaseID, and InstallationPointID, remain blank. The reference can be kept in the AddressUUID attribute. If there is an aggregation relationship to the address of an InstalledBase, the InstalledBaseID attribute can be filled with the ID of the InstalledBase. All other ID fields, such as LocationID, PartyID, and InstallationPointID, remain blank. The reference can be kept in the AddressUUID InstalledBaseAddressInformationUUID attribute. If there is an aggregation relationship to the address of an InstallationPoint, the InstallationPointID attribute can be filled with the ID of the InstallationPoint. All other ID fields, such as LocationID, PartyID, and InstalledBaseID, remain blank. The reference can be kept in the AddressUUID attribute. In some implementations, if an address is referenced via the element AddressUUID, the elements AddressBusinessObjectType- Code and AddressHostTypeCode may also be filled. All locations may exist in all derived business objects if necessary. In some implementations, at least one location is used.

Location Address represents an address of a physical or logical location. Location Alternative Identification is an alternative identification to the identified location in Location node. The elements located at the node Location Alternative Identification can be defined by the datatype ReleaseOrderLocationAlternativeIdentificationElements. These elements include: LocationID, LocationIdentifierTypeCode, IdentifiedByPartyRoleCode, and IdentifiedByPartyRoleCategoryCode. LocationID is an alternative identifier of the location identified in Location. It may be based on datatype GDT: LocationID. LocationIdentifierTypeCode is a coded representation of the type of Location identifier. It may be based on datatype GDT: LocationIdentifierTypeCode. IdentifiedByPartyRoleCode represents a party role code that identifies the location. It may be based on datatype GDT: PartyRoleCode with Qualifier: IdentifiedBy. IdentifiedByPartyRoleCategoryCode represents a party role category code that identifies the location. It may be based on datatype GDT: PartyRoleCategoryCode with Qualifier: IdentifiedBy. The elements of the present node can be used in every derived BO. In some implementations, at least the attribute LocationIdentifierTypeCode, the attribute UsedByPartyRoleCategoryCode, or the attribute UsedByPartyRoleCode has to be filled.

Item represents a quantity of a product included in the release order with additional information on the ordering status, any existing references to preceding business documents, an ID, and information in textual form regarding the order. The elements located at the node Item can be defined by the datatype ReleaseOrderItemElements. These elements include: UUID, ID, TypeCode, ProcessingTypeCode, SourceOfSupplyLogisticRelationshipUUID, SourceOfSupplyLogisticRelationshipBaseObjectNodeReference, BaseBusinessTransactionDocumentItemCancellationRequested Indicator, CancellationInitiatorCode, FulfilmentBlockedIndicator, OrderingDateTime, FulfilmentBlockStartDateTime, SystemAdministrativeData, Status, Key, and BusinessTransactionDocumentItemID. Status includes OrderingStatusCode, CancellationStatusCode, FulfilmentProcessingStatusCode, FulfilmentStatusCode, ProductAvailabilityConfirmationDateStatusCode, ProductAvailabilityConfirmationQuantityStatusCode, ProductAvailability ConfirmationStatusCode, ProductAvailabilityConfirmationUpToDatenessStatusCode, and LifeCycleStatusCode elements. Key includes a BusinessTransactionDocumentKey element. BusinessTransactionDocumentKey includes BusinessTransactionDocumentID and BusinessTransactionDocumentTypeCode elements. UUID is a universal unique identifier of Item. It can be used to refer to Item. In some implementations, UUID is used as an alternative key. It may be based on datatype GDT: UUID. ID is an identifier for Item, and can be used to refer to Item. It may be based on datatype GDT: BusinessTransactionDocumentItemID. TypeCode is a coded representation of the type of a release order item. It may be based on datatype GDT: BusinessTransactionDocumentItemTypeCode. ProcessingTypeCode is a coded representation of the processing of an item of a release order. It may be based on datatype GDT: BusinessTransactionDocumentItemProcessingTypeCode. SourceOfSupplyLogisticRelationshipUUID is a unique identifier of the logistic relationship within a source of supply that models the goods movement from the ship-from location to the ship-to location or transportation zone. It may be based on datatype GDT: UUID. SourceOfSupplyLogisticRelationshipBase ObjectNodeReference is a reference to the logistic relationship within a source of supply that represents the item of a purchasing contract. The BaseObjectNodeReference of Source of Supply Logistic Relationship is a reference of the object from which the logistic relationship was replicated. A logistic relationship may be replicated from a material specific transportation lane, from an item of a purchasing contract or a released planning production model. It may be based on datatype GDT: ObjectNodeReference with Qualifier: Base. BaseBusinessTransactionDocumentItemCancellationRequestedIndicator indicates if the base business transaction document requested a cancellation of the item. It may be based on datatype GDT: Indicator with Qualifier: Requested. CancellationInitiatorCode is a coded representation of the initiator of the cancellation of a release order item. Allowed code values include: Requestor, Planner and Seller. It may be based on datatype GDT: CancellationInitiatorCode. FulfilmentBlockedIndicator indicates if the item was blocked. It may be based on datatype GDT: Indicator with Qualifier: Blocked. OrderingDateTime represents the point in time when an item has to be ordered. It may be based on datatype GDT: LOCALNORMALISED_DateTime with Qualifier: Ordering. FulfilmentBlockStartDateTime represents the point in time when the fulfillment of a release order item is blocked. After this time, the fulfillment of an item can be blocked. It may be based on datatype GDT: GLOBAL_DateTime with Qualifier: Start. SystemAdministrativeData represents administrative data that is stored in the system that describes who created the release order item and when. It may be based on datatype GDT: SystemAdministrativeData. Status represents the current status of a release order item. It may be based on datatype BOIDT: ReleaseOrderItemStatus. OrderingStatusCode describes the ordering status of a release order item. It may be based on datatype GDT: OrderingStatusCode. CancellationStatusCode describes the cancellation status of a release order item. It may be based on datatype GDT: CancellationStatusCode. FulfilmentProcessingStatusCode describes the fulfillment processing status of a release order item. It may be based on datatype GDT: NOTSTARTEDINPROCESSFINISHED_ProcessingStatusCode with Qualifier: Fulfilment. FulfilmentStatusCode describes the fulfillment status of a release order item. It may be based on datatype GDT: ReleaseOrderItemFulfilmentStatusCode. ProductAvailabilityConfirmationDateStatusCode describes the product availability confirmation status of a release order item date. It may be based on datatype GDT: AvailabilityConfirmationDateStatusCode with Qualifier: Product. Product AvailabilityConfirmationQuantityStatusCode describes the product availability confirmation status of a release order item quantity. It may be based on datatype GDT: AvailabilityConfirmationQuantityStatusCode with Qualifier: Product. ProductAvailabilityConfirmationStatusCode describes the product availability confirmation status of a release order item. It may be based on datatype GDT: ProductAvailabilityConfirmationStatusCode. ProductAvailabilityConfirmationUpToDatenessStatusCode describes the product availability up to dateness status of a release order item confirmation. It may be based on datatype GDT: UPTODATEOUTOFDATE_UpToDatenessStatusCode with Qualifier: Confirmation. LifeCycleStatusCode describes the life cycle status of a release order item. It may be based on datatype GDT: ReleaseOrderItemLifeCycleStatusCode. Key is a unique human-readable item key for referencing purposes. It may be based on datatype KDT: BusinessTransactionDocumentItemKey. In some implementations, Key is used as an alternative key. BusinessTransactionDocumentKey represents a key for the BusinessTransactionDocument. It may be based on datatype KDT: BusinessTransactionDocumentKey. BusinessTransactionDocumentID is a unique identifier for a business transaction document. It may be based on datatype GDT: BusinessTransactionDocumentID. BusinessTransactionDocumentTypeCode is a coded representation of the document type that occurs in business transactions. The document type describes the business nature of similar documents and defines the basic features of this type of documents. It may be based on datatype GDT: BusinessTransactionDocumentTypeCode. BusinessTransactionDocumentItemID is a unique identifier of an item or sub-item of a document within a business transaction and is unique in the context of the business transaction. It may be based on datatype GDT: BusinessTransactionDocumentItemID. The elements of the present node can be used in every derived BO.

A composition relationship to a ItemBusinessTransactionDocumentReference subordinate node can exist with a 1:CN cardinality relationship. A composition relationship to a ItemParty subordinate node can exist with a 1:CN cardinality relationship. A composition relationship to a ItemLocation subordinate node can exist with a 1:CN cardinality relationship. A composition relationship to a ItemProduct subordinate node can exist with a 1:C cardinality relationship. A composition relationship to a ItemCurrentItemRequestReference subordinate node can exist with a 1:C cardinality relationship. A composition relationship to a ItemRequest subordinate node can exist with a 1:CN cardinality relationship. A composition relationship to a ItemCurrentItemConfirmationReference subordinate node can exist with a 1:C cardinality relationship. A composition relationship to a ItemConfirmation subordinate node can exist with a 1:CN cardinality relationship. A composition relationship to a ItemFulfilment subordinate node can exist with a 1:1 cardinality relationship. A composition relationship to a ItemAttachmentFolder subordinate node can exist with a 1:C cardinality relationship. A composition relationship to a ItemTextCollection subordinate node can exist with a 1:C cardinality relationship.

An inbound aggregation relationship may exist from the business object Source of Supply/node Logistic Relationship to SourceOfSupplyLogisticRelationship with a cardinality of C:CN, which may represent a Source of Supply logistic relationship corresponding to the Item. An inbound association relationship may exist from the business object Identity/node Identity to LastChangeIdentity with a cardinality of 1:CN, which may identify the identity that has last changed the Item. An inbound association relationship may exist from the business object Identity/node Identity to CreationIdentity with a cardinality of 1:CN, which may identify the identity that has created the Item.

A ProductRecipientItemParty specialization association for navigation may exist to the node ItemParty with a target cardinality of C. A ShipToItemLocation specialization association for navigation may exist to the node ItemLocation with a target cardinality of C. An ItemCurrentItemRequest Reference specialization association for navigation may exist to the node ItemCurrentItemRequestReference with a target cardinality of C. An ItemCurrentItemConfirmationReference specialization association for navigation may exist to the node ItemCurrentItemConfirmationReference with a target cardinality of C. A CurrentItemRequest specialization association for navigation may exist to the node ItemRequest with a target cardinality of C. A CurrentItemConfirmation specialization association for navigation may exist to the node ItemConfirmation with a target cardinality of C. A BusinessDocumentFlow specialization association for navigation may exist to the business object BusinessDocumentFlow/node Root with a target cardinality of 1.

A BaseItemBusinessTransactionDocumentReference specialization association for navigation may exist to the node ItemBusinessTransactionDocumentReference with a target cardinality of C. A SalesOrderItemReference specialization association for navigation may exist to the node ItemBusinessTransactionDocumentReference with a target cardinality of C. A OriginPurchaseOrderItemReference specialization association for navigation may exist to the node ItemBusinessTransactionDocumentReference with a target cardinality of C. A CustomerRequirementItemReference specialization association for navigation may exist to the node ItemBusinessTransactionDocumentReference with a target cardinality of C. A PurchasingContractItemReference specialization association for navigation may exist to the node ItemBusinessTransactionDocumentReference with a target cardinality of C.

Release Order_Template may be associated with the following enterprise service infrastructure actions: Order, Request Cancellation, Revoke Cancellation Request, Cancel, Revoke Cancellation, Discard Cancellation, Request Cancellation And Cancel, Request And Discard Cancellation, Revoke Cancellation Discarded And Cancellation Request, Finish Fulfilment Processing, Resume Fulfilment Processing, Confirm Delivery Request Fulfilment, Check Fulfilment, Check Product Availability Confirmation Up To Dateness, Check Product Availability Confirmation Date, Check Product Availability Confirmation Quantity, Create Item Confirmation With Reference To Current Item Request, and Create Item Request With Reference To Current Item Request.

The Order action orders a release order item. In some implementations, this action is applicable only for release orders items that are not yet ordered. If the status changes, the action sets the “Ordering” status variable to “Ordered.” The Request Cancellation action requests the cancellation of an item. In some implementations, this action is only applicable for those items that are not cancelled. If the object is changed, the action sets CancellationInitiatorCode at the item. If the status changes, the action sets the “Cancellation” status variable to “Cancellation Requested.” The Revoke Cancellation Request action revokes the cancellation request of an item. In some implementations, this action is only applicable for those items that are requested to be cancelled. If the object is changed, the action resets the CancellationInitiatorCode at the item. If the status is changed, the action sets the “Cancellation” status variable to “Not Canceled.” The Cancel action cancels an item. In some implementations, this action is only applicable for those items for which a cancellation has been requested, or has not been cancelled. If the object is changed, the action sets the OpenQuantityCancellationIndicator for the current item confirmation to true. If the status is changed, the action sets the “Cancellation” status variable to “Canceled.” The Revoke Cancellation action revokes the cancellation of an item. In some implementations, this action is only applicable for those items that are cancelled. If the object is changed, the action sets the OpenQuantityCancellationIndicator for the current item confirmation to false. If the status is changed, the action sets the “Cancellation” status variable to “Not Canceled.” The Discard Cancellation action discards a request for cancellation of an item. In some implementations, this action is only applicable for those items that are requested to be cancelled. If the status is changed, the action sets the “Cancellation” status variable to “Canceled Discarded.” The Request Cancellation And Cancel action requests the cancellation and cancels an item. It combines the actions Request Cancellation and Cancel for an item. The Request And Discard Cancellation action requests and discards the cancellation of an item. It combines the actions Request Cancellation and Discard Cancellation for an item. The Revoke Cancellation Discarded And Cancellation Request revokes the discarded cancellation and the cancellation request of an item. It combines the actions Request Cancellation and Revoke Cancellation Request for an item. The Finish Fulfilment Processing action finishes the fulfillment processing when the item is completely fulfilled, and/or no further fulfillment is expected. In some implementations, this action is only applicable for those items that are ordered. If the status is changed, the action sets the "Fulfilment Processing" status variable. The Resume Fulfilment Processing action resumes fulfillment processing after fulfillment processing has already been finished. In some implementations, this action is applicable for only those items where fulfillment processing was finished. If the status is changed, the action sets the "Fulfilment Processing" status variable. The Confirm Delivery Request Fulfilment action confirms the fulfillment of a delivery request. In some implementations, this action is only applicable for those items that are ordered. If the status is changed, the action sets the "Fulfilment Processing" status variable. The Check Fulfilment action checks if the request is fulfilled by the confirmation. In some implementations, this action is only applicable for those items that are ordered. If the status is changed, the action sets the "Fulfilment" status variable. The Check Product Availability Confirmation Up To Dateness action checks if the product availability confirmation refers to the current request. If the status is changed, the action sets the "Product Availability Confirmation Up To Dateness" status variable. The Check Product Availability Confirmation Date action checks if the product availability for the requested quantities is confirmed on time. If the status is changed, the action sets the "Product Availability Confirmation Date" status variable. The Check Product Availability Confirmation Quantity action checks if the product availability for the requested quantities is confirmed completely. If the status is changed, the action sets the "Product Availability Confirmation Quantity" status variable. The Create Item Confirmation With Reference To Current Item Request action creates an item confirmation with reference to the current item request. The Create Item Request With Reference To Current Item Request action creates an item request with reference to the current item request.

Release Order_Template may be associated with a Query By Elements Query. The Query By Elements query returns a list of all release orders items that satisfy the selection criteria. The query elements can be defined by the datatype: ReleaseOrderItemElementsQueryElements. These elements include a SourceOfSupplyLogisticRelationshipID element. Source OfSupplyLogisticRelationshipID matches the query element SourceOfSupplyLogisticRelationshipID. Items that have a relationship to the Source of Supply Logistic Relationship identified by that ID will be found by the query. It may be based on datatype GDT: SourceOfSupplyLogisticRelationshipID. The query parameters can be used in every derived BO. The actions and queries of the present node can be used in every derived BO.

Item Business Transaction Document Reference is a unique reference to a different business document or the business document item relevant to the release order item. The elements located at the node Item Business Transaction Document Reference can be defined by the datatype ReleaseOrderItemBusinessTransactionDocumentReference Elements. These elements include BusinessTransactionDocumentReference and BusinessTransactionDocument Relationship RoleCode. BusinessTransactionDocument Reference is a unique reference to another business transaction document or business transaction document item. It may be based on datatype GDT: BusinessTransactionDocumentReference. BusinessTransactionDocumentRelationship RoleCode is a coded representation of the role the referenced document or referenced document item plays in relation to the release order. It may be based on datatype GDT: BusinessTransactionDocumentRelationshipRoleCode. The elements of the present node can be used in every derived BO.

An inbound association relationship may exist from the business object Customer Requirement/node Availability Confirmation Item to CustomerRequirementAvailabilityConfirmationitem with a cardinality of C:C, which may represent the association to the Customer Requirement Availability Confirmation Item in the Procurement Release Order. An inbound association relationship may exist from the business object Purchase Order/node Item to OriginPurchaseOrderItem with a cardinality of C:C, which may represent the association to the item in the origin purchase order, the purchase order item that was posted by the end-buyer. An inbound association relationship may exist from the business object Purchasing Contract/node Item to PurchasingContractItem with a cardinality of C:C, which may represent the association to the Purchasing Contract Item of the Procurement Release Order Item. An inbound association relationship may exist from the business object Sales Order/node Item to SalesOrderItem with a cardinality of C:C, which may represent the association to the item in a sales order item that triggered the creation of the Procurement Release Order.

Item Party represents a natural or legal person, organization, organizational unit, or group that is involved in a release order item processing in a party role. An item party may keep a reference to a business partner or one of its specializations, for example, customer, supplier, or employee. It can also keep a reference to the Company, CostCentre, or ReportingLineUnit specializations of an organizational unit. An item party may exist without reference to a business partner or an organizational unit.

The elements located at the node Item Party can be defined by the datatype ReleaseOrderItemPartyElements. These elements include: PartyKey, PartyUUID, RoleCategoryCode, RoleCode, AddressReference, DeterminationMethodCode, MainIndicator, and Name. PartyKey includes PartyTypeCode and PartyID elements. PartyKey represents a Key of the Party in this PartyRole in the business document or the master data object. It may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. PartyUUID is a unique identifier for a business partner, the organizational unit, or their specializations. It may be based on datatype GDT: UUID. RoleCategoryCode represents a Party Role Category of the ItemParty in the business document or the master data object. It may be based on datatype GDT: PartyRoleCategoryCode. RoleCode represents a Party Role of the ItemParty in the business document or the master data object. It may be based on datatype GDT: PartyRoleCode. AddressReference represents the information to reference the address of a Party. It may be based on datatype GDT: PartyAddressReference. DeterminationMethodCode is a coded representation of the PartyDeterminationMethod. It may be based on datatype GDT: PartyDeterminationMethodCode. MainIndicator indicates if an ItemParty is emphasized in a group of parties with the same PartyRole. It may be based on datatype GDT: Indicator with Qualifier: Main. Name represents a Name of the ItemParty. It may be based on datatype GDT: LONG_Name. The elements of the present node can be used in every derived BO.

A composition relationship to a ItemPartyContactParty subordinate node can exist with a 1:CN cardinality relationship. A composition relationship to a ItemPartyAlternativeIdentification subordinate node can exist with a 1:CN cardinality relationship. A composition relationship to a ItemPartyAddress subordinate node can exist with a 1:C cardinality relationship. An inbound aggregation relationship may exist from the business object Party/node Party to Party with a cardinality of C:CN, which may represent the Referenced Party in master data.

A MainContactParty specialization association for navigation may exist to the node ItemPartyContactParty with a target cardinality of C. A UsedAddress specialization association for navigation may exist to the business object UsedAddress/node Root with a target cardinality of CN. The address can be used for the Party. This can be one of the following: a referenced address of the master data object or the PartyAddress integrated via the composition relationship. Which address applies can be determined by looking at the PartyAddressHostTypeCode element. The instance of the TO UsedAddress represents this address. The association is implemented. The referenced address of the master data object is used if the node ID of the node in the master data object is determined via the PartyTypeCode, PartyAddressUUID, and PartyAddressHostTypeCode elements, that have the composition relationship to the DO address that is to be represented by the TO UsedAddress. The TO UsedAddress in the association is provided with the following information: that this is an example of a master data address, and the BusinessObjectTypeCode, BusinessObjectNodeTypeCode, and Node ID of the business object node-Party node. In some implementations, these are required in case changes to the TO UsedAddress take place. The master data address is copied by the TO UsedAddress, the changes take place to the copy, and a corresponding DO Address is created at the business object nodeParty via the PartyAddress composition relationship. The PartyAddress integrated via the composition relationship is used if the TO UsedAddress is informed of the Business ObjectTypeCode, BusinessObjectNodeTypeCode, and Node ID of the business object node-Party. Additionally, information is provided that this is not an example of a referenced address. In this case, the TO UsedAddress represents the DO address used at the business object node-Party via the PartyAddress composition relationship.

An IdentifiedByProductRecipientParty specialization association for navigation may exist to the node ItemPartyAlternativeIdentification with a target cardinality of C. An IdentifiedByEndBuyerParty specialization association for navigation may exist to the node ItemPartyAlternativeIdentification with a target cardinality of C. An IdentifiedByBuyerParty specialization association for navigation may exist to the node ItemPartyAlternativeIdentification with a target cardinality of C. An IdentifiedBySellerParty specialization association for navigation may exist to the node ItemPartyAlternativeIdentification with a target cardinality of C.

A UsedAddressOverview specialization association for navigation may exist to the business object UsedAddress/node Overview with a target cardinality of CN. This association may be equal to the association to UsedAddress-Root.

In some implementations, there may only be one aggregation relationship to the business partner, the organizational unit, or their specializations. If the PartyUUID exists, the PartyTypeCode may exist as well. Parties may only be referenced via the Transformed Object Party that represents at least one of the following business objects: Company, CostCentre, SalesUnit, ServiceUnit, PurchasingUnit, Reporting LineUnit, Supplier, Customer, Employee, or BusinessPartner. There may only be one association to the address. This address is a master data address of the business partner, organizational unit, or their specializations referenced by PartyUUID. The parties in their various roles can be optionally used in the business objects derived from the delivery_template.

Item Party Contact Party is a natural person or organizational unit that can be contacted for the item party. The contact may be a contact person or, for example, a secretary's office. Usually, communication data for the contact is available. The elements located at the node Item Party Contact Party can be defined by the datatype ReleaseOrderItemPartyContactPartyElements. These elements include: PartyKey, PartyUUID, AddressReference, DeterminationMethodCode, MainIndicator, and Name. PartyKey includes PartyTypeCode and PartyID elements. PartyKey represents a Key of the ItemPartyContactParty in this PartyRole within the ReleaseOrder. It may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. PartyUUID is a unique identifier of the contact in this PartyRole in the business document or the master data object. It may be based on datatype GDT: UUID. AddressReference represents the information to reference the address of a Party. It may be based on datatype GDT: PartyAddressReference. MainIndicator indicates if a PartyContactParty is emphasized in a group of contact parties with the same PartyRole. It may be based on datatype GDT: Indicator with Qualifier: Main. Name represents a Name of the PartyContactParty. It may be based on datatype GDT: LONG_Name. The elements of the present node can be used in every derived BO.

A composition relationship to subordinate node ItemPartyContactPartyAddress exists in a 1:C cardinality relationship. An inbound aggregation relationship may exist from the business object Party/node Party to Party with a cardinality of C:CN, which may represent the Referenced Party in master data.

A UsedAddress specialization association for navigation may exist to business object UsedAddress/node Root with a target cardinality of CN. Address can be used for Party. This may be the referenced address of a master data object or an address referenced via the composition to PartyAddress. A UsedAddressOverview specialization association for navigation may exist to the business object UsedAddress/node Overview with a target cardinality of CN. This association may be equal to the association to UsedAddress-Root. In some implementations, there may only be one of the associations to the address. This address is a master data address of the business partner, organizational unit, or their specializations referenced by PartyUUID.

Item Party Contact Party Address (Dependent Object Inclusion Node) is a document-specific address of the item contact party. The data can be defined by the dependent object address.

Item Party Alternative Identification is an alternative identification to the identified party in ItemParty node. The elements located at the node Item Party Alternative Identification can be defined by the datatype Release OrderItemPartyAlternativeIdentificationElements. These elements include: PartyID, PartyIdentifierTypeCode, IdentifiedByPartyRoleCode, and IdentifiedByPartyRoleCategoryCode. PartyID represents an ID of the alternative identified party. It may be based on datatype GDT: NOALPHANUMERICCONVERSION_PartyID. PartyIdentifierTypeCode is a coded representation of a type of identifier for a party. It may be based on datatype GDT: PartyIdentifierTypeCode.

IdentifiedByPartyRoleCode represents a role code that identifies the party. It may be based on datatype GDT: PartyRoleCode with Qualifier: IdentifiedBy. IdentifiedByPartyRoleCategoryCode represents a role category code that identifies the party. It may be based on datatype GDT: PartyRoleCategoryCode with Qualifier: IdentifiedBy. The elements of the present node can be used in every derived BO.

Item Party Address (Dependent Object Inclusion Node) is a dependent object address containing the document specific address of the item party. The data can be defined by the dependent object address.

Item Location is a physical or logical location that is part of the release order process in a LocationRole. A location may keep a reference to a business object location, keep a reference to an address, keep a reference to a business partner or one of its specializations, for example, customer, supplier, or employee, or keep a reference to a Reporting Line Unit specialization of an organizational unit. The location role describes the role of a location in the release order process.

The elements located at the node Item Location can be defined by the datatype ReleaseOrderItemLocationElements. These elements include: LocationID, LocationUUID, AddressReference, RoleCode, and RoleCategoryCode. AddressReference includes AddressHostUUID, BusinessObj ectTypeCode, AddressHostTypeCode, PartyKey, InstalledBaseID, and InstallationPointID elements. PartyKey includes PartyTypeCode and PartyID elements. LocationID is an identifier of the Location in this LocationRole. It may be based on datatype GDT: LocationID. LocationUUID is a unique identifier for a location, business partner, the organizational unit, or their specializations. It may be based on datatype GDT: UUID. AddressReference represents the information to reference the address of a Business Object. It may be based on datatype BOIDT: ObjectNodeLocationAddressReference. AddressHostUUID is a universally unique identifier for the address of the business partner, the organizational unit or its specializations, the business object InstalledBase, or the business object InstallationPoint. It may be based on datatype GDT: UUID. BusinessObjectTypeCode is a coded representation of the type of the business object, in which the address referenced in the LocationAddressUUID is integrated as a dependent object. It may be based on datatype GDT: BusinessObjectTypeCode. AddressHostTypeCode is a coded representation of the address host type of the address referenced by the AddressUUID or the address included using the Location Address composition. It may be based on datatype GDT: AddressHostTypeCode. PartyKey is an alternative identifier of a party, which represents a business partner or an organizational unit, which references the address using the AddressUUID. It may be based on datatype KDT: PartyKey. PartyTypeCode is a coded representation of a type of party. It may be based on datatype GDT: BusinessObjectTypeCode. PartyID is an identifier for a party. It may be based on datatype GDT: PartyID. InstalledBaseID is an identifier for an installed base that references the address using the AddressUUID. It may be based on datatype GDT: InstalledBaseID. InstallationPointID is an identifier for an installation point that references the address using the AddressUUID. It may be based on datatype GDT: InstallationPointID. RoleCode is a coded representation of the role of the Item Location in the business document or the master data object. It may be based on datatype GDT: LocationRoleCode. RoleCategoryCode represents a Location Role Category of the Location. It may be based on datatype GDT: LocationRoleCategoryCode. The elements of the present node can be used in every derived BO.

A composition relationship to a ItemLocationAddress subordinate node can exist with a 1:C cardinality relationship. A composition relationship to a ItemLocationAlternativeIdentification subordinate node can exist with a 1:CN cardinality relationship. An inbound aggregation relationship may exist from the business object Location/node Location to Location with a cardinality of C:CN, which may represent a Location corresponding to the Item Location. An inbound aggregation relationship may exist from the business object Party/node Address Information to PartyAddressInformation with a cardinality of C:CN, which may represent AddressInformation of a representative of a Business Partner or Organizational Centre corresponding to the ItemLocation.

A UsedAddressOverview specialization association for navigation may exist to business object UsedAddress/node Overview with a target cardinality of CN. This association may be equal to the association to UsedAddress-Root. A UsedAddress specialization association for navigation may exist to business object UsedAddress/node Root with a target cardinality of CN. Address can be used for this location. This can be one of the following: a referenced address of a master data object, or the address that is integrated via the composition relationship LocationAddress. Which address applies can be determined by looking at element AddressHostTypeCode. The instance of the TO UsedAddress represents this address. The association is implemented. The referenced address of a master data object is used if the elements AddressBusinessObjectTypeCode, AddressUUID, and AddressHostTypeCode are used to determine the Node ID of the node in the master data object, that holds the composition relationship with DO Address that is to be represented by TO UsedAddress. The following information is sent to the TO UsedAddress in the implemented address: The fact that it is a master data address, and the BusinessObjectTypeCode, BusinessObjectNodeTypeCode, and Node ID of the business object node Location node. In some implementations, this is required if changes are made to the TO UsedAddress. The TO UsedAddress copies the master data address, the changes are applied and the corresponding DO Address is generated on the business object nodeLocation node via the composition relationship LocationAddress. The address that is integrated via the composition relationship LocationAddress is used if the BusinessObjectTypeCode, BusinessObjectNodeTypeCode, and Node ID of then business object node Location are communicated to the TO UsedAddress. Information as to whether or not it is a referenced address is also included. The TO UsedAddress represents the DO Address that is integrated via the composition relationship on the business object node Location node.

An IdentifiedByProductRecipientParty specialization association for navigation may exist to node ItemLocationAlternativeIdentification with a target cardinality of C.

In some implementations, there can be just one aggregation or composition relationship to the dependent object. If there is an aggregation relationship to the BO Location, the LocationID attribute can be filled with the ID of BO Location. All other ID fields, such as PartyID, InstalledBaseID, and InstallationPointID, remain blank. If the address of a party is referenced, representative of a BusinessPartners or an OrganisationalCentre, then the PartyID attribute can be filled with the ID of the Party. All other ID fields, such as LocationID, InstalledBaseID, and InstallationPointID, remain blank. The reference can be kept in the AddressUUID attribute. If there is an aggregation relationship to the address of an InstalledBase, the InstalledBaseID attribute can be filled with the ID of the InstalledBase. All other ID fields, such as LocationID, PartyID, and InstallationPointID, remain blank. The reference can be kept in the AddressUUID InstalledBaseAddressInformationUUID attribute. If there is an aggregation relationship to the address of an InstallationPoint, the InstallationPointID attribute can be filled with the ID of the InstallationPoint. All other ID fields, such as LocationID, PartyID, and InstalledBaseID, remain blank. The reference can be kept in the AddressUUID attribute. In some implementations, if an address is referenced via the element AddressUUID, then elements AddressBusinessObjectTypeCode and AddressHostTypeCode may also be filled. All locations may exist in all derived business objects. In some implementations, at least one location is used.

Item Location Address (Dependent Object Inclusion Node) is an address of a physical or logical location of an item. Item Location Alternative Identification is an alternative identification to the identified location in Item Location node. The elements located at the node Item Location Alternative Identification can be defined by the datatype ReleaseOrderItemLocationAlternativeIdentificationElements. These elements include: LocationID, LocationIdentifierTypeCode, IdentifiedByPartyRoleCode, and IdentifiedByPartyRoleCategoryCode. LocationID is an alternative identifier of the location identified in Item Location. It may be based on datatype GDT: LocationID. LocationIdentifierTypeCode is a coded representation of the type of Item Location identifier. It may be based on datatype GDT: LocationIdentifierTypeCode. IdentifiedByPartyRoleCode represents a party role code that identifies the location. It may be based on datatype GDT: PartyRoleCode with Qualifier: IdentifiedBy. IdentifiedByPartyRoleCategoryCode represents a party role category code that identifies the location. It may be based on datatype GDT: PartyRoleCategoryCode with Qualifier: IdentifiedBy. The elements of the present node can be used in every derived BO. In some implementations, at least the attribute LocationIdentifierTypeCode, the attribute UsedByPartyRoleCategoryCode or the attribute UsedByPartyRoleCode has to be filled.

Item Product is an identifier, description, and classification of the product in the release order item. The elements located at the node Item Product can be defined by the datatype ReleaseOrderItemProductElements. These elements include: ProductKey, ProductUUID, ProductStandardID, ProductBuyerID, ProductSellerID, ProductProductRecipientID, ProductRequirementSpecificationVersionUUID, and ProductRequirementSpecificationKey. ProductKey includes ProductTypeCode, ProductIdentifierTypeCode, and Product ID elements. ProductRequirementSpecificationKey includes RequirementSpecificationID and RequirementSpecificationVersionID elements. ProductKey represents a unique identifier of the product. It may be based on datatype KDT: ProductKey. ProductTypeCode is a coded representation of a product type such as a material or service. It may be based on datatype GDT: ProductTypeCode. ProductIdentifierTypeCode is a coded representation of a product identifier type. It may be based on datatype GDT: ProductIdentifierTypeCode. ProductID is an identifier for a product. It may be based on datatype GDT: ProductID. ProductUUID is a universal unique identifier of the product in the release order item. It may be based on datatype GDT: UUID. ProductStandardID is a unique identifier of a product whereby the identification sheet used is managed by an agency. It may be based on datatype GDT: ProductStandardID. ProductBuyerID is an identifier of the product assigned by the buyer. It may be based on datatype GDT: ProductPartyID. ProductSellerID is an identifier of the product assigned by the seller. It may be based on datatype GDT: ProductPartyID. ProductProductRecipientID is an identifier of the product assigned by the product recipient. It may be based on datatype GDT: ProductPartyID. ProductRequirementSpecificationVersionUUID is a universally unique identifier of the product requirement specification for the material that will be produced. It may be based on datatype GDT: UUID. ProductRequirementSpecificationKey is a unique identifier of the product requirement specification for the material that will be produced. It may be based on datatype KDT: RequirementSpecificationKey. RequirementSpecificationID is an identifier for a requirement specification that is unique within one system. It may be based on datatype GDT: RequirementSpecificationID. RequirementSpecificationVersionID is an identifier for the version of a requirement specification. It may be based on datatype GDT: VersionID. The elements of the present node can be used in every derived BO.

An inbound aggregation relationship may exist from the business object Material/node Material to Material with a cardinality of C:C. The ItemProduct may represent the Product specialization Material if an item includes a material. An inbound aggregation relationship may exist from the business object Product Requirement Specification/node Product Requirement Specification to ProductRequirementSpecification with a cardinality of C:CN, which may denote the product requirement specification that specifies the product to be produced in detail. A MaterialOverview specialization association for navigation may exist to business object Material/node Overview with a target cardinality of CN.

Item Current Item Request Reference is a unique reference to the current item request. The elements located at the node Item Current Item Request Reference can be defined by the datatype ReleaseOrderItemCurrentItemRequest Reference Elements. These elements include an ItemRequestUUID element. ItemRequestUUID is a universal unique identifier of the current item request. It may be based on datatype GDT: UUID. The elements of the present node can be used in every derived BO. A CurrentItemRequest specialization association for navigation may exist to node ItemRequest with a target cardinality of C.

Item Request is a request to order a product. In some implementations, Item Request is Time dependent based on Time Point. The elements located at the node Item Request can be defined by the datatype ReleaseOrderItemRequestElements. These elements include: UUID, ID, PredecessorItemRequestID, PredecessorItemRequestUUID, CumulatedRequestedQuantity, CumulatedRequestedQuantity Type Code, Status, and SystemAdministrativeData. Status includes a ProcurementReleaseOrderRequestIssuing StatusCode element. UUID is a universally unique identifier of Item Request. In some implementations, UUID is used as an alternative key. It may be based on datatype GDT: UUID. ID represents an identification for Item Request. It may be based on datatype GDT: ReleaseOrderItemRequestID. PredecessorItemRequestID is an identifier of the predecessor item request. It may be based on datatype GDT: BusinessTransactionDocumentID. PredecessorItemRequestUUID is a unique identifier of the predecessor item request. It may be based on datatype GDT: UUID. CumulatedRequestedQuantity represents the cumulated requested quantity with the corresponding unit of measure. It may be based on datatype GDT: Quantity with Qualifier: Requested. Cumulated Requested QuantityTypeCode is a coded representation of the type of the cumulated requested quantity value. It may be based on datatype GDT: QuantityTypeCode with Qualifier: Requested. Status represents the current status of a release order item request. It may be based on datatype BOIDT: ReleaseOrderItemRequestStatus. ProcurementReleaseOrderRequestIssuingStatusCode describes the issuing status of a procurement release order request. In some implementations, allowed code values are Not Issued and Issued. It may be based on datatype GDT: IssuingStatusCode with Qualifier: ProcurementReleaseOrderRequest. SystemAdministrativeData represents administrative data stored in the system that describes who created the release order item request, and when it was created. It may be based on datatype GDT: SystemAdministrativeData. The elements of the present node can be used in every derived BO.

A composition relationship to a ItemRequestScheduleLine subordinate node can exist with a 1:C cardinality relationship. An inbound association relationship may exist from the business object Identity/node Identity to LastChangeIdentity with a cardinality of 1:CN, which may identify the identity that has last changed the Item Request. An inbound association relationship may exist from the business object Identity/node Identity to CreationIdentity with a cardinality of 1:CN, which may identify the identity that has created the Item Request. An inbound association relationship may exist from the business object Release Order_Template/node Item Request to PredecessorItemRequest with a cardinality of C:C, which may represent the association from the predecessor item request.

A PlannedItemRequestScheduleLine specialization association for navigation may exist to node ItemRequestScheduleLine with a target cardinality of CN. The association may filter all schedule lines of type Planned. A RequestedItemRequestScheduleLine specialization association for navigation may exist to node ItemRequestScheduleLine with a target cardinality of CN. The association may filter all schedule lines of type Requested.

Release Order_Template may be associated with a Notify Of Procurement Release Order Request Issue enterprise service infrastructure action. The action notifies the procurement release order item request that a procurement release order request message was sent. The action also determines the ProcurementReleaseOrderRequestIssuingStatus of the procurement release order item request. In some implementations, this action is only applicable for procurement release orders items that are not yet issued. If the object is changed, only the status variable is set. If the status is changed, the action can set the "ProcurementReleaseOrderRequestIssuingStatusCode" status variable to "Issued." The action may not be triggered by a user. It may be executed by a compound service or a core service of the same or a different business object. The actions and queries of the present node can be used in every derived BO.

Item Request Schedule Line is a schedule line included in the item request covering a partial quantity of the product specified in the item and specifying the delivery date. In some implementations, Item Request Schedule Line is Time dependent based on Schedule Line Date.

The elements located at the node Item Request Schedule Line can be defined by the datatype ReleaseOrderItemRequestScheduleLineElements. These elements include: UUID, ID, TypeCode, RequestedArrivalDateTimePeriod, RequestedQuantity, and RequestedQuantityTypeCode. UUID is a universally unique identifier of the schedule line in a ReleaseOrderItemRequest. In some implementations, UUID is used as an alternative key. It may be based on datatype GDT: UUID. ID is a unique identifier of the schedule line in a ReleaseOrderItemRequest. It may be based on datatype GDT: ReleaseOrderItemRequestScheduleLineID. TypeCode is a coded representation of the type of schedule line of the requested quantity. It may be based on datatype GDT: BusinessTransactionDocumentItemScheduleLine TypeCode. RequestedArrivalDateTimePeriod represents the time period within which the goods are requested to arrive at the receiver. GDT: UPPEROPEN_LOCALNORMALISED_DateTimePeriod with Qualifier: Arrival. RequestedQuantity represents the requested quantity. It may be based on datatype GDT: Quantity with Qualifier: Requested. RequestedQuantityTypeCode is a coded representation of the type of the requested quantity. It may be based on datatype GDT: QuantityTypeCode with Qualifier: Requested. The elements of the present node can be used in every derived BO.

Item Current Item Confirmation Reference is a unique reference to the current item confirmation. The elements located at the node Item Current Item Confirmation Reference can be defined by the datatype ReleaseOrderItemCurrentItemConfirmationReferenceElements. These elements include an ItemConfirmationUUID element. ItemConfirmationUUID is a universally unique identifier of the current item confirmation. It may be based on datatype GDT: UUID. The elements of the present node can be used in every derived BO. A CurrentItemConfirmation specialization association for navigation may exist to node ItemConfirmation with a target cardinality of C.

Item Confirmation is a confirmation to deliver an ordered product. In some implementations, Item Confirmation is Time dependent based on Time Point. The elements located at the node Item Confirmation can be defined by the datatype: ReleaseOrderItemConfirmationElements. These elements include: UUID, ID, ItemRequestID, ItemRequestUUID, ConfirmedDateTime, CumulatedConfirmedQuantity, CumulatedConfirmedQuantityTypeCode, OpenQuantityCancelledIndicator, and SystemAdministrativeData. UUID is a universally unique identifier of Item Confirmation. In some implementations, UUID is used as an alternative key. It may be based on datatype GDT: UUID. ID is an identification for Item Confirmation. It may be based on datatype GDT: ReleaseOrderItemConfirmationID. ItemRequestID is an identifier of the item request, which is confirmed by the item confirmation. It may be based on datatype GDT: BusinessTransactionDocumentID. ItemRequestUUID is a universally unique identifier of the item request, which is confirmed by the item confirmation. It may be based on datatype GDT: UUID. ConfirmedDateTime represents a point in time when the release order item was confirmed. It may be based on datatype GDT: LOCALNORMALISED_DateTime with Qualifier: Confirmed. CumulatedConfirmedQuantity represents the cumulated confirmed quantity with the corresponding unit of measure. It may be based on datatype GDT: Quantity with Qualifier: Confirmed. Cumulated ConfirmedQuantityTypeCode is a coded representation of the type of the cumulated confirmed quantity value. It may be based on datatype GDT: QuantityTypeCode with Qualifier: Confirmed. OpenQuantityCancelledIndicator indicates the cancellation of the open quantity. It may be based on datatype GDT: Indicator with Qualifier: Cancelled. SystemAdministrativeData represents administrative data stored in the system that describes who created the release order item confirmation, and when it was created. It may be based on datatype GDT: SystemAdministrativeData. The elements of the present node can be used in every derived BO.

A composition relationship to a ItemConfirmationScheduleLine subordinate node can exist with a 1:CN cardinality relationship. A composition relationship to a ItemConfirmationAttachmentFolder subordinate node can exist with a 1:C cardinality relationship. A composition relationship to a ItemConfirmationTextCollection subordinate node can exist with a 1:C cardinality relationship. An inbound aggregation relationship may exist from the business object Release Order_Template/node Item Request to Item Request with a cardinality of C:CN, which may represent an Item request, which is confirmed by the item confirmation. An inbound association relationship may exist from the business object Identity/node Identity to CreationIdentity with a cardinality of 1:CN, which may identify the identity that has created the Item Confirmation. An inbound association relationship may exist from the business object Identity/node Identity to LastChangeIdentity with a cardinality of 1:CN, which may identify the identity that has last changed the Item Confirmation.

A PlannedItemConfirmationScheduleLine specialization association for navigation may exist to node ItemConfirmationScheduleLine with a target cardinality of CN. The association may filter all schedule lines of type Planned. A ConfirmedItemConfirmationScheduleLine specialization association for navigation may exist to node ItemConfirmationScheduleLine with a target cardinality of CN. The association may filter all schedule lines of type Confirmed.

Item Confirmation Schedule Line is a schedule line included in the item confirmation covering a partial quantity of the product specified in the item and specifying the delivery date. In some implementations, Item Confirmation Schedule Line is Time dependent based on Schedule Line Date. The elements located at the node Item Confirmation Schedule Line can be defined by the datatype ReleaseOrderItemConfirmationScheduleLineElements. These elements include: UUID, ID, TypeCode, ArrivalDateTimePeriod, ShippingDateTimePeriod, ConfirmedQuantity, and ConfirmedQuantityTypeCode. UUID is a universally unique identifier of the schedule line in a ReleaseOrderItemConfirmation. In some implementations, UUID is used as an alternative key. It may be based on datatype GDT: UUID. ID is a unique identifier of the schedule line in a ReleaseOrderItemConfirmation. It may be based on datatype GDT: ReleaseOrderItemConfirmationScheduleLineID. TypeCode is a coded representation of the type of the confirmed quantity. It may be based on datatype GDT: BusinessTransactionDocumentItemScheduleLineTypeCode. ArrivalDateTimePeriod represents the time period within which the goods will arrive at the receiver. It may be based on datatype GDT: UPPEROPEN_LOCALNORMALISED_DateTimePeriod with Qualifier: Arrival. ShippingDateTimePeriod represents the time period within which the goods are shipped to the receiver. It may be based on datatype GDT: UPPEROPEN_LOCALNORMALISED_DateTimePeriod with Qualifier: Shipping. ConfirmedQuantity represents the confirmed quantity. It may be based on datatype GDT: Quantity with Qualifier: Confirmed. ConfirmedQuantityTypeCode is a coded representation of the type of the confirmed quantity. It may be based on datatype GDT: QuantityTypeCode with Qualifier: Confirmed. The elements of the present node can be used in every derived BO.

Item Confirmation Attachment Folder (Dependent Object Inclusion Node) is a folder including one or more documents in electronic form including additional information about an item confirmation. Item Confirmation Text Collection (Dependent Object Inclusion Node) is a natural language text linked to the release order item confirmation that supports release order processing.

Item Fulfilment represents the fulfillment of an item relevant to the release order. In some implementations, Item Fulfilment is Time dependent based on Time Point. The elements located at the node Item Fulfilment can be defined by the datatype ReleaseOrderItemFulfilmentElements. These elements include: CumulatedOutboundDeliveryQuantity, CumulatedOutboundDeliveryQuantityTypeCode, CompletedIndicator, and SystemAdministrativeData. CumulatedOutboundDeliveryQuantity represents the cumulated delivered quantity. It may be based on datatype GDT: Quantity with Qualifier: Delivery. CumulatedOutboundDeliveryQuantityTypeCode is a coded representation of the type of the cumulated delivered quantity. It may be based on datatype GDT: QuantityTypeCode with Qualifier: Delivery. CompletedIndicator indicates the completion of a release order item for which no more deliveries are expected. It may be based on datatype GDT: Indicator with Qualifier: Completed. SystemAdministrativeData is administrative data recorded by the system. This data includes system users and change times. It may be based on datatype GDT: SystemAdministrativeData. The elements of the present node can be used in every derived BO.

A composition relationship to a ItemFulfilmentActualValue subordinate node can exist with a 1:CN cardinality relationship. An inbound association relationship may exist from the business object Identity/node Identity to LastChangeIdentity with a cardinality of 1:CN, which may identify the identity that has last changed the release order item fulfillment. An inbound association relationship may exist from the business object Identity/node Identity to CreationIdentity with a cardinality of 1:CN, which may identify the identity that has created the release order item fulfillment.

Item Fulfilment Actual Value is a value that represents actual order fulfillment in terms of quantity and dates for an item business transaction document reference. The elements located at the node Item Fulfilment Actual Value can be defined by the datatype ReleaseOrderItemFulfilmentActualValueElements. These elements include: BusinessTransactionDocumentReference, BusinessTransactionDocument RelationshipRoleCode, ShippingDateTimePeriod, ArrivalDateTimePeriod, FulfilledQuantity, and FulfilledQuantityTypeCode. BusinessTransactionDocument Reference is a unique reference to another business transaction document or business transaction document item. It may be based on datatype GDT: BusinessTransactionDocumentReference. BusinessTransactionDocumentRelationship RoleCode is a coded representation of the role the referenced document or referenced document item plays in relation to the release order. It may be based on datatype GDT: BusinessTransactionDocumentRelationshipRoleCode. ShippingDateTimePeriod represents the time period within which the goods were shipped to the receiver. It may be based on datatype GDT: UPPEROPEN_LOCALNORMALISED_ DateTimePeriod with Qualifier: Shipping. ArrivalDateTimePeriod represents the time period within which the goods will arrive at the receiver. It may be based on datatype GDT: UPPEROPEN_LOCALNORMALISED_DateTimePeriod with Qualifier: Arrival. FulfilledQuantity represents the fulfilled quantity with the corresponding unit of measure. It may be based on datatype GDT: Quantity with Qualifier: Fulfilled. FulfilledQuantityTypeCode is a coded representation of the type of the fulfilled quantity value. It may be based on datatype GDT: QuantityTypeCode with Qualifier: Fulfilled. The elements of the present node can be used in every derived BO.

An inbound association relationship may exist from the business object Outbound Delivery/node Item to Item with a cardinality of C:C, which may represent the item in an outbound delivery.

Item Attachment Folder (Dependent Object Inclusion Node) is a folder for one or more documents in electronic form including information about a release order item. Item Text Collection (Dependent Object Inclusion Node) is a collection of natural-language texts with additional information about a release order item. Attachment Folder (Dependent Object Inclusion Node) is a folder for one or more documents in electronic form including information about a release order. Text Collection (Dependent Object Inclusion Node) is a collection of natural-language texts with additional information about a release order. Controlled Output Request (Dependent Object Inclusion Node) is a controller of output requests and output history entries.

Some or all of the nodes of the business object Template Release Order_Template may be used in a derived business object (e.g., in Procurement Release Order). Business Object Procurement Release Order is a procurement request to release a specified quantity of material for delivery within a specified time. The business object Procurement Release Order belongs to the process component External Procurement Trigger and Response. This request only includes information about the material flow. If the material flow represents a sales process, the financial conditions can be specified by referring to an outline agreement. Procurement Release Order is used within Third-Party Direct Ship by a buyer to request that a seller delivers a specified quantity of material within a specified time. It is also used during Intra Company Stock Transfer as a means to control the shipment of goods from one location to another within a company. The Procurement Release Order includes the following main parts, the Root, and the Item. The Root includes information on parties, locations, and status with information on the ordered goods or the goods to be delivered. The Item includes information on the product to be delivered and its quantities, as well as on parties and status.

Figures 1, 45:
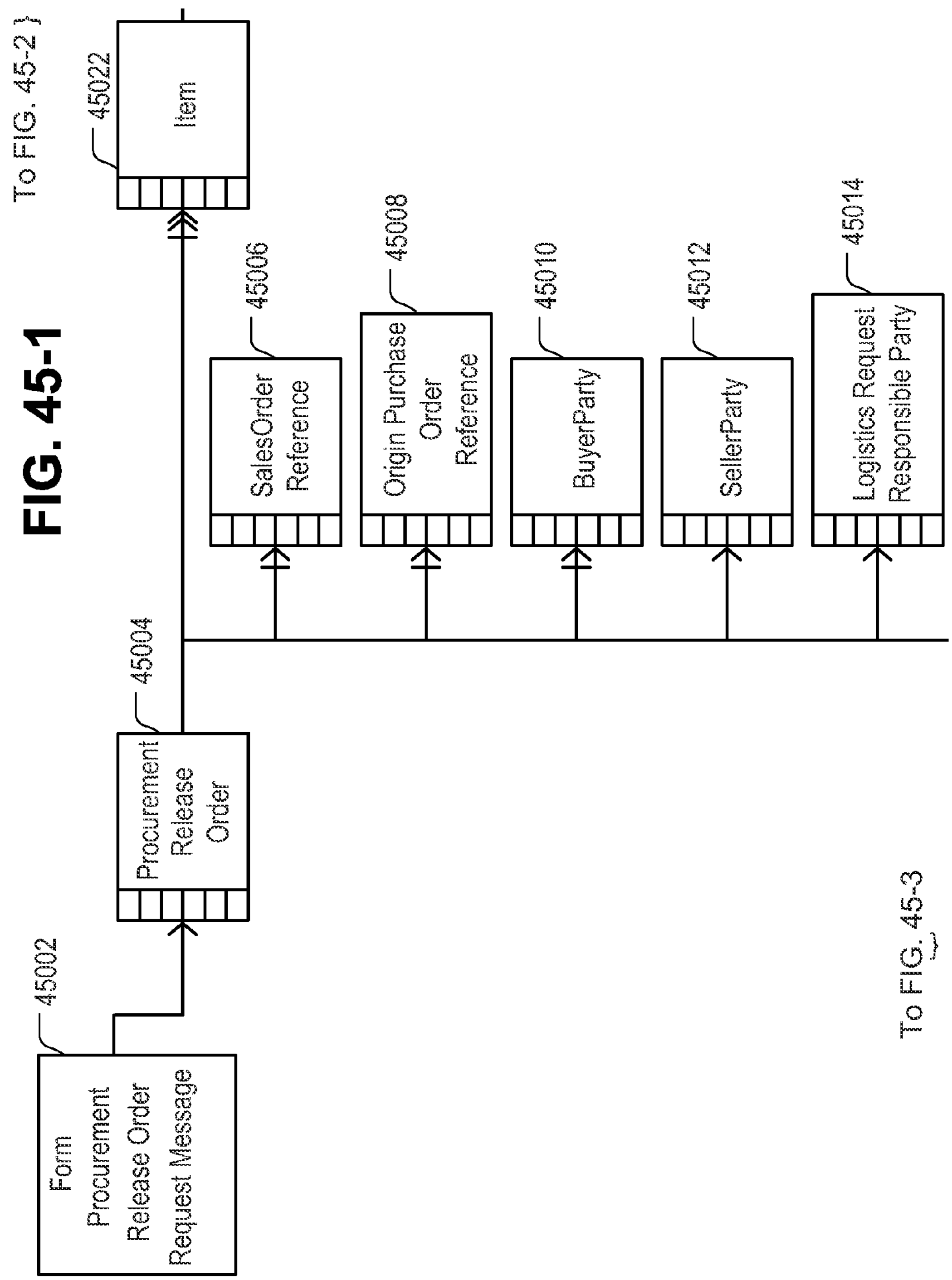
Figures 2, 45:
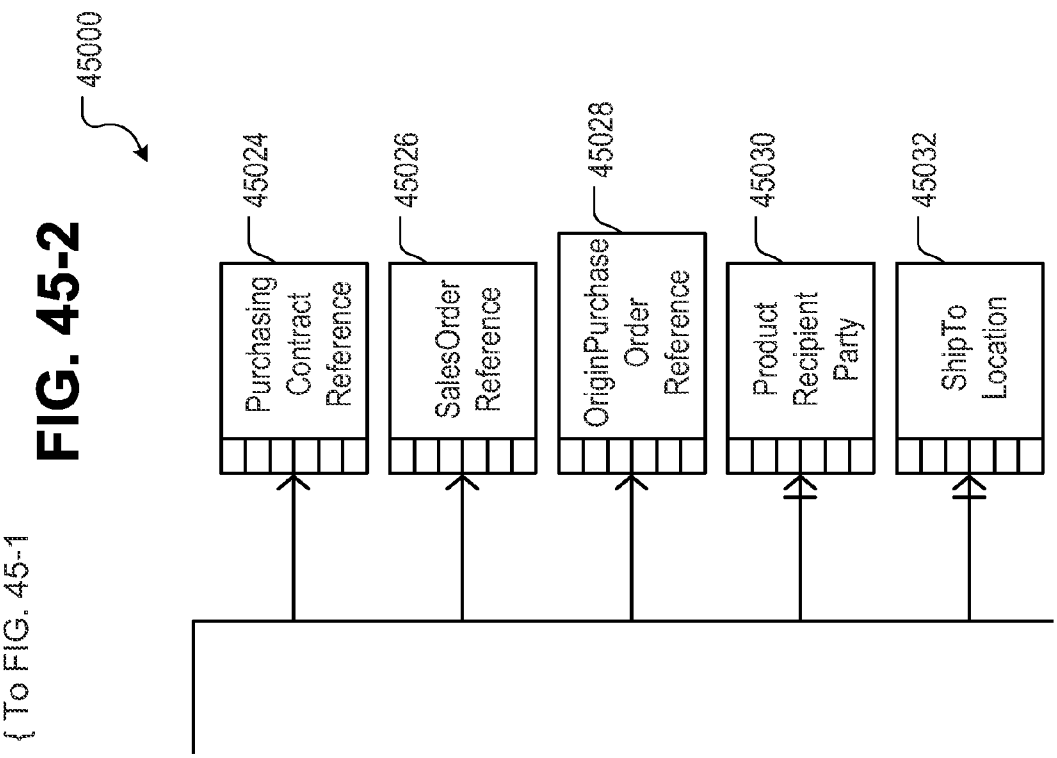
Figures 3, 45:
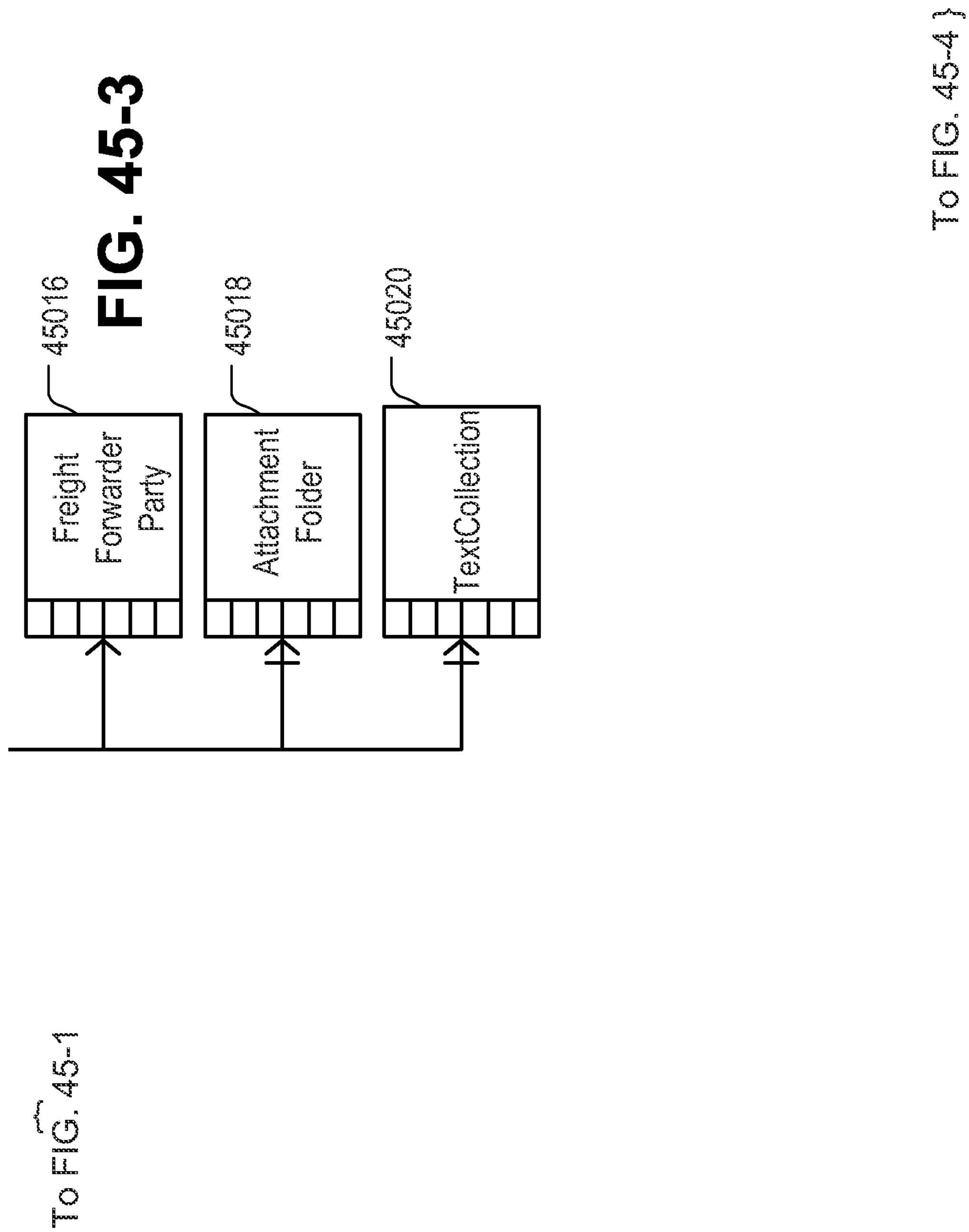
Figures 4, 45:
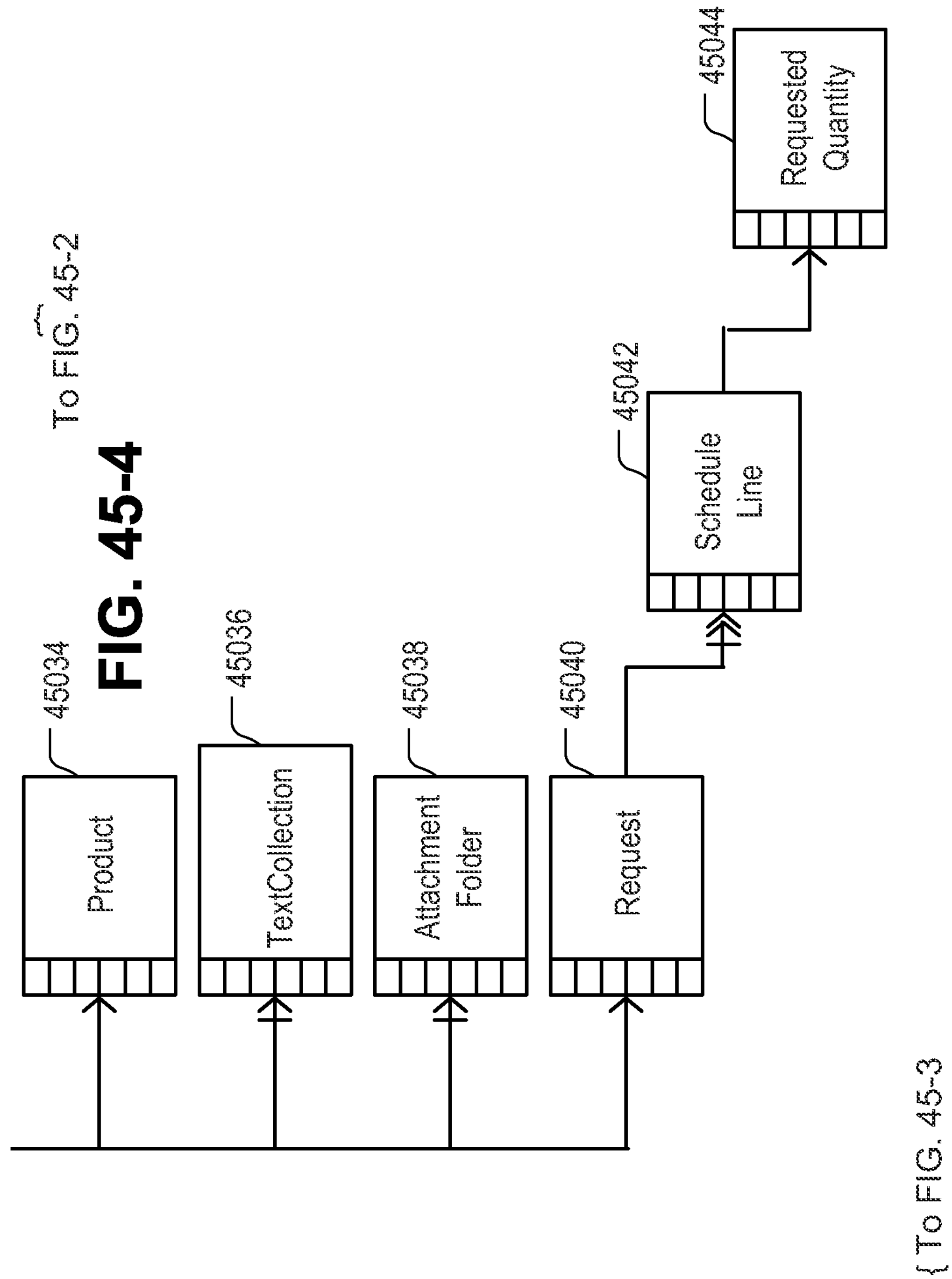

FIGS. 45-1 through 45-4 depict an example Form Procurement Release Order Request Message Data Type 45000, which comprises elements 45002-45044, hierarchically related as shown. For example, the Form Procurement Release Order Request Message 45002 includes a Procurement Release Order 45004.

The message type Form Procurement Release Order Request is derived from the business object Procurement Release Order leading object together with its operation signature. Form Procurement Release Order Request is a message type to enable form-based output for a procurement release order request. The structure of this message type can be determined by the message data type FormProcurement ReleaseOrderRequestMessage. The FormProcurementReleaseOrderRequestMessage message data type includes the object ProcurementReleaseOrder which is included in the business document, and the business information that is relevant for sending a business document in a message. It also includes the MessageHeader and ProcurementReleaseOrder packages. The FormProcurementReleaseOrderRequestMessage message data type can provide the structure for the Form Procurement Release Order Request message type and the operations that are based on it.

The MessageHeader package is a grouping of business information that is relevant for sending a business document in a message. It includes a MessageHeader node. MessageHeader is a grouping of business information from the perspective of the sending application. It includes information to identify the business document in a message, information about the sender, and optionally, information about the recipient. The MessageID can be set by the sending application. With the ReferencedMessageID, reference is made in the current BusinessDocument to a previous BusinessDocument.

The SenderParty can be specified by the sending application. It can name a contact person for any problems that arise with the message. This can be useful when there is an additional infrastructure, such as a marketplace, between the sender and the recipient. The SenderParty plays an auxiliary role during message transfer, and can be ignored by the recipient application. It can be filled by the sender if the PurchaseOrder package cannot be used to transfer the participating parties.

The RecipientParty can be specified by the sending application. It can name a recipient contact person for any problems that arise with the message. This can be useful when there is an additional infrastructure, such as a marketplace, between the sender and the recipient. The RecipientParty plays an auxiliary role during message transfer, and can be ignored by the recipient application. It can be filled by the sender if the PurchaseOrder package cannot be used to transfer the participating parties.

The MessageHeader includes SenderParty and RecipientParty elements. It can be of the type GDT:BusinessDocumentMessageHeader. The elements of the GDT used include: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime. SenderParty is a partner responsible for sending a business document at a business application level. The SenderParty may be based on datatype GDT:BusinessDocumentMessageHeaderParty. RecipientParty is a partner responsible for receiving a business document at a business application level. The RecipientParty may be based on datatype GDT:BusinessDocumentMessageHeaderParty.

The ProcurementReleaseOrder package is the grouping of ProcurementReleaseOrder with its packages. The packages include BusinessTransactionDocumentReference, Party, AttachmentFolder, TextCollection, and Item. It also includes a ProcurementReleaseOrder entity. ProcurementReleaseOrder is used by a customer to notify a supplier about the quantity of a material from a purchasing contract item that is to be delivered and at what time. ProcurementReleaseOrder includes ActionCode and ReconciliationPeriodCounterValue attributes. ActionCode is a coded representation of an instruction to the message recipient how to process the ProcurementReleaseOrderRequest message. It may be based on datatype GDT:ActionCode. ReconciliationPeriodCounterValue is a sequence number that identifies the reconciliation period this message refers to. For AP (Accounts Payable) internal communication, the ReconciliationPeriodCounterValue may be used. It may be based on datatype GDT: CounterValue.

ProcurementReleaseOrder includes the non-node elements: WatermarkName, ID, CreationDateTime, OrderedDateTime, LastChangeDateTime, and ItemListCompleteTransmissionIndicator. WatermarkName represents the name of the watermark. The watermark can be used to mark a form in a preview as a copy. It may be based on datatype CDT: LANGUAGEINDEPENDENT_MEDIUM_Name. ID is a unique identifier for the ProcurementReleaseOrder. It may be based on datatype GDT:BusinessTransactionDocumentID. CreationDateTime represents the creation time of the procurement release order. It may be based on datatype CDT: LOCALNORMALISED_DateTime. OrderedDateTime represents the first time a procurement release order was sent to the supplier. It may be based on datatype CDT:LOCALNORMALISED_DateTime. LastChangeDateTime represents the last change time of the procurement release order. It may be based on datatype CDT:LOCALNORMALISED_DateTime. ItemListCompleteTransmissionIndicator indicates if all items are transmitted in the message. It may be based on datatype CDT:Indicator.

ProcurementReleaseOrder includes a node element Sales OrderReference in a 1:C cardinality relationship, a node element OriginPurchaseOrderReference in a 1:C cardinality relationship, a node element BuyerParty in a 1:C cardinality relationship, a node element SellerParty in a 1:1 cardinality relationship, a node element LogisticsRequestResponsibleParty in a 1:C cardinality relationship, a node element FreightForwarderParty in a 1:C cardinality relationship, a node element AttachmentFolder in a 1:C cardinality relationship, a node element TextCollection in a 1:C cardinality relationship, a node element Item in a 1:CN cardinality relationship.

The ProcurementReleaseOrderBusinessTransaction DocumentReference package includes SalesOrderReference and OriginPurchaseOrderReference entities. The SalesOrderReference is a reference to the sales order which initiated the creation of the procurement release order. SalesOrderReference can be typed by BusinessTransactionDocumentReference. In some implementations, the reference is used in a third party direct ship scenario. The OriginPurchaseOrderReference is a reference to the customer's purchase order which initiated the sales order in a third party direct ship scenario. OriginPurchaseOrderReference can be typed by BusinessTransactionDocumentReference.

The ProcurementReleaseOrderParty package includes BuyerParty, SellerParty, LogisticsRequestResponsibleParty, and FreightForwarderParty entities. BuyerParty is a party that buys goods or services. BuyerParty includes the non-node elements: InternalID, StandardID, BuyerID, SellerID, ProductRecipientID, VendorID, BillToID, BillFromID, BidderID, PaymentTransactionInitiatorID, PaymentTransactionDestinatedID, TaxID, TypeCode, FormattedName, and FormAddress. InternalID may be based on datatype GDT: PartyInternalID. StandardID may be based on datatype GDT: PartyStandardID. BuyerID may be based on datatype GDT: PartyPartyID. SellerID may be based on datatype GDT: PartyPartyID. ProductRecipientID may be based on datatype GDT:PartyPartyID. VendorID may be based on datatype GDT:PartyPartyID. BillToID may be based on datatype GDT:PartyPartyID. BillFromID may be based on datatype GDT:PartyPartyID. BidderID may be based on datatype GDT:PartyPartyID. PaymentTransactionInitiatorID may be based on datatype GDT:PartyPartyID. PaymentTransactionDestinatedID may be based on datatype GDT:PartyPartyID. TaxID may be based on datatype GDT:PartyTaxID. TypeCode may be based on datatype GDT:BusinessObjectTypeCode. FormattedName may be based on datatype CDT:LANGUAGEINDEPENDENT_LONG_Name. FormAddress may be based on datatype GDT:FormAddress. BuyerParty includes a node element ContactPerson in a 1:C cardinality relationship.

For intra-enterprise communication, use the InternalID for all party entities. For inter-enterprise communication, use the StandardID or the partner-role-specific ID of the receiving partner for all party entities. Use the BuyerID for Supplier Collaboration scenarios, and use the SellerID for Customer Collaboration scenarios. Due to the different possibilities for ID use, all ID elements of the particular party are optional. The address of the BuyerParty is not intended to be used as the delivery address. The ShipToLocation is provided for this purpose.

ContactPerson includes the non-node elements: InternalID, BuyerID, SellerID, ProductRecipientID, VendorID, BillToID, BillFromID, BidderID, FormAddress, and FormattedName. InternalID is a proprietary identifier that can be used when both sender and recipient access shared master data. It may be based on datatype GDT:ContactPersonInternalID with Qualifier:Internal. BuyerID may be based on datatype GDT:ContactPersonPartyID. SellerID is a proprietary identifier that is used by the SellerParty for this location. It may be based on datatype GDT: ContactPersonPartyID with Qualifier:Seller. ProductRecipientID is a proprietary identifier that is used by the ProductRecipientParty for this location. It may be based on datatype GDT:ContactPersonPartyID with Qualifier:Product Recipient. VendorID may be based on datatype GDT:ContactPersonPartyID. BillToID may be based on datatype GDT:ContactPersonPartyID. BillFromID may be based on datatype GDT: ContactPersonPartyID. BidderID may be based on datatype GDT: ContactPersonPartyID. FormAddress may be based on datatype GDT: FormAddress. FormattedName may be based on datatype CDT:LANGUAGEINDEPENDENT_LONG_Name.

The SellerParty is a company or person who sells the goods described in the ProcurementReleaseOrder. SellerParty includes the non-node elements: InternalID, StandardID, BuyerID, SellerID, ProductRecipientID, VendorID, BillToID, BillFromID, BidderID, PaymentTransactionInitiatorID, PaymentTransactionDestinatedID, TaxID, TypeCode, FormattedName, and FormAddress. InternalID may be based on datatype GDT:PartyInternalID. StandardID may be based on datatype GDT:PartyStandardID. BuyerID may be based on datatype GDT:PartyPartyID. SellerID may be based on datatype GDT:PartyPartyID. ProductRecipientID may be based on datatype GDT:PartyPartyID. VendorID may be based on datatype GDT:PartyPartyID. BillToID may be based on datatype GDT:PartyPartyID. BillFromID may be based on datatype GDT:PartyPartyID. BidderID may be based on datatype GDT:PartyPartyID. PaymentTransactionInitiatorID may be based on datatype GDT:PartyPartyID. PaymentTransactionDestinatedID may be based on datatype GDT:PartyPartyID. TaxID may be based on datatype GDT: PartyTaxID. TypeCode may be based on datatype GDT:BusinessObjectTypeCode. FormattedName may be based on datatype CDT:LANGUAGEINDEPENDENT_LONG_Name. FormAddress may be based on datatype GDT:FormAddress. SellerParty includes a node element ContactPerson in a 1:C cardinality relationship.

For intra-enterprise communication, use the InternalID for all party entities. For inter-enterprise communication, use the StandardID or the partner-role-specific ID of the receiving partner for all party entities. Use the BuyerID for Supplier Collaboration scenarios, and use the SellerID for Customer Collaboration scenarios. Due to the different possibilities for ID use, all ID elements of the particular party are optional.

ContactPerson includes the non-node elements: InternalID, BuyerID, SellerID, ProductRecipientID, VendorID, BillToID, BillFromID, BidderID, FormAddress, and FormattedName. InternalID represents a proprietary identifier that is used when both sender and recipient access shared master data. It may be based on datatype GDT:ContactPersonInternalID with Qualifier:Internal. BuyerID may be based on datatype GDT:ContactPersonPartyID. SellerID represents a proprietary identifier that is used by the SellerParty for this location. It may be based on datatype GDT:ContactPersonPartyID with Qualifier:Seller. ProductRecipientID represents a proprietary identifier that is used by the ProductRecipientParty for this location. It may be based on datatype GDT: ContactPersonPartyID with Qualifier:Product Recipient. VendorID may be based on datatype GDT:ContactPersonPartyID. BillToID may be based on datatype GDT:ContactPersonPartyID. BillFromID may be based on datatype GDT: ContactPersonPartyID. BidderID may be based on datatype GDT:ContactPersonPartyID. FormAddress may be based on datatype GDT:FormAddress. FormattedName may be based on datatype CDT:LANGUAGEINDEPENDENT_LONG_Name.

LogisticsRequestResponsibleParty is a company or person responsible for logistics requests. LogisticsRequestResponsibleParty includes the non-node elements: InternalID, StandardID, BuyerID, SellerID, ProductRecipientID, VendorID, BillToID, BillFromID, BidderID, PaymentTransactionInitiatorID, PaymentTransactionDestinatedID, TaxID, TypeCode, FormattedName, and FormAddress. InternalID may be based on datatype GDT:PartyInternalID. StandardID may be based on datatype GDT:PartyStandardID. BuyerID may be based on datatype GDT:PartyPartyID). SellerID may be based on datatype GDT:PartyPartyID. ProductRecipientID may be based on datatype GDT:PartyPartyID. VendorID may be based on datatype GDT:PartyPartyID. BillToID may be based on datatype GDT:PartyPartyID. BillFromID may be based on datatype GDT:PartyPartyID. BidderID may be based on datatype GDT:PartyPartyID. PaymentTransactionInitiatorID may be based on datatype GDT:PartyPartyID. PaymentTransactionDestinatedID may be based on datatype GDT:PartyPartyID. TaxID may be based on datatype GDT:PartyTaxID. TypeCode may be based on datatype GDT:BusinessObjectTypeCode. FormattedName may be based on datatype CDT:LANGUAGEINDEPENDENT_LONG_Name. FormAddress may be based on datatype GDT:FormAddress. LogisticsRequestResponsibleParty includes a node element ContactPerson in a 1:C cardinality relationship.

ContactPerson includes the non-node elements: InternalID, BuyerID, SellerID, ProductRecipientID, VendorID, BillToID, BillFromID, BidderID, FormAddress, and FormattedName. InternalID is a proprietary identifier that is used when both sender and recipient can access shared master data. It may be based on datatype GDT:ContactPersonInternalID with Qualifier:Internal. BuyerID may be based on datatype GDT:ContactPersonPartyID. SellerID is a proprietary identifier that is used by the SellerParty for this location. It may be based on datatype GDT:ContactPersonPartyID with Qualifier:Seller. ProductRecipientID is a proprietary identifier that is used by the ProductRecipientParty for this location. It may be based on datatype GDT:ContactPersonPartyID with Qualifier:Product Recipient. VendorID may be based on datatype GDT:ContactPersonPartyID. BillToID may be based on datatype GDT:ContactPersonPartyID. BillFromID may be based on datatype GDT: ContactPersonPartyID. BidderID may be based on datatype GDT: ContactPersonPartyID. FormAddress may be based on datatype GDT:FormAddress. FormattedName may be based on datatype CDT:LANGUAGEINDEPENDENT_LONG_Name.

FreightForwarderParty is a company or person responsible for organizing the shipment. FreightForwarderParty includes the non-node elements: InternalID, StandardID, BuyerID, SellerID, ProductRecipientID, VendorID, BillToID, BillFromID, BidderID, PaymentTransactionInitiatorID, PaymentTransactionDestinatedID, TaxID, TypeCode, FormattedName, and FormAddress. InternalID may be based on datatype GDT:PartyInternalID. StandardID may be based on datatype GDT:PartyStandardID. BuyerID may be based on datatype GDT:PartyPartyID. SellerID may be based on datatype GDT:PartyPartyID. ProductRecipientID may be based on datatype GDT:PartyPartyID. VendorID may be based on datatype GDT:PartyPartyID. BillToID may be based on datatype GDT:PartyPartyID. BillFromID may be based on datatype GDT:PartyPartyID. BidderID may be based on datatype GDT:PartyPartyID. PaymentTransactionInitiatorID may be based on datatype GDT:PartyPartyID. PaymentTransactionDestinatedID may be based on datatype GDT:PartyPartyID. TaxID may be based on datatype GDT:PartyTaxID. TypeCode may be based on datatype GDT:BusinessObjectTypeCode. FormattedName may be based on datatype CDT:LANGUAGEINDEPENDENT_LONG_Name. FormAddress may be based on datatype GDT:FormAddress. FreightForwarderParty includes a node element ContactPerson in a 1:C cardinality relationship.

For intra-enterprise communication, use the InternalID for all party entities. For inter-enterprise communication, use the StandardID or the partner-role-specific ID of the receiving partner for all party entities. Use the BuyerID for Supplier Collaboration scenarios, and use the SellerID for Customer Collaboration scenarios. Due to the different possibilities for ID use, all ID elements of the particular party are optional.

ContactPerson includes the non-node elements: InternalID, BuyerID, SellerID, ProductRecipientID, VendorID, BillToID, BillFromID, BidderID, FormAddress, and FormattedName. InternalID is a proprietary identifier that is used when both sender and recipient can access shared master data. It may be based on datatype GDT:ContactPersonInternalID with Qualifier:Internal. BuyerID may be based on datatype GDT:ContactPersonPartyID. SellerID is a proprietary identifier that is used by the SellerParty for this location. It may be based on datatype GDT:ContactPersonPartyID with Qualifier:Seller. ProductRecipientID is a proprietary identifier that is used by the ProductRecipientParty for this location. It may be based on datatype GDT:ContactPersonPartyID with Qualifier:Product Recipient. VendorID may be based on datatype GDT:ContactPersonPartyID. BillToID may be based on datatype GDT:ContactPersonPartyID. BillFromID may be based on datatype GDT: ContactPersonPartyID. BidderID may be based on datatype GDT: ContactPersonPartyID. FormAddress may be based on datatype GDT:FormAddress. FormattedName may be based on datatype CDT:LANGUAGEINDEPENDENT_LONG_Name.

The ProcurementReleaseOrderAttachmentFolder package includes the AttachmentFolder entity. AttachmentFolder can be typed by AttachmentFolder. The ProcurementReleaseOrderTextCollection package includes the TextCollection entity. TextCollection includes the Text non-node element. Text includes the TypeCode, TypeName, and SystemAdministrativeData elements. Text may be based on datatype FMIDT:FormTextCollectionText. TypeCode may be based on datatype GDT:TextCollectionTextTypeCode. TypeName may be based on datatype CDT:LANGUAGEINDEPENDENT_MEDIUM_Name. SystemAdministrativeData may be based on datatype FMIDT:FormSystemAdministrativeData.

The ProcurementReleaseOrderItem package includes an Item entity. ProcurementReleaseOrderItem is a statement regarding the requirement for a specific product at a ship-to location with reference to a purchasing contract item. Item includes an ActionCode attribute. ActionCode is a coded representation of an instruction to the message recipient as to how they should process the message item. It may be based on datatype GDT:ActionCode.

Item includes the non-node elements: ID, TypeCode, and CancellationDocumentIndicator. ID is a sequential number for the item in the ProcurementReleaseOrder document. It may be based on datatype GDT:BusinessTransactionDocumentItemID. TypeCode is a coded representation of the item's type. It may be based on datatype GDT:BusinessTransactionDocumentItemTypeCode. CancellationDocumentIndicator indicates whether this message cancels previous requests of the ProcurementReleaseOrderItem. It may be based on datatype CDT:Indicator.

Item includes a node element PurchasingContractReference in a 1:1 cardinality relationship, a node element Sales OrderReference in a 1:1 cardinality relationship, a node element OriginPurchaseOrderReference in a 1:1 cardinality relationship, a node element ProductRecipientParty in a 1:C cardinality relationship, a node element ShipToLocation in a 1:C cardinality relationship, a node element Production a 1:1 cardinality relationship, a node element ProductRequirementSpecification in a 1:C cardinality relationship, a node element TextCollection in a 1:C cardinality relationship, a node element AttachmentFolder in a 1:C cardinality relationship, and a node element Request in a 1:1 cardinality relationship.

The ProcurementReleaseOrderItemBusinessTransaction DocumentReference package includes PurchasingContractReference, SalesOrderReference, and OriginPurchaseOrderReference entities. PurchasingContractReference is a reference to an item in a purchasing contract. PurchasingContractReference can be typed by BusinessTransactionDocumentReference. In some instances, the reference may always includes the ItemID (purchasing contract item). SalesOrderReference is a reference to the sales order which initiated the creation of the procurement release order. SalesOrderReference can be typed by BusinessTransactionDocumentReference. In some instances, the reference may always include the ItemID (sales order item). OriginPurchaseOrderReference is a reference to the customer's purchase order which initiated the sales order in a third party direct ship scenario. OriginPurchaseOrderReference can be typed by BusinessTransactionDocumentReference. In some instances, the reference may always include the ItemID (purchasing contract item).

The ProcurementReleaseOrderItemParty package includes a ProductRecipientParty entity. The ProductRecipientParty is the company or person that receives the goods delivery. ProductRecipientParty includes the non-node elements: InternalID, StandardID, BuyerID, SellerID, Product RecipientID, VendorID, BillToID, BillFromID, BidderID, PaymentTransactionInitiatorID, PaymentTransactionDestinatedID, TaxID, TypeCode, FormattedName, and FormAddress. InternalID may be based on datatype GDT:PartyInternalID. StandardID may be based on datatype GDT: PartyStandardID. BuyerID may be based on datatype GDT: PartyPartyID. SellerID may be based on datatype GDT: PartyPartyID. ProductRecipientID may be based on datatype GDT:PartyPartyID. VendorID may be based on datatype GDT:PartyPartyID. BillToID may be based on datatype GDT:PartyPartyID. BillFromID may be based on datatype GDT:PartyPartyID. BidderID may be based on datatype GDT:PartyPartyID. PaymentTransactionInitiatorID may be based on datatype GDT:PartyPartyID. PaymentTransactionDestinatedID may be based on datatype GDT:PartyPartyID. TaxID may be based on datatype GDT:PartyTaxID. TypeCode may be based on datatype GDT:BusinessObjectTypeCode. FormattedName may be based on datatype CDT:LANGUAGEINDEPENDENT_LONG_Name. FormAddress may be based on datatype GDT:FormAddress. ProductRecipientParty includes a node elements ContactPerson in a 1:C cardinality relationship.

For intra-enterprise communication with common master data, use InternalID for all party entities. For inter-enterprise communication with business-partner-specific master data, use the StandardID or the partner-role-specific ID of the receiving partner for all party entities. Use the BuyerID for Supplier Collaboration scenarios, and use the VendorID for Customer Collaboration scenarios. Due to the different possibilities for ID use, all ID elements of the particular "Party" are optional.

ContactPerson includes the non-node elements: InternalID, BuyerID, SellerID, ProductRecipientID, VendorID, BillToID, BillFromID, BidderID, FormAddress, and FormattedName. InternalID is a proprietary identifier that is used when both sender and recipient can access shared master data. It may be based on datatype GDT:ContactPersonInternalID with Qualifier:Internal. BuyerID may be based on datatype GDT:ContactPersonPartyID. SellerID is a proprietary identifier that is used by the SellerParty for this location. It may be based on datatype GDT:ContactPersonPartyID with Qualifier:Seller. ProductRecipientID is a proprietary identifier that is used by the ProductRecipientParty for this location. It may be based on datatype GDT:ContactPersonPartyID with Qualifier:Product Recipient. VendorID may be based on datatype GDT:ContactPersonPartyID. BillToID may be based on datatype GDT:ContactPersonPartyID. BillFromID may be based on datatype GDT: ContactPersonPartyID. BidderID may be based on datatype GDT: ContactPersonPartyID. FormAddress may be based on datatype GDT:FormAddress. FormattedName may be based on datatype CDT:LANGUAGEINDEPENDENT_LONG_Name.

The ProcurementReleaseOrderItemLocation package includes a ShipToLocation entity. ShipToLocation represents the place to which the ordered products are delivered. ShipToLocation includes the non-node elements: InternalID, StandardID, BuyerID, SellerID, ProductRecipientID, VendorID, and Note. InternalID is a proprietary identifier that is used when both sender and recipient can access shared master data. It may be based on datatype GDT:LocationInternalID with Qualifier:Internal. StandardID is a standardized identifier for this location, whose identification scheme is managed by an agency from a code list. It may be based on datatype GDT:LocationStandardID. BuyerID is a proprietary identifier used by the BuyerParty for this location. It may be based on datatype GDT:LocationPartyID with Qualifier:Buyer. SellerID is a proprietary identifier that is used by the SellerParty for this location. It may be based on datatype GDT: LocationPartyID with Qualifier:Seller. ProductRecipientID is a proprietary identifier that is used by the ProductRecipientParty for this location. It may be based on datatype GDT: LocationPartyID with Qualifier:Product Recipient. VendorID is a proprietary Identifier that is used by the VendorParty for this location. It may be based on datatype GDT:LocationPartyID with Qualifier:Vendor. Note indicates additional information. It may be based on datatype GDT:Note. ShipToLocation includes a node element Address in a 1:C cardinality relationship and a node element UnloadingLocation in a 1:C cardinality relationship.

For intra-enterprise communication, use the InternalID for all location entities. For inter-enterprise communication, use for all location entities either the StandardID or the partner-role-specific ID of the sending or receiving partner. Due to the different possibilities for ID use, all the ID elements of each location are optional.

The ProcurementReleaseOrderItemLocationAddress package includes an Address entity. The Address identifies the location by indicating e.g., postal address, or geographic coordinates. Address can be typed by FormAddress.

The ProcurementReleaseOrderItemLocationUnloading Location package includes an UnloadingLocation entity. UnloadingLocation represents a location where the delivered product is taken from the means of transport (e.g., a truck or a ship). UnloadingLocation includes the non-node elements: InternalID, StandardID, BuyerID, SellerID, ProductRecipientID, VendorID, BillToID, BillFromID, BidderID, Note, and FormAddress. InternalID may be based on datatype GDT:LocationInternalID. StandardID may be based on datatype GDT:LocationStandardID. BuyerID may be based on datatype GDT:LocationPartyID. SellerID may be based on datatype GDT:LocationPartyID. ProductRecipientID may be based on datatype GDT:LocationPartyID. VendorID may be based on datatype GDT:LocationPartyID. BillToID may be based on datatype GDT:LocationPartyID. BillFromID may be based on datatype GDT:LocationPartyID. BidderID may be based on datatype GDT:LocationPartyID. Note may be based on datatype GDT:Note. FormAddress may be based on datatype GDT:FormAddress.

The ProcurementReleaseOrderItemProductInformation package includes Product and ProductRequirementSpecification entities. Product can be either a tangible or intangible good that is a part of the business activities of a company. It can be traded and contributes directly or indirectly to value added. Product includes the non-node elements: InternalID, StandardID, BuyerID, SellerID, ProductRecipientID, VendorID, ManufacturerID, BillToID, BillFromID, BidderID, TypeCode, TypeName, and Note. InternalID may be based on datatype GDT:LocationInternalID. StandardID may be based on datatype GDT:LocationStandardID. BuyerID may be based on datatype GDT:LocationPartyID. SellerID may be based on datatype GDT:LocationPartyID. ProductRecipientID may be based on datatype GDT:LocationPartyID. VendorID may be based on datatype GDT:LocationPartyID. ManufacturerID may be based on datatype GDT:ProductPartyID. BillToID may be based on datatype GDT:LocationPartyID. BillFromID may be based on datatype GDT:LocationPartyID. BidderID may be based on datatype GDT: LocationPartyID. TypeCode may be based on datatype GDT: ProductTypeCode. TypeName may be based on datatype CDT:Name. Note may be based on datatype GDT:Note.

For intra-enterprise communication, use the InternalID for all product entities. For inter-enterprise communication, use the StandardID or the partner-role-specific ID of the sending or receiving partner for all product entities. Due to the different possibilities for ID use, all ID elements of each particular product are optional.

ProductRequirementSpecification is a collection of requirements for a product used in a specific business context, for example, in a prototype, development project, or sales order. It also includes corresponding specifications for fulfilling these requirements.

ProductRequirementSpecification includes the non-node elements: InternalID, VersionInternalID, and Description. InternalID is a proprietary identifier of a product requirement specification. It may be based on datatype GDT:RequirementSpecificationID. VersionInternalID is a proprietary identifier of the version of a product requirement specification. It may be based on datatype GDT:VersionID. Description is a description of a product requirement specification. It may be based on datatype GDT:MEDIUM_Description with Qualifier:RequirementSpecification.

ProcurementReleaseOrderItemTextCollection package includes a TextCollection entity. TextCollection includes a non-node element Text. Text includes the elements TypeCode, TypeName, and SystemAdministrativeData. Text may be based on datatype FMIDT:FormTextCollectionText. TypeCode may be based on datatype GDT:TextCollectionTextTypeCode. TypeName may be based on datatype CDT: LANGUAGEINDEPENDENT_MEDIUM_Name. SystemAdministrativeData may be based on datatype FMIDT: FormSystemAdministrativeData.

ProcurementReleaseOrderItemAttachmentFolder package includes an AttachmentFolder entity. AttachmentFolder can be typed by AttachmentFolder.

The ProcurementReleaseOrderItemRequest package includes a Request entity. Request includes the non-node elements: ID, CreationDateTime, and PreviousItemRequestID. ID is a unique identifier for the request instance transferred in the procurement release order item. The ReleaseID is valid across all messages and is assigned for a release period such as a fiscal year or quarter. The ReleaseID does not identify a release order item. It may be based on datatype GDT:ReleaseOrderItemRequestID. CreationDateTime represents the reaction date and time of the release instance. It may be based on datatype CDT:LOCALNORMALISED_DateTime. PreviousItemRequestID is a unique identifier for the request instance transferred in the previous message. It may be based on datatype GDT:ReleaseOrderItemRequestID. Request includes a node element ScheduleLine in a 1:CN cardinality relationship. In some instances, Request may always be specified.

The ProcurementReleaseOrderItemRequestScheduleLine package includes a ScheduleLine entity. ScheduleLine is a statement about the quantity of a product to be delivered within a certain period of time. ScheduleLine includes the non-node elements ID and RequestedArrivalDateTimePeriod. ID is a unique identifier for the request schedule line instance transferred in the procurement release order. It may be based on dateyepe GDT: ReleaseOrderItemRequestScheduleLineID. RequestedArrivalDateTimePeriod represents the period in which the product is to be delivered. It may be based on dateyepe GDT:UPPEROPEN_LOCALNORMALISED_DateTimePeriod. ScheduleLine includes a node element RequestedQuantity in a 1:1 cardinality relationship.

RequestedQuantity represents the quantity of a product to be delivered. RequestedQuantity includes the non-node elements: Quantity, QuantityMeasureUnitCodeName, QuantityTypeCode, and QuantityTypeCodeName. Quantity may be based on datatype CDT:Quantity. QuantityMeasureUnitCodeName may be based on datatype CDT:Name. QuantityTypeCode may be based on datatype GDT: QuantityTypeCode. QuantityTypeCodeName may be based on datatype CDT:Name.

Figures 1, 46:
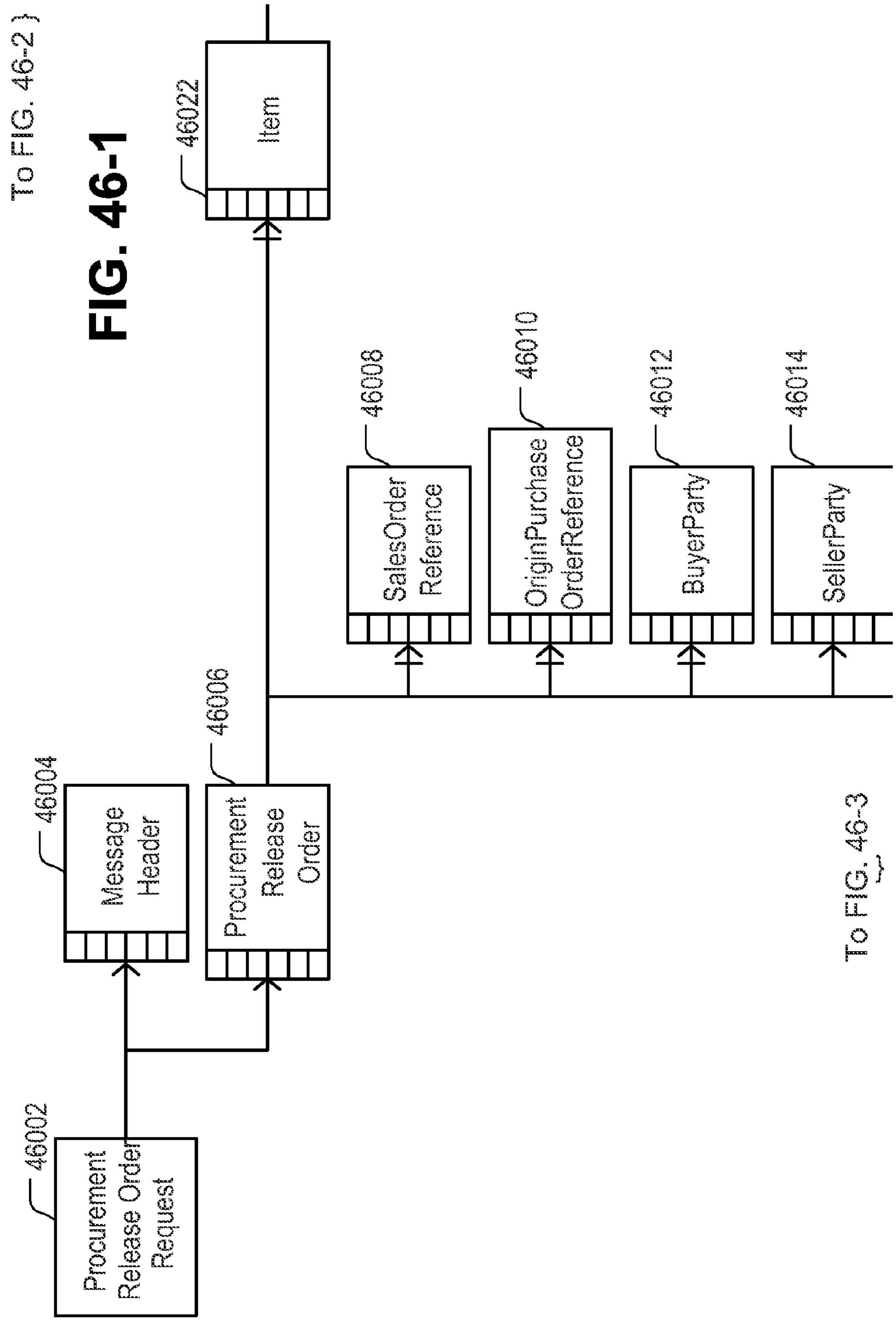
Figures 2, 46:
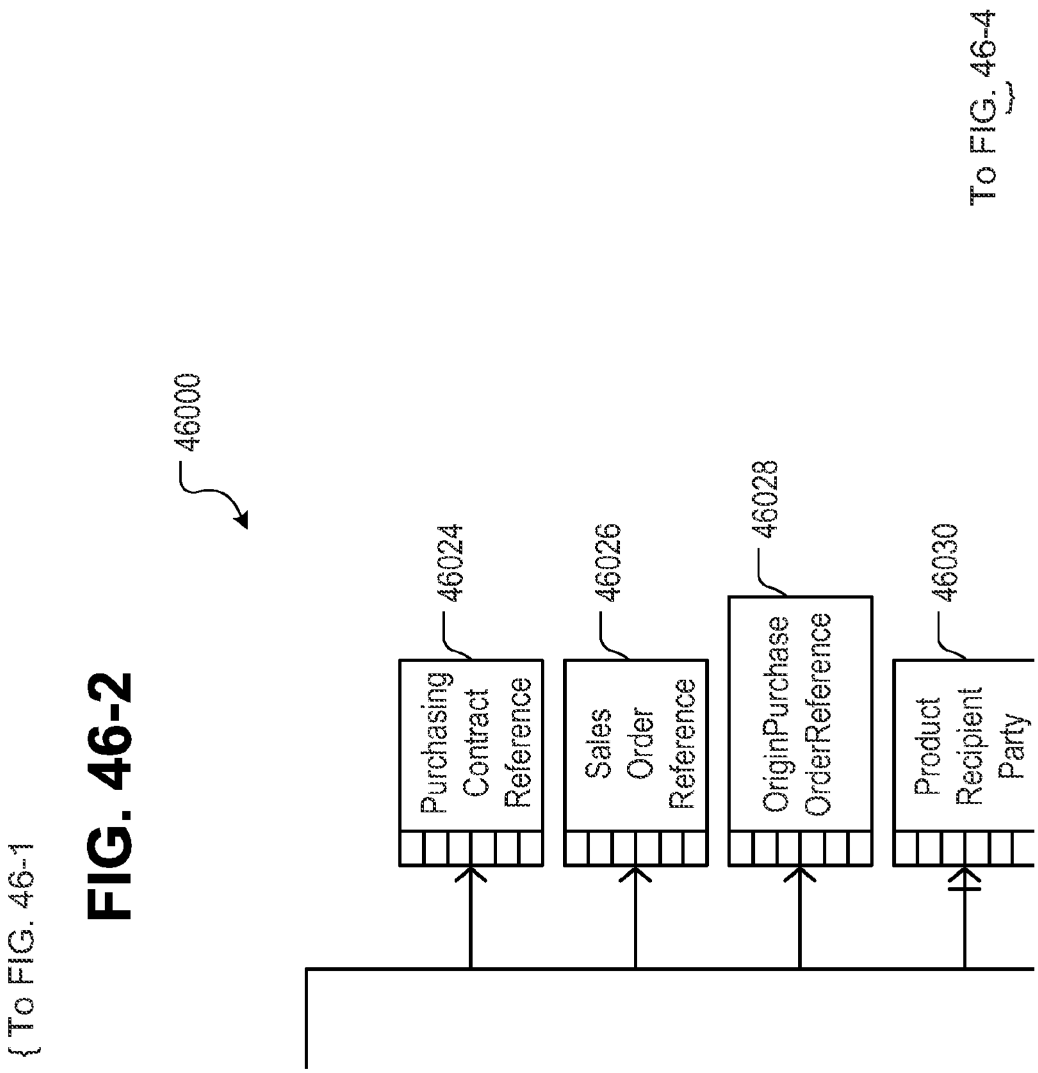
Figures 3, 46:
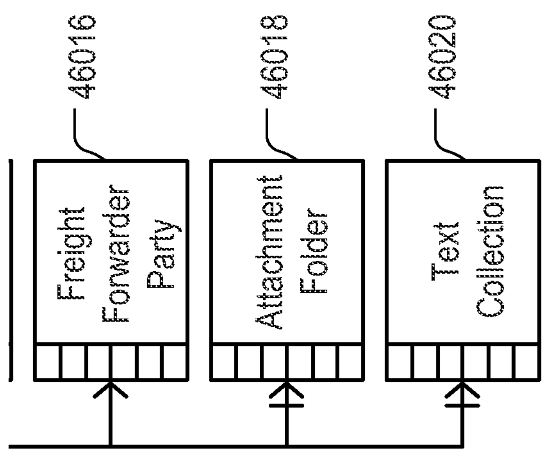
Figures 4, 46:
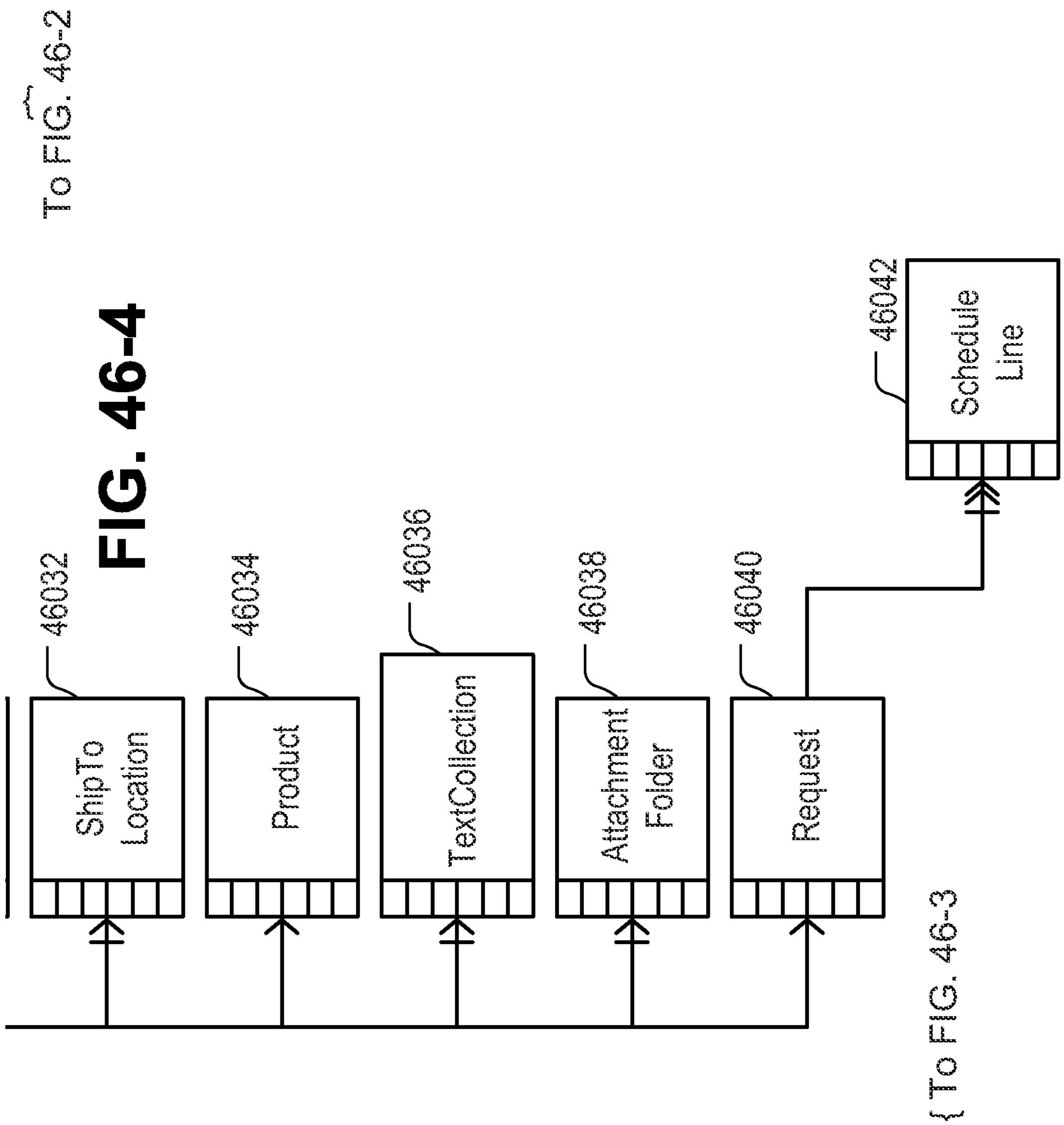

FIGS. 46-1 through 46-4 depict an example Procurement ReleaseOrderRequest Message Data Type 46000, which comprises elements 46002-46042, hierarchically related as shown. For example, the ProcurementReleaseOrderRequest 46002 includes a Message Header 46004.

The message type ProcurementReleaseOrderRequest is derived from the business object ReleaseOrderTemplate leading object together with its operation signature. A ProcurementReleaseOrderRequest is a request from a buyer to a seller about the quantities of products to be delivered on certain dates according to purchasing contract items. The structure of this message type can be determined by the message data type ProcurementReleaseOrderRequestMessage.

The ProcurementReleaseOrderRequestMessage message data type includes an object ProcurementReleaseOrder which is included in the business document, and business information that is relevant for sending a business document in a message. It includes MessageHeader and ProcurementReleaseOrder packages. This message data type can provide the structure for the ProcurementReleaseOrderRequest message type and the operations that are based on it.

MessageHeader Package is a grouping of business information that is relevant for sending a business document in a message. It includes the MessageHeader node. MessageHeader is a grouping of business information from the perspective of the sending application. It includes information to identify the business document in a message, information about the sender, and optionally, information about the recipient.

The MessageHeader includes SenderParty and RecipientParty elements. It can be of the type GDT:BusinessDocumentMessageHeader, and the elements of the GDT used include: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime.

SenderParty is a partner responsible for sending a business document at a business application level. The SenderParty may be based on datatype GDT:BusinessDocumentMessageHeaderParty. RecipientParty is a partner responsible for receiving a business document at a business application level. The RecipientParty may be based on datatype GDT:BusinessDocumentMessageHeaderParty.

The ProcurementReleaseOrder package is a grouping of ProcurementReleaseOrder with its packages. It includes BusinessTransactionDocumentReference, Party, AttachmentFolder, TextCollection, and Item packages, and a ProcurementReleaseOrder entity.

ProcurementReleaseOrder is a tool that is used by a customer to notify a supplier about the quantity of a material from a purchasing contract item that is to be delivered and at what time. ProcurementReleaseOrder includes the ActionCode and ReconciliationPeriod CounterValue attributes. ActionCode is a coded representation of an instruction to the message recipient how to process the ProcurementReleaseOrderRequest message. It may be based on datatype GDT: ActionCode. ReconciliationPeriod CounterValue represents a sequence number that identifies the reconciliation period this message refers to. It may be based on datatype GDT: CounterValue.

ProcurementReleaseOrder includes the non-node elements: ID, CreationDateTime, OrderedDateTime, and ItemListCompleteTransmissionIndicator. ID is a unique identifier for the ProcurementReleaseOrder. It may be based on datatype GDT:BusinessTransactionDocumentID. CreationDateTime represents the creation time of the procurement release order. It may be based on datatype CDT:LOCALNORMALISED_DateTime. OrderedDateTime represents the first time a procurement release order was sent to the supplier. It may be based on datatype CDT:LOCALNORMALISED_DateTime. ItemListCompleteTransmissionIndicator indicates if all items are transmitted in the message. It may be based on datatype CDT:Indicator.

ProcurementReleaseOrder includes a node element Sales OrderReference in a 1:C cardinality relationship, a node element OriginPurchaseOrderReference in a 1:C cardinality relationship, a node element BuyerParty in a 1:C cardinality relationship, a node element SellerParty in a 1:1 cardinality relationship, a node element LogisticsRequestResponsibleParty in a 1:C cardinality relationship, a node element FreightForwarderParty in a 1:C cardinality relationship, a node element AttachmentFolder in a 1:C cardinality relationship, a node element TextCollection in a 1:C cardinality relationship, and a node element Item in a 1:CN cardinality relationship.

The ProcurementReleaseOrderBusinessTransaction DocumentReference package includes SalesOrderReference and OriginPurchaseOrderReference entities. SalesOrderReference is a reference to the sales order which initiated the creation of the procurement release order. SalesOrderReference can be typed by BusinessTransactionDocument Reference. In some implementations, the reference is used in a third party direct ship scenario. OriginPurchaseOrderReference is a reference to the customer's purchase order which initiated the sales order in a third party direct ship scenario. OriginPurchaseOrderReference can be typed by BusinessTransactionDocumentReference.

The ProcurementReleaseOrderParty package includes BuyerParty, SellerParty, LogisticsRequestResponsibleParty, and FreightForwarderParty entities. A BuyerParty is a party that buys goods or services. BuyerParty can be typed by BusinessTransactionDocumentParty. The address of the BuyerParty is not intended to be used as the delivery address. The ShipToLocation is provided for this purpose. The SellerParty is a company or the person to sell the goods described in the ProcurementReleaseOrder. SellerParty can be typed by BusinessTransactionDocumentParty. LogisticsRequestResponsibleParty is a company or person that is responsible for logistics request. LogisticsRequestResponsibleParty can be typed by BusinessTransactionDocumentParty. FreightForwarderParty is a company or person that is responsible for organizing the shipment. FreightForwarderParty can be typed by BusinessTransactionDocumentParty.

For intra-enterprise communication, use the InternalID for all party entities. For inter-enterprise communication, use the StandardID or the partner-role-specific ID of the receiving partner for all party entities. Use the BuyerID for Supplier Collaboration scenarios, and use the SellerID for Customer Collaboration scenarios. Due to the different possibilities for ID use, all ID elements of the particular party are optional.

The ProcurementReleaseOrderAttachmentFolder package is the grouping of the Document package. AttachmentFolder can be typed by AttachmentFolder.

The ProcurementReleaseOrderAttachmentFolder Document package includes a Document entity. Document is an attachment, may be assigned, and includes unstructured information and additional control and monitoring information. A document includes unstructured information, as well as additional control and monitoring information. Document can be typed by Document.

The ProcurementReleaseOrderTextCollection package is the grouping of the Text package. TextCollection can be typed by TextCollection.

The ProcurementReleaseOrderTextCollectionText package includes a Text entity. Text is unstructured, readable information that includes additional formatting information within TextCollection. A text is recorded in a specific language and is characterized by its text type. Text can be typed by TextCollectionText.

The ProcurementReleaseOrderItem package is the grouping of BusinessTransactionDocumentReference, Party, Location, ProductInformation, TextCollection, AttachmentFolder, and Request packages.

ProcurementReleaseOrderItem is a statement regarding the requirement for a specific product at a ship-to location with reference to a purchasing contract item. Item includes an ActionCode attribute. ActionCode is a coded representation of an instruction to the message recipient as to how they should process the message item. It may be based on datatype GDT:ActionCode.

ProcurementReleaseOrderItem includes the non-node elements: ID, TypeCode, and CancellationDocumentIndicator. ID is a sequential number for the item in the ProcurementReleaseOrder document. It may be based on datatype GDT: BusinessTransactionDocumentItemID. TypeCode is a coded representation of the item's type. It may be based on datatype GDT:BusinessTransactionDocumentItemTypeCode. CancellationDocumentIndicator indicates whether this message cancels previous requests of the ProcurementReleaseOrderItem. It may be based on datatype CDT:Indicator.

ProcurementReleaseOrderItem includes a node element PurchasingContractReference in a 1:1 cardinality relationship, a node element SalesOrderReference in a 1:1 cardinality relationship, a node element OriginPurchaseOrderReference in a 1:1 cardinality relationship, a node element ProductRecipientParty in a 1:C cardinality relationship, a node element ShipToLocation in a 1:C cardinality relationship, a node element Product in a 1:1 cardinality relationship, a node element TextCollection in a 1:C cardinality relationship, a node element AttachmentFolder in a 1:C cardinality relationship, and a node element Request in a 1:1 cardinality relationship.

The ProcurementReleaseOrderItemBusinessTransaction DocumentReference package includes PurchasingContractReference, SalesOrderReference, and OriginPurchaseOrderReference entities. PurchasingContractReference is a reference to an item in a purchasing contract. In some implementations, the reference may always include the ItemID (purchasing contract item). SalesOrderReference is a reference to the sales order which initiated the creation of the procurement release order. In some implementations, the reference may always include the ItemID (sales order item). OriginPurchaseOrderReference is a reference to the customer's purchase order which initiated the sales order in a third party direct ship scenario. In some implementations, the reference may always include the ItemID (purchasing contract item).

The ProcurementReleaseOrderItemParty package includes a ProductRecipientParty entity. The ProductRecipientParty is a company or person that receives the goods delivery. ProductRecipientParty can be typed by BusinessTransactionDocumentParty.

For intra-enterprise communication with common master data, use InternalID for all party entities. For inter-enterprise communication with business-partner-specific master data, use the StandardID or the partner-role-specific ID of the receiving partner for all party entities. Use the BuyerID for Supplier Collaboration scenarios, and use the VendorID for Customer Collaboration scenarios. Due to the different possibilities for ID use, all ID elements of the particular "Party" are optional.

The ProcurementReleaseOrderItemLocation package includes a ShipToLocation entity. ShipToLocation represents a place to which the ordered products are delivered. ShipToLocation can be typed by BusinessTransactionDocumentShipToLocation.

For intra-enterprise communication, use the InternalID for all location entities. For inter-enterprise communication, use for all location entities either the StandardID or the partner-role-specific ID of the sending or receiving partner. Due to the different possibilities for ID use, all the ID elements of each location are optional.

The ProcurementReleaseOrderItemProductInformation package includes a Product entity. Product can be either a tangible or intangible good that is a part of the business activities of a company. It can be traded and contributes directly or indirectly to value added. Product can be typed by BusinessTransactionDocumentProduct.

For intra-enterprise communication, use the InternalID for all product entities. For inter-enterprise communication, use the StandardID or the partner-role-specific ID of the sending or receiving partner for all product entities. Due to the different possibilities for ID use, all ID elements of each particular product are optional.

The ProcurementReleaseOrderItemTextCollection package includes a TextCollection entity. TextCollection can be typed by TextCollection.

The ProcurementReleaseOrderItemAttachmentFolder package includes an AttachmentFolder entity. AttachmentFolder can be typed by AttachmentFolder.

The ProcurementReleaseOrderItemRequest package includes a Request entity. Request includes the non-node elements: ID, CreationDateTime, and PreviousItemRequestID. ID is a unique identifier for the request instance transferred in the procurement release order item. The ReleaseID is valid across all messages and is assigned for a release period such as a fiscal year or quarter. The ReleaseID does not identify a release order item. It may be based on datatype GDT:ReleaseOrderItemRequestID. CreationDateTime represents the creation date and time of the release instance. It may be based on datatype CDT:DateTime. PreviousItemRequestID is a unique identifier for the request instance transferred in the previous message. It may be based on datatype GDT:ReleaseOrderItemRequestID. Request includes a node element ScheduleLine in a 1:CN cardinality relationship. In some implementations, request may always be specified.

The ProcurementReleaseOrderItem package includes a ScheduleLine entity. ProcurementReleaseOrderItemScheduleLine is a statement about the quantity of a product to be delivered within a certain period of time. ScheduleLine includes the non-node elements: ID, RequestedArrivalDateTimePeriod, RequestedQuantity, and RequestedQuantityTypeCode. ID is a unique identifier for the request schedule line instance transferred in the procurement release order. It may be based on datatype GDT:ReleaseOrderItemRequestScheduleLineID. RequestedArrivalDateTimePeriod represents the period in which the product is to be delivered. It may be based on datatype GDT:DateTimePeriod. RequestedQuantity represents the quantity of a product to be delivered or picked up. It may be based on datatype CDT:Quantity. RequestedQuantityTypeCode is a coded representation of schedule line's requested quantity type. It may be based on datatype GDT:QuantityTypeCode.

FIGS. 47-1 through 47-64 show an example configuration of an Element Structure that includes a FormProcurementReleaseOrderRequest 470000 package. Specifically, these figures depict the arrangement and hierarchy of various components such as one or more levels of packages, entities, and datatypes, shown here as 470000 through 472112. As described above, packages may be used to represent hierarchy levels. Entities are discrete business elements that are used during a business transaction. Data types are used to type object entities and interfaces with a structure. For example, the FormProcurementReleaseOrderRequest 470000 includes, among other things, a FormProcurementReleaseOrderRequest 470002. Accordingly, heterogeneous applications may communicate using this consistent message configured as such.

FIGS. 48-1 through 48-237 show an example configuration of an Element Structure that includes a ProcurementReleaseOrderRequest 480000 package. Specifically, these figures depict the arrangement and hierarchy of various components such as one or more levels of packages, entities, and datatypes, shown here as 480000 through 486426. As described above, packages may be used to represent hierarchy levels. Entities are discrete business elements that are used during a business transaction. Data types are used to type object entities and interfaces with a structure. For example, the ProcurementReleaseOrderRequest 480000 includes, among other things, a ProcurementReleaseOrderRequest 480002. Accordingly, heterogeneous applications may communicate using this consistent message configured as such.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for exchanging goods tag-related information for an electronic device or other small piece, part or label that is attached to a product or package and that contains selected information about the product or package, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing a notification to print or create a mixed content package tag notification, wherein the mixed content package tag comprises a label for an identified logistics unit, the label including package measurements and package content information, the first message including a first message package derived from the common business object model and hierarchically organized in memory as:

a form mixed content package tag notification message entity; and a goods tag package comprising a goods tag entity, a delivery package, a business transaction document references package and a site package, where the goods tag entity includes an identifier (ID), a creation context depending date, an output request creation date time and an output request creation identity ID, where the delivery package includes a delivery entity, where the business transaction document references package includes a business transaction document references entity, where the site package includes a site entity, and further where the site entity includes a site ID and a site description;

program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the goods tag entity further comprises at least one of the following: a production date, a shipping date, a goods receipt date, a shipping package attached indicator, a gross weight measure, a gross weight measure type code, a gross weight measure type name, a gross weight measure unit code name, a gross volume measure, a gross volume measure type code, a gross volume measure type name, a gross volume measure unit code name, an output request creation business partner formatted name, an image file content binary object, and a transport tracking.

3. The computer readable medium of claim 1, wherein the goods tag package further comprises at least one of the following: a text collection package, a logistic unit package, and an identified logistic unit package.

4. A distributed system operating in a landscape of computer systems providing message-based services defined in a service registry, the system comprising:

a graphical user interface comprising computer readable instructions, embedded on tangible media, for a request to provide a notification to print or create a mixed content package tag notification, the mixed content package tag comprising goods tag-related information for an electronic device or other small piece, part or label that is attached to a product or package and that contains selected information about the product or package using a request;

a first memory storing a user interface controller for processing the request and involving a message including a message package derived from a common business object model, where the common business object model includes business objects having relationships that enable derivation of message-based service interfaces and message packages, the message package hierarchically organized as:

a form mixed content package tag notification message entity; and a goods tag package comprising a goods tag entity, a delivery package, a business transaction document references package and a site package, where the goods tag entity includes an identifier (ID), a creation context depending date, an output request creation date time and an output request creation identity ID, where the delivery package includes a delivery entity, where the business transaction document references package includes a business transaction document references entity, where the site package includes a site entity, and further where the site entity includes a site ID and a site description; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the message package based on the common business object model.

5. The distributed system of claim 4, wherein the first memory is remote from the graphical user interface.

6. The distributed system of claim 4, wherein the first memory is remote from the second memory.

* * * * *